US012754148B2

(12) United States Patent
Allman et al.

(10) Patent No.: US 12,754,148 B2
(45) Date of Patent: Oct. 6, 2026

(54) SYSTEMS AND METHODS FOR USING MULTI-DIMENSIONAL X-RAY IMAGING IN MEAT PRODUCTION AND PROCESSING APPLICATIONS

(71) Applicant: Rapiscan Holdings, Inc., Hawthorne, CA (US)

(72) Inventors: Brendan Edward Allman, Coburg (AU); Luciano Adrian Gonzalez, Caringbah South (AU); Garth Michael Tarr, Newtown (AU); Xiuying Wang, Cheltenham (AU); Yichao Hao, Bella Vista (AU); Jingwen Guan, Camperdown (AU); Cassius Errol Owen Coombs, Revesby (AU); Alessio Cotticelli, Camden (AU)

(73) Assignee: Rapiscan Holdings, Inc., Torrance, CA (US)

( * ) Notice: Subject to any disclaimer, the term of this patent is extended or adjusted under 35 U.S.C. 154(b) by 550 days.

(21) Appl. No.: 18/329,434

(22) Filed: Jun. 5, 2023

(65) Prior Publication Data

US 2024/0402098 A1 Dec. 5, 2024

(51) Int. Cl.

*G01N 23/00* (2006.01)
*G01N 23/046* (2018.01)
*G06F 18/23213* (2023.01)

(52) U.S. Cl.

CPC ..... *G01N 23/046* (2013.01); *G06F 18/23213* (2023.01); *G01N 2223/303* (2013.01); *G01N 2223/408* (2013.01); *G01N 2223/423* (2013.01); *G01N 2223/612* (2013.01); *G01N 2223/633* (2013.01); *G01N 2223/643* (2013.01)

(58) Field of Classification Search

CPC ....... G01N 2223/303; G01N 2223/408; G01N 2223/423; G01N 2223/612; G01N 2223/633; G01N 2223/643; G01N 23/046
See application file for complete search history.

(56) References Cited

U.S. PATENT DOCUMENTS

| | | | |
|---|---|---|---|
| 7,349,525 | B2 | 3/2008 | Morton |
| 7,440,543 | B2 | 10/2008 | Morton |
| 7,505,563 | B2 | 3/2009 | Morton |
| 7,512,215 | B2 | 3/2009 | Morton |
| 7,564,939 | B2 | 7/2009 | Morton |
| 7,664,230 | B2 | 2/2010 | Morton |
| 7,684,538 | B2 | 3/2010 | Morton |
| 7,724,868 | B2 | 5/2010 | Morton |

(Continued)

OTHER PUBLICATIONS

WO2021/112784 (Year: 2021).*

*Primary Examiner* — Dani Fox
(74) *Attorney, Agent, or Firm* — Novel IP

(57) ABSTRACT

The specification teaches an imaging system that evaluates meat quality. The imaging system includes an X-ray scanning system that generates X-ray scan data of meat and a hyperspectral imaging system that generates hyperspectral imaging data. A computing device acquires the X-ray scan data and hyperspectral imaging data, automatically determines a quality of the meat by analyzing the acquired X-ray scan data in combination with the hyperspectral imaging data, categorizes the meat, based on the determined quality, into one of acceptable quality and unacceptable quality categories; and generates data indicative of the quality of the meat.

29 Claims, 107 Drawing Sheets

(56) References Cited

U.S. PATENT DOCUMENTS

| | | | |
|---|---|---|---|
| 7,876,879 | B2 | 1/2011 | Morton |
| 7,903,789 | B2 | 3/2011 | Morton |
| 7,929,663 | B2 | 4/2011 | Morton |
| 7,949,101 | B2 | 5/2011 | Morton |
| 8,085,897 | B2 | 12/2011 | Morton |
| 8,094,784 | B2 | 1/2012 | Morton |
| 8,135,110 | B2 | 3/2012 | Morton |
| 8,204,173 | B2 | 6/2012 | Betcke |
| 8,223,919 | B2 | 7/2012 | Morton |
| 8,243,876 | B2 | 8/2012 | Morton |
| 8,331,535 | B2 | 12/2012 | Morton |
| 8,451,974 | B2 | 5/2013 | Morton |
| 8,552,722 | B2 | 10/2013 | Lionheart |
| 8,559,592 | B2 | 10/2013 | Betcke |
| 8,625,735 | B2 | 1/2014 | Morton |
| 8,804,899 | B2 | 8/2014 | Morton |
| 8,824,637 | B2 | 9/2014 | Morton |
| 8,837,669 | B2 | 9/2014 | Morton |
| 8,885,794 | B2 | 11/2014 | Morton |
| 8,958,526 | B2 | 2/2015 | Morton |
| 9,001,973 | B2 | 4/2015 | Morton |
| 9,020,095 | B2 | 4/2015 | Morton |
| 9,046,465 | B2 | 6/2015 | Thompson |
| 9,048,061 | B2 | 6/2015 | Morton |
| 9,093,245 | B2 | 7/2015 | Morton |
| 9,113,839 | B2 | 8/2015 | Morton |
| 9,158,030 | B2 | 10/2015 | Morton |
| 9,183,647 | B2 | 11/2015 | Morton |
| 9,208,988 | B2 | 12/2015 | Morton |
| 9,263,225 | B2 | 2/2016 | Morton |
| 9,420,677 | B2 | 8/2016 | Morton |
| 9,442,082 | B2 | 9/2016 | Morton |
| 9,576,766 | B2 | 2/2017 | Morton |
| 9,606,259 | B2 | 3/2017 | Morton |
| 9,618,648 | B2 | 4/2017 | Morton |
| 9,638,646 | B2 | 5/2017 | Morton |
| 9,675,306 | B2 | 6/2017 | Morton |
| 9,714,920 | B2 | 7/2017 | Lionheart |
| 9,726,619 | B2 | 8/2017 | Thompson |
| 9,747,705 | B2 | 8/2017 | Morton |
| 10,107,783 | B2 | 10/2018 | Lionheart |
| 10,175,381 | B2 | 1/2019 | Morton |
| 10,295,483 | B2 | 5/2019 | Morton |
| 10,483,077 | B2 | 11/2019 | Morton |
| 10,591,424 | B2 | 3/2020 | Morton |
| 10,663,616 | B2 | 5/2020 | Morton |
| 10,901,112 | B2 | 1/2021 | Morton |
| 10,976,271 | B2 | 4/2021 | Morton |
| 11,796,711 | B2 | 10/2023 | Morton |
| 2009/0274277 | A1 | 11/2009 | Morton |
| 2009/0316855 | A1 | 12/2009 | Morton |
| 2010/0172476 | A1 | 7/2010 | Morton |
| 2014/0342631 | A1 | 11/2014 | Morton |
| 2015/0357148 | A1 | 12/2015 | Morton |
| 2017/0161922 | A1 | 6/2017 | Morton |
| 2018/0038988 | A1 | 2/2018 | Morton |
| 2018/0128754 | A1 | 5/2018 | Thompson |
| 2019/0178821 | A1 | 6/2019 | Morton |
| 2020/0103357 | A1 | 4/2020 | Morton |
| 2020/0200690 | A1 | 6/2020 | Morton |
| 2020/0378906 | A1 | 12/2020 | Morton |
| 2021/0041378 | A1* | 2/2021 | Morton .................. G01N 23/10 |
| 2021/0137470 | A1 | 5/2021 | Thompson |
| 2023/0053185 | A1* | 2/2023 | Shi ......................... G01N 33/12 |
| 2024/0111070 | A1 | 4/2024 | Morton |

* cited by examiner

901

2304

3608

3606

3708

3808

3910

4040

4802

5102

5104

5202

5204

SYSTEMS AND METHODS FOR USING MULTI-DIMENSIONAL X-RAY IMAGING IN MEAT PRODUCTION AND PROCESSING APPLICATIONS

FIELD

The present specification relates generally to the field of rearing animals and/or livestock on farms for the processing and production of meat products derived therefrom. More specifically, the present specification is related to the use of three-dimensional (3D) stationary gantry computed tomography (CT) systems for improving farming practices that lead to enhanced quality of reared animal products in addition to improved management of abattoir production processes.

BACKGROUND

Farms produce livestock destined for consumption in human and animal food chains, including but not limited to, poultry, pigs, goats, sheep and cattle. In contrast to other industries where a blending of product is possible to achieve a level of consistency, each animal has individual characteristics that warrant consumer satisfaction. The manner in which the animals are raised or treated on the farm tend to have an effect on the characteristics that affect customer satisfaction with meat products derived from the animals (such as, for example, a beefsteak or lamb chop). Consumers place increasing emphasis on consumption quality, food safety, and food traceability of the resultant meat product. As an example, animals reared at cattle farms are sold and processed at meat factories to produce a variety of meat products within the food chain. Strict quality control measures exist to ensure that the animals that enter the factory are optimally processed to produce products that meet desired consumer satisfaction in terms of eating quality, food chain traceability, and food safety.

To satisfy such consumer demands, the farmer needs to demonstrate conformance to standards and practices, in addition to regular farming activities, which place considerable burden on the farmer. The objective of a farmer is thus to breed the highest value animal for the farming conditions at a particular farm location (high altitude, low altitude, warm, cool, wet, dry, lush, barren) and to do this at the lowest possible cost. This means managing food, water, veterinary needs, transportation, and maintenance costs to deliver the greatest return. Currently, farmers use a range of information sources to plan their farming practices including weather forecasting, satellite imagery for pasture and water management, animal tracking to determine optimal location of feed and water troughs, genetic profiling for herd development and veterinary records. In general, such information is processed by the farmer using his own farming experience in order to optimize animal health, lean meat yield (the amount of meat compared to fat or bone), and consequent return on investment.

Once an animal reaches a meat processing plant or factory, the animals are typically slaughtered first; the head, viscera, hide and extremities are subsequently removed; and the carcasses are then placed into a cool room for a period of time to hang while fat solidifies. Once the carcass is rigid, it is then sectioned into major pieces (known as primals). Each primal is then passed on to a de-boning area in which retail ready cuts of meat are processed into bone-in or boneless cuts prior to packaging and transfer into the retail supply chain. Hundreds of people stand shoulder-to-shoulder to each perform a certain set of actions as the carcass or primal passes in front of them, with the carcass typically being suspended from a moving rail and the primal typically on a moving conveyor belt in this labor-intensive process. Instructions are provided to each individual in the de-boning area with regard to which cuts are required on each day to satisfy customer demand and meet production targets. The result is a productive process but not one that typically operates at peak efficiency.

Efficiency losses come from trimming excess meat off the retail cut, thus putting valuable product into a lower-grade food supply chain, for example overcutting valuable rib-eye muscle such that it ends up destined for lower value minced meat. Further efficiency losses come from inaccurate production planning in which a carcass is processed into a sub-optimal set of retail cuts. This typically occurs because the cutting team of individuals is provided with a production plan that is not specific to each individual carcass but rather reflects an average production target across the full set of carcasses to be processed that day.

Each individual working in the plant has an obligation to meet high standards of food safety, but in some cases, the carcass may contain invisible contamination or health defects that are hidden beneath the visible surface of the carcass that are not possible for the individual to determine. This can result in occasional, yet significant, food safety issues that can be expensive and complex to mitigate. Further, as retail cuts are produced and packaged, there are occasional errors in food labelling and packaging which result in shipping incorrect products to customers. Such errors lead to rejection, sometimes of large quantities, of product by retail customers or consumers. In these cases, there is an adverse financial impact on the processer and the rejected product usually needs to be destroyed. It should also be noted that meat processing plants or factories predominantly employ individual workers who use knives to stage-by-stage dissect a carcass into required consumer products. Thus, the individual workers in a meat processing line responsible for the slaughter of an animal all the way to the final packaging of a product must undergo a high level of training to achieve proper cutting technique on a repeatable basis at the processing line speed required to achieve a commercially satisfactory outcome.

In some sectors, the use of automation to either substitute for or augment the labor force is prevalent (for example, in poultry processing) but in other sectors, the use of automation is limited (for example, beef processing). In large part, this is driven by the complexity and variation of the anatomy between one carcass and another. In poultry, such variations are relatively minimal whereas in beef the variations can be large depending on the breed and weight of the carcass being processed.

On the retail end, customers of meat products have specific requirements for the quality and cut of the products that they buy from a meat factory. These may include meat grading, fat thickness, weight and other factors that the processor must conform to regardless of the supply of animals into the factory. Given that the processor only understands the actual anatomy of the carcass during the dissection process in the factory, it is hard to plan optimal production based on the significant variation in size, weight and quality of the animals that arrive at the factory. This may lead to directing higher quality product to lower value output streams thereby resulting in reduction in yield and factory efficiency.

Meat quality grading systems tend to rely on relatively subjective measurements of a carcass and may include characteristics such as, but not limited to: a) comparison of meat color to a standard color chart at a specific location in the carcass; b) comparison of marbling and fat content of the carcass compared to a set of standardized photographs; and c) the amount force needed to indent a particular point on the surface of the carcass among other subjective indicators. Such measurements tend to be point-based and do not measure the natural variation in meat quality that can occur either within a particular muscle group or between muscle groups.

There is therefore a need for use of X-ray scanning systems and methods to improve farming practices leading to a higher valuation of reared animals. There is also need for the use of X-ray screening at various stages of the animal life cycle during development on a farm so that meat products derived from a herd are better characterized in terms of food quality and food safety. There is also a need to improve production efficiency, to reduce labor utilization, to take a carcass-centric approach to production, to enhance plant and food safety performance and to reduce losses due to poorly labelled and poorly packaged product. Accordingly, there is need for use of X-ray scanning systems and methods for improved quality control, consumption quality, carcass valuation and food safety in meat processing factories or abattoirs. There is also need for the use of X-ray screening to aid overall production planning and automation for improved abattoir management.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses an imaging system configured to evaluate meat, comprising: an X-ray scanning system configured to generate X-ray scan data of meat; a hyperspectral imaging system configured to generate hyperspectral imaging data; a computing device in data communication with the X-ray scanning system and the hyperspectral imaging system, wherein the computing device includes a processor and memory storing a plurality of programmatic instructions which when executed by the processor, configures the processor to: acquire the X-ray scan data and hyperspectral imaging data; automatically determine a quality of the meat by analyzing the acquired X-ray scan data in combination with the hyperspectral imaging data; categorize the meat, based on the determined quality, into one of acceptable quality and unacceptable quality categories; and generate data indicative of the quality of the meat.

Optionally, the X-ray scanning system comprises a two-dimensional projection X-ray imaging system having at least one of a single-view or a dual-view configuration, in combination with multi-energy X-ray (MEXA) sensors. Optionally, the X-ray scanning system comprises an inclined conveyor such that an entrance end of the conveyor is at a lower height position than an exit end of the conveyor. Optionally, the X-ray scanning system uses a declining conveyor such that an entrance end of the conveyor is at a higher height position than an exit end of the conveyor.

Optionally, the hyperspectral scan data comprises data in a visible light wavelength range and a shortwave infrared wavelength range.

Optionally, the meat comprises offal and organs.

Optionally, the system further comprises at least one of an ink-jet, a laser beam, a LED strip or an augmented reality headset adapted to generate a visual indication of quality in relation to the meat.

Optionally, the processor is further configured to: generate at least one graphical user interface to display at least one image corresponding to the X-ray scan data, and determine the quality based on data indicative of a thickness and/or a density of the meat.

Optionally, the system further comprises a conveyor that translates the meat through the system at a speed ranging from 0.1 m/s to 1.0 m/s.

Optionally, the multi-sensor imaging system has an inspection tunnel having a length ranging from 1100 mm to 5000 mm, a width ranging from 500 mm to 1000 mm, and a height ranging from 300 mm to 1000 mm.

Optionally, the X-ray scanning system comprises a first X-ray source of 120 to 160 keV with 0.2 to 1.25 mA beam current and a second X-ray source of 120 to 160 keV with 0.2 to 1.25 mA beam current, wherein the first X-ray source is configured in up-shooter configuration and the second X-ray source is configured in a side-shooter configuration. Optionally, the X-ray scanning system comprises multi-energy photon counting X-ray sensor arrays. Optionally, the X-ray scanning system comprises 6 to 22 data acquisition boards corresponding to the first X-ray source and 4 to 20 data acquisition boards corresponding to the second X-ray source.

Optionally, the X-ray scanning system is configured to acquire data in a plurality of energy bands, wherein the plurality of energy bands ranges from 3 to 20 and wherein each of the energy bands are in the range of 20-160 keV.

Optionally, the hyperspectral imaging system comprises a first camera sensor configured for visible imaging in 200 to 1200 wavelength bands and a second camera sensor configured for shortwave infrared imaging in 400 to 700 wavelength bands. Optionally, the first camera sensor is configured to operate in a range of 400 nm to 900 nm and have a spectral resolution of at least 20 nm with a pixel size not exceeding 2.0 mm across a width of a conveyor. Optionally, the second camera sensor operates is configured to operate in a range of 900 nm to 1800 nm and have a spectral resolution of at least 20 nm with a pixel size not exceeding 2.0 mm across the width of the conveyor.

Optionally, the hyperspectral imaging system is configured to have an acquisition rate of 30 to 150 Hz.

Optionally, the X-ray scanning system and the hyperspectral imaging system are synchronized to an X-ray base frequency ranging from 150 to 500 Hz.

Optionally, the processor is further configured to: determine a type of meat based on the acquired X-ray scan data and hyperspectral imaging data.

Optionally, the processor is further configured to: generate at least one graphical user interface to display at least one image corresponding to the hyperspectral imaging data; identify regions indicative of anomalies in the at least one image; and apply an annotation to the identified regions, wherein the annotation is at least one of a shape or a color. Optionally, the processor is configured to implement at least one machine learning model, wherein the machine learning model is configured to analyze the hyperspectral imaging data in order to determine the quality of the meat and the regions indicative of anomalies. Optionally, the machine learning model is adapted to be trained using K-means clustering in order to identify the regions indicative of anomalies.

Optionally, the data indicative of a quality of the meat includes at least one of a lean meat yield, a ratio of intra-muscular fat to tissue, an amount of inter-muscular fat, an absolute size of individual organs, a relative size of individual organs, a muscle volume, a number of ribs, a presence or an absence of diseases, a presence or an absence of cysts, a presence or an absence of tumors, a presence or an absence of pleurisy, or a presence or an absence of foreign objects.

The present specification also discloses a system for generating data indicative of animal breeding practices and meat production practices, comprising: a plurality of geographically distributed meat production sites having associated multi-sensor imaging systems, wherein each of the multi-sensor imaging system includes an X-ray scanning system and a hyperspectral imaging system; at least one server in data communication with a database and each of the multi-sensor imaging systems, wherein the at least one server includes a processor and memory storing a plurality of programmatic instructions which when executed by the processor, configures the processor to: implement at least one machine learning model; provide as input to the at least one machine learning model a plurality of data accessed from the database, wherein the at least one machine learning model is configured to analyze the plurality of data in order to generate said data, wherein said data are directed towards maximizing a plurality of positive parameters and minimizing a plurality of negative parameters associated with animal breeding and meat production; and enable a plurality of geographically distributed computing devices to access the generated data.

Optionally, the plurality of data corresponds to an aggregate of a plurality of animal and meat related data from each of the plurality of geographically distributed meat production sites and wherein the plurality of animal and meat related data comprises at least one of an animal ID, an animal type, a breed of animal, X-ray scan data corresponding to each of different ages of an animal, X-ray scan data of the animal's carcass and/or primal, hyperspectral image data of the animal's meat and organs, geographical location of a livestock farm and/or meat production site, climate, weather, season, feed type, time of year of meat production, vaccination history, medications, disease history, age of animal when received in the meat production site, a lean meat yield, a ratio of intra-muscular fat to tissue, an amount of inter-muscular fat, an absolute size of individual organs, a relative size of individual organs, a muscle volume, a number of ribs, a presence or an absence of diseases, a presence or an absence of cysts, a presence or an absence of tumors, a presence or an absence of pleurisy or a presence or an absence of foreign objects.

Optionally, the plurality of positive parameters comprises at least one of a reduced need for medication, a lower carbon footprint, a variable cost efficiency, a reputation protection, lower health risks to consumers, or improvements in the lean meat yield, the ratio of intra-muscular fat to tissue, the amount of inter-muscular fat, the absolute size of individual organs, the relative size of individual organs, the muscle volume, the number of ribs, the absence of diseases, the absence of cysts, the absence of tumors, the absence of pleurisy or the absence of foreign objects.

Optionally, the plurality of negative parameters comprises at least one of increases in the presence of diseases, the presence of cysts, the presence of tumors, the presence of pleurisy or the presence of foreign objects.

In some embodiments, the present specification discloses a method of evaluating quality of meat, comprising: operating a multi-sensor imaging system comprising: an X-ray scanning system configured to generate X-ray scan data of meat; a hyperspectral imaging system configured to generate hyperspectral imaging data; acquiring the X-ray scan data and hyperspectral imaging data; automatically determining a health status of the meat by analyzing the acquired X-ray scan data and/or hyperspectral imaging data; sorting the meat, based on the determined health status, into one of healthy and unhealthy categories; and generating data indicative of a quality of the meat.

Optionally, the X-ray scanning system uses 2D projection X-ray imaging in single-view or dual-view configurations with dual-energy or multi-energy X-ray (MEXA) sensors.

Optionally, the X-ray scanning system uses a conveyor that is positioned on an incline such that a first end of the conveyor is at a lower height position than a second opposing end of the conveyor.

Optionally, the X-ray scanning system uses a conveyor that is positioned on a decline such that a first end of the conveyor is at a higher height position than a second opposing end of the conveyor.

Optionally, the hyperspectral scan data includes visible and shortwave infrared scan data. Optionally, the meat includes offal and organs.

Optionally, the multi-sensor imaging system includes an ink-jet, laser beam, LED strip or augmented reality headset to indicate presence of health issues upon scanning the meat.

Optionally, the method further comprises generating at least one graphical user interface to display at least one image corresponding to the X-ray scan data, and determining the health status based on a threshold indicative of thickness and/or density of the meat.

Optionally, the multi-sensor imaging system includes a conveyor that translates the meat through the wherein the multi-sensor imaging system at a speed of about 0.2 m/s.

Optionally, the multi-sensor imaging system has an inspection tunnel of 1360 mm length, 630 mm width and 400 mm height.

Optionally, the X-ray scanning system includes first and second X-ray sources of 160 keV with 1.0 mA beam current, wherein the first X-ray source is configured in up-shooter configuration and the second X-ray source is configured in a side-shooter configuration.

Optionally, the X-ray scanning system includes multi-energy photon counting X-ray sensor arrays.

Optionally, the X-ray scanning system includes 11 data acquisition boards corresponding to the first X-ray source and 9 data acquisition boards corresponding to the second X-ray source.

Optionally, the X-ray scanning system is configured to have an acquisition rate of 300 Hz in six energy bands, and wherein the six energy bands are in the range of 20-160 keV.

Optionally, the hyperspectral imaging system includes a first camera sensor configured for visible imaging in 300 wavelength bands and a second camera sensor configured for shortwave infrared imaging in 512 wavelength bands.

Optionally, the first camera sensor operates in a range of 400 nm to 900 nm, has a spectral resolution of at least 20 nm with pixel size not exceeding 2.0 mm across a width of a conveyor.

Optionally, the second camera sensor operates in a range of 900 nm to 1800 nm, has a spectral resolution of at least 20 nm with pixel size not exceeding 2.0 mm across the width of the conveyor.

Optionally, the hyperspectral imaging system is configured to have an acquisition rate of 30 to 150 Hz.

The X-ray scanning system and the hyperspectral imaging system are synchronized to an X-ray base frequency of 300 Hz.

Optionally, the method further comprises determining a type of meat based on the acquired X-ray scan data and hyperspectral imaging data.

Optionally, the method further comprises generating at least one graphical user interface to display at least one image corresponding to the hyperspectral imaging data; identifying regions indicative of anomalies in the at least one image; and applying color and/or a shaped annotation to the identified regions, wherein the shaped annotation is one of circle or box.

Optionally, a machine learning model is configured to analyze the hyperspectral imaging data in order to determine the health status of the meat and the identify regions indicative of anomalies. Optionally, the machine learning model is trained using K-means clustering in order to identify the regions indicative of anomalies.

Optionally, the data indicative of a quality of the meat includes a plurality of after-sale parameters including lean meat yield, ratio of intra-muscular fat to tissue, amount of inter-muscular fat, absolute and relative size of individual organs, muscle volume, number of ribs, and presence or absence of diseases such as cysts, tumors, pleurisy and foreign objects.

The aforementioned and other embodiments of the present specification shall be described in greater depth in the drawings and detailed description provided below.

BRIEF DESCRIPTION OF THE DRAWINGS

These and other features and advantages of the present specification will be further appreciated, as they become better understood by reference to the following detailed description when considered in connection with the accompanying drawings.

DETAILED DESCRIPTION

Figure 1A:
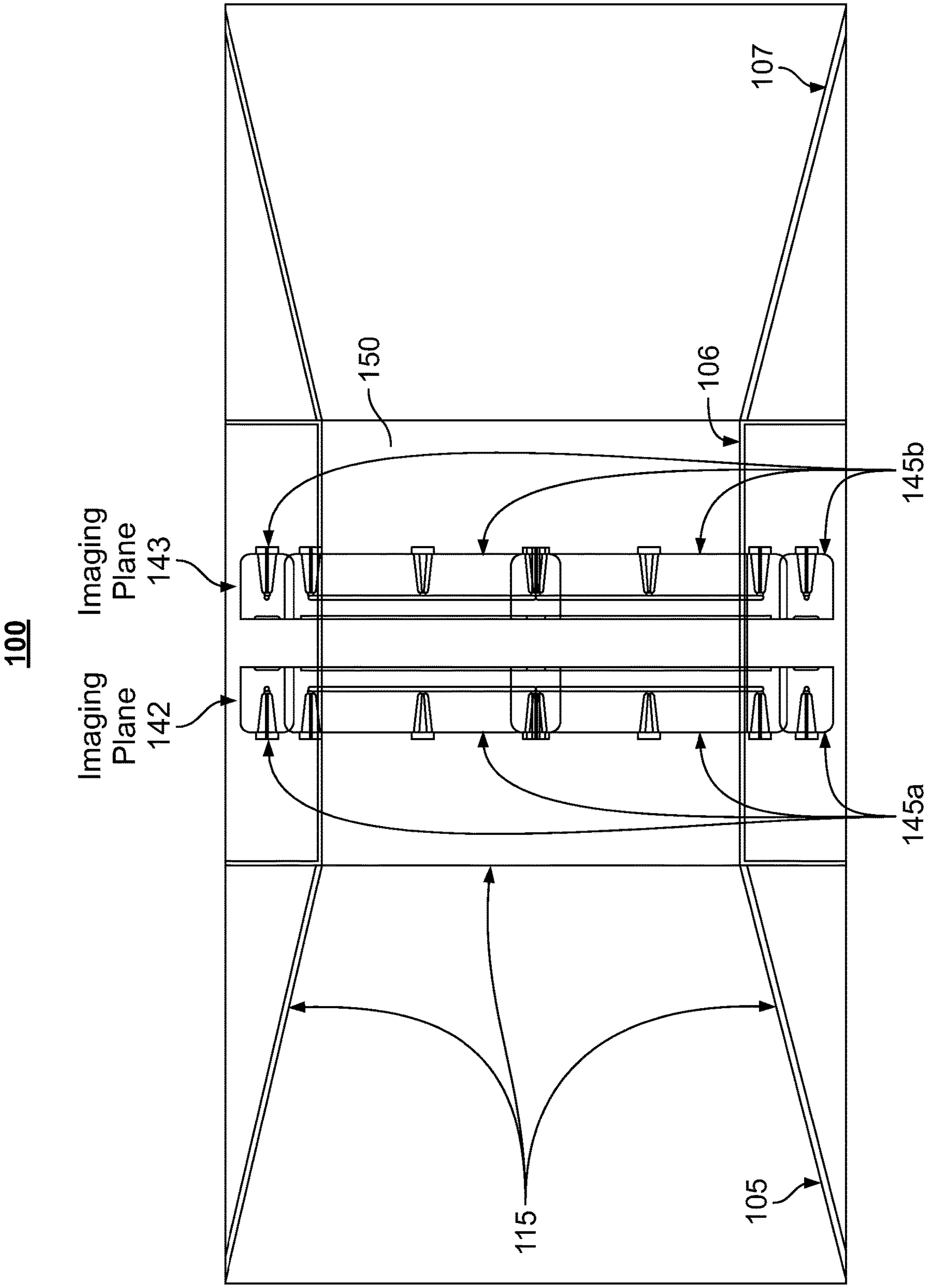
FIG. 1A shows a first cross-sectional side view of a 3D stationary gantry X-ray CT imaging system configured to scan cattle at farms, in accordance with some embodiments of the present specification.

In an embodiment, the present specification describes the use of three-dimensional (3D) stationary gantry X-ray computed tomography systems to scan animals and/or livestock for enabling improved management of animal farming processes, functions, or events. The resultant scan information, particularly when generated or applied at different stages during the development of an animal, may be used to drive farming practices for individual animals and for overall development of one or more herds. When such farming practices are driven based on scan information of animals and herds, the result is improved valuation of animals, a reduction in farming costs, and a concurrent improvement in eating or consumption quality of each animal thereby leading to improved farm economics and consumer satisfaction.

The present specification also discloses the use of 3D stationary gantry X-ray computed tomography systems for carcass screening and improved abattoir production planning, execution, and automation. In various embodiments, the use of scanning technology supports high throughput, automated, meat-processing lines with reduced manual labor, objectively measured product quality and improved food safety standards.

In an embodiment, the present specification discloses the use of 3D X-ray inspection to generate an image of an entire carcass and sections of the carcass, during the stages of dissection, final product preparation, and packaging of the carcass. The generated images are used to derive metrics on, but not limited to, eating quality, animal health, lean meat yield (the amount of meat, fat and bone present in the carcass), carcass value, and 3D carcass structure. The derived metrics also drive abattoir efficiency through process automation, precise production planning, provision of accurate consumption quality through each muscle within the carcass, rejection of unhealthy carcasses from the food chain, payment based on carcass value and not just on weight, quality control measures to ensure integrity of safe product to consumers, and supply chain assurance for customers to validate the supply chain of the meat that they purchase.

In an embodiment, the present specification also discloses a method for automating and increasing the efficiency of meat production in a meat processing plant. In an embodiment, the present specification provides for the use of network connected 2D and 3D X-ray imaging modalities along with visible and hand-held sensors such as, but not limited to, RFID and barcode readers in a meat producing plant. The networked imaging and screening modalities are used to generate data that is processed in real-time by specific algorithms in conjunction with production requirement information stored in a database that is coupled with the network, to generate individualized carcass-driven optimization of the meat production process as a whole. In an embodiment, the present specification provides a method for automatic and robotic cutting of carcasses.

In various embodiments, a computing device includes an input/output controller, at least one communication interface and a system memory. The system memory includes at least one random access memory (RAM) and at least one read-only memory (ROM). These elements are in communication with a central processing unit (CPU) to enable operation of the computing device.

In various embodiments, the computing device may be a conventional standalone computer or alternatively, the functions of the computing device may be distributed across a network of multiple computer systems and architectures. In some embodiments, execution of a plurality of sequences of programmatic instructions or code, which are stored in one or more non-volatile memories, enable or cause the CPU of the computing device to perform various functions and processes such as, for example, performing tomographic image reconstruction for display on a screen. In alternate embodiments, hard-wired circuitry may be used in place of, or in combination with, software instructions for implementation of the processes of systems and methods described in this application. Thus, the systems and methods described are not limited to any specific combination of hardware and software.

The term "pass", "passes", "passes through", "passing through", or "traverses" used in this disclosure encompass all forms of active and passive animal movement, including walking, being carried in a container, hanging from a structure or being conveyed/driven using a conveyor.

The term "meat" used in this disclosure may refer to flesh of animals used for food. In some embodiments, "meat" may refer to flesh inclusive of bone and edible parts but exclusive of inedible parts. Edible parts may include prime cuts, choice cuts, edible offal (head or head meat, tongue, brains, heart, liver, spleen, stomach or tripes and, in some cases, other parts such as feet, throat and lungs). Inedible parts may include hides and skins (except in the case of pigs), as well as hoofs and stomach contents.

The term "K-means clustering" used in this disclosure may refer to an unsupervised learning algorithm. There is no labeled data for this type of clustering, unlike with supervised learning. K-Means clustering is used to perform the division of objects into clusters that share similarities and are dissimilar to the objects belonging to another cluster.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. In addition, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise.

Figure 1B:
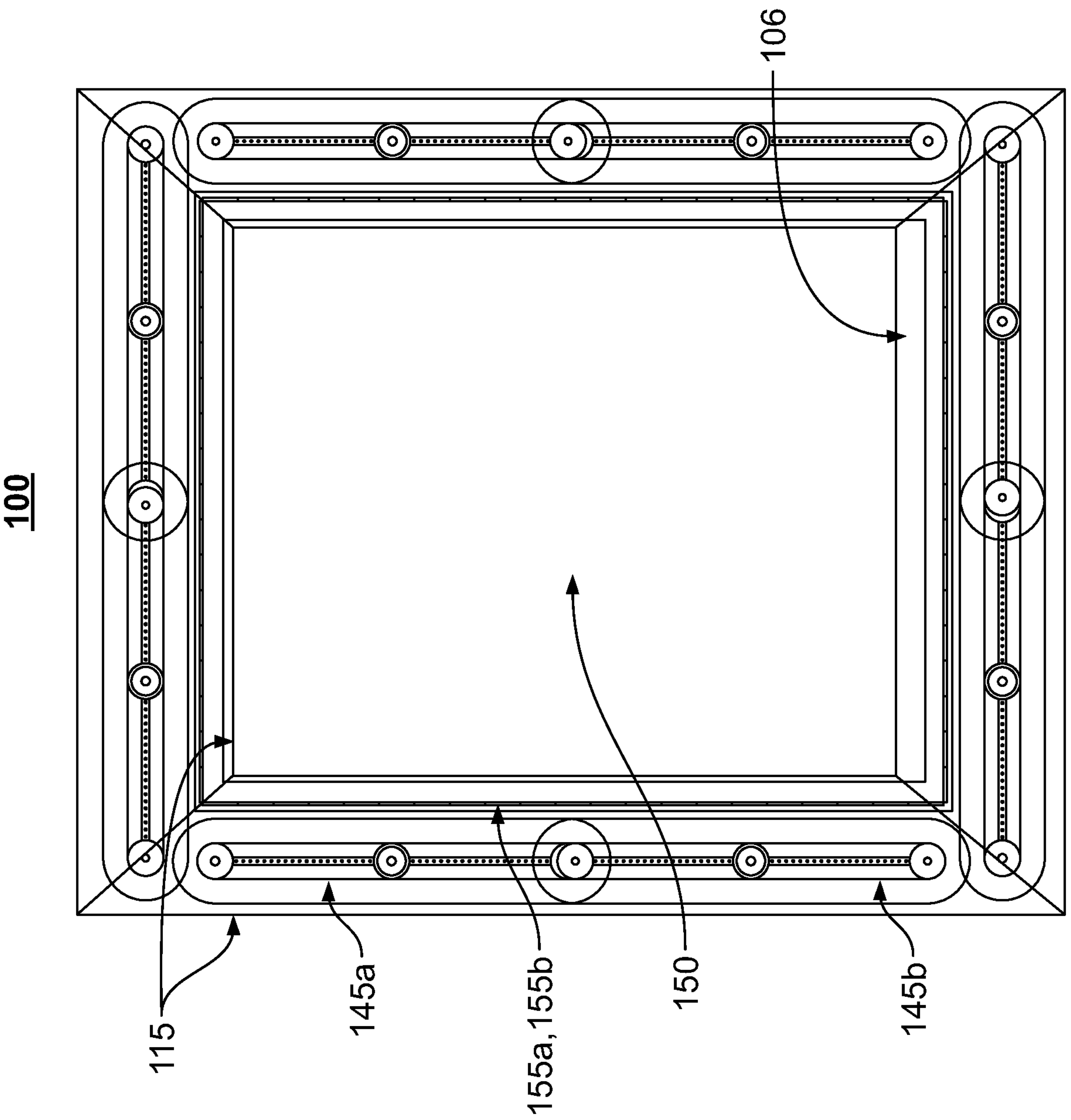
FIG. 1B shows a second cross-sectional side view of the 3D stationary gantry X-ray CT imaging system of FIG. 1A, in accordance with some embodiments of the present specification.

FIGS. 1A and 1B illustrate first and second side cross-sectional views of a 3D stationary gantry X-ray CT imaging system 100 (also referred to as a Real-Time Tomography (RTT) system) configured to scan cattle, in accordance with some embodiments of the present specification. Referring to FIGS. 1A and 1B, the system 100 is deployed, for example, in an animal farm to scan cattle in real time as an animal passes through a scanning region, area or aperture 150 of the system 100. The first side cross-sectional view of FIG. 1A is in a direction perpendicular to the direction of motion of an animal as it passes through the scanning region, area or aperture 150 whereas the second side cross-sectional view of FIG. 1B is in a direction parallel to the direction of motion of the animal passing through the scanning region, area or aperture 150.

In some embodiments, a first inclined ramp 105 is adapted to enable the animal to pass onto a horizontal platform 106 that lies in the scanning region, area or aperture 150 to eventually pass down using a second inclined ramp 107. In other words, the animal enters the scanning region, area or aperture 150 from the left portion in the figure and exits the scanning region, area or aperture 150 at the right in the figure.

In some embodiments, the system 100 is enclosed within a food safe, environmentally protected enclosure 115 manufactured using materials such as, but not limited to, stainless steel and/or plastic. In some embodiments, the system 100 is surrounded with at least one radiation shielding enclosure. A control room is provided for one or more system operators to review the performance of the system 100 on one or more inspection workstations in data communication with the system 100. In various embodiments, the one or more inspection workstations are computing devices.

In some embodiments, the system 100 is configured for dual-plane scanning and comprises a first plurality of linear multi-focus X-ray sources 145*a* along with an associated first array of detectors 155*a* positioned or deployed around the scanning region, area or aperture 150 to scan the animal in a first imaging plane 142 and a second plurality of linear multi-focus X-ray sources 145*b* along with an associated second array of detectors 155*b* also positioned or deployed around the scanning region, area or aperture 150 to scan the animal in a second imaging plane 143. Thus, the system 100 is constructed in two separate planes 142, 143 with data combined together, at the one or more inspection workstations, to create a single reconstructed volume.

In some embodiments, the scanning region, area or aperture 150 has a substantially rectangular geometry or shape. In some embodiments, a value representative of an entire width of the scanning area 150 is within 85% of a value representative of an entire height of the scanning area 150. In some embodiments, the scanning region, area or aperture 150 has dimensions 1500 mm (width)×1800 mm (height). In alternate embodiments, the scanning region, area or aperture 150 has a substantially square or polygonal geometry or shape. In some embodiments, the first imaging plane 142 comprises, say, four linear multi-focus X-ray sources 145*a* separated from each other and positioned around or along a perimeter of the scanning region, area or aperture 150. In some embodiments, the second imaging plane 143 comprises, say, four linear multi-focus X-ray sources 145*b* separated from each other and positioned around or along the perimeter of the scanning region, area or aperture 150.

In some embodiments, as shown in FIG. 1B, the linear multi-focus X-ray sources 145*b* (in the second imaging plane 143) are disposed or positioned so as to fill the gaps separating the linear multi-focus X-ray sources 145*a* (in the first imaging plane 142). Thus, the first and second linear multi-focus X-ray sources 145*a*, 145*b* are dispersed in their respective first and second imaging planes 142, 143 to create a substantially uniform sampling distribution around the periphery of the scanning region, area or aperture 150. In embodiments, it is preferred to maintain a relatively thin X-ray window around the X-ray detector regions 155*a*, 155*b*. In some embodiments, the horizontal top as well as first and second vertical sides use 2 mm to 5 mm thick aluminum. In the floor (horizontal platform 106), a thicker plate is needed, with a thickness ranging from 6 mm to 10 mm aluminum to prevent deformation under load from an animal's hoof. Although such thick windows reduce the total X-ray flux in the scanning region 150, this also reduces low energy X-ray dose, which helps to reduce radiation dose to the animal to a tolerable level.

In some embodiments, the first and second imaging planes 142, 143 are disposed along a direction perpendicular to the direction of motion of the animal over the horizontal platform 106 and through the inspection region, area or aperture 150 during scanning. In embodiments, the first and second imaging planes 142, 143 are separated from each other, along the direction of motion of the animal during scanning, by a distance 'd' ranging from 100 mm to 2000 mm. Thus, the first plurality of linear multi-focus X-ray sources 145*a* and the associated first array of detectors 155*a* are deployed in the first imaging plane 142 while the second plurality of linear multi-focus X-ray sources 145*b* and the associated second array of detectors 155*b* are deployed in the second imaging plane 143.

In embodiments, the first plurality of linear multi-focus X-ray sources 145*a* are offset or displaced from the associated first array of detectors 155*a*, in the first imaging plane 142, by a distance $d_1$ while the second plurality of linear multi-focus X-ray sources are offset or displaced from the associated second array of detectors 155*b*, in the second imaging plane 143, by a distance $d_2$. In some embodiments, $d_1$ is equal to $d_2$. In various embodiments, the distances $d_1$ and $d_2$ range from 2 mm to 20 mm. It should be appreciated that the first and second array of detectors 155*a*, 155*b* are displaced from the respective planes of the first and second X-ray sources 145*a*, 145*b* so that X-rays from a source on one side of the scanning region, area or aperture 150 pass above the detector array adjacent to the source but interact in the detector array opposite to the source at the other side of the scanning region, area or aperture 150.

In an embodiment, the 3D stationary gantry X-ray CT imaging system 100 comprises a series of X-ray tubes operating in tandem, instead of a multi focus X-ray source shown in FIGS. 1A and 1B. In other words, the X-ray sources are a plurality of X-ray tubes and do not contain multiple source points.

Figure 1C:
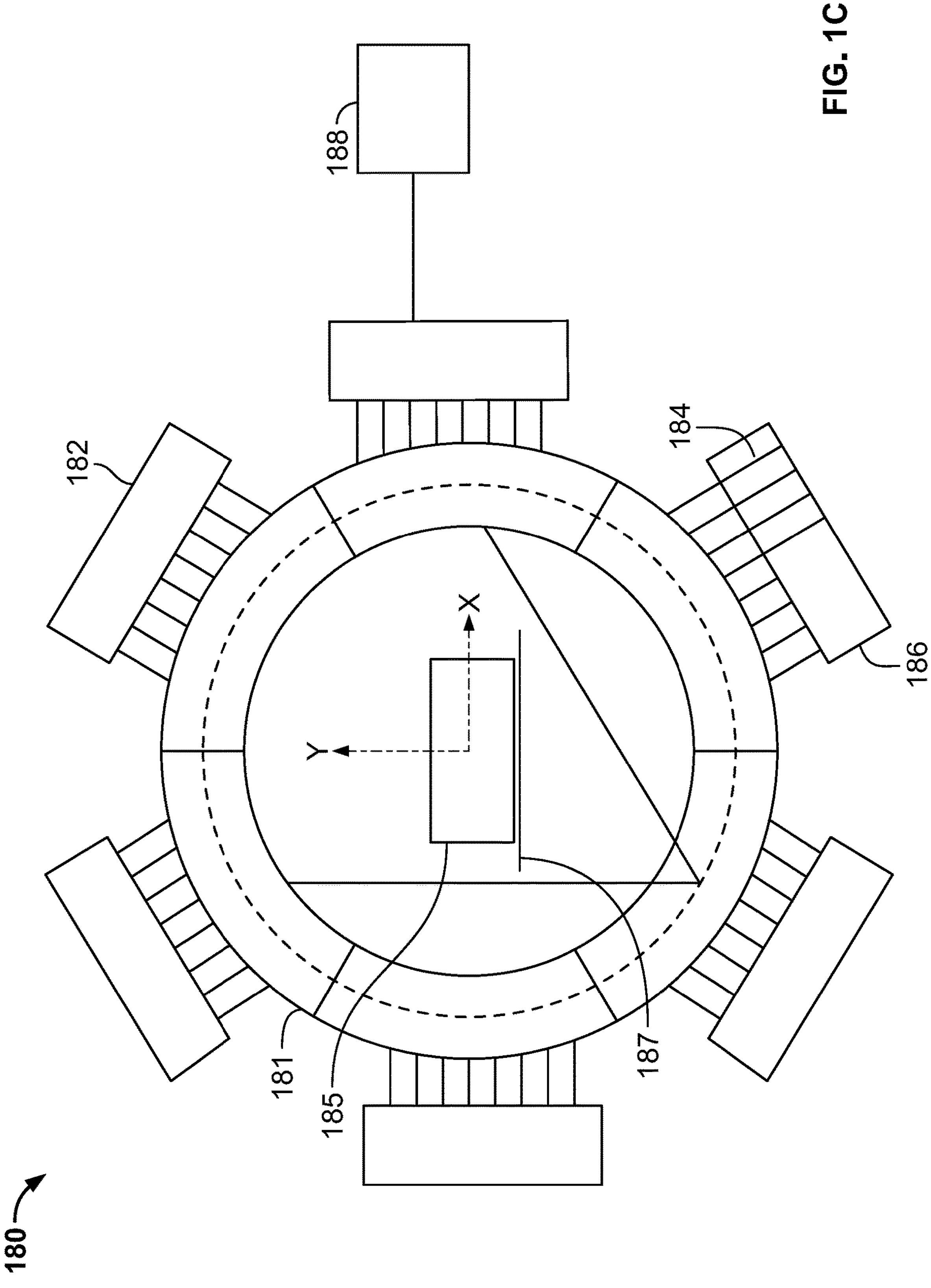
FIG. 1C shows a 3D stationary gantry X-ray CT imaging system comprising a plurality of X-ray tubes, in accordance with some embodiments of the present specification.

In some embodiments, as shown in FIG. 1C, the 3D stationary gantry X-ray CT imaging system 180 comprises one or more X-ray tubes 181 which are configured into a substantially circular arrangement around the scanner axis, wherein each X-ray tube 181 contains an X-ray source having one or more X-ray source points 182. In an embodiment, the emission of X-rays from each source point from each of the X-ray tubes 181 is controlled by a switching circuit 184, with one independent switching circuit for each X-ray source point. The switching circuits for each tube 181 together form part of a control circuit 186 for that tube. A controller 188 controls operation of all of the individual switching circuits 184. In an embodiment, the controller 188 is a workstation provided in a control room for one or more system operators to review the performance of the system 180. In embodiments, the switching circuits 184 are controlled to fire in a predetermined sequence such that in each of a series of activation periods, fan shaped beams of X rays from one or more active source points propagate through an animal 185 passing on a ramp 187 through a center of the arrangement of X-ray tubes 181. Thus, in embodiments, the controller 188 is configured to control an activation and deactivation of each of the source points within each of the first and second linear multi-focus X-ray sources 145*a*, 145*b*.

It should be appreciated that, in various embodiments, the controller 188 implements a plurality of instructions or programmatic code to a) ensure that the switching circuits 184 are controlled to fire in a predetermined sequence, and b) perform process steps corresponding to various workflows and methods described in this specification.

Referring to FIGS. 1A and 1B, during a scanning operation, as the animal passes through the scanning region, area or aperture 150, each X-ray source point within an individual multi-focus X-ray source (145*a*, 145*b*) is switched on in turn and projection data through the animal as it passes is collected for that one source point. When the exposure is complete, a different X-ray source point is switched on, say, for example, within a different multi-focus X-ray source in the system 100 to create a next X-ray projection. The scanning process continues until all X-ray sources have been fired in a sequence that is configured to optimize a reconstructed X-ray image quality. In some embodiments, it is preferable to activate a non-adjacent source in the next part of the scanning sequence. In fact, it is preferable to activate a source at approximately 20 to 90 degrees away from a currently active source point. Thus, individual X-ray source points within the linear multi-focus X-ray sources 145*a*, 145*b* within each plane 142, 143 are active sequentially such that typically at least one X-ray beam is active at all times. In some embodiments, each source point within a first linear multi-focus X-ray source is switched on and subsequently, after going through each of the source points within the first linear multi-focus X-ray source, each source point within a second linear multi-focus X-ray source is switched on. In some embodiments, one source point within a first linear multi-focus X-ray source is switched on and then one source point within a second linear multi-focus X-ray source is switched on, thus, alternating back and forth (between the first and second linear multi-focus X-ray sources) until all source points have been activated.

Figure 2:
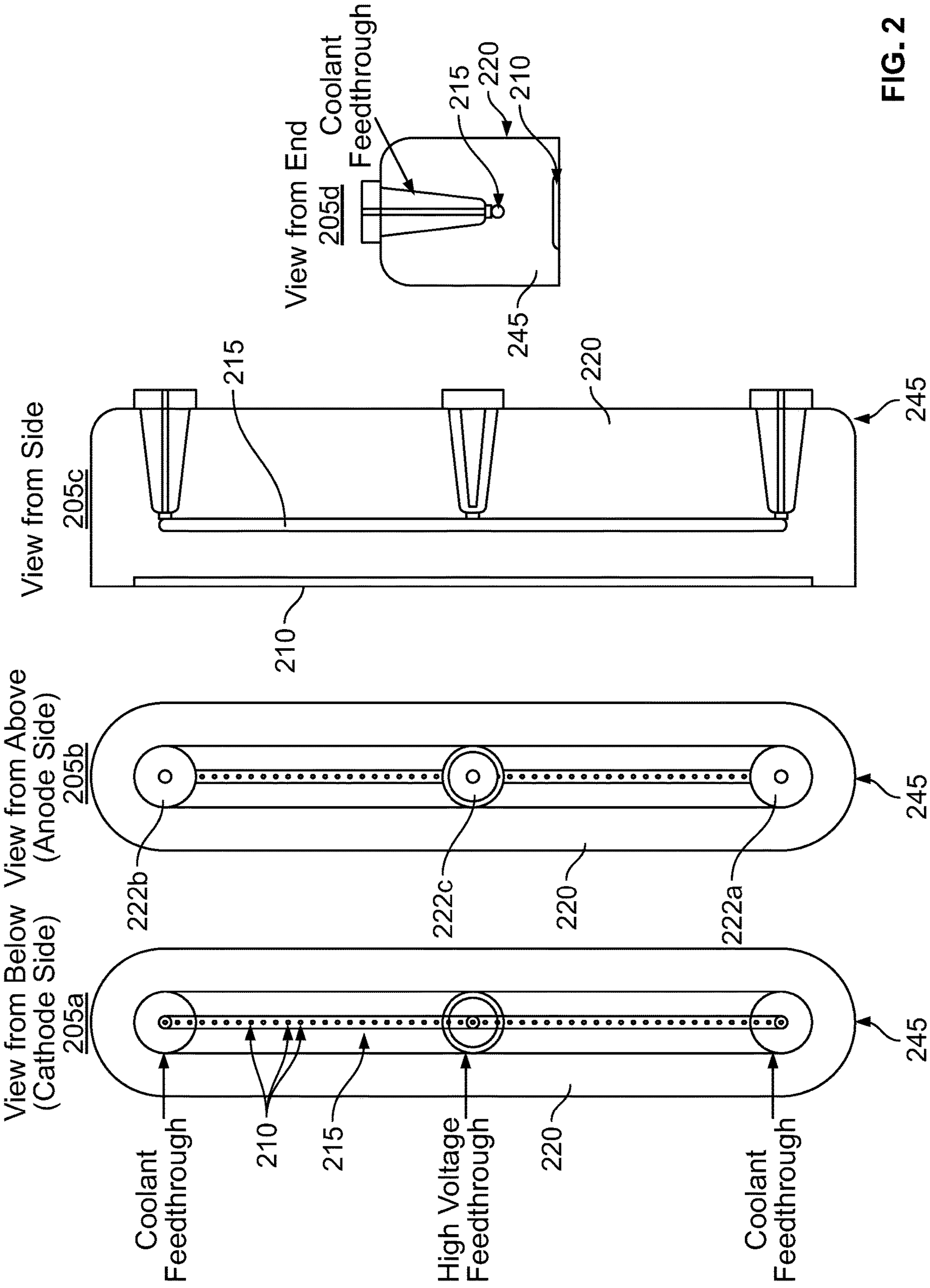
FIG. 2 shows bottom, top, longitudinal side and end views of a linear multi-focus X-ray source for use in a 3D stationary gantry X-ray CT imaging system, in accordance with some embodiments of the present specification.

FIG. 2 shows bottom, top, longitudinal side and end views 205*a*, 205*b*, 205*c*, 205*d* of a linear multi-focus X-ray source 245 for use in a 3D stationary gantry X-ray CT imaging system, in accordance with some embodiments of the present specification. Referring now to the views 205*a*, 205*b*, 205*c*, 205*d*, simultaneously, the source 245 comprises a plurality of electron guns, cathodes or source/emission points 210 and an anode 215 housed in a vacuum tube or envelope 220. In some embodiments, the source 245 comprises 100 X-ray emission points 210 on 10 mm spacing over an active anode 215 of length 1000 mm.

In some embodiments, first, second and third supports 222*a*, 222*b*, 222*c* are deployed to support the anode 215 along a longitudinal axis. The first and second supports 222*a*, 222*b* are deployed at two ends while the third support 222*c* is deployed at the center of the anode 215. In some embodiments, the first and second supports 222*a*, 222*b* also function as coolant feed-through units while the third support 222*c* enables high voltage feed-through. In some embodiments, the anode 215 supports an operating tube voltage in a range of 100 kV to 300 kV. In some embodiments, each electron gun, cathode or source/emission point 210 emits a tube current in a range of 1 mA to 500 mA depending on animal thickness and inspection area, aperture or size-larger the inspection aperture and thicker the animal, higher the required tube current.

For scanning livestock (for example, cows and buffaloes), a suitable optimization is 225 k V tube voltage and 20 mA beam current, with total X-ray beam power of 4.5 kW. Coupled with tube filtration of minimum 3 mm aluminum this results in dose to the animal in a range of 2 μSv (microsievert) to 20 μSv, and in embodiments, around 10 μSv. To put this in context, typical individual dose to humans due to naturally occurring background radiation is 2 mSv/year (millisievert/year). An exposure of 10 μSv corresponds to 0.5% of one year of natural background radiation or around 2 days of natural background radiation.

In some embodiments, each electron gun 210 is configured to irradiate an area or focal spot on the anode 215 ranging between 0.5 mm to 3.0 mm diameters. Specific dimensions of the focal spot are selected to maximize image quality and minimize heating of the anode 215 during X-ray exposure. Higher the product of tube current and tube voltage, larger the focal spot is typically designed to be.

Figure 3A:
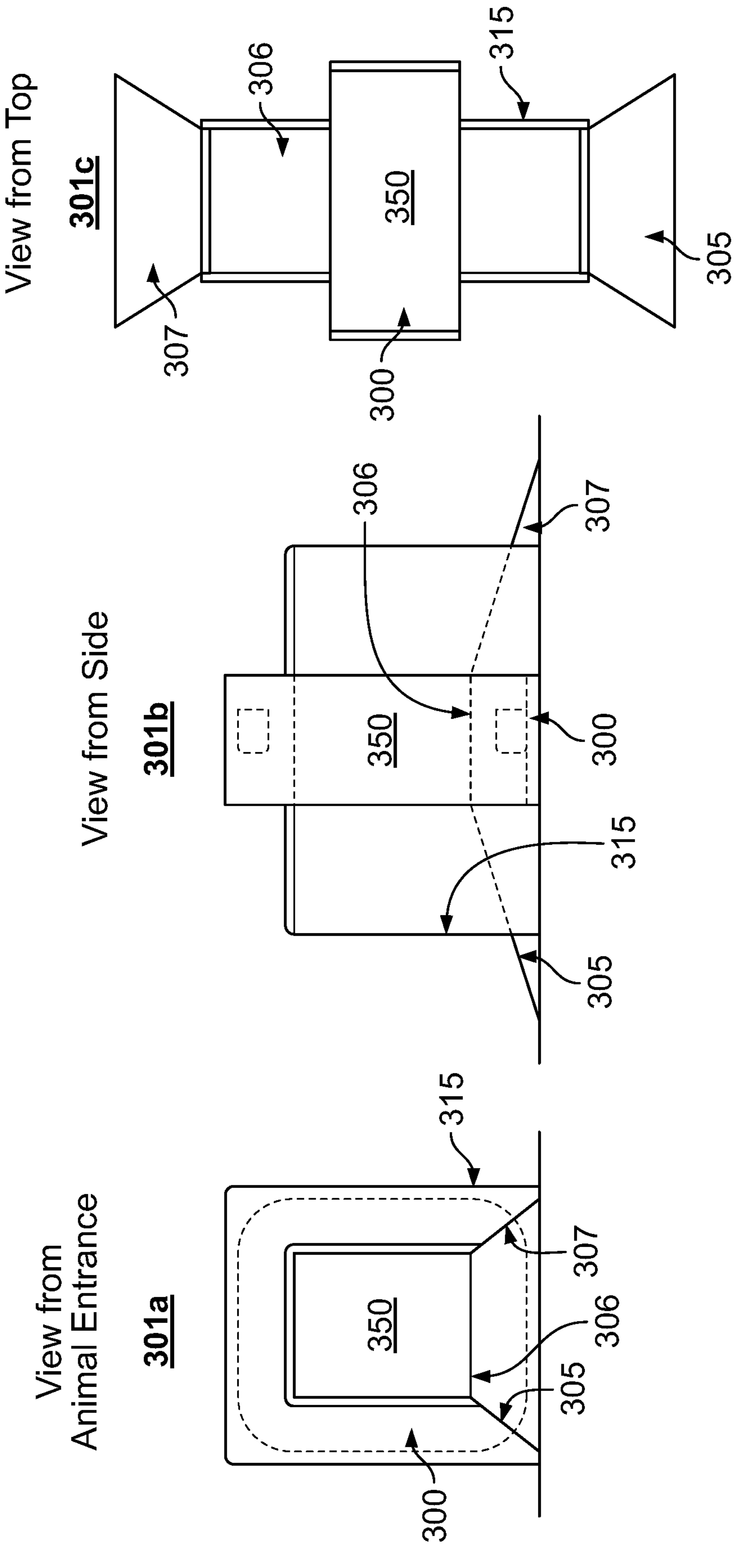
FIG. 3A shows first side, second side and top views of a single-plane stationary gantry X-ray computed tomography system configured to scan cattle at farms, in accordance with some embodiments of the present specification.
Figure 3B:
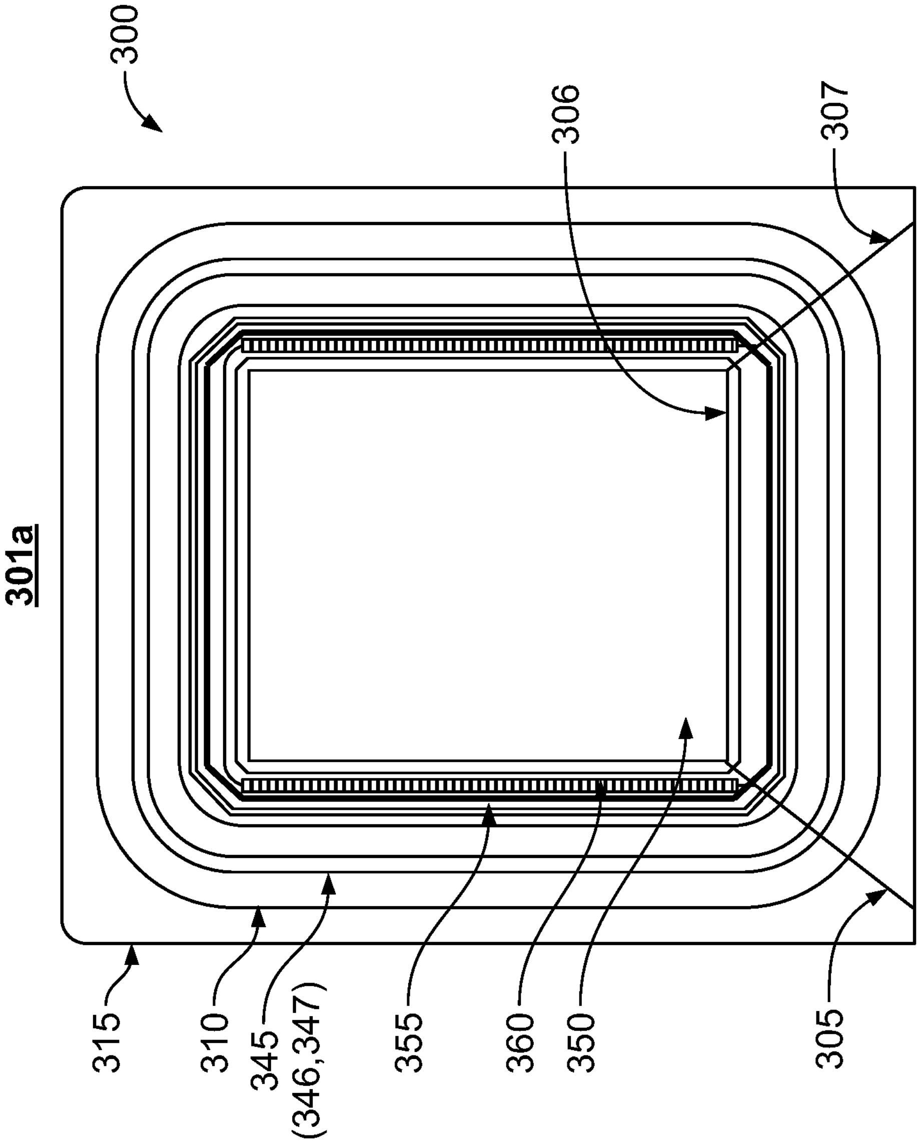
FIG. 3B shows the first side view of the single-plane stationary gantry X-ray computed tomography system of FIG. 3A including a radar imaging or inspection system, in accordance with some embodiments of the present specification.

FIG. 3A illustrates first side, second side and top views 301*a*, 301*b*, 301*c* of a single-plane stationary gantry X-ray computed tomography system 300 configured to scan sheep, pigs and goats while FIG. 3B also illustrates the first side 301*a*, in accordance with some embodiments of the present specification. Referring to FIGS. 3A and 3B, the system 300 is deployed, for example, in an animal farm to scan livestock in real time as an animal passes through a scanning region, area, aperture or tunnel 350 of the system 300. The scanning region, area, aperture or tunnel 350 is smaller (compared to the scanning system of FIG. 1A, 1B) for scanning animals such as sheep, pigs and goats. The first side view 301*a* (FIGS. 3A, 3B) is in a direction parallel to the direction of motion of an animal as it passes through the scanning region, area or aperture 350 whereas the second side view 301*b* is in a direction perpendicular to the direction of motion of the animal passing through the scanning region, area or aperture 350.

In some embodiments, a first inclined ramp 305 is adapted to enable the animal to pass onto a horizontal platform 306 that lies in the scanning region, area or aperture 350 and eventually pass down using a second inclined ramp 307. In other words, the animal enters the scanning region, area or aperture 350 from the left in the view 301*b* and exits the scanning region, area or aperture 350 at the right in the 301*b*.

In some embodiments, the system 300 is enclosed within a food safe, environmentally protected enclosure 315 manufactured using materials such as, but not limited to, stainless steel, aluminum and/or plastic. In some embodiments, the system 100 is surrounded with at least one radiation shielding enclosure. In some embodiments, the system 300 has a multi-focus X-ray source 345 disposed in a plane around the scanning region, area or aperture 350. The source 345 comprises a plurality of X-ray source emission points, electron guns or cathodes 346 (also referred to as an electron gun array) around an anode 347. The plurality of X-ray source emission pints 346 and the anode 347 are enclosed in a vacuum envelope or tube 310. In some embodiments, the source 345 comprises 200 to 500 X-ray source emission points 346 arranged around a single anode 347 that is held at positive high voltage with respect to the corresponding electron gun array 346. In some embodiments, tube voltage is maintained in a range of 120 kV to 200 kV with tube current in a range 1 mA to 20 mA. In an embodiment, a single source 345 comprises a plurality of X-ray source emission points is employed for scanning small animals (such as, for example, sheep, pigs, and goats); while a plurality of linear multi-focus X-ray sources disposed around a scanning tunnel (such as, for example, shown in FIGS. 1A, 1B) are employed for scanning larger animals such as cattle. A preferred operating point for scanning small animals (such as, for example, sheep, pigs, and goats) is 160 kV, 4 mA corresponding to total X-ray beam power of 640 W. In embodiments, this results in a dose per scan to the animal on the order of 2 μSv to 20 μSv. In embodiments, the dose scan per animal is on the order of 10 μSv due to the smaller size of the scanning region, area, aperture or tunnel 350 (compared to the scanning region 150 of FIGS. 1A, 1B for beef scanning).

An array of detectors 355 is also positioned or deployed around the scanning region, area or aperture 350 to scan the animal as it passes through the scanning region, area or aperture 350. In some embodiments, the scanning region, area or aperture 350 has a substantially rectangular geometry or shape. In some embodiments, the scanning region, area or aperture 350 has a substantially square or polygonal geometry or shape. In some embodiments, the scanning region, area or aperture 350 has a width ranging from 400 mm to 800 mm and a height ranging from 600 mm to 1000 mm height. In an embodiment, as shown in FIG. 3, the scanning region 350 has a width of 600 mm and a height of 800 mm. In some embodiments, the array of detectors 355 are offset or displaced from the X-ray source 345 by a predefined distance so that X-rays from a source pass above the detector array adjacent to the source but interact in the detector array opposite to the source at the other side of the scanning region, area or aperture 350. In various embodiments, the predefined distance ranges from 2 mm to 20 mm.

A control room may be provided for one or more system operators to review the performance of the system 300 on one or more inspection workstations in data communication with the system 300. Alternatively, mobile computing devices may be used to inspect image data and control system operation. In various embodiments, the one or more inspection workstations are computing devices. At least one controller, positioned within the one or more inspection workstations, is configured to control an activation and deactivation of each of the plurality of X-ray source emission points.

It should be appreciated that, in various embodiments, the controller implements a plurality of instructions or programmatic code to a) ensure that the plurality of X-ray source emission points are controlled to fire in a predetermined sequence, and b) perform process steps corresponding to various workflows and methods described in this specification.

During a scanning operation, each X-ray source point within a multi-focus X-ray source is switched on, in turn, and where at least a portion of the X-rays pass through the animal, and the resultant projection data is collected for that one source point. When the exposure is complete, a different X-ray source point is switched on, for example, within a different multi-focus X-ray source (in embodiments that employ a plurality of linear multi-focus X-ray sources) to create a next X-ray projection. The scanning process continues until all X-ray sources have been fired/activated in a sequence that is configured to optimize a reconstructed X-ray image quality. In some embodiments, it is preferable to activate a non-adjacent source in the next part of the scanning sequence. In embodiments, it is preferable to activate a source positioned at approximately 20 to 90 degrees away from a currently active source point.

In embodiments employing a plurality of linear multi-focus X-ray sources, each source point within a first linear multi-focus X-ray source is switched on and then (only after going through each of the source points within the first linear multi-focus X-ray source) each source point within a second linear multi-focus X-ray source is switched on. In some embodiments employing a plurality of linear multi-focus X-ray sources, one source point within a first linear multi-focus X-ray source is switched on and subsequently, one source point within a second linear multi-focus X-ray source is switched on, thus, alternating back and forth (between the first and second linear multi-focus X-ray sources) until all source points have been activated.

In an embodiment, the system 300 comprises a series of X-ray source tubes operating in tandem, instead of the multi-focus X-ray source 345. In other words, the X-ray sources are a plurality of X-ray tubes and do not contain multiple source points.

While passing through the scanning region, area or aperture 350 the animal may move at an uncontrolled speed, especially if walking and not ambulatory, and may also possibly move from side to side. Consequently, the X-ray projection data needs to be motion corrected prior to implementing or executing back-projection algorithm. In some embodiments, this is enabled directly from the X-ray projection data itself by analyzing each set of data and forward projecting through the partial reconstructed X-ray data to see where the new projection is most likely to have come from. However, this is computationally expensive and so, in some embodiments, it is advantageous to use a secondary sensor system for monitoring surface profile of the animal and so measure motion directly. This information can then be used to determine where each new X-ray projection should be back-projected into the 3D reconstructed image volume.

Various types of 3D (three-dimensional) surface sensing technology may be used including, for example, point cloud optical and radar imaging sensors. FIG. 3B shows a radar imaging or inspection system 360 comprising radar transceivers or transceiver modules each comprising a plurality of Receiver (Rx) elements and Transmitter (Tx) elements which operate together to form a tomographic image of the animal as it passes through the scanning region, area or aperture 350.

Figure 4:
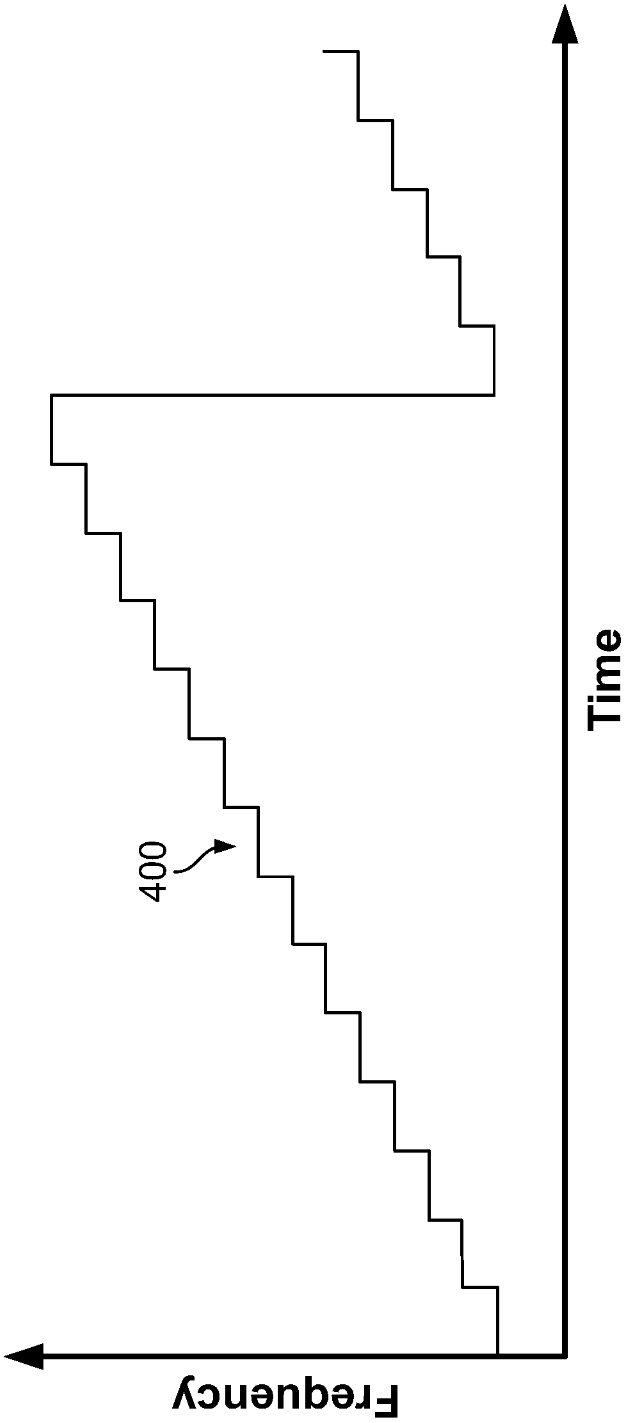
FIG. 4 illustrates an exemplary stepped frequency continuous wave radar scanning sequence, in accordance with some embodiments of the present specification.

In some embodiments, the radar imaging or inspection system 360 is operated in stepped frequency continuous wave radar scanning sequence or mode 400, as shown in FIG. 4. In the radar scanning sequence or mode 400, each Tx element is held at a discrete set of frequencies (in the range 5 GHz to 50 GHz with 10 to 500 steps depending on range resolution required, in some embodiments) for a fixed period of time per step (1 to 100 μs, in some embodiments) in order to give time for the Rx elements to calculate phase and amplitude with respect to the input signal. Each Tx element is activated individually, with all of the Rx elements employed, listening in parallel to the radar signal from the individual Tx element, in order to form a tomographic data set which is then reconstructed to form a full surface image of the traversing animal. In one embodiment, for example, with Rx and Tx elements on 15 mm spacing over a 800 mm length, there are 50 Rx and Tx transceiver elements on each of first and second sides 350*a*, 350*b* of the scanning region, area or aperture 350. Assuming a 50 Hz (20 ms) imaging frame rate, for example, each Tx element will be active for 400 us per ramp period. With an output frequency range from 10 GHz to 40 GHz and steps of 0.5 GHZ (60 steps in total), the dwell time at each step is 6.5 μs, for example. In embodiments, the choice of which Tx element to activate at any time is made based upon the goal of maximizing the reconstructed image quality.

Figure 5:
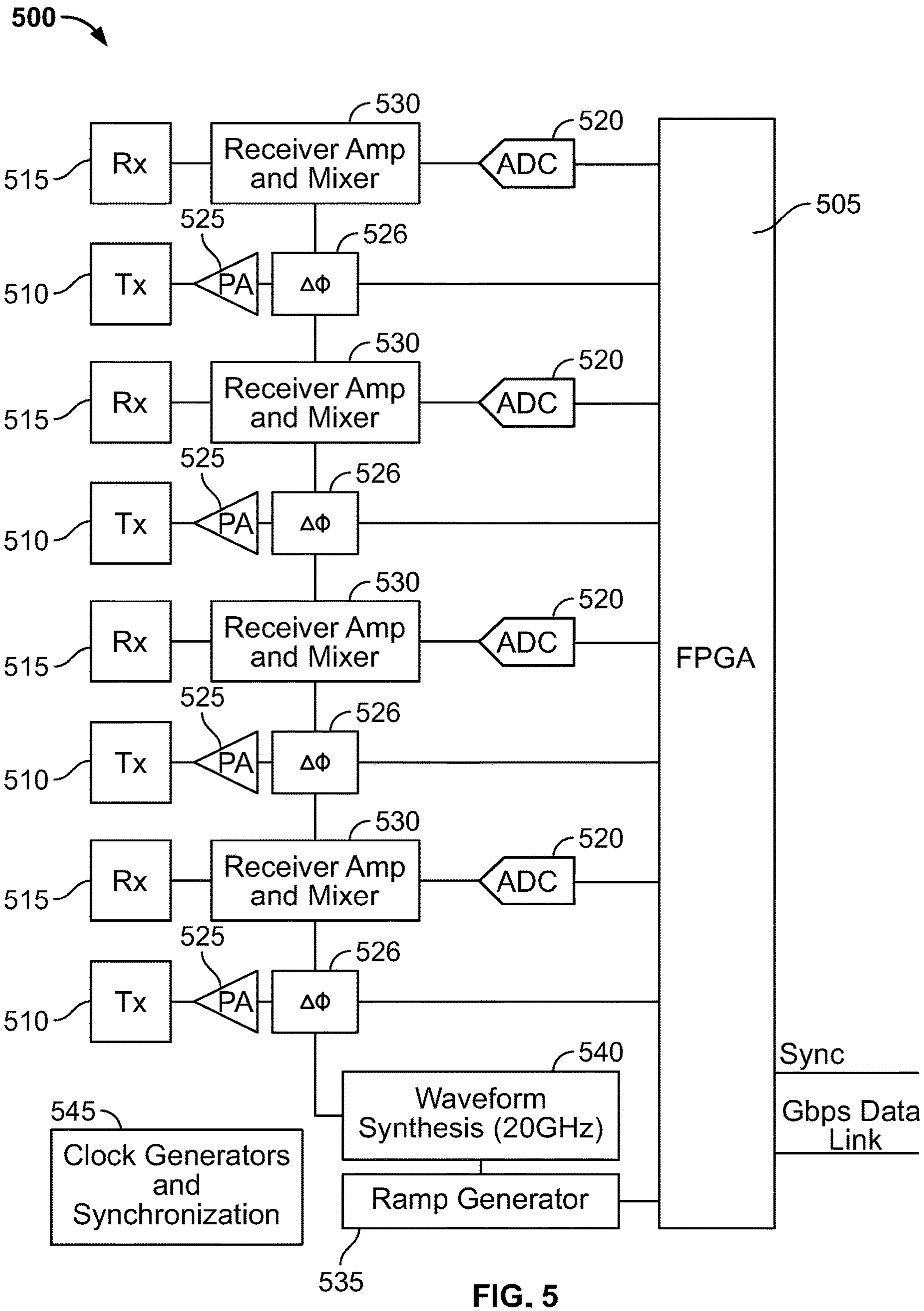
FIG. 5 is a block diagram of a radar imaging system, in accordance with some embodiments of the present specification.

FIG. 5 is a block diagram of a radar imaging system 500 for determining body shape and body movement for correction of motion of an animal through an X-ray computed tomography scanning system, in accordance with some embodiments of the present specification. In some embodiments, the system 500 is an ultra-wide band radar system. In some embodiments, the system 500 comprises a field programmable gate array (FPGA) 505 to generate a base stepped frequency continuous wave signal which is frequency multiplied and amplified (at power amplifier elements 525) to each of a plurality of Tx transceiver elements 510 in turn. The FPGA 505 is coupled with the power amplifier elements 525 via frequency multiplier blocks 526, which convert low frequency CLOCK of the FPGA 505 (e.g. 100 MHZ) to a higher output frequency CLOCK (e.g. 50 GHZ) for the power amplifier elements 525. A ramp generator circuit 535, in communication with the FPGA 505, creates a linear rising or falling output signal with respect to time thereby producing a saw tooth waveform. A waveform synthesis element 540 receives the linear rising or falling waveform signal output from the ramp generator circuit 535 to output the base stepped frequency continuous wave signal for application to each of the plurality of Tx transceiver elements 510. A clock generator and synchronization circuit 545 produces a timing signal for use in synchronizing operation of the system 500.

In parallel, outputs from all Rx transceiver elements 515 are mixed with the Tx frequency, at Rx amplifier and mixer elements 530, to generate a lower frequency signal that can be measured by an analogue-to-digital converter (ADC) 520 and transferred to internal memories of the FPGA 505. Further, signal processing may be done in the FPGA 505 to reduce data bandwidth, or alternatively all data can be transferred through a high-speed interface to a host-computing device for processing.

In some embodiments, Tx and Rx transceiver elements 510, 515 employ circular polarization such that reflected waves return in an opposite polarization to the transmitted wave. This reduces cross talk between Tx and Rx transceiver elements 510, 515 thereby simplifying analogue front-end design as well as algorithmic complexity in image reconstruction.

Figure 6:
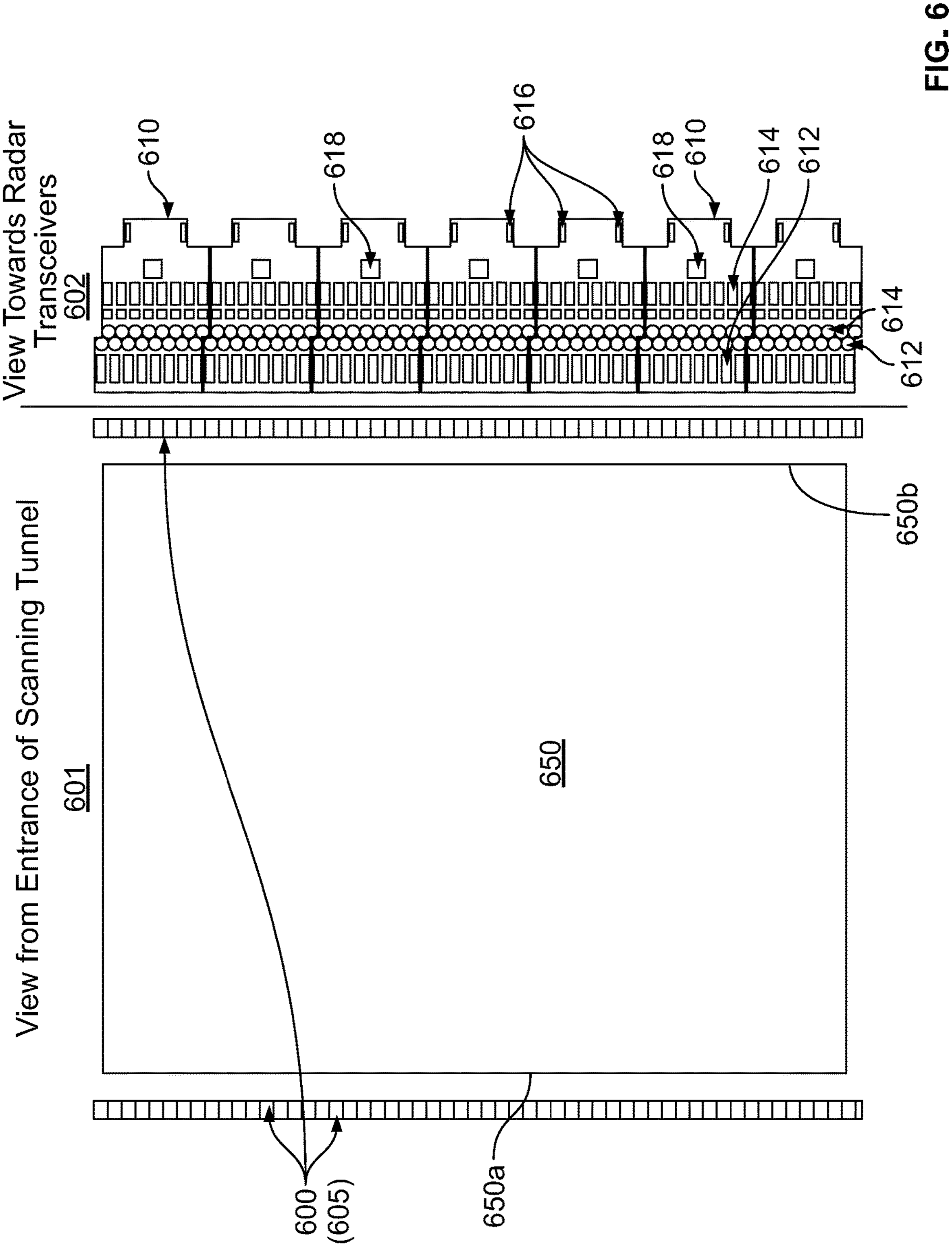
FIG. 6 shows an exemplary arrangement of a plurality of transmitter (Tx) and receiver (Rx) elements of a radar imaging or inspection system, in accordance with some embodiments of the present specification.

FIG. 6 shows an exemplary arrangement of a plurality of transmitter (Tx) and receiver (Rx) elements of a radar imaging or inspection system 600 deployed to determine body shape and movement for correction of motion of an animal through an X-ray computed tomography scanning system, in accordance with some embodiments of the present specification. The figure shows a view 601 along a direction parallel to a direction of motion of an animal through scanning region, area or aperture 650. The radar imaging or inspection system 600 comprises arrays 605 of radar Tx and Rx elements disposed on first and second vertical sides 650*a*, 650*b* of the scanning region, area or aperture 650.

Another view 602, along a direction perpendicular to the direction of motion of the animal through scanning region, area or aperture 650, shows a plurality of radar transceivers or transceiver modules 610, which may also be referred to as “cards” in some embodiments. Each of the transceivers 610 comprises a plurality of Tx and Rx elements (or analogue circuits) 612, 614. In some embodiments, each of the transceivers 610 comprises 8 Rx and 8 Tx elements 612, 614. In some embodiments, the Rx elements 614 are offset, in a vertical direction, by spacing of half an element from the Tx elements 612.

In some embodiments, the transmitter and receiver elements or analogue circuits 612, 614 with ADCs (Analog to Digital Circuits) are soldered to a same PCB (Printed Circuit Board) as the antenna structures with an overall FPGA for system control and data acquisition. Each of the transceivers 610 further comprises data transmission connectors 616 and a readout control circuit 618. Ribbon cables are used to transfer signals from one card to the next to allow flexibility in overall system configuration.

In accordance with some embodiments, each of the 3D X-ray computed tomography scanning systems of the present specification may be housed in a container that is located on the farm. When in use, doors at entry and exit ends of the container may be opened, the X-ray system powered up and scanning conducted by herding animals from the entry side of the container to the exit side of the container. In some embodiments, by reconciling RFID (Radio Frequency Identification) tag or other animal-specific IDs to the X-ray image data, quantitative information from an X-ray scan is associated back to individual animals to aid overall farm processes as well as food supply chain integrity process. In embodiments, containerized 3D X-ray computed tomography scanning systems may be installed permanently at the farm, or a particular container may be transported using a truck or trailer from one location to another as required to service multiple farms.

In accordance with some embodiments, the 3D X-ray computed tomography scanning systems of the present specification may be supported on mobile, roadworthy, scanning platforms such as, for example, a truck, van and/or a trailer. This enables the system to be transported on public and private roads to a required farm scanning site, the necessary scans conducted and the system then driven off to another farm where the scanning process can be repeated.

It should be noted that, in alternate embodiments, 3D high-resolution imaging methods such as, for example, magnetic resonance imaging, may be substituted for X-ray computed tomography. In addition, in various alternate embodiments, rotating gantry and/or single, dual and multi-plane stationary gantry X-ray computed tomography methods may be used interchangeably.

Figure 7:
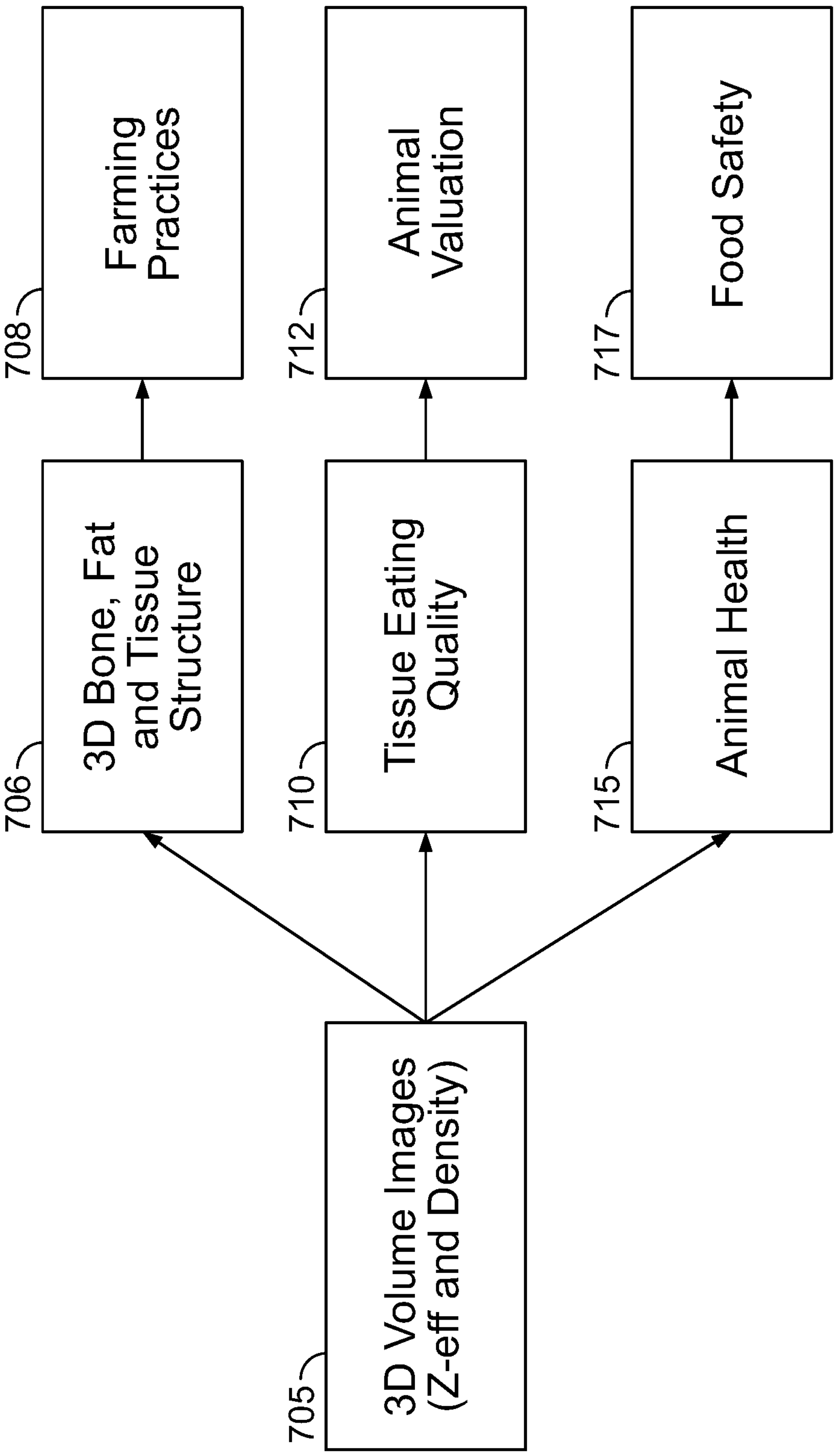
FIG. 7 is a block diagram of a plurality of exemplary information, outputs or outcomes derived based on processing or analyses of an animal's scan image data generated using a 3D stationary gantry X-ray CT imaging system, in accordance with some embodiments of the present specification.

FIG. 7 is a block diagram of a plurality of exemplary information, outputs or outcomes derived based on processing or analyses of an animal's scan image data generated using a 3D stationary gantry X-ray CT imaging system, in accordance with some embodiments of the present specification. In embodiments, a controller in data communication with the 3D stationary gantry X-ray CT imaging system implements a plurality of instructions or programmatic code to receive 3D scan image data, process or analyze the scan image data and generate various outputs or outcomes such as, for example, effective Z, density information, 3D structure of the animal, calculating lean meat yield, analysis of intra-muscular fat, amount inter-muscular fat, ratio of intra-muscular fat (marbling) to tissue, absolute and relative size of individual organs, muscle volume, number of ribs, and presence or absence of cysts, tumors, pleurisy and foreign objects.

In accordance with aspects of the present specification, 3D scan image data of an animal provides effective Z (atomic number) and density information (block 705) leading to insight related to a 3D structure (comprising bony structure, size of each muscle and location and amount of fat) of the animal (block 706). This enables a farmer to optimize a plurality of farming processes (block 708) such as, for example, calculating lean meat yield and thereby determining how best to optimize a go forward plan for the herd including how much exercise, feed, feed supplements and water to include in the plan for the animal.

In some embodiments, the 3D scan image data of the animal is analyzed to deliver objective metrics or measurement data for all muscle groups within the animal, on an individual basis, in order to determine eating quality (block 710). In embodiments, the metrics or measurement data are determined by analysis of intra-muscular fat (marbling) and inter-muscular fat. As is known, inter-muscular fat is the fat that surrounds a muscle, and typically lies between the muscle and the skin of an animal. In embodiments, the metrics or measurement data are determined by analysis of a ratio of intra-muscular fat (marbling) to tissue. The farmer can use this data to plan to increase overall eating quality and/or to improve the quality of selected muscle groups in the highest value part of the animal-thereby leading to improved sale price or valuation of the animal (block 712).

In some embodiments, further analysis of the 3D image data provides metrics, measurement data or information on animal health (block 715) such as, for example, the absolute and relative size of individual organs (such as kidneys, liver, heart and lungs), the presence or absence of cysts and tumors, the presence of chronic conditions such as pleurisy and the presence of foreign objects such as barbed wire and needles that may lead to infection. Collectively information on animal health leads to improving overall quality control in food safety (block 717).

Figure 8:
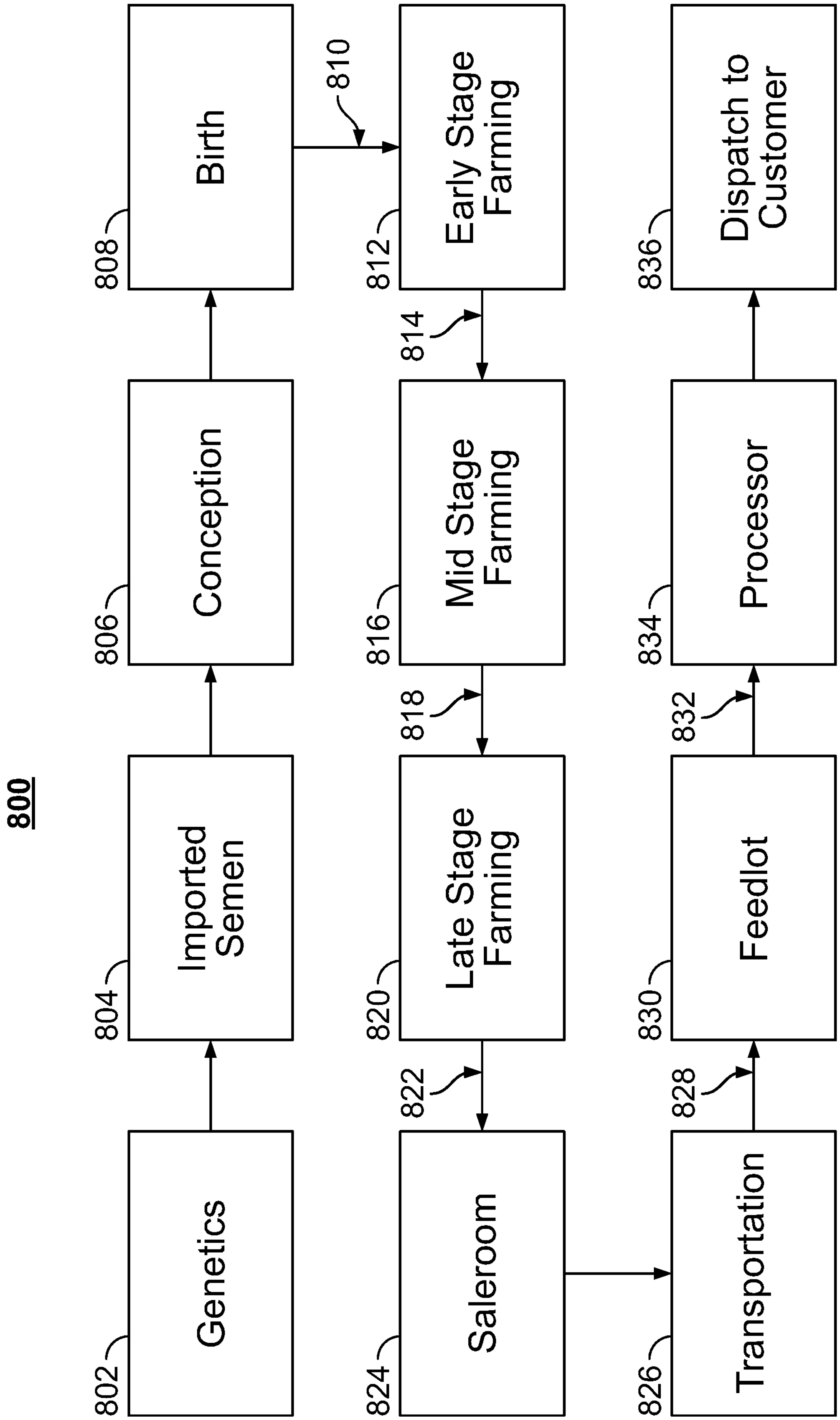
FIG. 8 is a workflow illustrating use of a plurality of 3D X-ray computed tomography scanning processes during various events relating to farming of livestock, in accordance with some embodiments of the present specification.

FIG. 8 is a workflow 800 illustrating use of a plurality of 3D X-ray computed tomography scanning processes during various events relating to farming of livestock, in accordance with some embodiments of the present specification. In accordance with aspects of the present specification, the workflow 800 illustrates an entire life cycle of an animal and a herd overall, from genetic selection through to the customer delivery, and a plurality of scanning points in the life cycle where 3D X-ray computed tomography at a farm may be beneficial. In embodiments, a controller in data communication with a 3D X-ray computed tomography scanner implements a plurality of instructions or programmatic code to implements a plurality of instructions or programmatic code to receive 3D scan image data, process or analyze the scan image data and generate various outputs or outcomes.

Blocks 802, 804, 806 and 808 respectively represent functions/events related to genetic selection, importing semen, conception and birth of an animal for rearing at the farm. At step 810, an initial/early scan of the animal is taken soon after birth, such as within 0-36 hours after birth, and in some cases longer, or before the animal reaches an age of 6 months using a 3D X-ray computed tomography scanning system such as those described with reference to FIGS. 1A, 1B, 3A, 3B and 6. Data from this initial/early scan is directed towards identifying abnormalities and also for checking predefined genetic features. For example, most lambs are born with 8 ribs, but some are born with 7 ribs and some with 9 ribs. It is helpful to know how many ribs the lamb contains from an early stage since an ultimate value of the animal may be dependent on such information. The identified abnormalities and predefined genetic features are recorded in at least one database.

In embodiments, 3D X-ray computed tomography scans are taken of an animal during various stages of development. For example, in embodiments, at a first stage of development, an animal may be in a first age range, beginning at a first start date and ending at a first end date. In embodiments, a first stage of development corresponds to an early stage. In embodiments, at a second stage of development, an animal may be in a second age range beginning at a second start date and ending at a second end date. In embodiments, a second stage of development corresponds to a mid-range stage. In embodiments, at a third stage of development, an animal may be in a third age range beginning at a third start date and ending at a third end date. In embodiments, the third stage of development corresponds to a late stage. In embodiments, at a fourth stage of development, an animal may be in a fourth age range beginning at a fourth start date and ending at a fourth end date.

In embodiments, the first start date corresponds to the date of birth of the animal and is before each of the first end date, the second start date, the second end date, the third start date, the third end date, the fourth start date, and the fourth end date.

In embodiments, the first end date is after each of the first start date and before each of the second start date, the second end date, the third start date, the third end date, the fourth start date, and the fourth end date.

In embodiments, the second start date is after each of the first start date and the first end date and before each of the second end date, the third start date, the third end date, the fourth start date, and the fourth end date.

In embodiments, the second end date is after each of the first start date, the first end date and the second start date and before each of the third start date, the third end date, the fourth start date, and the fourth end date.

In embodiments, the third start date is after each of the first start date, the first end date, the second start date, and the second end date and before each of the third end date, the fourth start date, and the fourth end date.

In embodiments, the third end date is after each of the first start date, the first end date, the second start date, the second end date, and the third start date and before each of the fourth start date and the fourth end date.

In embodiments, the fourth start date is after each of the first start date, the first end date, the second start date, the second end date, the third start date, and the third end date and before each of the fourth end date.

In embodiments, the fourth end date is after each of the first start date, the first end date, the second start date, the second end date, the third start date, the third end date, and the fourth start date.

In embodiments, there may be n stages of development, with nth start dates and nth end dates, appearing in chronological order as described above. In embodiments, the first end date may be on the same day as, or one day, before the second start date. In embodiments, the second end date may be on the same day as, or one day before, the third start date. In embodiments, the third end date may be on the same day as, or one day before, the fourth start date. In embodiments, the fourth end date may be the same day as, or one day before, the nth start date. It should be noted that the various age ranges of development is dependent upon the animal species.

At step 814, a 3D X-ray computed tomography scan of the animal is acquired after the animal completes a first stage (block 812) in development, that is, when the animal is in a first age range. The scan at step 814 is directed towards determining any abnormalities or health conditions (such as, for example, presence or absence of cysts, tumors, pleurisy and foreign objects) that may affect the ultimate value of the animal.

At step 818, another 3D X-ray computed tomography scan of the animal is acquired after the animal completes a mid-stage (block 816) in development, that is, when the animal is in a second age range. The quality control scan at step 818 enables driving optimization of the animal and the herd as a whole. It is at this stage that significant transformation in valuation can be achieved of the animal and the herd.

At step 822, a yet another scan of the animal is acquired once the animal has been reared through late-stage farming (block 820) and is ready to leave the farm, that is, when the animal is in a third age range. The 3D X-ray computed tomography scan, at step 822, is used to generate a complete analysis of the animal (to generate metrics or measurement data such as, for example, lean meat yield, localized eating quality and health) which together describe the animal sufficiently for presentation at auction and so achieve a final purchase price. In various embodiments, data from scan steps 818 and 822 is evaluated/analyzed by a plurality of programmatic code or instructions in order to determine data indicative of a value of the animal based on at least one of a plurality of pre-sale parameters including lean meat yield, ratio of intra-muscular fat to tissue, amount of inter-muscular fat, absolute and relative size of individual organs, muscle volume, number of ribs, and presence or absence of cysts, tumors, pleurisy and foreign objects. In various embodiments, the plurality of programmatic code or instructions generate data indicative of lean meat yield, which is associated with a first range of values; generate data indicative of a ratio of intra-muscular fat to tissue, which is associated with a second range of values; generate data indicative of an amount of inter-muscular fat, which is associated with a third range of values; generate data indicative of absolute and relative size of individual organs, which is associated with a fourth range of values; generate data indicative of muscle volume, which is associated with a fifth range of values; generate data indicative of number of ribs, which is associated with a sixth range of values; and generate data indicative of presence or absence of cysts, tumors, pleurisy and foreign objects.

It is known that transfer of animals from the farm to sale yards is stressful for the animal and expensive for the farmer. Therefore, the ability to conduct virtual auctions with electronic data, including that from the 3D X-ray computed tomography data, is beneficial.

Following sale and transportation (blocks 824, 826 respectively) of the animal from the farm, a 3D X-ray computed tomography scan is acquired at a feedlot, at step 828. The scan at step 828 is directed towards performing an incoming check of the animal post auction to validate the electronic data that was presented at auction and also to check on animal health where animals from multiple herds are being combined. Thus, data from the scan at step 828 is used to determine one or more of a plurality of after-sale parameters. In embodiments, the validation of the electronic data involves comparing at least a portion of the plurality of pre-sale parameters with at least a portion of a plurality of after-sale parameters. In embodiments, the plurality of after-sale parameters include lean meat yield, ratio of intra-muscular fat to tissue, amount of inter-muscular fat, absolute and relative size of individual organs, muscle volume, number of ribs, and presence or absence of cysts, tumors, pleurisy and foreign objects.

At step 832, a final scan of the animal is conducted at the end of the feedlot process (block 830) where the animal has generally been fattened prior to slaughter. This final scan provides initial data to enable planning production schedules/processes (block 834) and hence optimize a factory process and, thereafter, final dispatch to customers (block 836).

Persons of ordinary skill in the art should appreciate that, in some embodiments, the scan information generated on an animal at a particular stage in development is aggregated with information from other animals at similar and different stages in development to determine, using methods such as (for example) artificial intelligence and big data analytics, a predicted outcome for the animal as well as an impact on overall development of a herd within a particular farm and also between different farms.

In embodiments, multi-energy computed tomography and transmission X-ray screening may be employed for the purposes of the present specification. In embodiments, the use of multi-energy transmission X-ray screening enables improved $Z_{eff}$ recovery in single-view and stereo-view imaging systems leading to improved chemical lean accuracy and improved location of bone structure especially in high attenuation regions. In addition, the use of multi-energy transmission X-ray screening enables improved Zeff recovery for use in foreign object detection and final product quality control.

In embodiments, the technologies described above may be integrated with meat processing and plant safety practices. In embodiments, the present specification employs the use of software to link three-dimensional imaging and multi-energy meat processing technology to plant operations. In embodiments, the present specification employs the use of software to link three-dimensional imaging and multi-energy meat processing technology to farming practices. In embodiments, the present specification employs the use of modified security technology, such as personnel and baggage screening systems, such that these technologies can be employed within the meat industry across several applications.

Figure 9A:
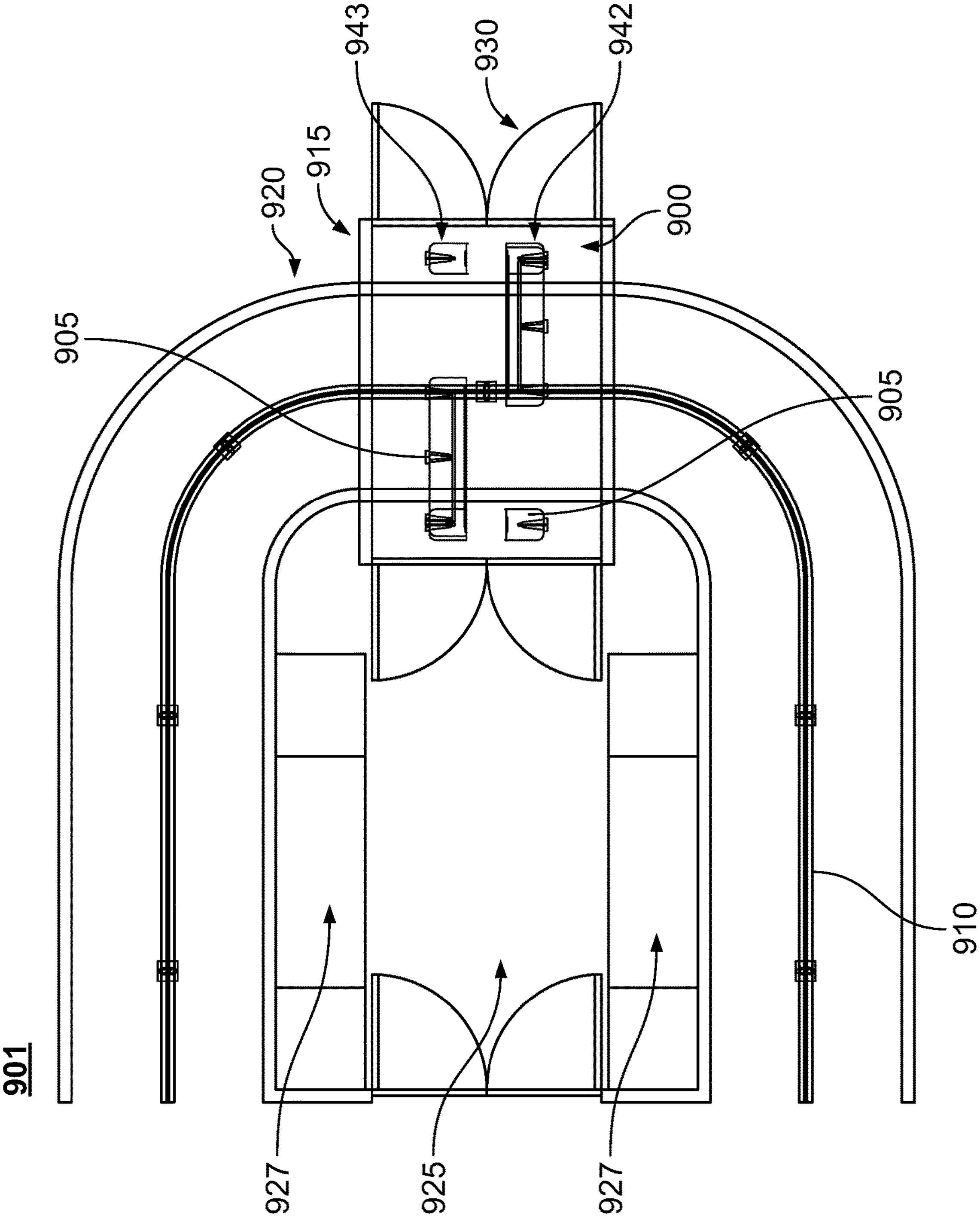
FIG. 9A illustrates a top view of a 3D stationary gantry X-ray CT imaging system in first configuration to scan meat in an abattoir, in accordance with some embodiments of the present specification.
Figure 9B:
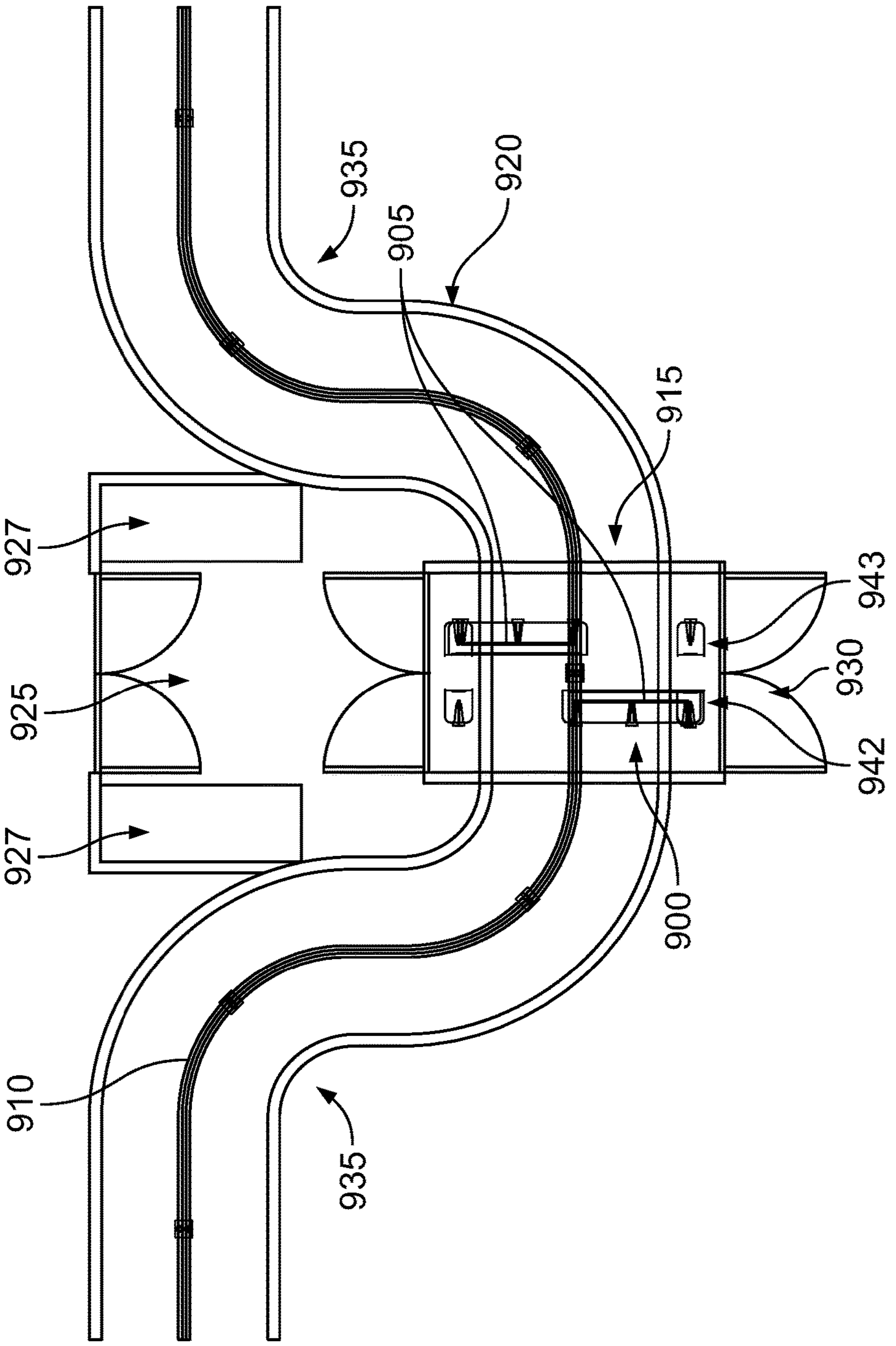
FIG. 9B illustrates a top view of the 3D stationary gantry X-ray CT imaging system of FIG. 1A in second configuration to scan meat in an abattoir, in accordance with some embodiments of the present specification.

FIGS. 9A and 9B illustrate top views of a 3D stationary gantry X-ray CT imaging system 900 (also referred to as a Real-Time Tomography (RTT) system) in first and second configurations, respectively, to scan meat in an abattoir 901, in accordance with some embodiments of the present specification. Referring now to FIGS. 9A and 9B, the system 900 is deployed in the abattoir 901 to scan carcasses 905 hanging from hooks of a conveyor or conveyor rail 910 and being moved through the system 900 by the conveyor rail 910. In some embodiments, the carcasses 905 are moved, by the conveyor rail 910, through the system 900, at a speed ranging from 0.05 m/s to 0.5 m/s.

In some embodiments, the system 900 is enclosed within a food safe, environmentally protected enclosure 915 manufactured using materials such as, but not limited to, stainless steel and/or plastic. In some embodiments, the system 900 is surrounded with at least one radiation shielding enclosure or tunnel 920. A control room 925 is provided for one or more system operators to review the performance of the system 900 on one or more inspection workstations 927. A service access 930 is also provided to the system 900. In various embodiments, the one or more inspection workstations 927 are computing devices.

In some embodiments, the system 900 is configured for dual-plane scanning of carcasses and comprises a first plurality of linear multi-focus X-ray sources along with an associated first array of detectors positioned or deployed around an inspection region, area or aperture to scan carcasses in a first imaging plane 942 and a second plurality of linear multi-focus X-ray sources along with an associated second array of detectors also positioned or deployed around the inspection region, area or aperture to scan carcasses in a second imaging plane 943. In some embodiments, the first and second imaging planes 942, 943 are along a direction parallel to the direction of motion of the carcasses along the conveyor rail 910. In embodiments, the first plurality of linear multi-focus X-ray sources are offset from the associated first array of detectors, in the first imaging plane 942, by a distance $d_1$ while the second plurality of linear multi-focus X-ray sources are offset from the associated second array of detectors, in the second imaging plane 943, by a distance $d_2$. In some embodiments, $d_1$ is equal to $d_2$. In various embodiments, the distances $d_1$ and $d_2$ range from 1 mm to 10 mm.

In some embodiments, as shown in FIG. 9A, the at least one radiation shielding enclosure 920 as well as the conveyor rail 910 may have a layout similar to a labyrinth or maze such that there is no straight path through the at least one radiation shielding enclosure 920 and the conveyor rail 910 and that any path through the at least one radiation shielding enclosure 920 and the conveyor rail 910 requires at least more than 1 turn and less than 20 turns, preferably in the range of 2 to 5 turns, each turn having a turning radius greater than 10 percent. In addition, each turn is preferably in the range of 25 to 80 degrees and any increment therein. In embodiments, the labyrinthine layout serves to restrict radiation exposure to workers in the abattoir 901 to below statutory limits (typically, less than 1 μSv/hr in any one hour). In some embodiments, as shown in FIG. 9B, the at least one radiation shielding enclosure 920 as well as the conveyor rail 910 have a layout in a broadly linear fashion but with one or more deviations, chicanes, or turns 935 to restrict radiation exposure to workers in the abattoir 901 below statutory limits. Persons of ordinary skill in the art would appreciate that the configurations of FIGS. 9A and 9B are only exemplary and in no way limiting. For example, in alternate embodiments, the at least one radiation shielding enclosure 920 as well as the conveyor rail 910 may have other layout configurations such as, but not limited to, an elbow or a staircase.

Figure 10A:
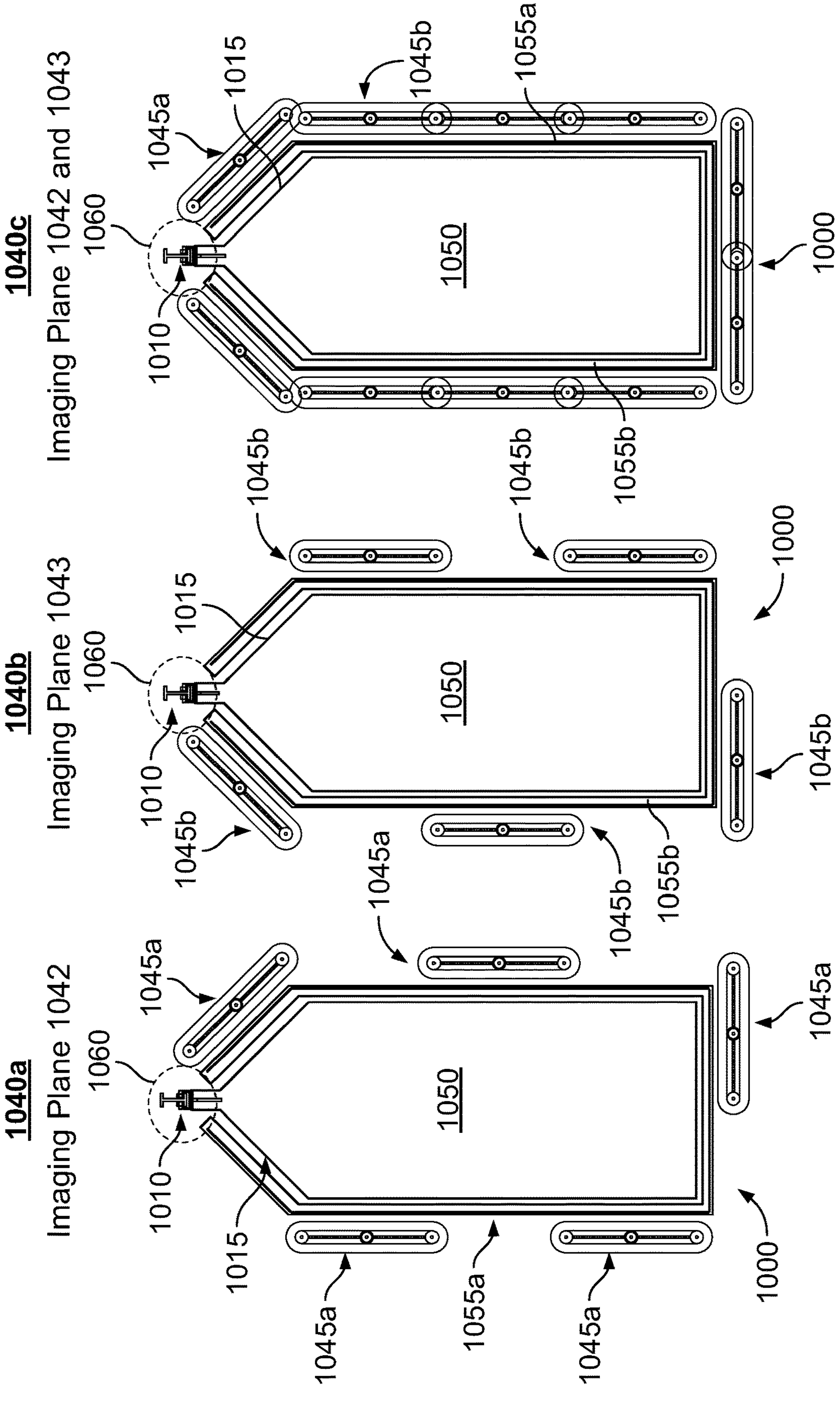
FIG. 10A illustrates first, second and third cross-sectional views of a 3D stationary gantry X-ray CT imaging system configured for dual-plane scanning of carcasses, in accordance with some embodiments of the present specification.

FIG. 10A illustrates first, second and third cross-sectional views 1040*a*, 1040*b*, 1040*c* of a 3D stationary gantry X-ray CT imaging system 1000 configured for dual-plane scanning of carcasses, in accordance with some embodiments of the present specification. The first cross-sectional view 1040*a* is along a direction parallel to the direction of motion of carcasses along a conveyor rail 1010 and perpendicular to a first imaging plane 1042. In embodiments, the first imaging plane 1042 comprises a plurality of separate linear multi-focus X-ray sources 1045*a* arranged around an inspection area 1050. In some embodiments, the first imaging plane 1042 comprises, say, five linear multi-focus X-ray sources 1045*a* separated from each other and positioned around or along a perimeter of the inspection area 1050.

The inspection area or aperture 1050 is bounded by a food safe environmental enclosure or housing 1015. The inspection area or aperture 1050 is surrounded by an array of X-ray detectors 1055*a* positioned in the first imaging plane 1042 such that the X-ray detectors 1055*a* lie between the linear multi-focus X-ray sources 1045*a* and the housing 1015. The array of detectors 1055*a* is offset, by a distance of 1 mm to 10 mm from the plane of the X-ray sources 1045*a* such that X-rays from a multi-focus X-ray source on one side of the inspection aperture 1050 can pass above the adjacent X-ray detectors and interact with X-ray detectors on an opposing side of the inspection area 1050, thereby forming a transmission image through a carcass under inspection.

The second cross-sectional view 1040*b* is along the direction parallel to the motion of carcasses along the conveyor rail 1010 and perpendicular to a second imaging plane. In embodiments, the second imaging plane also comprises a plurality of separate linear multi-focus X-ray sources 1045*b* arranged around the inspection area 1050. In some embodiments, the second imaging plane 1043 comprises, say, five linear multi-focus X-ray sources 1045*b* separated from each other and positioned around or along the perimeter of the inspection area 1050. In some embodiments, the five linear multi-focus X-ray sources 1045*b* (in the second imaging plane 1043) are disposed or positioned so as to fill the gaps separating the five linear multi-focus X-ray sources 1045*a* (in the first imaging plane 1042).

The inspection area or aperture 1050 is surrounded by another array of X-ray detectors 1055*b* positioned in the second imaging plane 1043 such that the X-ray detectors 1055*b* lie between the linear multi-focus X-ray sources 1045*b* and the housing 1015. The array of detectors 1055*b* is also offset, by a few millimeters, from the plane of the X-ray sources 1045*b* such that X-rays from a multi-focus X-ray source on one side of the inspection aperture 1050 can pass above the adjacent X-ray detectors and interact with X-ray detectors on an opposing side of the inspection area 1050, thereby forming a transmission image through the carcass under inspection.

The third cross-sectional view 1040*c* illustrates a composite representation of the first and second imaging planes 1042, 1043 as the carcass moves through the system 1000. The view 1040*c* shows a complete locus of multi-focus X-ray source points about the inspection area 1050 as required to form a high-quality 3D tomographic image of the carcass. A small region 1060 of missing data is observable adjacent to a hook on which the carcass is transported. Accordingly, an image reconstruction algorithm of the system 1000 is configured to minimize an impact of the missing data in a final image.

During a scanning operation, each X-ray source point within an individual multi-focus X-ray source (1045*a*, 1045*b*) is switched on in turn and projection data through the carcass is collected for that one source point. When the exposure is complete, a different X-ray source point is switched on, say, for example, within a different multi-focus X-ray source in the system 1000 to create a next X-ray projection. The scanning process continues until all X-ray sources have been fired in a sequence that is configured to optimize a reconstructed X-ray image quality.

In some embodiments, the inspection area 1050 has a cross-sectional shape, which is a composite of a first rectangular shape mounted by a second triangular shape. In some embodiments, the first rectangular cross-sectional shape has an exemplary size defined by a width that is less than 20%, preferably less than 40% of a height. In some embodiments, the first rectangular cross-sectional shape has an exemplary size (area) of 1500 mm (width)×3900 mm (height). In some embodiments, the area of the second triangular shape is substantially less or negligible compared to the area of the first rectangular shape. Therefore, for practical purposes, the exemplary size (area) of 1500 mm (width)×3900 mm (height) for the first rectangular cross-sectional shape is representative of the composite—that is, the inspection area 1050. It should be appreciated that this size (area) of 1500 mm (width)×3900 mm (height) of the inspection area or aperture 1050 is suited to scanning beef carcasses, in some embodiments.

Figure 10B:
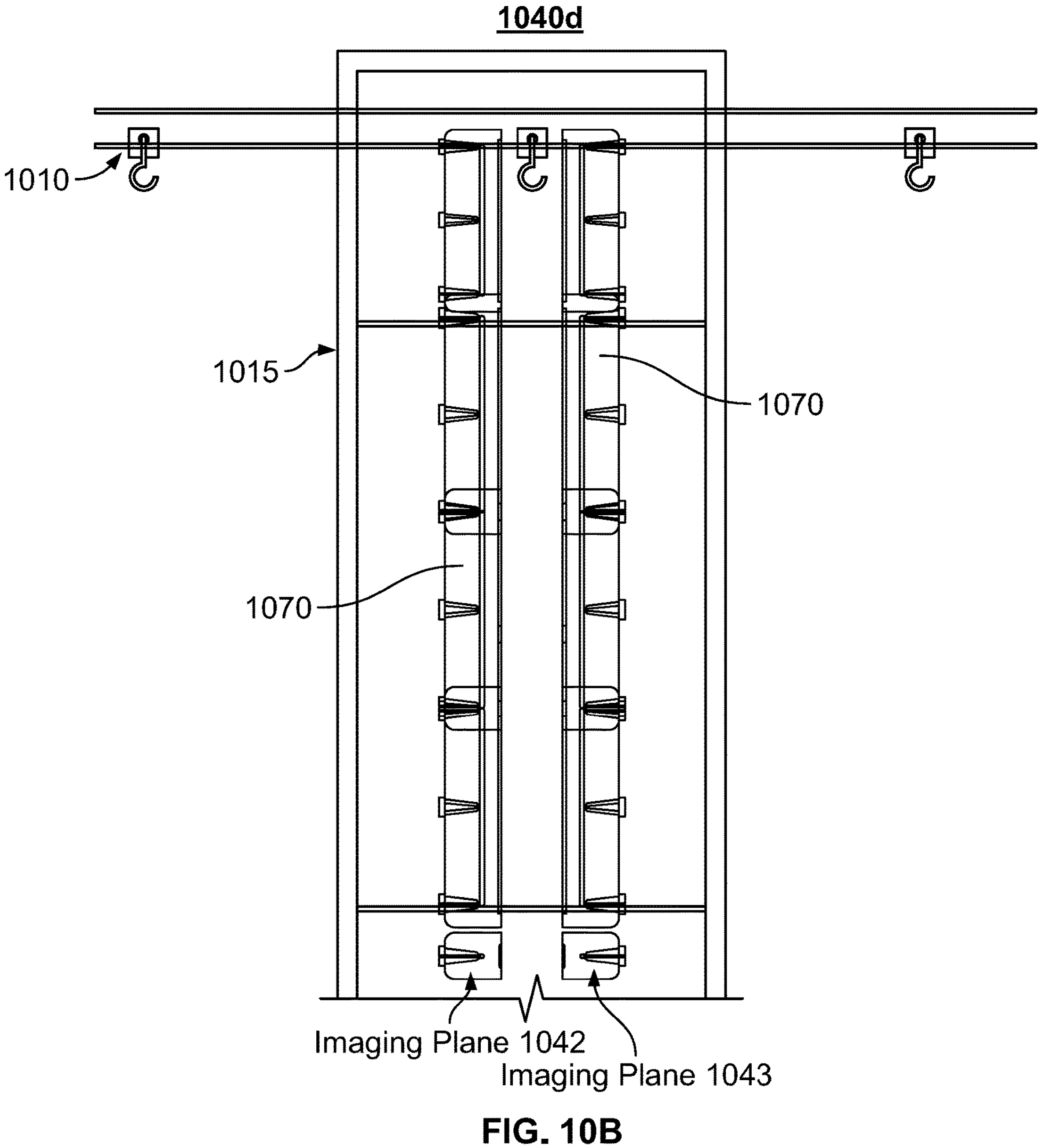
FIG. 10B illustrates a fourth cross-sectional view of the 3D stationary gantry X-ray CT imaging system, in accordance with some embodiments of the present specification.

FIG. 10B illustrates a fourth cross-sectional view 1040*d* of the 3D stationary gantry X-ray CT imaging system 1000, in accordance with some embodiments of the present specification. The fourth cross-sectional view 1040*d* is along a direction perpendicular to the direction of motion of carcasses 1070 along the conveyor rail 1010 and parallel to the first and second imaging planes 1042, 1043. In embodiments, the first and second imaging planes 1042, 1043 are separated by a distance 'd' thereby simplifying service access. In some embodiments, the distance 'd' ranges from 100 mm to 2000 mm. In an embodiment, the distance 'd' ranges from 500 mm to 1000 mm. In embodiments, the carcass motion that may occur between the first and second imaging planes 1042, 1043 other than that in a simple linear direction (for example, in a front to back and/or left to right swinging and/or rotational motion) may be measured using standard 3D optical point cloud or radar imaging methods known to persons of ordinary skill in the art. This 3D data may be converted to actual carcass displacement at each point in the field and used to drive the tomographic image reconstruction back-projection process. This may be achieved through methods known to those skilled in the art such as, for example, re-calculation of the direction of each X-ray projection from source to detector through a virtual carcass, in computer memory, as the image reconstruction process takes place.

According to aspects of the present specification, a size of an inspection region can be configured for specific carcass-based applications by deploying a specific imaging geometry comprising a) selecting the number and position of multi-focus X-ray sources (such as, sources 1045*a*, 1045*b*) to be used and b) configuring the array of X-ray detectors (such as, detectors 1055*a*, 1055*b*) to suit the X-ray source positions. The specific imaging system geometry is passed to the X-ray 3D image reconstruction algorithm where a one-time re-calculation of weighting functions is conducted to ensure accurate image reconstruction. The embodiments of FIGS. 9A, 9B, 10A and 10B are representative of the type of imaging system that might be deployed in an abattoir processing beef. A comparatively smaller inspection area or aperture is typically required in abattoirs processing pigs, goats and lamb. It should be appreciated that below an inspection area or aperture of approximately 1 m diameter, it is typically more cost effective to use a single-plane scanning system such as a rotating gantry computed tomography system or a stationary gantry imaging system with a rectangular or circular tube configuration.

Figure 11:
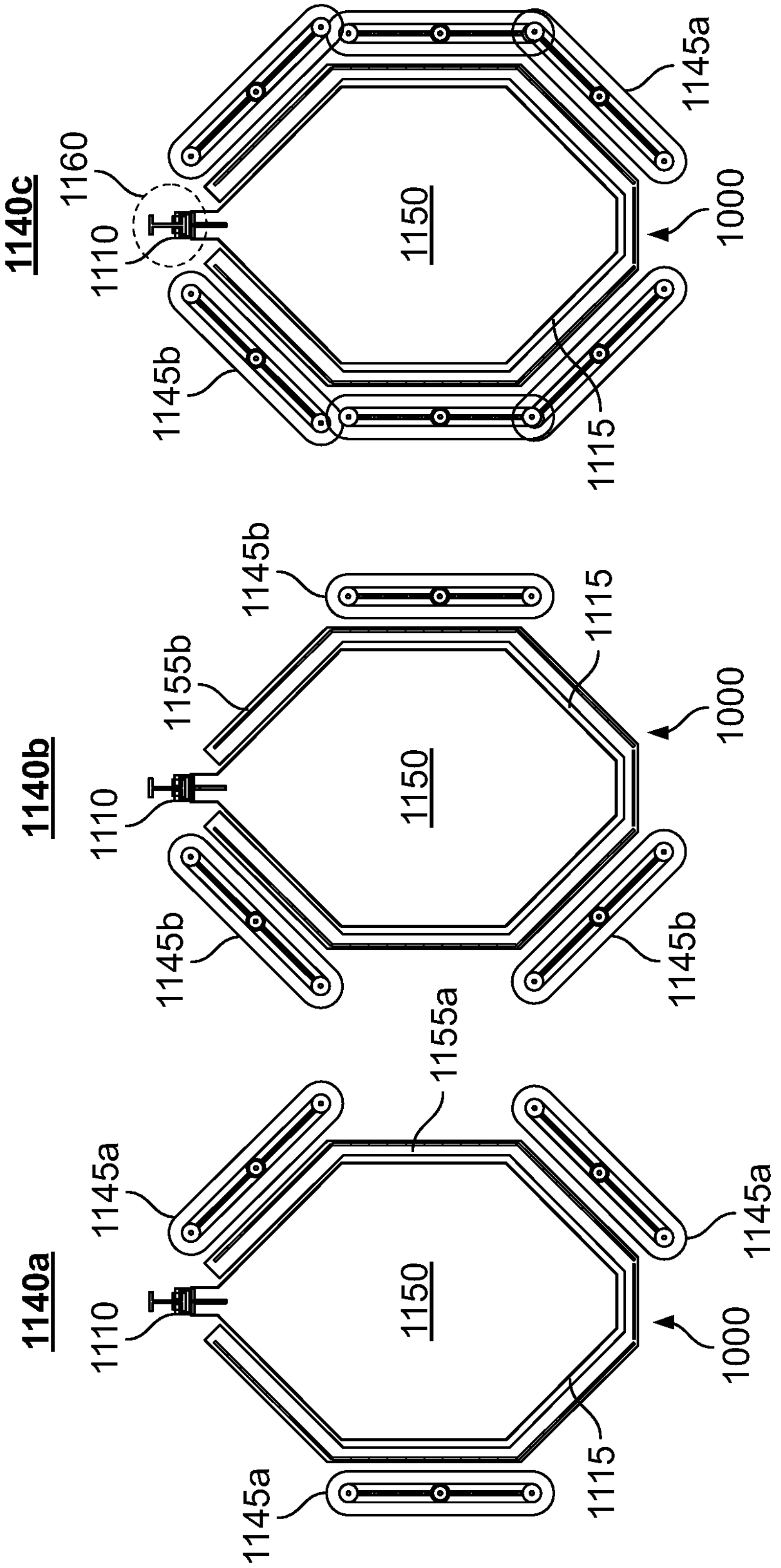
FIG. 11 illustrates first, second and third cross-sectional views of a 3D stationary gantry X-ray CT imaging system configured for dual-plane scanning of carcasses, in accordance with some embodiments of the present specification.

For example, FIG. 11 illustrates first, second and third cross-sectional views 1140*a*, 1140*b*, 1140*c* of a 3D stationary gantry X-ray CT imaging system 1100 configured for dual-plane scanning of carcasses, in accordance with some embodiments of the present specification. The first cross-sectional view 1140*a* is along a direction parallel to the motion of carcasses along a conveyor rail 1110 and perpendicular to a first imaging plane. In embodiments, the first imaging plane comprises a plurality of separate linear multi-focus X-ray sources 1145*a* arranged around an inspection region, area or aperture 1150. In some embodiments, the first imaging plane comprises, say, three linear multi-focus X-ray sources 1145*a* separated from each other and positioned around or along a perimeter of the inspection area 1150.

In accordance with an aspect of the present specification, the inspection area or aperture 1150 has a polygonal geometry or shape to approximate a round or circular cross-section. The polygonal shape or geometry is suited to scan carcasses of lamb, pigs and goats. In some embodiments, the inspection area or aperture 1150 has a maximum width of 1500 mm and a maximum height of 2000 mm. In some embodiments, the inspection area or aperture 1150 has a maximum width that is less than 10%, preferably less than 20% of a maximum height.

In some embodiments, the inspection area or aperture 1150 is bounded by a food safe environmental enclosure or housing 1115. The inspection area or aperture 1150 is surrounded by an array of X-ray detectors 1155*a* positioned in the first imaging plane such that the X-ray detectors 1155*a* lie between the linear multi-focus X-ray sources 1145*a* and the housing 1115. The array of detectors 1155*a* is offset, by a few millimeters, from the plane of the X-ray sources 1145*a* such that X-rays from a multi-focus X-ray source on one side of the inspection aperture 1150 can pass above the adjacent X-ray detectors and interact with X-ray detectors on an opposing side of the inspection area 1150, thereby forming a transmission image through a carcass under inspection.

The second cross-sectional view 1140*b* is along the direction parallel to the motion of carcasses along the conveyor rail 1110 and perpendicular to a second imaging plane. In embodiments, the second imaging plane also comprises a plurality of separate linear multi-focus X-ray sources 1145*b* arranged around the inspection area 1150. In some embodiments, the second imaging plane comprises, say, three linear multi-focus X-ray sources 1145*b* separated from each other and positioned along the perimeter of the inspection area 1150. In some embodiments, the three linear multi-focus X-ray sources 1145*b* (in the second imaging plane) are disposed or positioned so as to fill the gaps separating the three linear multi-focus X-ray sources 1145*a* (in the first imaging plane).

The inspection area or aperture 1150 is surrounded by another array of X-ray detectors 1155*b* positioned in the second imaging plane such that the X-ray detectors 1155*b* lie between the linear multi-focus X-ray sources 1145*b* and the housing 1115. The array of detectors 1155*b* is also offset, by a few millimeters, from the plane of the X-ray sources 1145*b* such that X-rays from a multi-focus X-ray source on one side of the inspection aperture 1150 can pass above the adjacent X-ray detectors and interact with X-ray detectors on an opposing side of the inspection area 1150, thereby forming a transmission image through the carcass under inspection.

The third cross-sectional view 1140*c* illustrates a composite representation of the first and second imaging planes as the carcass moves through the system 1100. The view 1140*c* shows a complete locus of multi-focus X-ray source points about the inspection area 1150 as required to form a high-quality 3D tomographic image of the carcass. A small region 1160 of missing data is observable adjacent to a hook on which the carcass is transported. Accordingly, an image reconstruction algorithm of the system 1100 is configured to minimize an impact of the missing data in a final image.

Figure 12:
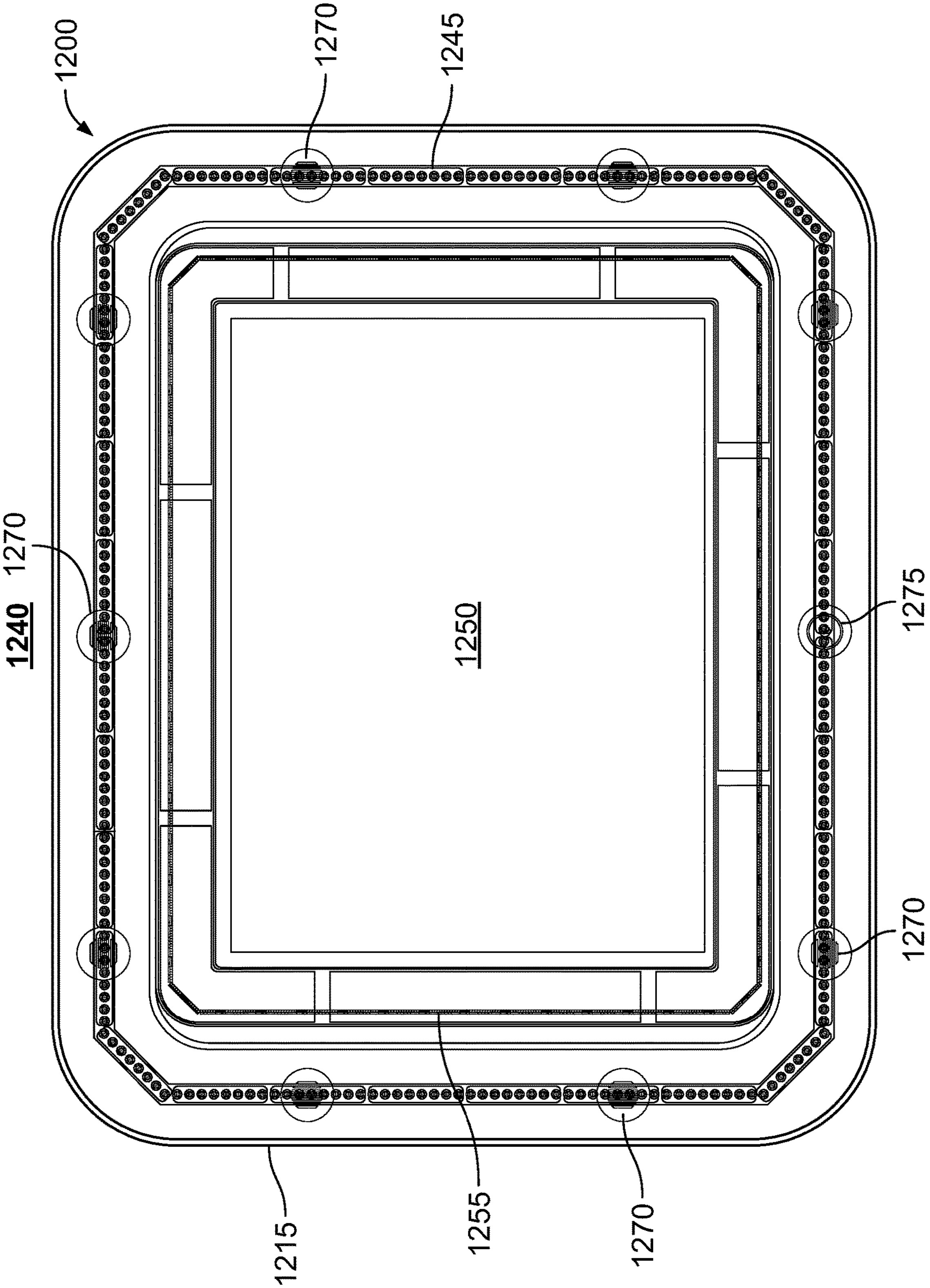
FIG. 12 illustrates a cross-sectional view of a 3D stationary gantry X-ray CT imaging system configured for single-plane scanning of carcasses, in accordance with some embodiments of the present specification.

As another example, FIG. 12 illustrates a cross-sectional view 1240 of a 3D stationary gantry X-ray CT imaging system 1200 configured for single-plane scanning of carcasses, in accordance with some embodiments of the present specification. The system 1200 comprises a plurality of separate linear multi-focus X-ray sources 1245 arranged around a perimeter of an inspection region, area or aperture 1250. The inspection region, area or aperture 1250 is surrounded by an array of X-ray detectors 1255. The plurality of separate linear multi-focus X-ray sources 1245 and the array of X-ray detectors 1255 are enclosed in a housing 1215.

The figure also shows a plurality of first structures 1270 for enabling heat dissipation from the plurality of X-ray sources 1245 and at least one second structure 1275 for enabling heat dissipation from and also for providing voltage supply to the plurality of X-ray sources 1245. In embodiments, the first structure 1270 is designed to maximize mechanical integrity and heat conductivity. The at least one second structure 1275 comprises a thermally conductive element to dissipate heat from an anode region and also a metal rod that passes through its center to supply voltage.

In accordance with an aspect of the present specification, the inspection region, area or aperture 1250 has a substantially non-circular geometry or shape such as rectangular or square, for example. The rectangular or square shape or geometry is suited to scan whole poultry and beef, lamp, pig and goat carcass sections during de-boning process. In some embodiments, the inspection area or aperture 1250 has a size of 600 mm (width)×450 mm (height).

Figure 13:
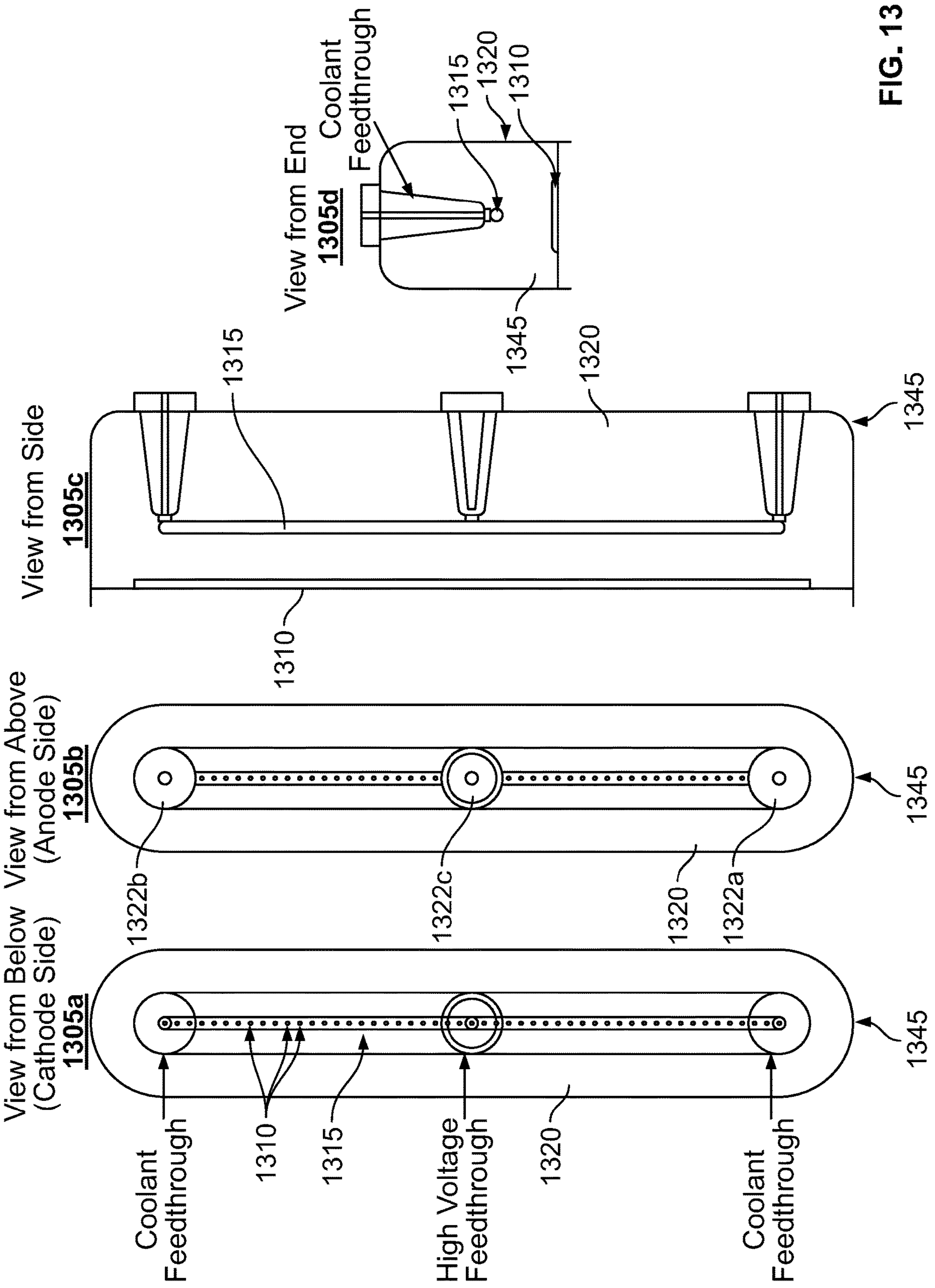
FIG. 13 shows bottom, top, longitudinal side and end views of a linear multi-focus X-ray source for use in a 3D stationary gantry X-ray CT imaging system, in accordance with embodiments of the present specification.

FIG. 13 shows bottom, top, longitudinal side and end views 1305*a*, 1305*b*, 1305*c*, 1305*d* of a linear multi-focus X-ray source 1345 for use in a 3D stationary gantry X-ray CT imaging system, in accordance with embodiments of the present specification. Referring now to the views 1305*a*, 1305*b*, 1305*c*, 1305*d*, simultaneously, the source 1345 comprises a plurality of electron guns, cathodes or source/emission points 1310 and an anode 1315 housed in a vacuum tube or envelope 1320. In some embodiments, the source 1345 comprises 100 X-ray emission points 1310 on 10 mm spacing over an active anode 1315 of length 1000 mm.

In some embodiments, first, second and third supports 1322*a*, 1322*b*, 1322*c* are deployed to support the anode 1315 along a longitudinal axis. The first and second supports 1322*a*, 1322*b* are deployed at two ends while the third support 1322*c* is deployed at the center of the anode 1315. In some embodiments, the first and second supports 1322*a*, 1322*b* also function as coolant feed-through units while the third support 1322*c* enables high voltage feed-through. In some embodiments, the anode 1315 supports an operating tube voltage in a range of 100 kV to 300 kV. In some embodiments, each electron gun, cathode or source/emission point 1310 emits a tube current in a range of 1 mA to 500 mA depending on carcass thickness and inspection area, aperture or size-larger the inspection aperture and thicker the carcass, higher the required tube current.

In some embodiments, each electron gun 1310 is configured to irradiate an area or focal spot on the anode 1315 ranging between 0.5 mm to 3.0 mm diameters. Specific dimensions of the focal spot are selected to maximize image quality and minimize heating of the anode 1315 during X-ray exposure. Higher the product of tube current and tube voltage, larger the focal spot is typically designed to be.

In accordance with aspects of the present specification, the 3D stationary gantry X-ray CT imaging system 100 includes a plurality of design features and fabrication methods of a CT tube having improved performance and stability, both from a physics and mechanical standpoint, in addition to reduced production costs. In embodiments, the housing is fabricated from stainless steel and is formed using hydroforming as opposed to metal stamping. In an embodiment, the hydroforming manufacturing method uses high pressure fluid to press a material into a mold to form a desired shape. Metal stamping in contrast, uses a custom male mold and custom female mold to press a material into a desired shape. There are many advantages to using hydroforming over metal stamping including the advantages presented in the text that follows. For example, there is less material waste in the forming process (on the order of 0-10%); stamping is typically 20% waste or more. Further, hydroforming has a lower upfront cost since it requires just one custom mold as opposed to two molds in stamping. This also contributes to a shorter production lead time and reduced cost for volume production of the parts. In addition, hydroforming provides the capability for forming more intricate shapes and features, often features that would be impossible to create in stamping. Even with the added complexity, hydroformed parts are typically manufactured at a faster rate, which also contributes to shorter manufacturing time once the system is in production. Still further, hydroforming provides better surface finishes due to water forming the material instead of another metal part surface, which translates to better stability in the CT tube when high voltage is applied. Typically, hydroformed parts have greater strength properties over stamped parts. The even distribution of compressive forces from the liquid in forming process usually results in a more rigid part. Stamping has a greater potential cause formed sheet material to thin out to an undesirable thickness with weaker strength attributes in certain areas. Because the tube is put under atmospheric vacuum pressure while trying to maintain a relatively compact shape and low weight, hydroforming contributes positively to the overall uniformity of the design execution. Still further, hydroformed parts typically experience less material spring back in hydroforming, resulting in more accurate and consistent geometries, which is critical for the CT tube housing. It should be noted that the hydroforming process does not produce uniform material thicknesses or flatness as might be expected from machining.

Figure 62:
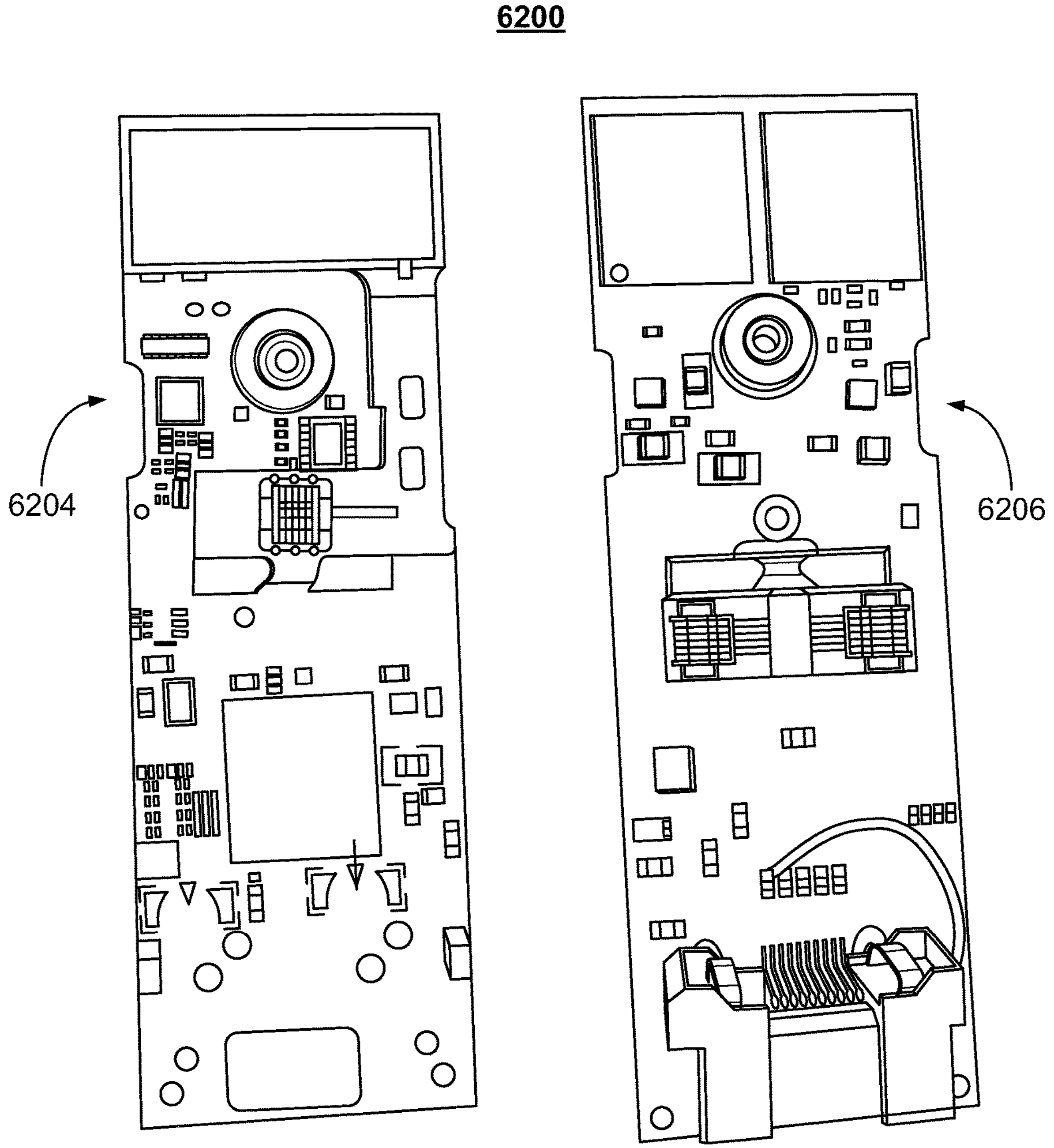
FIG. 62 shows a fully assembled sensor module, in accordance with some embodiments of the present specification.

In accordance with some embodiments, a CT multi-energy detector module consists of a printed circuit board (PCB), electrical components soldered onto the PCB to create a printed circuit board assembly (PCBA), and a detector crystal (CdTe or CdZnTe) assembled onto the PCBA. The final processing steps to complete the detector module assembly includes attaching a high-voltage flex circuit (HV Flex) and adding a protective coating. FIG. 62 shows a fully assembled sensor module 6200. Image 6204 shows side of board with detector crystals at top under the high voltage flex board. Image 6206 shows side of board with 2 ASICs at the top. The PCB for the sensor board is preferably characterized by at least following requirement: it should have a high density of traces and interconnects to carry the electronic signals from the detector crystal to the ASIC and both the area of the detector crystal attachment and each pad in the detector crystal should be flat.

Figure 14:
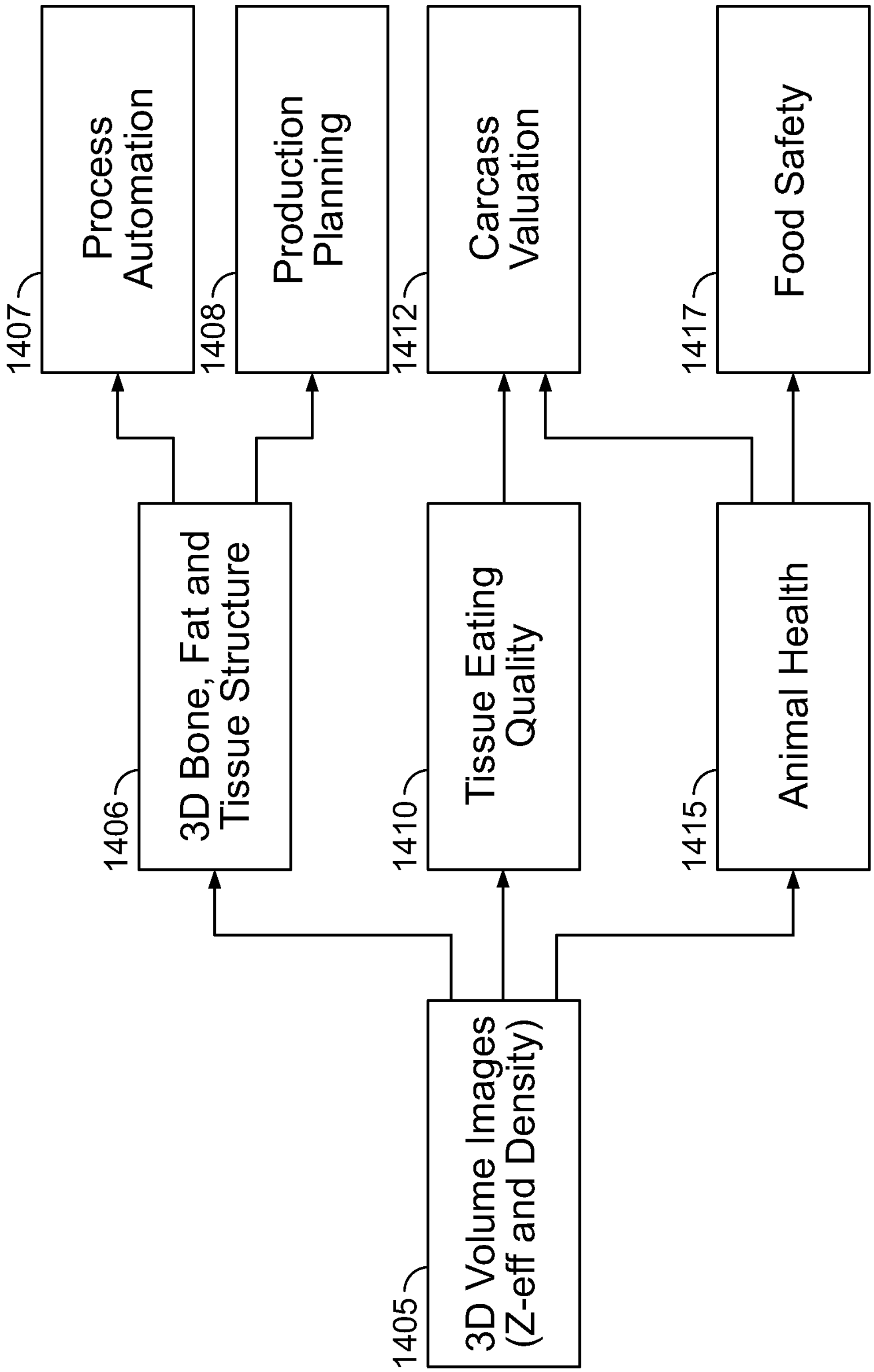
FIG. 14 is a block diagram illustration of a plurality of exemplary information, outputs or outcomes derived based on processing of carcass scan image data generated using a dual-plane 3D stationary gantry X-ray CT imaging system, in accordance with some embodiments of the present specification.

FIG. 14 is a block diagram illustration of a plurality of exemplary information, outputs or outcomes derived based on processing of carcass scan image data generated using a dual-plane 3D stationary gantry X-ray CT imaging system, in accordance with some embodiments of the present specification. In embodiments, a controller in data communication with the 3D stationary gantry X-ray CT imaging system implements a plurality of instructions or programmatic code to receive 3D scan image data, process or analyze the scan image data and generate various outputs or outcomes such as, for example, effective Z, density information, 3D structure of the animal, calculating lean meat yield, analysis of intra-muscular fat, amount inter-muscular fat, ratio of intra-muscular fat (marbling) to tissue, absolute and relative size of individual organs, muscle volume, number of ribs, and presence or absence of cysts, tumors, pleurisy and foreign objects.

Figure 20:
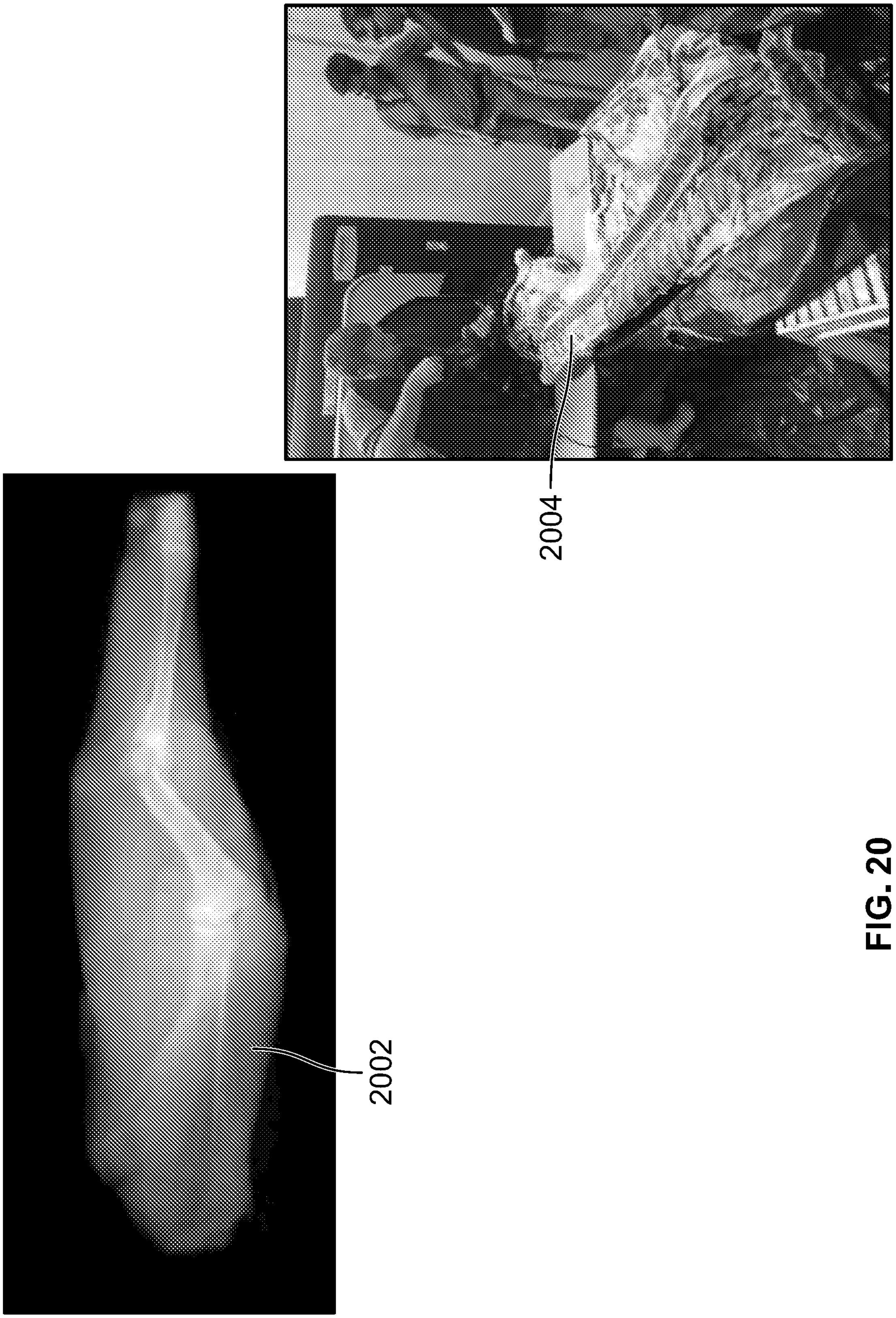
FIG. 20 shows a 3D scan image of a beef carcass providing information to enable automatic alignment, positioning and cutting of the carcass, in accordance with some embodiments of the present specification.

In accordance with aspects of the present specification, 3D scan image data of a carcass provides effective Z (atomic number) and density information (block 1405) leading to insight related to the 3D structure (comprising bone, fat and tissue structure) of the carcass (block 1406) and therefore may be used to drive a system for automatic cutting (block 1407) of the carcass based on its structure. It is known, for example, that lamb carcasses have 8 ribs typically, but sometimes a lamb may have just 7 or even 9. To continue this example, in order to plan optimal output from an abattoir, it needs to be determined as to how many lamb chops are required as opposed to rack of lamb, which typically comprises 7 ribs. Therefore, a carcass may yield 1 rack, 1 rack and 1 chop or 1 rack and 2 chops. The decision on whether the carcass should be processed into individual chops or into rack plus chop(s) is ideally made prior to the start of a day's production. In some embodiments, therefore, the use of 3D imaging can drive optimal production planning (block 1408) and establish a correct cutting sequence for one or more automated cutting equipment. As a non-limiting example, FIG. 20 shows a 3D scan image 2002 of a beef carcass 2004. The scan image 2002 provides insight related to the 3D structure (comprising bone, fat and tissue structure) of the carcass 2004. The insight related to the 3D structure enables volumetric bone positioning for automatic alignment, positioning and subsequent cutting of the carcass 2004.

In some embodiments, the 3D scan image data of the carcass can also be used to determine eating quality (block 1410) in 3D within the carcass as a whole. It is known that the density of fat and muscle are dissimilar. Therefore, they appear at different grey levels in the reconstructed X-ray image. Metrics of eating quality in beef, for example, are determined by a) a ratio of intra-muscular fat to tissue (marbling) as well as b) an amount of inter-muscular fat. Analysis of eating quality through these metrics, at each point in each muscle, determines a first amount or portion of each muscle within the carcass that will be destined for highest value output, a second amount or portion that will be destined for standard output and a third amount or portion that will be destined for low value output. This analysis drives the overall valuation (block 1412) of the carcass and ensures that farmers can be remunerated fairly for producing high quality animals and not simply on carcass weight or lean meat yield (the percentage of meat, fat and bone in the carcass).

Figure 21:
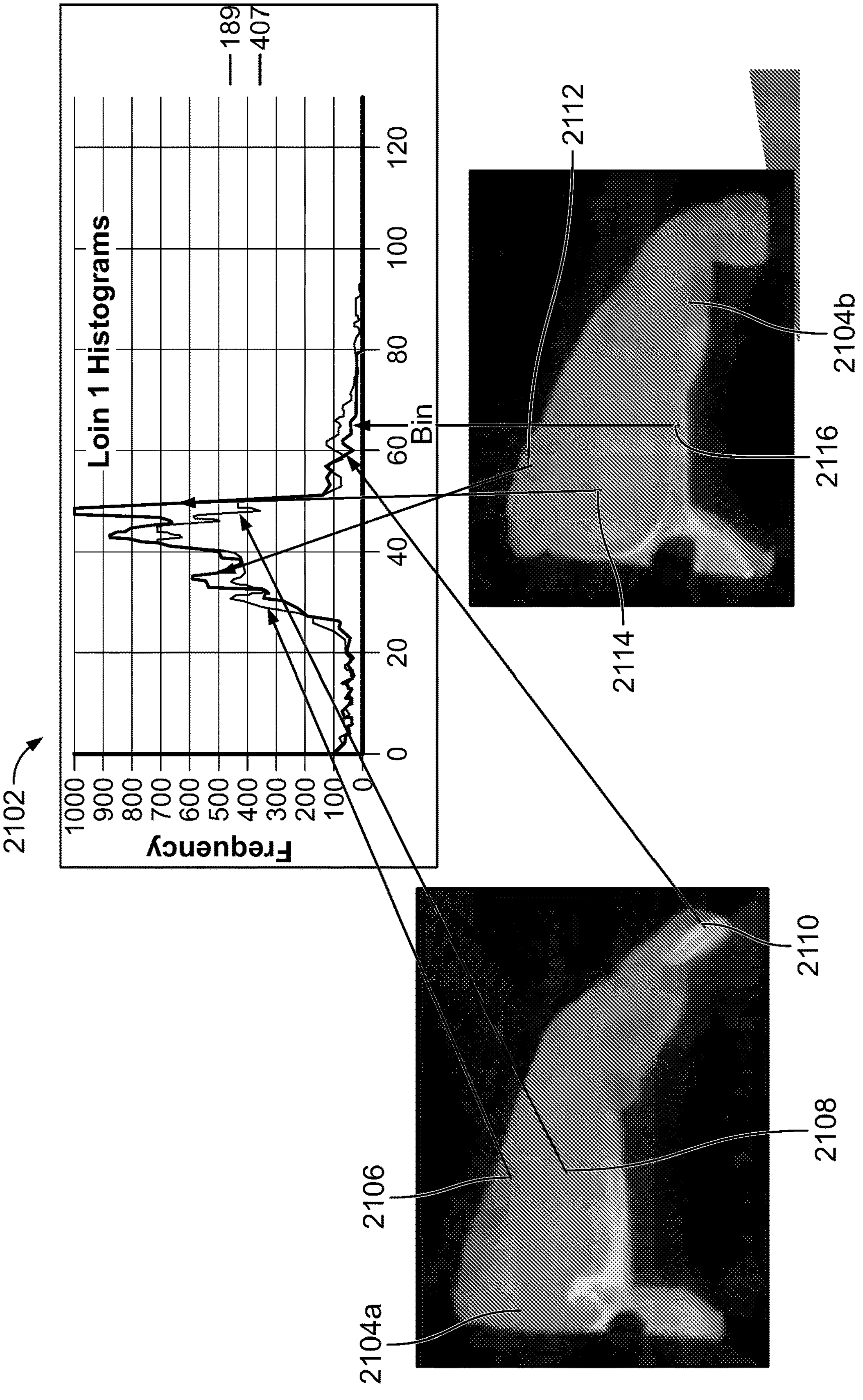
FIG. 21 shows a histogram analysis of first and second scan images of first and second beef samples respectively, in accordance with some embodiments of the present specification.

FIG. 21 shows a histogram analysis 2102 of a first scan image 2104*a* of a first beef sample and a second scan image 2104*b* of a second beef sample in accordance with some embodiments of the present specification. The image histogram analysis 2102 displays a first gray-level region 2106 (fat), a second gray-level region 2108 (lean meat), and a third gray-level region 2110 (bone) corresponding to fat, lean and bone as described in the first beef sample 2104*a* as well as fourth gray-level region 2112 (fat), a fifth gray-level region 2114 (lean meat), and a sixth gray-level region 2116 (bone) corresponding to fat, lean and bone as described in the second beef sample 2104*b*. In embodiments, plot bins 22-38 correspond to fat; plot bin range 39-54 corresponds to lean meat; and plot bin 60-74 corresponds to bone. These identified grey-level regions are used to segment the first scan image 2104*a* and second scan image 2104*b* for determining parameters such as, for example, volume content (for example, muscle volume) and ratios (for example, lean meat yield, and ratio of intra-muscular fat to tissue).

In some embodiments, further analysis of the 3D image data provides information on carcass/animal health (block 1415), for example the presence of foreign objects such as syringe needles and barbed wire inclusions, and also the presence of cysts and tumors, oversized organs, pleurisy and other common diseases. Collectively, this information also drives carcass valuation since an unhealthy carcass will be diverted to a low value food chain while simultaneously improving overall quality control in food safety (block 1417).

Figure 15:
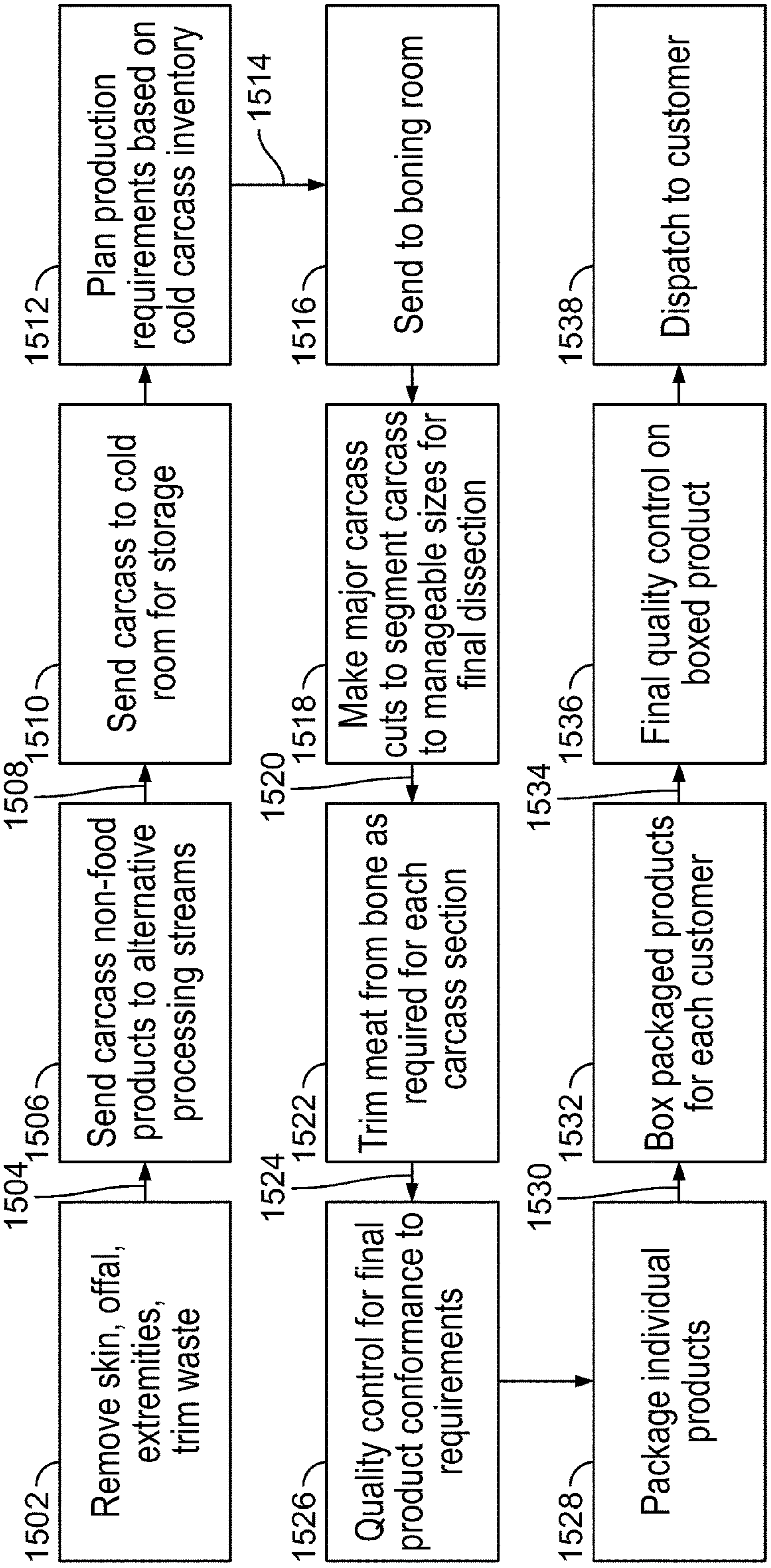
FIG. 15 is a workflow illustrating use of a plurality of 3D X-ray computed tomography scanning processes for improved abattoir management and automation, in accordance with some embodiments of the present specification.

FIG. 15 is a workflow illustrating use of a plurality of 3D X-ray computed tomography scanning processes for improved abattoir management and automation, in accordance with some embodiments of the present specification. In embodiments, a controller in data communication with a 3D X-ray computed tomography scanner implements a plurality of instructions or programmatic code to receive 3D scan image data, process or analyze the scan image data and generate various outputs or outcomes.

At step 1502, an animal is processed to remove skin, offal, extremities and trim waste. At step 1504, full carcass scanning or inspection is conducted while a temperature of the carcass is in a range of 10 to 50 degrees Celsius, and preferably is greater than 10 degrees Celsius, using a 3D X-ray computed tomography scanning system such as those described with reference to FIGS. 9A, 9B, 10A, 10B, 11 and 12. At this stage, the carcass scan data may be analyzed to determine measurements or information related to eating quality, understand animal health, determine carcass value, provide input to the production planning process, and enable optimal processing of the animal to meet customer demand. In various embodiments, a value of the carcass is determined based on at least one of lean meat yield, ratio of intra-muscular fat to tissue, amount of inter-muscular fat, absolute and relative size of individual organs, muscle volume, number of ribs, and presence or absence of cysts, tumors, pleurisy and foreign objects.

Consequently, at step 1506, non-food products of the carcass are sent to alternative processing streams. At step 1508, scanning is conducted of offal and other by-products to provide further input to animal health measurements (for example, inspection of individual organs for abnormalities and presence or absence of cysts, tumors, pleurisy and foreign objects). This can again affect carcass health, carcass valuation and subsequent production process planning. Thereafter, at step 1510, the carcass is sent for storage in a cool room that is maintained at a temperature of less than 15 degrees Celsius and preferably at about 12 degrees Celsius. Production requirements are planned, at step 1512, based on cold carcass inventory.

Now, at step 1514, full scanning of the carcass is conducted once the carcass has been stored in the cold room for a period ranging from 24 to 36 hours. At this point, the carcass will have settled into a rigid shape and re-imaging with the 3D X-ray computed tomography system ensures that the most accurate scan image data, indicative of the bone, fat and tissue structure and, therefore, of areas of contiguous meat of a predefined quality level (determined by, for example, ratio of intra-muscular fat to tissue and amount of inter-muscular fat), is sent to automated cutting systems that are used to do initial carcass segmentation into smaller pieces for more effective processing in a boning room. At step 1516, the carcass is sent to the boning room and thereafter, at step 1518, the automated cutting systems perform major carcass cuts to segment the carcass to manageable sizes for final dissection.

Next, at step 1520, in some embodiments, a 3D X-ray screening system with smaller inspection area, aperture, tunnel or region (such as that of the screening system of FIG. 4) is used to scan the smaller carcass sections (resulting from step 1518) in order to generate scan image data and determine therefrom accurate 3D structures of the smaller carcass sections prior to automated de-boning of expensive cuts, such as a beef strip-loin. Here, accurate registration between the 3D scan image data and the automated cutting systems is critical to avoid waste of valuable product and bone chipping into the final product. Subsequently, at step 1522, meat is trimmed from the bone as required from each smaller carcass section.

At step 1524, in some embodiments, the 3D X-ray screening system with smaller inspection area, aperture, tunnel or region is used to scan the meat and the scan image data is analyzed to determine measurements related to individual dissected cuts, such as a T-bone or rib-eye steak, for key quality metrics such as eating quality, fat thickness and presence of foreign objects including bone fragments. The amount of meat remaining on the bone after de-boning is also determined. If excess meat remains, the bone may be sent back for further processing to extract the remaining meat into the food chain. Subsequently, at step 1526, a quality control function is performed to ensure final product conformance to customer requirements and then, at step 1528, individual meat products are packaged.

Next, at step 1530, a quality control scanning is performed of individual cuts following packaging. This inspection is targeted towards looking for foreign objects as well as for measures such as fat thickness surrounding a piece of steak, for example, in order to ensure that customer requirements have been met. In some embodiments, this step is done with a 3D X-Ray CT system (e.g. FIG. 12), a two-dimensional X-ray system or a camera system. Packaged meat products are now boxed, at step 1532, for each customer.

Now, at step 1534, an entire box of packaged meat is scanned through the 3D X-ray computed tomography system with a smaller inspection area, aperture, tunnel or region to facilitate a final quality control function. During the final quality control function, at step 1536, a packing list to be given to the customer is compared against the actual contents of the box using automated analysis methods, such as deep learning methods, for example, to validate that the correct number of each type of product are in the box with the desired eating quality, shape and size specifications wherein the eating quality is determined based on at least one of a ratio of intra-muscular fat to tissue and an amount of inter-muscular fat. Finally, at step 1538, the boxed product is dispatched to the customer.

In embodiments, steps 1504, 1508, 1514, 1520, 1524, 1530 and 1534 highlight processes where 3D X-ray carcass inspection adds value to improving overall abattoir production operation.

Figure 16A:
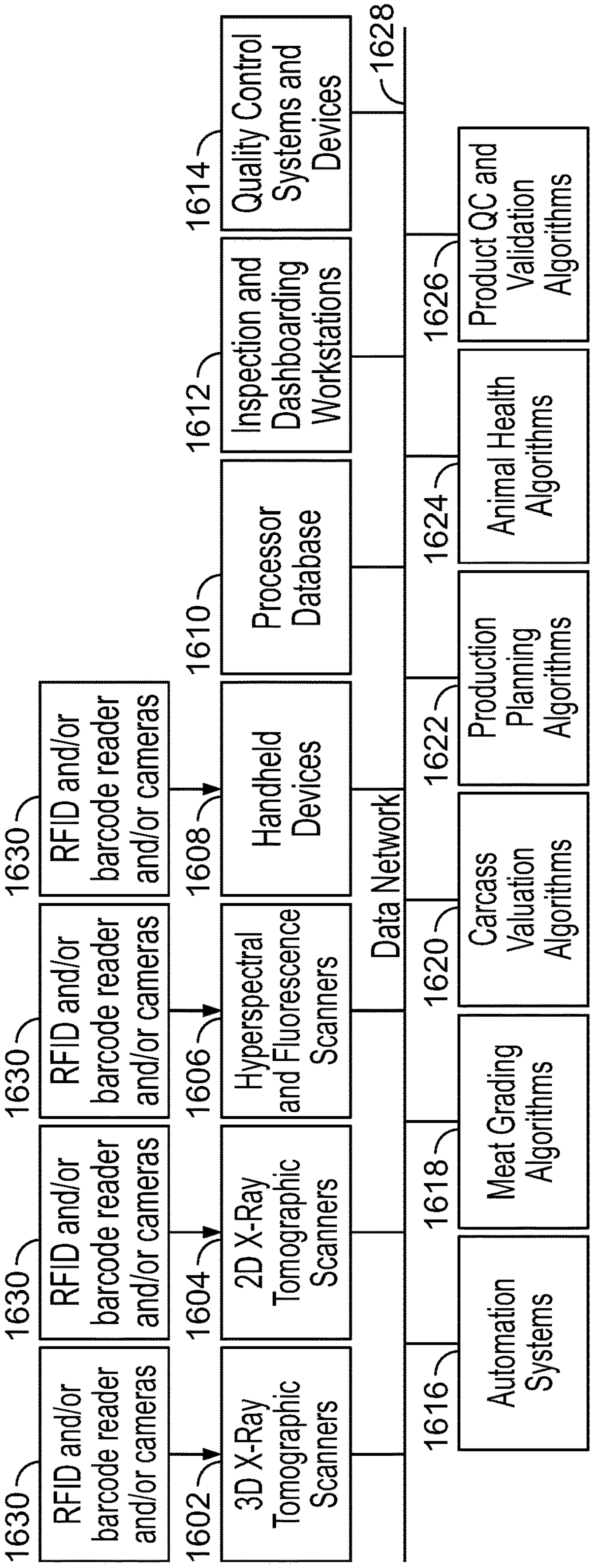
FIG. 16A is a workflow illustrating a semi-automated meat production process, in accordance with an embodiment of the present specification.

FIG. 16A is a workflow diagram illustrating an exemplary networked layout of a semi-automated meat production process, in accordance with an embodiment of the present specification. In an embodiment, meat production process workflow 1600 comprises 3D X-Ray tomographic scanners 1602; 2D X-Ray tomographic scanners 1604; hyperspectral and fluorescence scanners 1606; handheld devices 1608; database 1610; inspection workstations 1612; quality control systems and devices 1614; automation systems 1616; meat grading algorithms 1618; carcass valuation algorithms 1620; production planning algorithms 1622; animal health algorithms 1624; and product quality check and validation algorithms 1626, wherein all element blocks are coupled to a common communications/data network 1628. In embodiments, the meat production process also comprises 3D and 2D X-Ray scanners and other sensing elements such as RFID and/or barcode reader and/or cameras 1630.

In embodiments, the common communications/data network 1628 enables storage and retrieval of data in real-time from the database 1610 thereby providing a rapid search facility in order to store and retrieve data.

The common communications/data network 1628 also facilitates transmission of image data from the sensing elements (such as, but not limited to, the 3D X-Ray tomographic scanners 1602, the 2D X-Ray tomographic scanners 1604, the hyperspectral and fluorescence scanners 1606, and the handheld devices 1608), in real-time, to the algorithm processing units that can analyze the data from said sensing elements to generate information required for optimal operation of the meat production process.

The common communications/data network 1628 also enables the data from the sensing elements to be passed in real-time to automated cutting systems employed in the meat production process as well as to human operators to direct cutting of carcasses and/or primals into retail cuts on a carcass-by-carcass basis. The common communications/data network 1628 also enables the data from the sensing elements employed in the meat processing plant to be analyzed by automated quality control processes 1626 and human quality control staff to ensure accurate processing and food safety standards. In an embodiment, the common communications/data network 1628 provides means for real-time display of production metrics and other data (such as financial reports) that support meat production plant management in delivering the highest possible productivity from the plant.

Referring to FIG. 16A, in an embodiment, the present specification provides inspection workstations 1612 which operates as a plant management dashboard providing an operator of a meat processing plant with real-time updates of the status of all products within the plant. In embodiments, said status information comprises: real-time location of a carcass, primal, retail-cut, trim or packaged product identified by means of a unique ID. In an exemplary scenario, if a sensing element such as one or more of the 3D X-Ray tomography scanners 1602, 2D X-Ray tomography scanners 1604, hyperspectral and fluorescence scanners 1606, hand-held devices 1608, detects fecal contamination of a particular primal through its unique ID, the inspection workstations/dashboard 1612 immediately displays, for an operator to view, a location of the remaining carcass, and any other primals, retail cuts, trim or packaged product that originated from the same carcass.

A hyperspectral camera generates hyperspectral data which comprises a plurality of different wavelengths detected at each pixel location. Accordingly, instead of a given pixel having a single color value assigned thereto, hyperspectral data comprises a plurality of detected wavelengths at every pixel location. The plurality of wavelengths include one or more wavelengths in the range of 100 nm to 15,000 nm or any increment or subrange of values therein. The resulting image therefore comprises more than wavelength, from a spectral continuum, detected at each pixel.

In an embodiment, status information displayed by the inspection workstations/dashboard 1612 comprises at least one of: real-time notification of any package mis-labelling or incorrect shippable carton contents; real-time notification and location of any animal health defects identified by any sensing element or human operator within the plant; real-time production data including output over adjustable time scales (e.g. current shift, day, week, month or year); real-time plan variance; real-time notification of areas of production backlog or product non-conformity that require management action; real-time financial data on retail product value based on objective measurement from suitable sensors within the plant; and other relevant data such as, but not limited to, staff utilization, staff efficiency and work accuracy.

In an embodiment, the present specification provides a method of identifying the locations of all staff working in a meat processing plant in real time, by providing each member of the staff with Wi-Fi, GPS or other suitable location sensors. Referring to FIG. 16A, in embodiments, video camera systems are installed in the premises of the meat processing plant for providing real-time data to analysis algorithms such as meat grading algorithms 1618, carcass valuation algorithms 1620, production planning algorithms 1622, animal health algorithms 1624, and product quality check and validation algorithms 1626. In embodiments, said real time data is used for conducting: automated time and motion studies to determine where plant efficiencies may be achieved by more productive use of people and facilities; automated technique analysis to determine distinguishing characteristics of high performing operators which may then be used for training low performing/less efficient operators; automated review of safe working practices for all staff working with knives to determine best practice to enhance overall plant safety; and quality assurance.

Figure 16B:
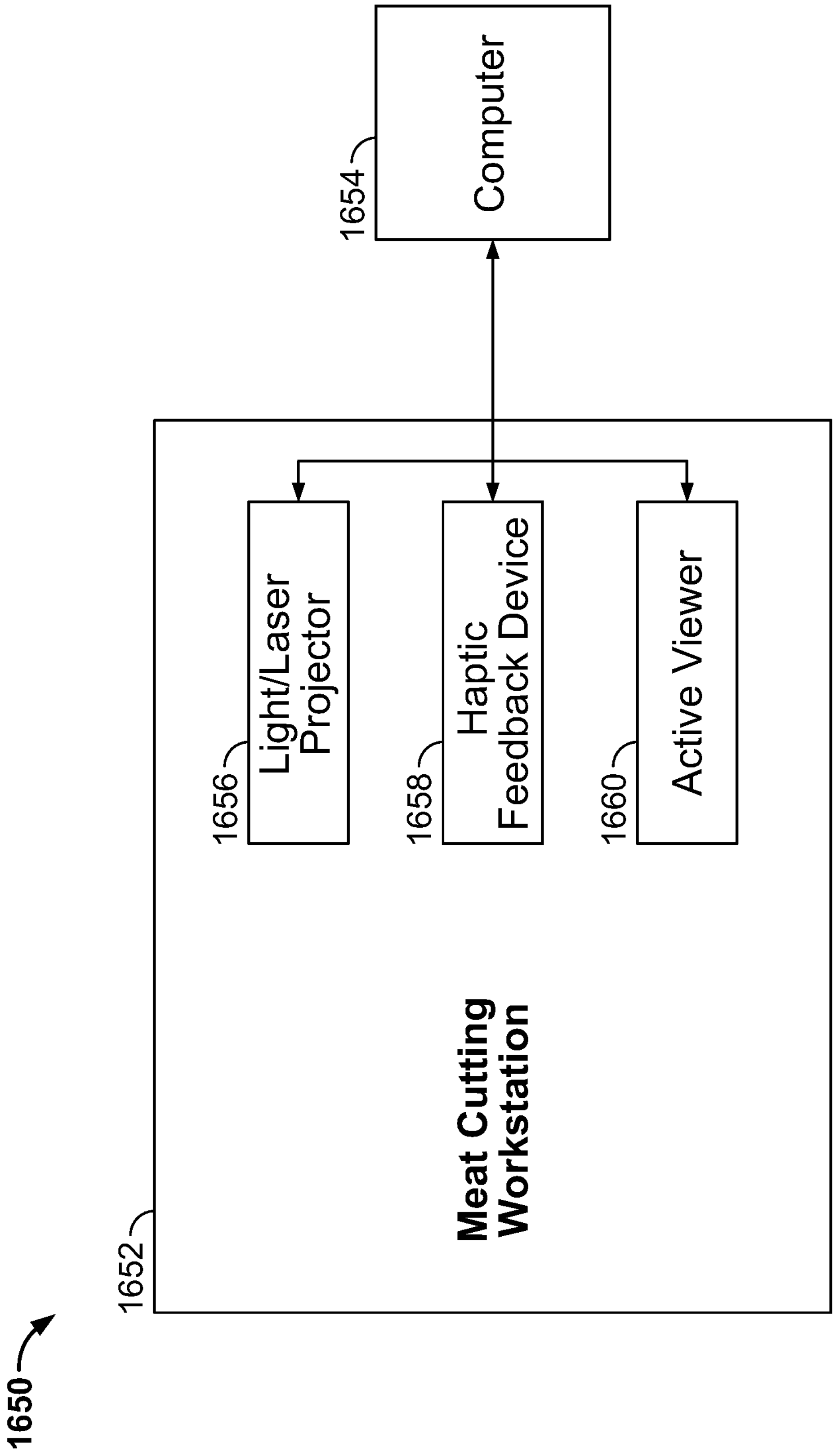
FIG. 16B is a block diagram illustrating an augmented reality based system for cutting meat in a meat processing plant, in accordance with an embodiment of the present specification.

In an embodiment, the present specification provides an augmented reality based method for achieving optimal cutting of carcasses, primals and retail cuts in a meat processing plant. FIG. 16B is a block diagram illustrating an augmented reality based system for cutting meat in a meat processing plant. In an embodiment, system 1650, located in a meat processing plant, comprises a meat cutting station 1652 for cutting carcasses into both primals and retail cuts. The meat cutting station 1652 is coupled with a controller workstation 1654. In an embodiment, the meat cutting station 1652 comprises a light/laser projector 1656, one or more haptic feedback devices 1658, and one or more active viewers 1660 for electronically guiding an operator to cut the carcasses in a desired manner. Each of the light/laser projector 1656, the one or more haptic feedback devices 1658, and the one or more viewers 1660 are electronically coupled with the controller workstation 1654, which, in an embodiment, is a computing device that controls the operation of said devices. In an embodiment, the light/laser projector 1656 is used to project images of desired primal and retail cuts over the meat cutting station 1652 to guide an operator of the meat processing plant to cut a carcass as shown in the projected images. In another embodiment, the one or more haptic feedback devices 1658 comprise cutting tools such as, but not limited to a knife blade haptic that stops vibrating when the knife is in a desired position with respect to a carcass for enabling an operator to produce desired primal and retail cuts from a carcass. In an embodiment, the one or more viewers 1660 comprise wearable active glasses to project or otherwise display how and where an individual carcass, primal or retail cut should be cut or trimmed to deliver optimal results. It would be apparent to persons of skill in the art that other feedback mechanisms such as, but not limited to, audible tones, indicators or video monitors may also be used either solely or in conjunction with other augmented reality devices for enabling an operator to deliver an optimal cut.

Figure 16C:
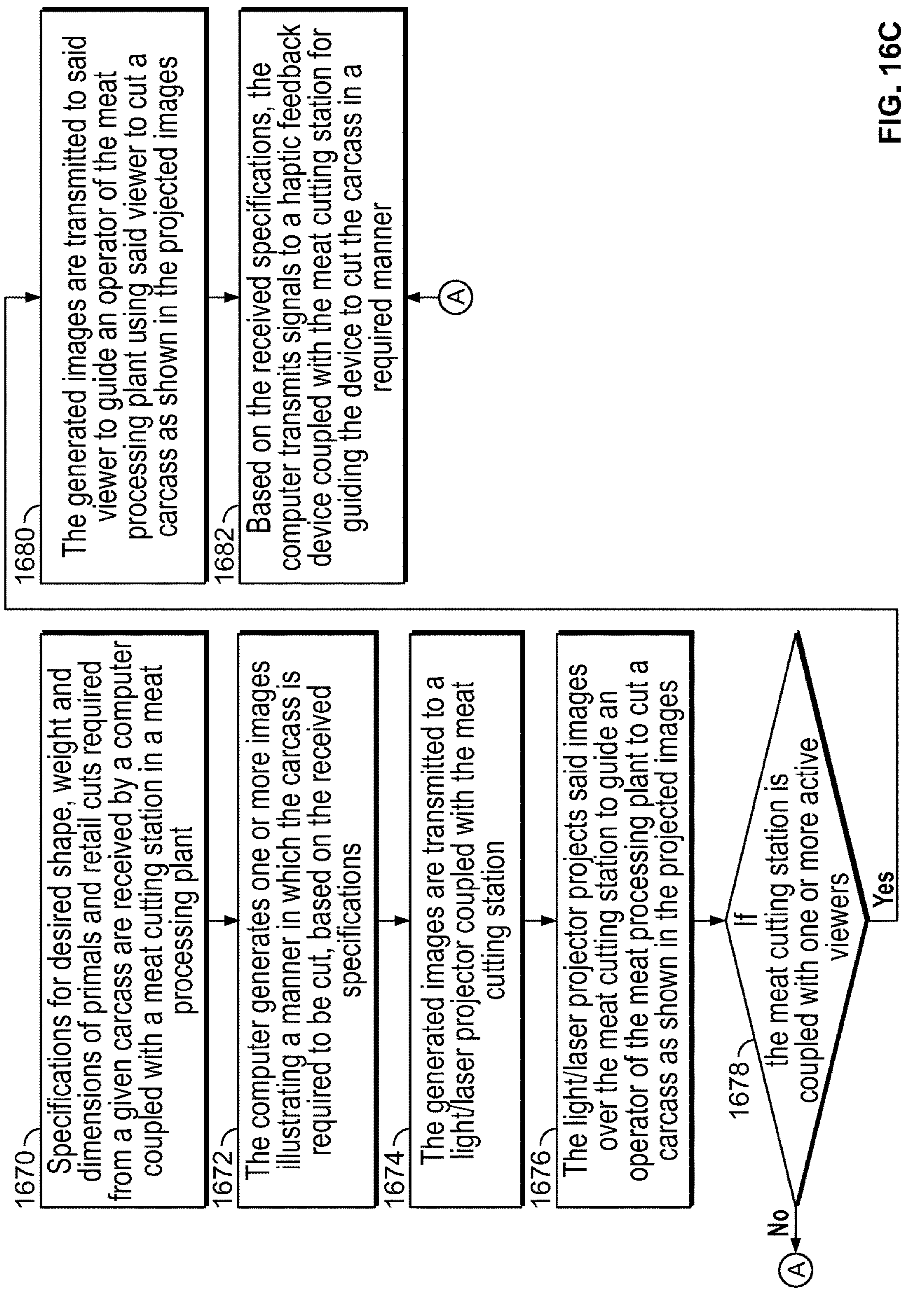
FIG. 16C is a flowchart illustrating the steps of an augmented reality based method for cutting meat in a meat processing plant, in accordance with an embodiment of the present specification.

FIG. 16C is a flowchart illustrating the steps of an augmented reality-based method for cutting meat in a meat processing plant. At step 1670, specifications for desired shape, weight and dimensions of primals and retail cuts required from a given carcass are received by a computer coupled with a meat cutting station in a meat processing plant. At step 1672 the computer generates one or more images illustrating a manner in which the carcass is required to be cut, based on the received specifications. In embodiments, said images include locations and angles of cuts required with respect to different parts of the carcass. At step 1674 the generated images are transmitted to a light/laser projector coupled with the meat cutting station. At step 1676 the light/laser projector projects said images over the meat cutting station to guide an operator of the meat processing plant to cut a carcass as shown in the projected images. At step 1678, the computer determines if the meat cutting station is coupled with one or more active viewers, which in an embodiment comprise wearable active glasses to project or otherwise display how and where an individual carcass, primal or retail cut should be cut or trimmed to deliver optimal results. At step 1680 if the meat cutting station is coupled with one or more active viewers, the generated images are transmitted to said viewer to guide an operator of the meat processing plant using said viewer to cut a carcass as shown in the projected images. At step 1682 based on the received specifications, the computer transmits signals to a haptic feedback device coupled with the meat cutting station for guiding the device to cut the carcass in a required manner. In an embodiment, haptic feedback devices comprise cutting tools such as, but not limited to a knife blade haptic that stops vibrating when the knife is in a desired position with respect to a carcass for enabling an operator to produce desired primal and retail cuts from a carcass.

Referring to FIG. 16A, in various embodiments, data produced by all sensor systems such as, but not limited to, the 3D X-Ray tomography scanners 1602, 2D X-Ray tomography scanners 1604, hyperspectral and fluorescence scanners 1606, and handheld devices 1608 installed in a meat processing plant is analyzed by automated algorithms such as meat grading algorithms 1618, carcass valuation algorithms 1620, production planning algorithms 1622, animal health algorithms 1624, product quality check and validation algorithms 1626 to produce information that is used to drive the meat production process.

In an embodiment, the automated, real-time, carcass valuation algorithms 1620 identify a carcass/an item derived from a carcass as being contaminated (for example, by using hyperspectral and fluorescence scanners 1606). Carcass valuation algorithms 1620 also identify the products (primals and cuts) derived from the same carcass as the contaminated item and marks all such products for de-contamination or further analysis depending on a type of contamination.

In an embodiment, the automated, real-time, carcass valuation algorithms 1620 also identify health defects in carcasses, animal offal, and primals. For example, pleurisy; metal contamination from sources such as, but not limited to, fence wire or syringe needles; tumors or cysts may be identified in carcasses. In addition, tumors, cysts, enlarged organs, and worms may be identified in offal by using for example using hyperspectral and fluorescence scanners 1606 and 3D X-Ray tomography scanners 1602, 2D X-Ray tomography scanners 1604. Further, worm nodules, tumors and cysts may be identified in primals; and discoloration, worms, tumors, and cysts may be identified in retail cuts being processed in the meat processing plant by using for example 3D X-ray tomographic imaging. In another embodiment, the automated, real-time, carcass valuation algorithms 1620 also identifies 3D spatial location of bone structure, muscles, inter-muscular fat or health defects within carcasses and primals in order to drive automated cutting equipment and to direct human operators, for example, by using 3D X-ray computed tomography image sensors.

In an embodiment, the automated, real-time product quality check and validation algorithms 1626 identifies meat quality spatially distributed within a carcass, primal or retail cut or packaged product against suitable grading standards such as the Australian MSA standard or the USDA meat quality standard by using imaging data obtained from sensing devices employed in the meat processing plant, such as, but not limited to 3D X-Ray tomography scanners 1602, 2D X-Ray tomography scanners 1604, hyperspectral and fluorescence scanners 1606, and handheld devices 1608.

Further, in an embodiment, the automated, real-time, carcass production planning algorithms 1622 performs carcass valuation, including determining optimal ways to cut the carcass to maximize product revenue given the current customer product delivery requirements. In an embodiment, production planning algorithms 1622 operates by combining objective measurement data derived from sensor systems such as the 3D X-Ray tomography scanners 1602, 2D X-Ray tomography scanners 1604, hyperspectral and fluorescence scanners 1606, and handheld devices 1608 installed in the meat processing plant including spatially localized information on meat grading, muscle volume, animal health, number of ribs in the carcass and animal health data obtained via the meat grading algorithms 1618, carcass valuation algorithms 1620, and the animal health algorithms 1624.

In an embodiment, real-time, meat grading algorithms 1618 determines the constituents of trim boxes to determine the exact ratio of fat to lean meat. In an embodiment data from sensing elements such as 3D X-ray tomography system employed in the meat producing plant is used by the meat grading algorithms 1618 to generate metrics for both percentage fraction of fat and lean as well as the size distribution of lean and fat items within the trim box.

In an embodiment, real-time, product quality check and validation algorithms 1626 determine if the labelling of packaged retail cuts is done as per predefined rules. In an embodiment, data from sensing elements such as 3D X-ray tomography system in combination with hyperspectral imaging employed in the meat producing plant is used to determine the weight, meat grade, meat color, fat content, fat thickness and cut-type of the products produced at the plant.

In an embodiment, real-time, product quality check and validation algorithms 1626 also determines if the contents of cartons containing multiple packaged retail cuts is as per predefined customer requirements. In an embodiment data from sensing elements such as 3D X-ray tomography system 1602 employed in the meat producing plant is used by the product quality check and validation algorithms 1626 to determine parameters such as cut type, meat grading score, weight and fat thickness of each retail cut within the carton, which parameters are then compared to the customer supplied product requirements obtained from the production database 1610. In an embodiment, real-time, product quality check and validation algorithms 1626 also performs automated tracking of product throughout the plant by using sensing technology such as, but not limited to, RFID, barcode, video tracking and time, velocity and distance based methods.

In embodiments, real-time data analysis algorithms provided by the present specification also perform time and motion analysis of individual operators and groups of operators based on video camera and location sensor measurements throughout a meat processing plant. It would be apparent to persons skilled in the art that other automated analysis algorithms may also be employed in meat processing plant. Examples of some such real time automated algorithms comprise algorithms for monitoring temperature distribution, humidity variation, throughput and other associated production metrics such as touch labor time per carcass, and the examples of real time analysis algorithms provided herein are for representative purpose only and should not be considered limiting the scope of the present specification.

Referring to FIG. 16A, the present specification provides for the use of image sensors such as 3D X-ray tomographic scanners 1602, which have dual or multi-energy sensors placed in a rotating gantry being robotically controlled or stationary gantry imaging geometries. In embodiments, 3D X-ray tomographic scanners 1602 may be used with or without motion correction methods depending upon the application in which the scanning technology is deployed. In various embodiments, the 3D X-ray tomographic scanners 1602 may be used in various applications in a meat producing plant. In an embodiment said scanner is used for performing full carcass scanning while the carcass is still hot on entrance to the abattoir production line post slaughter in the meat processing plant, wherein the scanner obtains data comprising carcass volume, spatially localized meat quality grading, bone structure and initial cutting line analysis, gross animal health defects including metal object inclusion, tumors and cysts, and wherein the data is used for obtaining an accurate carcass valuation and retail revenue estimate. In an embodiment, the 3D X-ray tomographic scanner 1602 is used for performing full carcass scanning once the carcass is rigid after cooling for one or two days wherein the scanner obtains data to map the 3D carcass structure to a sub-millimeter precision in order to determine final cut lines for automatic or manual processing into primals. In an embodiment, said scanner is used for performing offal screening in order to determine presence of cysts, tumors, metal and other foreign objects and subsequent analysis for abnormal organ volume and densities.

In another embodiment, the 3D X-ray tomographic scanner 1602 is used for performing primal scanning for determining a sub-millimeter 3D location of carcass features immediately prior to automated or manual cutting equipment in the boning room. During such scanning, in some embodiments, the primal is fixed to rigid support structures that may be used to transfer the primal from the imaging system (scanners 1602) to an automated, robotic, cutting equipment in a known frame of reference in the meat processing plant. In an embodiment, the 3D X-ray tomographic scanner 1602 is used for performing retail cut scanning to determine a cut type, a meat grade, a weight, a fat thickness and an orientation of a cut within a package. The obtained scanned data may then be used to cross-correlate with the label applied to the package using optical character recognition technology taken from a video camera image or a bar code reader. In another embodiment, the scanned data may be used to auto generate an accurate label which may then be applied directly to the packaged retail cut. In an embodiment, the 3D X-ray tomographic scanner 1602 is used for scanning packaged carton in order to verify that the entire contents of the carton containing multiple retail cuts reflects accurately the label that is applied to the outside of the carton. In embodiments, each retail cut within the carton is analyzed from the obtained 3D X-ray image in order to determine a cut type, a meat grade, a weight, a fat-thickness and a 3D location of each retail cut within the carton.

Referring to FIG. 16A, the present specification provides for the use of image sensors such as 2D X-ray tomographic scanners 1604, which have dual or multi-energy sensors placed in a rotating gantry being robotically controlled or stationary gantry imaging geometries. In embodiments, 2D X-ray tomographic scanners 1604 may be used with or without motion correction methods depending upon the application in which the scanning technology is deployed. In various embodiments, the 2D X-ray tomographic scanners 1604 may be used in various applications in a meat producing plant. In an embodiment, said scanner is used for performing meat grading scans, typically for beef grading; wherein the X-ray scan data is analyzed for checking meat quality, rib-eye muscle area, inter-muscular fat thickness, intra-muscular fat content, fat marbling and surface fat thickness. In an embodiment, the 2D X-ray tomographic scanner 1604 is used for performing analysis of a section through a trim carton to determine average fat to lean ratio across a retail cut slice and average trim component dimensions (both fat and lean) within the slice.

Figure 63:
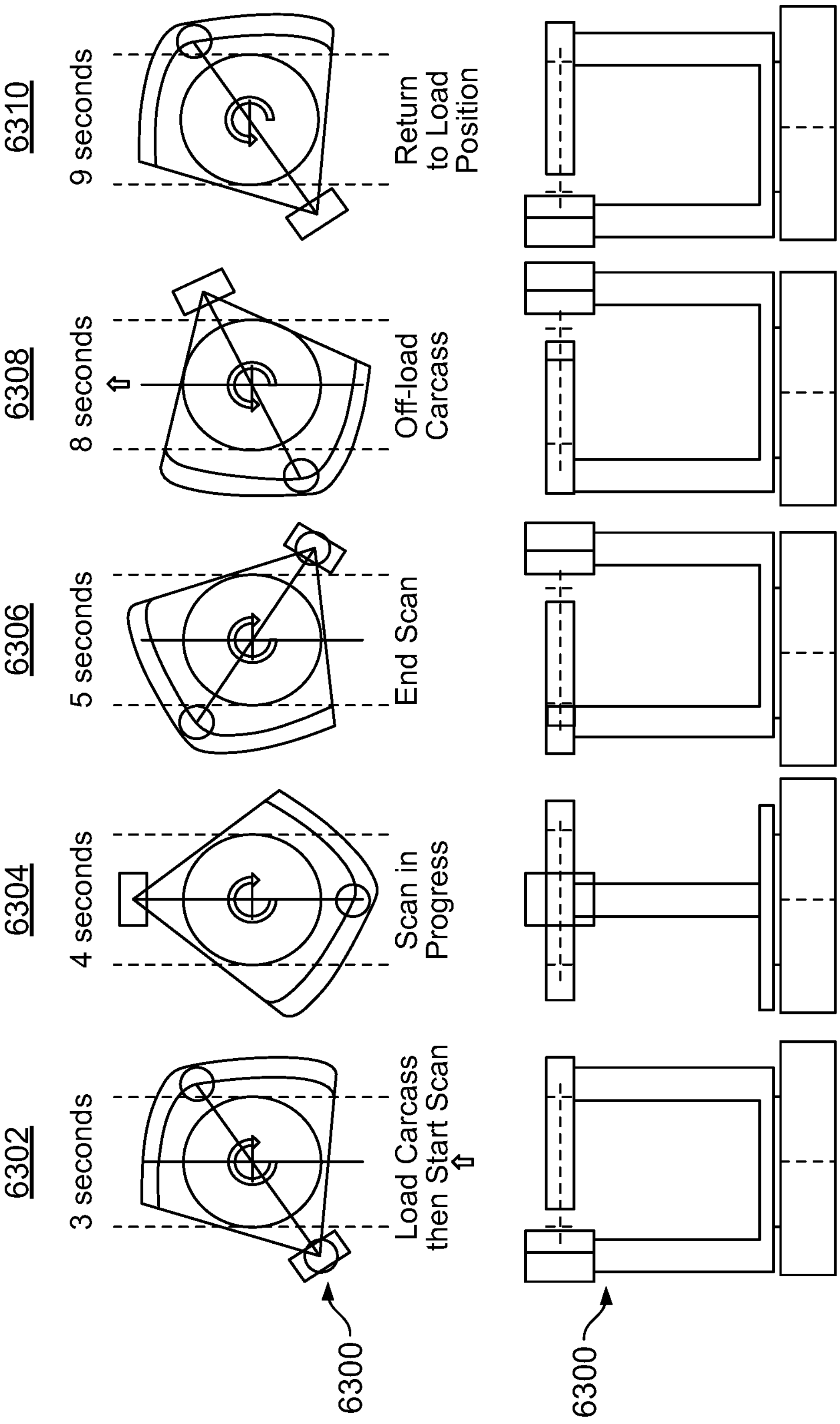
FIG. 63 shows line diagrams of various stages of performing a scan and subsequent image analysis to generate data indicative of the quality of meat ("meat grade"), in accordance with some embodiments of the present specification.

FIG. 63 shows line diagrams of various stages of performing a scan and subsequent image analysis to generate data indicative of the quality of meat ("meat grade"), in accordance with some embodiments of the present specification. In embodiments, the scan is performed using a tomographic scanner 6300. At stage 6302, a carcass is loaded onto the scanner 6300 and the scan is initiated. In some embodiments, the process of stage 6302 takes about 3 seconds. At stage 6304, the scan is in progression. In some embodiments, at stage 6304, about 4 seconds elapse until about a mid-point of the scan. At stage 6306, the scan is completed. In some embodiments, at stage 6306, about 5 seconds elapse. At stage 6308, the carcass is unloaded from the scanner 6300. In some embodiments, at stage 6308, about 8 seconds elapse. At stage 6310, the scanner returns to the initial load position (of stage 6302). In some embodiments, at stage 6310, about 9 seconds elapse. Thus, in some embodiments, completion of all stages of the meat grading scan takes about 9 seconds. In some embodiments, the tomographic scanner 6300 has a throughput of 400 sides/hour and generates 0.5 mm×0.5 mm reconstructed pixels.

In some embodiments, the system of the present specification applies a plurality of programmatic instructions to evaluate the X-ray image and generate data indicative of a quality of meat, wherein said quality is quantified by a first range of values; to generate data indicative of intramuscular fat (IMF) deposition and/or content, which is associated with a second range of values; and to generate data indicative of an extent of marbling of the meat, which is associated with a third range of values. In some embodiments, one or more camera systems are installed for slice location and meat color imaging.

The present specification also provides for the use of image sensors such as 2D projection X-ray imaging in single-view or dual-view configurations with dual or multi-energy X-ray sensors. In various embodiments, the 2D projection X-ray imaging may be used in various applications in a meat producing plant. In an embodiment, said imaging is used for performing analysis of offal after removal from the carcass into trays, wherein one tray of green offal (e.g. stomach, intestines and bowel) and one tray of red offal (e.g. heart, lungs, liver, kidneys) are produced per carcass. In embodiments, the X-ray system is used to look for foreign objects such as metal items and worm nodules as well as for health defects such as tumors, cysts and enlarged organs. In an embodiment, said imaging is also used for analysis of cartons containing trim to determine the fraction of lean to fat tissue averaged over the whole carton.

In some embodiments, the present specification provides for the use of image sensors such as 2D projection X-ray imaging in a single-view and/or dual-view configuration with dual or multi-energy X-ray (MEXA) sensors to detect the presence of brisket worm nodules in the scanned meat. It should be appreciated that programmatic instructions are configured to process the X-ray image data to identify at least one of shapes, attenuation values, clustering, density, or other values indicative of one or more brisket worm nodules. In some embodiments, the X-ray system uses a conveyor that is positioned on an incline, wherein a first end of the conveyor is at a lower height position than the second, opposing end of the conveyor, or a decline, wherein a first end of the conveyor is at a higher height position than the second, opposing end of the conveyor, to minimize radiation dose and overall system size. In some embodiments, the X-ray system provides an ink-jet, laser beam, LED strip or augmented reality headset to indicate presence of worm nodules.

Referring to FIG. 16A, the present specification provides for the use of hyperspectral and fluorescence scanners 1606 operating across the mid infra-red wavelengths ranging from 5,000 nm to 2,000 nm; short wave infra-red wavelengths ranging from 2,000 nm to 900 nm; near infra-red wavelengths ranging from 900 nm to 800 nm; visible light wavelengths ranging from 800 μm to 400 nm; and ultra-violet wavelength ranging from 400 nm to 100 nm. Contrast between tissues varies as a function of wavelength, as a function of healthy to diseased tissue and as a function of contaminated to clean tissue. In embodiments, ultra-violet light, broadband visible light and infrared light may be used to illuminate offal/other meat product under inspection for reflective image formation and analysis. In embodiments, hyperspectral and fluorescence scanners 1606 may be used for carcass scale analysis of contamination (for example, for detection of feces following removal of the hide). In embodiments, hyperspectral and fluorescence scanners 1606 may be used for analysis of viscera (offal) following removal from the carcass into trays, which typically includes one tray of green offal (such as stomach, intestines and bowel) and one tray of red offal (such as heart, lungs, liver, kidneys) per carcass. In embodiments, hyperspectral and fluorescence scanners 1606 are used to determine a range of heath defects in meat products such as, but not limited to tumors, cysts, inflammation, rashes and infection.

Referring to FIG. 16A, the present specification provides for the use of video camera systems 1630 operating in the visible wavelength ranging from 800 nm to 400 nm and short wave infra-red wavelength region ranging from 2000 nm to 900 nm. In embodiments, said video camera systems are used for: object tracking along conveyor belts and between hanging conveyor systems, automated cutting systems and horizontal conveyor systems; positioning data for locating carcasses and primals within other inspection systems such as X-ray scanners and to provide data for motion correction algorithms as may be required; human factors and time-motion study analysis to deliver optimal production efficiency and best quality operator cutting procedures; and thermal imaging to analyze knife cutting methods used in creating retail cuts from primals.

Referring to FIG. 16A, the present specification provides for the use of handheld devices 1608 comprising RFID and/or barcode reader and/or cameras 1630. In various embodiments, said RFID and/or barcode reader and/or cameras 1630 which may be both handheld or fixed are used for: tracking carcass, offal, primal, retail cut, trim container, packaged product and cartons or product within the production facility; and performing quick lookup of data relating to the carcass, offal, primal, retail cut, trim container, packaged product or carton of product associated with that barcode and/or RFID tag reading.

In various embodiments, various different types of sensors and applications may be used in the abattoir, of a meat processing plant, such as, but not limited to, fixed installations of 3D video camera systems; radar range finding systems for determining carcass volume, meat grading and meat color; hand held systems for measuring temperature, pH, color, contamination and other parameters. Such and other sensors may be integrated within the overall framework disclosed in the present specification for further increasing the efficiency and profitability of a meat processing plant, without departing from the scope of the present specification.

In an embodiment of the present specification, each of the carcasses being processed in a meat processing plant, each of the primals that are cut from said carcasses and each subsequent retail cut from each of said primals are provided with a unique identifier (ID) to ensure traceability of all products. For example, if a carcass entering an abattoir cool room of the meat processing plant has an ID of '63', and subsequently, six primals are cut from the carcass, said primals may be provided with ID's such as, '63:1' through '63:6'. If the primal '63:1' is then processed into 26 retail cuts said cuts may be provided with ID's such as '63:1:1' to '63:1:26'. If the primal 63:2 is processed into 15 retail cuts said cuts may be provided with ID's such as '63:2:1' to '63:2:15'. IDs for the retail cuts from the remaining primals from carcass ID '63' may be similarly provided. It would be apparent to persons of skill in the art, that multiple carcass, primal and retail cut labelling schemes are possible and may be employed in the present specification, and that the above given example is just one of such labelling schemes. In various embodiments, the IDs generated for the carcass, primal and retail cut are also associated with the date and time stamp at which a primal was cut from a carcass or a retail cut was separated from its primal.

In another embodiment, the present specification provides a method for tracking a location and time or arrival of each carcass, primal and retail cut through a meat processing plant.

Figure 17:
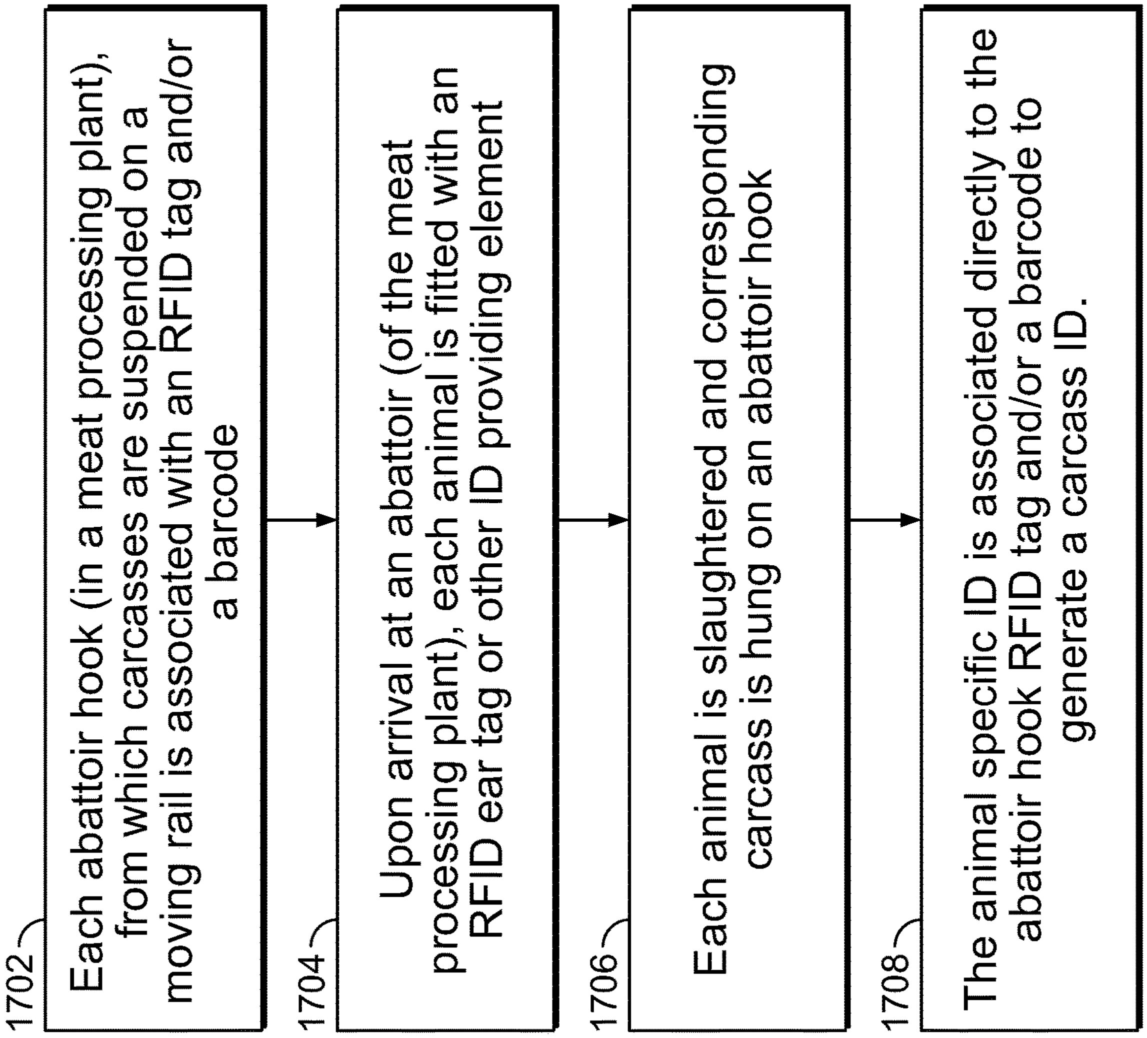
FIG. 17 is a flowchart illustrating the steps of assigning a carcass ID for tracking a location, time and/or arrival of each carcass through a meat processing plant, in accordance with an embodiment of the present specification.

FIG. 17 is a flowchart illustrating the steps of assigning a carcass ID for tracking a location and time or arrival of each carcass through a meat processing plant, in accordance with an embodiment of the present specification. At step 1702 each abattoir hook (in a meat processing plant), from which carcasses are suspended on a moving rail is associated with an RFID tag and/or a barcode. At step 1704, upon arrival at an abattoir (of the meat processing plant), each animal is fitted with an RFID car tag or other ID providing element. At step 1706 each animal is slaughtered and corresponding carcass is hung on an abattoir hook. At step 1708, the animal specific ID is associated directly to the abattoir hook RFID tag and/or a barcode to generate a carcass ID. This ensures traceability of an animal to a corresponding carcass. In embodiments, a carcass ID is a combination of the abattoir hook ID and the animal ID to case traceability of the carcass primary ID back to a farm on which the animal was produced. In embodiments, a date and time stamp is included as a component of the carcass ID to case human sortation of the abattoir data.

Figure 18:
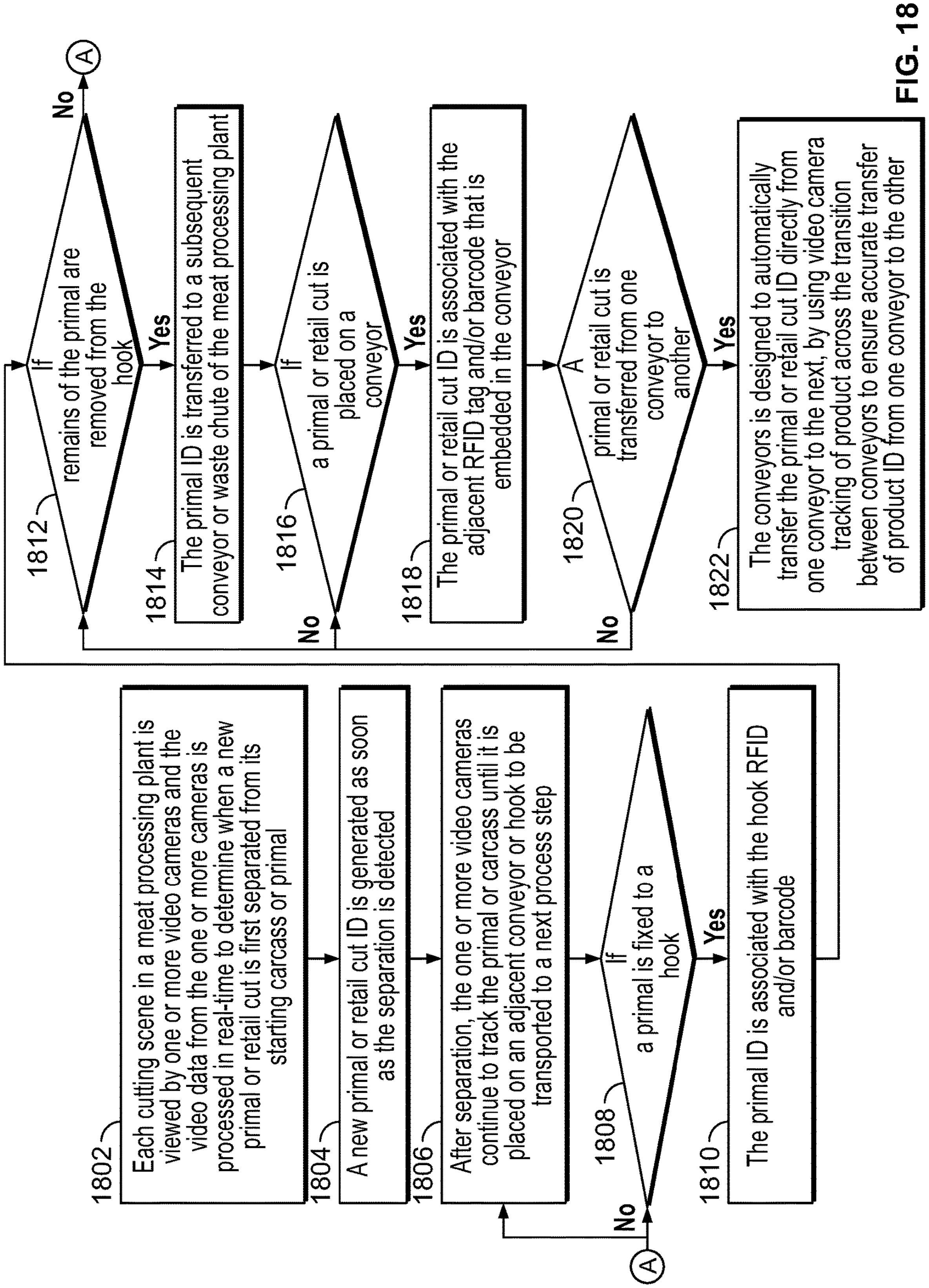
FIG. 18 is a flowchart illustrating the steps of assigning a carcass ID for tracking a location and/or time when a primal or retail cut is obtained from a carcass through a meat processing plant, in accordance with an embodiment of the present specification.

In an embodiment, the present specification employs a video camera technology to track a primal as it is cut from a carcass and transferred to a conveyor or a secondary hanging rail. FIG. 18 is a flowchart illustrating the steps of assigning a carcass ID for tracking a location and time when a primal or a retail cut is obtained from a carcass through a meat processing plant, in accordance with an embodiment of the present specification. At step 1802, each cutting scene in a meat processing plant is viewed by one or more video cameras and the video data from the one or more cameras is processed in real-time to determine when a new primal or retail cut is first separated from its starting carcass or primal. At step 1804, a new primal or retail cut ID is generated as soon as the separation is detected. At step 1806, after separation, the one or more video cameras continue to track the primal or carcass until it is placed on an adjacent conveyor or hook to be transported to a next process step. At step 1808 it is determined if a primal is fixed to a hook. At step 1810, if a primal is fixed to a hook, the primal ID is associated with the hook RFID and/or barcode. At step 1812 it is determined if remains of the primal are removed from the hook. At step 1814 if remains of the primal are removed from the hook, the primal ID is transferred to a subsequent conveyor or waste chute of the meat processing plant. At step, 1816 it is determined if a primal or retail cut is placed on a conveyor. At step 1818, if a primal or retail cut is placed on a conveyor, the primal or retail cut ID is associated with the adjacent RFID tag and/or barcode that is embedded in the conveyor. In an embodiment, conveyor ID's are placed at a spacing ranging from 100 mm-200 mm on the conveyor so that the position of each primal or retail cut on the conveyor is easily identifiable. At step, 1820 it is determined if a primal or retail cut is transferred from one conveyor to another. At step 1822, if a primal or retail cut is transferred from one conveyor to another, the conveyors are designed to automatically transfer the primal or retail cut ID directly from one conveyor to the next, by using video camera tracking of product across the transition between conveyors to ensure accurate transfer of product ID from one conveyor to the other. In an embodiment, if more than one retail cut is placed side by side on a conveyor, such that a plurality of cuts are associated with the same conveyor barcode or RFID tag, video camera tracking is used to determine the lateral position of each cut on the conveyor at the point where the cuts are loaded or removed from the conveyor.

Figure 19:
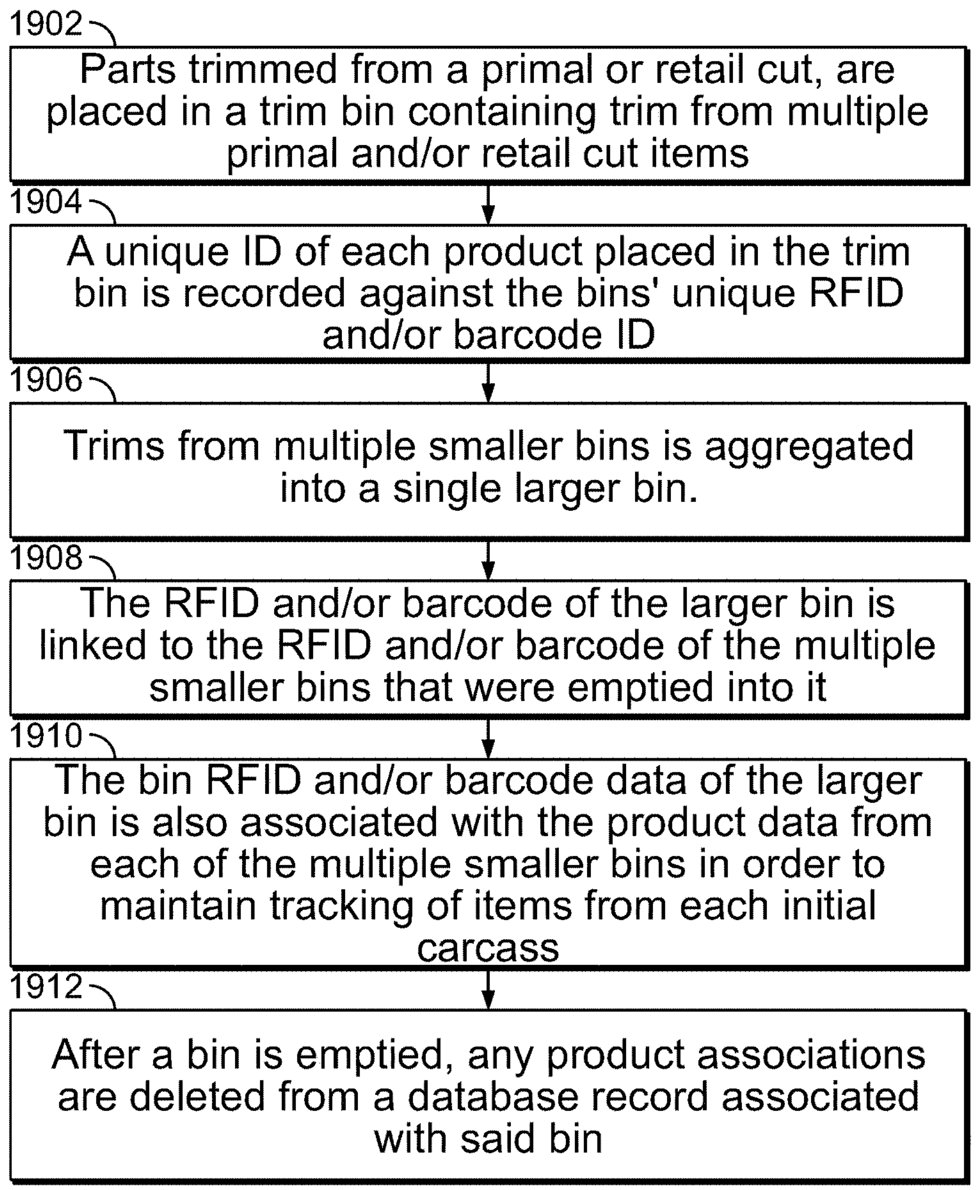
FIG. 19 is a flowchart illustrating the steps of assigning a carcass ID for tracking a location of a carcass/primal/retail cut through a meat processing plant, in accordance with an embodiment of the present specification.

In embodiments, for the points where human operators lift or otherwise remove primals or product from a rail or conveyor into a subsequent processing step, such as trimming fat from a primal or packing the product, one or more video cameras are used to monitor the location of the product and any parts that may be cut from it in order to maintain product location and ID assurance. FIG. 19 is a flowchart illustrating the steps of assigning a carcass ID for tracking a location of a carcass/primal/retail cut removed by human operators through a meat processing plant, in accordance with an embodiment of the present specification. At step 1902 parts trimmed from a primal or retail cut, are placed in a trim bin containing trim from multiple primal and/or retail cut items. At step 1904 a unique ID of each product placed in the trim bin is recorded against the bins' unique RFID and/or barcode ID. At step 1906, trims from multiple smaller bins are aggregated into a single larger bin. At step 1908, the RFID and/or barcode of the larger bin is linked to the RFID and/or barcode of the multiple smaller bins that were emptied into it. At step 1910, the bin RFID and/or barcode data of the larger bin is also associated with the product data from each of the multiple smaller bins in order to maintain tracking of items from each initial carcass. At step 1912 after a bin is emptied, any product associations are deleted from a database record associated with said bin in order that when the bin is filled again it may be associated with corresponding new product IDs.

In embodiments, before and after photographic data is recorded and associated with an initial and final product for quality assurance purposes at points where automated process equipment, such as rotating blades, band saws, pulling devices or water jet cutters, removes or modifies carcass, primal or retail cuts. Where automated handling equipment moves carcasses, primals or retail cuts from one location to another, the carcass, primal or retail cut IDs are transferred automatically from the initial location to the final hook or conveyor location.

In embodiments, at each point in the meat processing plant, where a carcass, primal, retail cut or a packaged product is scanned by a sensor, the carcass, primal, retail cut or packaged product ID is associated directly with the data produced by the sensor to allow instant recall of the data from that sensor via the data network (such as 1628, FIG. 16A) for retrospective analysis and for real-time analysis by computerized algorithms that provide added value to the overall production process.

A Multi-Sensory Imaging System/Platform

In some embodiments, the present specification describes a multi-sensor imaging system/platform that is designed to use 2D (two-dimensional) projection X-ray imaging in single-view or dual-view configurations with dual-energy or multi-energy X-ray (MEXA) sensors in combination with hyperspectral imaging for offal inspection and sortation. In some embodiments, the X-ray system uses a conveyor that is positioned on an incline, wherein a first end of the conveyor is at a lower height position than the second, opposing end of the conveyor, or a decline, wherein a first end of the conveyor is at a higher height position than the second, opposing end of the conveyor, to minimize radiation dose and overall system size.

In some embodiments, the multi-sensor imaging system/platform combines multi-energy X-ray attenuation (MEXA) with visible and shortwave infra-red (SWIR) hyperspectral camera data and applies a plurality of programmatic code, instructions or algorithms to automatically detect and sort cattle and sheep organs with defects in abattoirs. The hyperspectral data provides detailed information on the surface whereas the X-rays penetrate tissues providing information inside the organs. In some embodiments, the multi-sensor imaging system/platform provides an ink-jet, laser beam, LED strip or augmented reality headset to indicate presence of health issues upon scanning the meat.

The present specification describes a multi-sensor platform and associated plurality of programmatic code, instructions or algorithms to process the X-ray scan data and hyperspectral imaging data for the detection of defects in animal tissue, particularly beef and sheep organs. It should be appreciated that in order to collect data, normal and abnormal (where abnormal is diseased or sick) organs were acquired from abattoirs, scanned by the multi-sensor system, and histopathological inspection was performed by expert veterinarians. The collected data is then used to develop various algorithms for the automatic detection of abnormal organs using various machine learning and deep learning algorithms, both supervised and unsupervised. Automatic identification of defects in both beef and sheep organs using hyperspectral imaging data have an accuracy of up to at least 92%. In embodiments, the plurality of programmatic code, instructions or algorithms may be used to automatically either 'flag' organs with defects after classification, or produce an image (that may be, but is not limited to, RGB, X-ray and/or hyperspectral) with colored or otherwise differentiated regions where the anomaly is detected, which may assist inspectors for further inspection. The plurality of programmatic code, instructions or algorithms is configured to generate at least one graphical user interface (GUI) in order to display the image and apply color or other demarcations (such as stippling) to regions of the image in order to indicate that the regions contain one or more anomalies.

In addition, the plurality of programmatic code, instructions or algorithms analyze target X-ray scan data in order to determine whether an organ of interest (i.e. by abnormal thickness upon palpation or discoloration) is too dense compared to healthy organs within a library of X-ray images (stored in a database). In some embodiments, each X-ray image in the library has an associated thickness and density data. The plurality of programmatic code, instructions or algorithms is configured to process the associated thickness and density data in order to determine appropriate thresholds for acceptance or rejection of a target X-ray image as containing healthy or unhealthy meat/organ, respectively. In some embodiments, the plurality of programmatic code, instructions or algorithms is further configured to identify diseases in a target X-ray scan data based on the library or database containing marked-up X-ray images with information from several lesions.

The multi-sensory platform of the present specification provides improved offal throughput including optimization of the rollers and protective lead shielding, and automation of image analysis to view and inspect a scanned organ in real-time and determine if a second scan is necessary, and allowing for longer projection times in order to scan more than one organ in succession. Roller spacing, strength and size can be optimized based on a weight and/or distribution of scanned offal. Thick offal lowers the detected scan signal (due to more attenuation) and therefore statistical accuracy (that is, more noise). In such cases, the multi-sensory platform is configured to scan at slower speed (for longer) in order to improve image/detection accuracy and precision.

Figure 22:
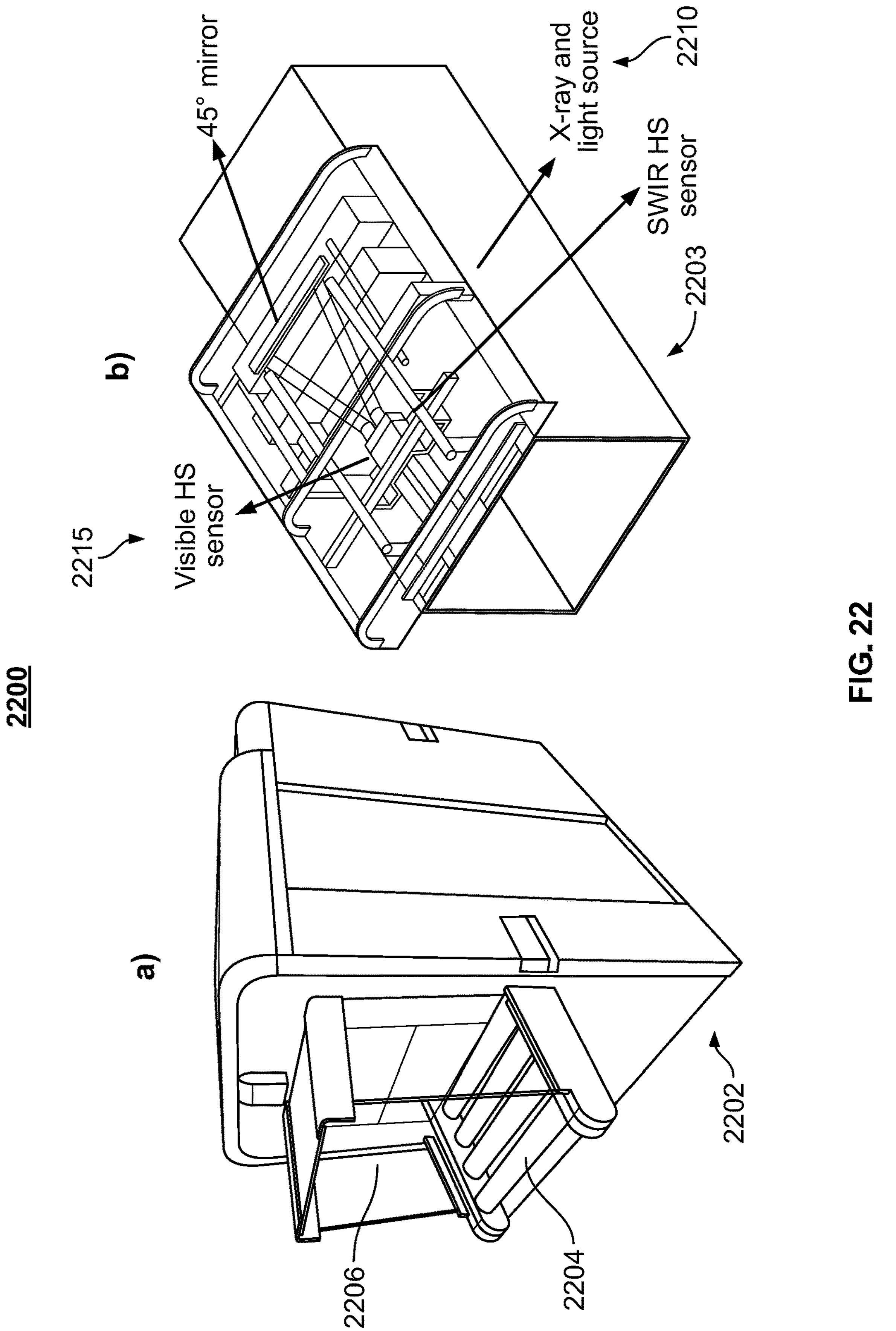
FIG. 22 shows perspective and block diagram views of a multi-sensory imaging system, in accordance with some embodiments of the present specification.

FIG. 22 shows perspective and block diagram views 2202, 2203 of a multi-sensory imaging system/platform 2200, in accordance with some embodiments of the present specification. In some embodiments, the system 2200 includes the following characteristics described below.

In some embodiments, system 2220 includes a conveyor belt 2204 (that translates at a speed ranging from 0.1 m/s to 1.0 m/s and preferably at approximately 0.2 m/s).

In some embodiments, system 2200 includes an inspection tunnel 2206 having a length ranging from 1100 mm to 5000 mm, a width ranging from 500 mm to 1000 mm and a height ranging from 300 mm to 1000 mm, and preferably a size of 1360 mm length×630 mm width×400 mm height.

In some embodiments, system 2200 includes a dual-view X-ray scanning system 2210 comprising first and second X-ray sources of 160 keV each (wherein, the first source is in up-shooter configuration and the second source is in a side-shooter configuration). In some embodiments, the system 2210 has 10 to 42 DABs, and preferably, 6 to 22 for up-shooter view and 4 to 20 for side-shooter view. In an embodiment, the system 2210 has 20 data acquisition boards (DABs), and particularly, 11 for up-shooter view and 9 for side-shooter view (112 pixels per board).

In some embodiments, the system 2210 includes high spatial resolution multi-energy photon counting X-ray sensor arrays such as, for example, a cadmium telluride detector (CdTe: 0.8 mm×1.2 mm×2 mm).

In various embodiments, an X-ray imaging acquisition rate of the system 2210, ranges from 150 Hz to 500 Hz in 3 to 20 energy bands in the range 20-160 keV. In some embodiments, an X-ray imaging acquisition rate is of 300 Hz in six energy bands in the range 20-160 kcV.

In various embodiments, system 2210 includes a hyperspectral imaging system 2215 comprising camera sensors. In some embodiments, the camera sensors include a Visible/IR (Infrared) sensor operating in a wavelength range of 450 nm-900 nm. In various embodiments, the camera sensor is configured for imaging in 200 to 1200 wavelength bands. In an embodiment, the camera sensor is configured for imaging in 300 wavelength bands. In some embodiments, the camera sensors include a SWIR (shortwave infrared) sensor operating in a wavelength range of 900 nm-1700 nm. In various embodiments, the camera sensor is configured for imaging in 400 to 700 wavelength bands. In an embodiment, the camera sensor is configured for imaging in 512 wavelength bands. In some embodiments, the hyperspectral imaging acquisition rate ranges from 30 Hz-150 Hz depending on image resolution/size and to scale to X-ray image capture.

The X-ray and hyperspectral imaging systems 2210, 2215 are in data communication with a computing device having memory, associated database system and a controller/processor that implements a plurality of instructions, programmatic code or algorithms (for example, an Ubuntu (Linux) Cube computer program) configured to control exposure time, image size, and acquisition rate as well as perform various analyses of X-ray images and/or hyperspectral images in order to identify anomalies, diseases and types of meat/organs/offal, classify healthy and unhealthy meat as well as implement associated functionalities and features, as described in the present specification.

The multi-sensory imaging system 2200 is configured to allow samples to be loaded from a first end, pass through the scanner, and emerge from a second end. Also, the system 2200 is characterized by real-time energy and intensity calibration of the multi-energy X-ray sensor arrays, integration of the two hyperspectral cameras at close to full GigE bandwidth on both cameras, synchronized store to disk and recall for MEXA, visible and SWIR camera data in DICOM (Digital Imaging and Communications in Medicine) format with associated TDRs (Threat Detection Reports), and a consolidated graphical user interface (GUI) for detailed review of all image types simultaneously.

In some embodiments, the system 2200 comprises a plurality of characteristics described as follows. In some embodiments, the general characteristics include that a) the sensing system is designed to operate in a hygienic abattoir environment; b) the sensing system is wash-down proof; c) the sensing system is designed to meet food safety standards; d) the sensing system is designed to meet ARPANSA (Australian Radiation Protection and Nuclear Safety Agency) radiation safety requirements; e) the sensing system has a 630 mm (W)×430 mm (H) tunnel size; and/or f) the sensing system has a conveyor speed of 200 mm/s.

In some embodiments, the system 2200 has the following imaging characteristics or specifications: a) the system is configured to enable dual-view X-ray imaging. One view is directed upwards through the center of the inspection area. Another view is directed horizontally through the inspection area; b) the X-ray imaging views use 120 to 160 keV X-ray beam quality with 0.2 to 1.25 mA beam current (For example, use 120 keV. 0.2 mA for low dose, low radiation exposure settings, such as, for light curtains, or curtainless shrouds); c) the X-ray imaging views use multi-energy X-ray (MEXA) sensors with 0.8 mm pitch sensor elements, wherein each sensor element counts photons into one of six energy bins with linear X-ray count rate capability up to 106 X-rays/mm$^2$/s; d) a visible wavelength hyperspectral imaging sensor operates in the range of 400 nm to 900 nm with spectral resolution of at least 20 nm over the full spectral region with pixel size not to exceed 2.0 mm across the conveyor width; e) a short wave infra-red (SWIR) hyperspectral imaging sensor operates in the range of 900 nm to 1800 nm with spectral resolution of at least 20 nm over the full spectral range with pixel size not to exceed 2.0 mm across the conveyor width; f) in various embodiments, the X-ray, visible and SWIR camera systems are synchronized to an X-ray base frequency ranging from 150 Hz to 500 Hz, and in particular, the X-ray, visible and SWIR camera systems are synchronized to an X-ray base frequency ranging of 300 Hz; g) X-ray scan data from the X-ray scanning system 2210 and the hyperspectral imaging data from the hyperspectral imaging system 2215 is transferred to the computing device for subsequent real-time visualization (via one or more images displayed in one or more graphical user interfaces) and analysis using a plurality of programmatic code, instructions or algorithms.

In some embodiments, the system 2200 has the following software characteristics or configurations, which are implemented by the plurality of programmatic code, instructions or algorithms. In embodiments, the computing device, associated with the multi-sensor imaging system 2200, generates at least one graphical user interface (GUI) that provides the system operator with pass/fail risk indication for all offal items. In embodiments, the at least one graphical user interface includes a scrolling image to show offal currently in the X-ray tunnel together with overlaid inspection results from automated health screening algorithms. When available, offal data is correlated with carcass ID using RFID, QR code, Bar Code or other similar ID technology by linking scanner and central abattoir databases. The computing device, associated with the system 2200, provides image review tools for retrospective analysis of offal samples including both X-ray manipulation and hyperspectral data manipulation tools. The software meets relevant cyber security standards such as ISO 27001.

In some embodiments, the system 2200 has the following algorithmic characteristics or configurations. The system 2200 is configured to apply a plurality of programmatic code or instructions to combine X-ray and hyperspectral image data to identify each type of offal as it passes through the scanning system. The target performance is at least 90% correct classification. The system 2200 is configured to apply a plurality of programmatic code or instructions to provide a risk assessment for each offal item as it passes through the scanning system, wherein the risk assessment is indicative of a probability of each offal item being healthy or unhealthy. In some embodiments, data indicative of the risk assessment is associated with a first range of values for healthy offal and is associated with a second range of values for unhealthy offal. The system 2200 is configured to apply a plurality of programmatic code or instructions to combine image-derived information with other abattoir provided information, such as animal type, age, sex and farming data when available in order to maximize risk prediction accuracy. The system 2200 is configured to apply a plurality of programmatic code or instructions to generate a total risk score as an aggregate of all underlying algorithm risk score results. The total risk score is used to generate a pass/fail result that shall also be used to apply color to the X-ray and/or hyperspectral image being displayed in at least one graphical user interface for the specific piece of offal to which the result relates.

In some embodiments, the system 2200 is configured to enable the following integrations. The system 2200 is configured to interface with abattoir database systems to recall information about a specific carcass and to store pass/fail information for each offal item for each carcass. The system 2200 is configured to integrate mechanically with abattoir conveying systems to pass offal items through the X-ray scanning and hyperspectral imaging systems 2210, 2215 in a controlled manner. The system 2200 is configured to interface with subsequent robotic systems for automatic offal selection and rejection.

Sample Illumination

Figure 23A:
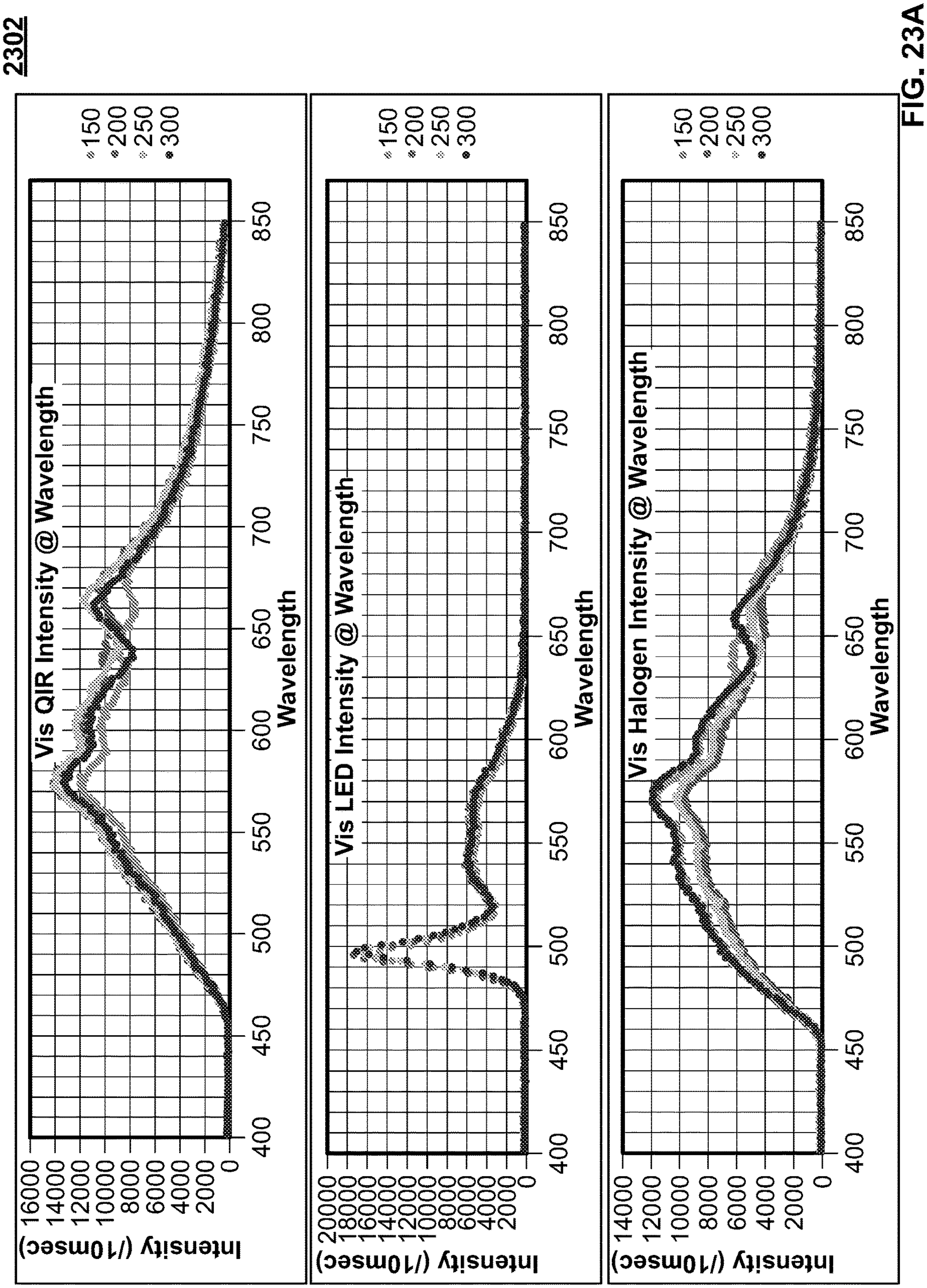
FIG. 23A shows a plurality of plots indicative of selection of illumination source for visible camera wavelengths as a function of scan rate (Hz), in accordance with some embodiments of the present specification.
Figure 23B:
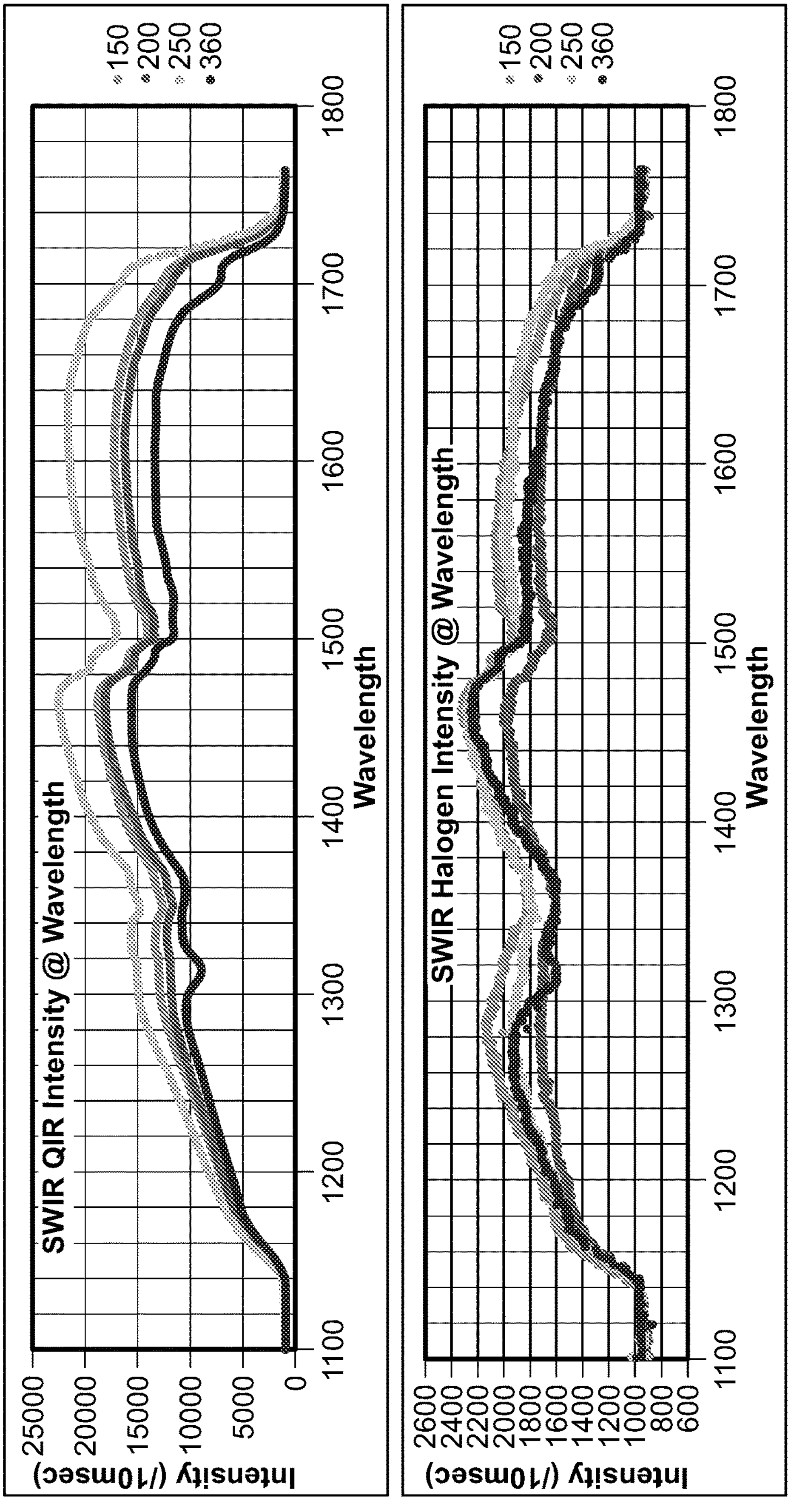
FIG. 23B shows a plurality of plots indicative of selection of illumination source for short wave infra-red (SWIR) wavelengths as a function of scan rate (Hz), in accordance with some embodiments of the present specification.

Referring back to FIG. 22, to achieve good quality image data from the hyperspectral imaging system 2215, it is preferred to provide sufficient illumination at all wavelengths in the (otherwise dark) imaging region. A variety of imaging light sources were evaluated including white LED's (Light Emitting Diode), halogen lamps and a QIR (Quartz Infra-Red) heating lamp as commonly found in food counters to keep food warm. To evaluate emission wavelength from each light source, a white reflective card was placed in the X-ray scanning tunnel 2206 to reflect light from the illumination sources back to the line-scan geometry hyperspectral imaging cameras. A first plurality of plots 2302 and a second plurality of plots 2304 indicative of results of these measurements are shown in FIG. 23A for the visible wavelength camera and in FIG. 23B for the SWIR camera.

In the SWIR region, the QIR source was almost an order of magnitude brighter than the halogen lamp while there was no illumination in this region from the LED. Therefore, the QIR light source was adopted for the broadband illumination task. Given that the QIR light source is very efficient at producing heat, the X-ray scanner control system is modified such that the QIR light source is configured to only switch on when the X-ray beam is on. This restricts heating in the scanning tunnel 2206 to only those seconds when a scan is actually being conducted.

Simultaneous Capture

Figure 24:
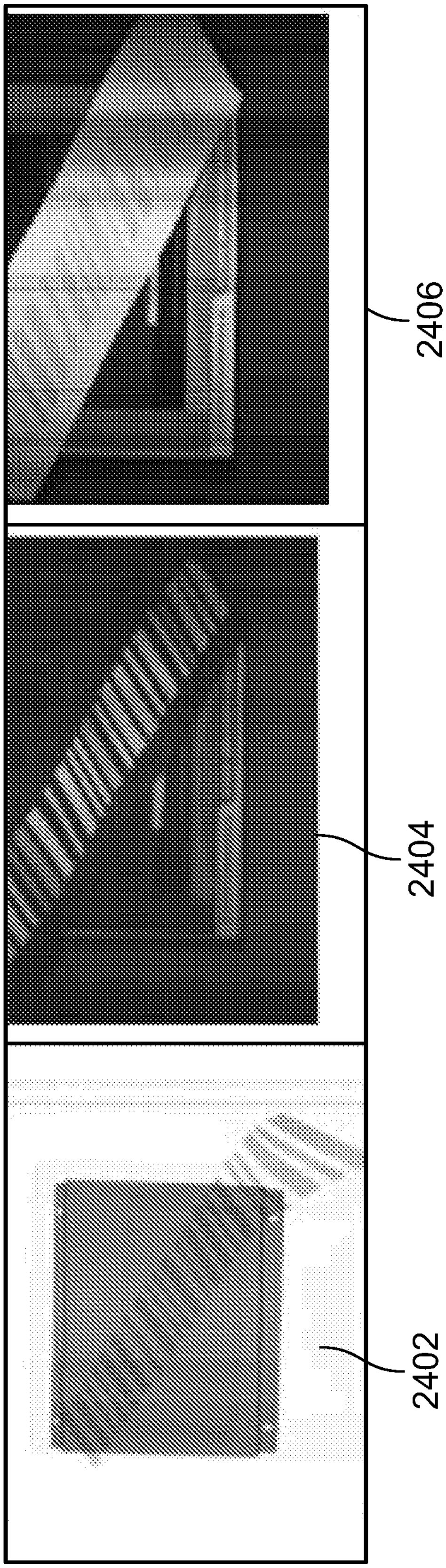
FIG. 24 shows an exemplary bar code scanned simultaneously using X-ray, visible and SWIR sensors, in accordance with some embodiments of the present specification.

A series of tests were then conducted using both X-ray absorbing and optically reflective bar code patterns to verify that the correct X-ray data is associated with the correct visible light data and that these are both associated with the correct SWIR data. FIG. 24 shows an example bar code scanned simultaneously using X-ray, visible and SWIR sensors. Alignment between the various sensors can be observed from image alignment of X-ray data 2402, visible data 2404 and SWIR data 2406.

X-Ray Scanning and Calibration

Figure 25A:
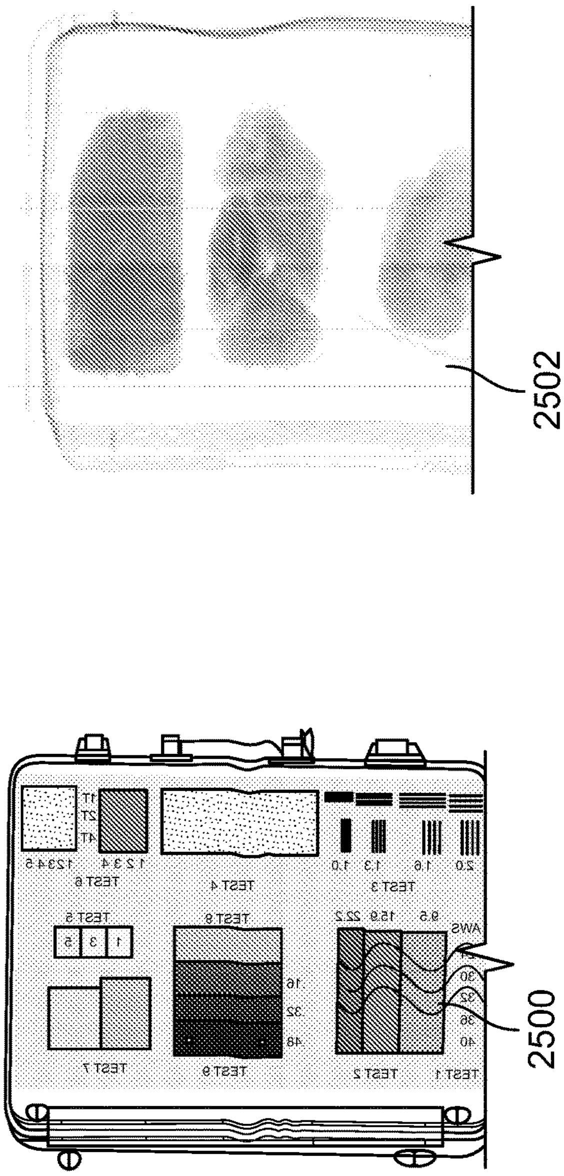
FIG. 25A shows MEXA X-ray image data for central vertical up-shooter view, in accordance with some embodiments of the present specification.
Figure 25B:
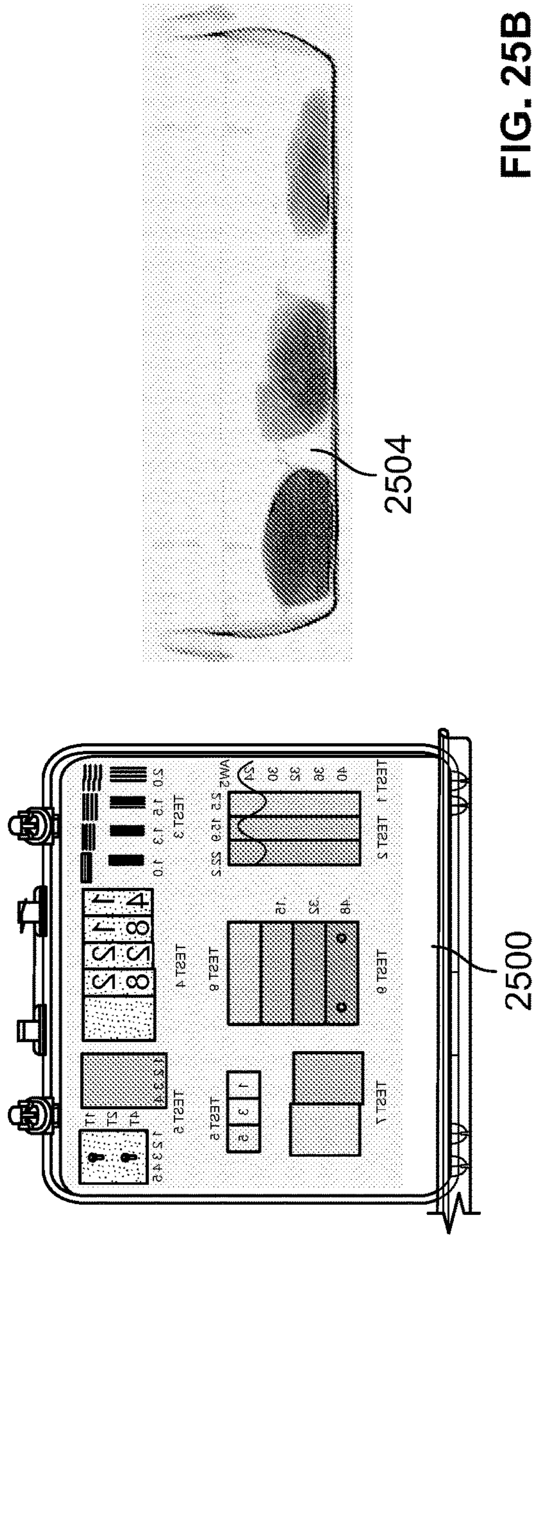
FIG. 25B shows MEXA X-ray image data for side-shooter view, in accordance with some embodiments of the present specification.

FIGS. 25A and 25B show MEXA X-ray image data 2502, 2504 for both the central vertical up-shooter view (FIG. 25A) and for the side-shooter view (FIG. 25B), respectively. To the left of both figures is a standard X-ray test piece 2500 used in the aviation industry for image quality performance validation. To the right of both figures are X-ray images 2502, 2504 of beef offal packed and purchased from a local wholesale butcher. Calibration systems and methods may be employed to eliminate vertical streak artifacts and provide the requisite qualitative data for calculating effective atomic number along each line integral from source to detector.

Preliminary Offal Characterization

Figure 26:
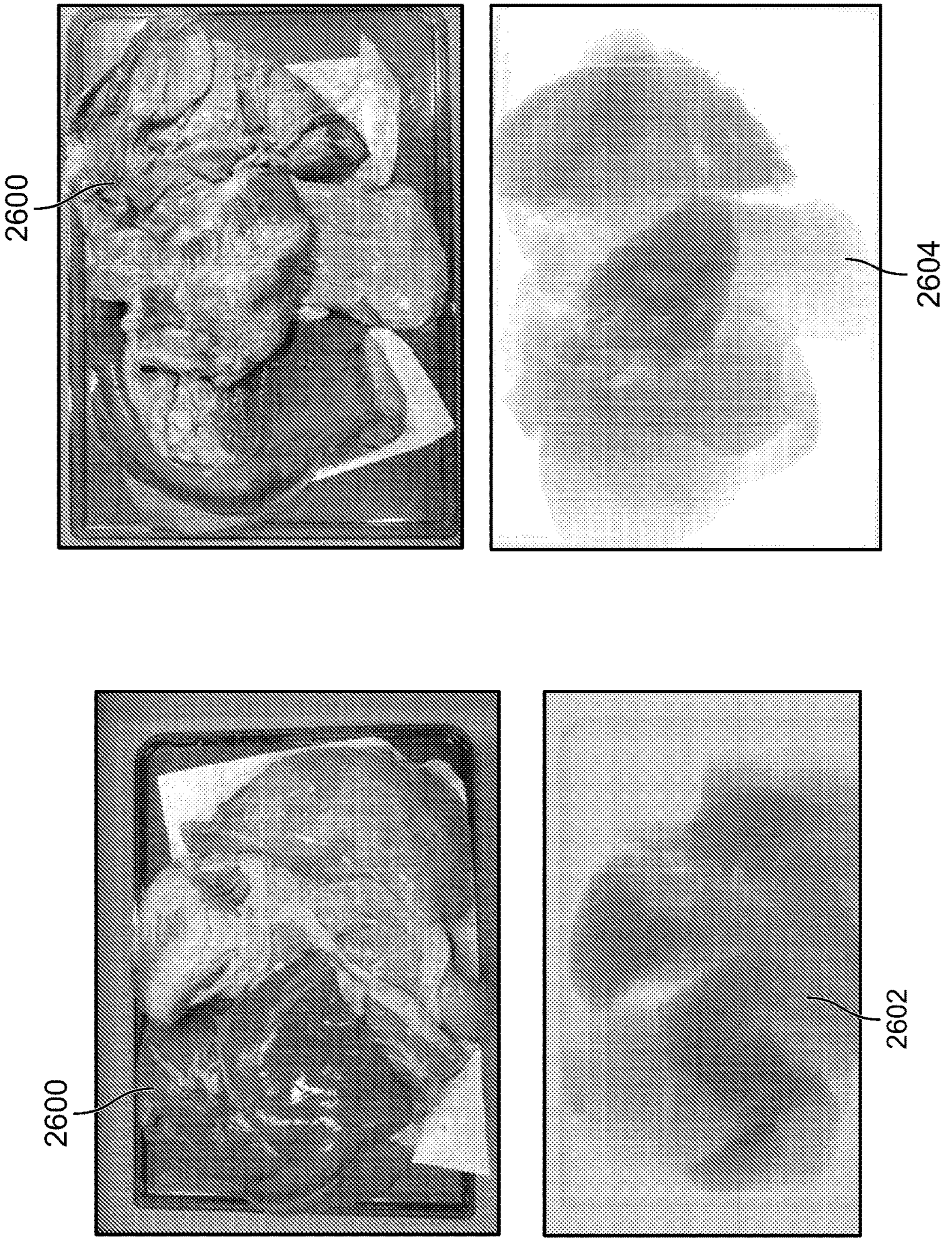
FIG. 26 shows an RGB image and corresponding MEXA images for fresh and ripe lamb pluck, in accordance with some embodiments of the present specification.

In accordance with some embodiments, lamb pluck (heart, liver and lungs) was acquired from a local butcher and X-ray image data was acquired as shown in FIG. 26. The sample 2600 was first imaged while still fresh to generate a first image 2602 and then it was imaged again after some days of decay to generate a second image 2604.

In images 2602, 2604, the heart is identifiable in the X-ray data as distinct from the liver and lungs and thus, an automated algorithm was configured for identification of the heart in the images 2602, 2604. In embodiments, a combination of vertical and horizontal view X-ray data is analyzed by a plurality of programmatic code or instruction in order to distinguish lung from liver and to determine the thickness of the tissues to calculate density and effective atomic number at each location in the image with a reasonable level of accuracy. The loss of image contrast over time is due to, in part, blood leaching from the organs.

Optimizing Capture Performance

As part of the imaging optimization, the optimal operating conditions selected for the multi-sensor system 2200 were determined to be as follows (in various embodiments as shown in Table 1).

TABLE 1

| Modality | Frequency/Frames per second | Image/Field of view | Exposure |
|---|---|---|---|
| ME X-ray | 300 Hz | 1232 pixels, full tunnel | 3.3 msec |
| Visible | 150 FPS | 300 × 430, ¾ tunnel | 6.4 msec |
| SWIR | 150 FPS | 512 × 256, ½ tunnel | 3.5 msec |

Figure 27:
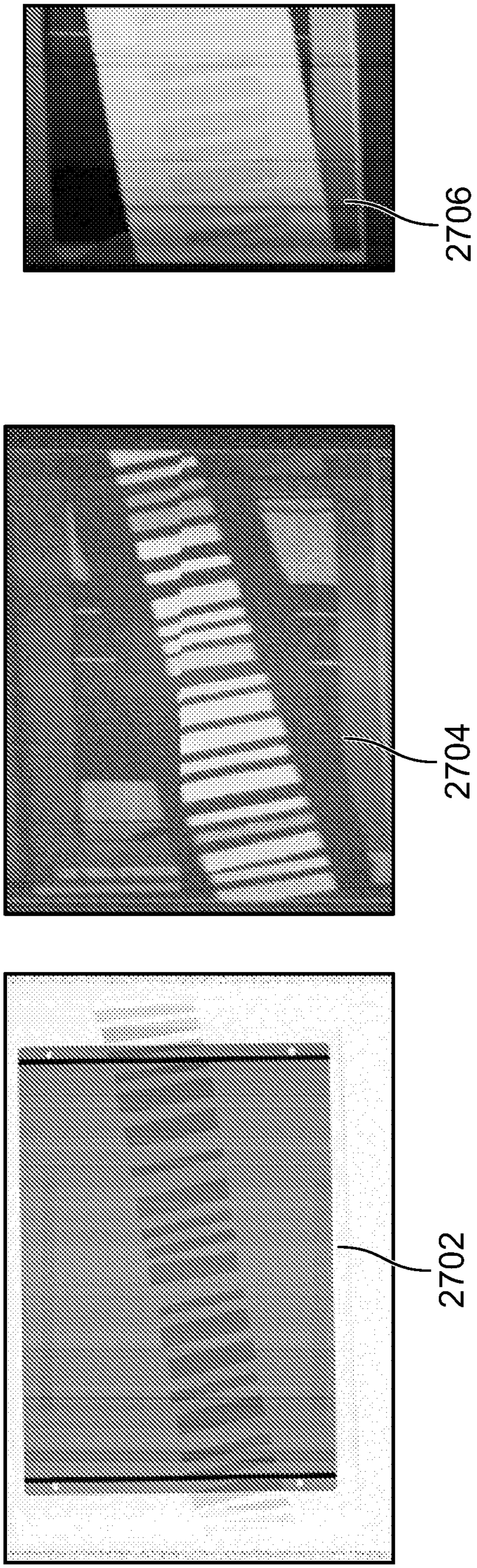
FIG. 27 shows synchronized first, second and third image data respectively for the MEXA, visible and SWIR sensors, in accordance with some embodiments of the present specification.

With these optimized settings, the synchronized first, second and third image data 2702, 2704, 2706 respectively for the MEXA, visible and SWIR sensors is shown in FIG. 27. The MEXA data 2702 covers the entire field of view. The visible hyperspectral data 2704 covers 75% of the field of view while the SWIR hyperspectral data 2706 covers 50% of the field of view. The restricted field of view for the two hyperspectral cameras is due to bandwidth constraints in the Gigabit Ethernet camera interface to the host computing device. In embodiments, spectral resolution may be reduced to reduce camera output data rate and allow for full field of view imaging.

Hyperspectral Imaging Performance

Image Alignment

In order to verify data acquisition synchronization between the two hyperspectral cameras, a simulation pattern was developed for playback from each camera. In this case, one camera outputted magenta data and the other green data. When perfectly aligned, the result will sum to white and or will otherwise result in magenta or green leading or trailing pixels.

Figure 28:
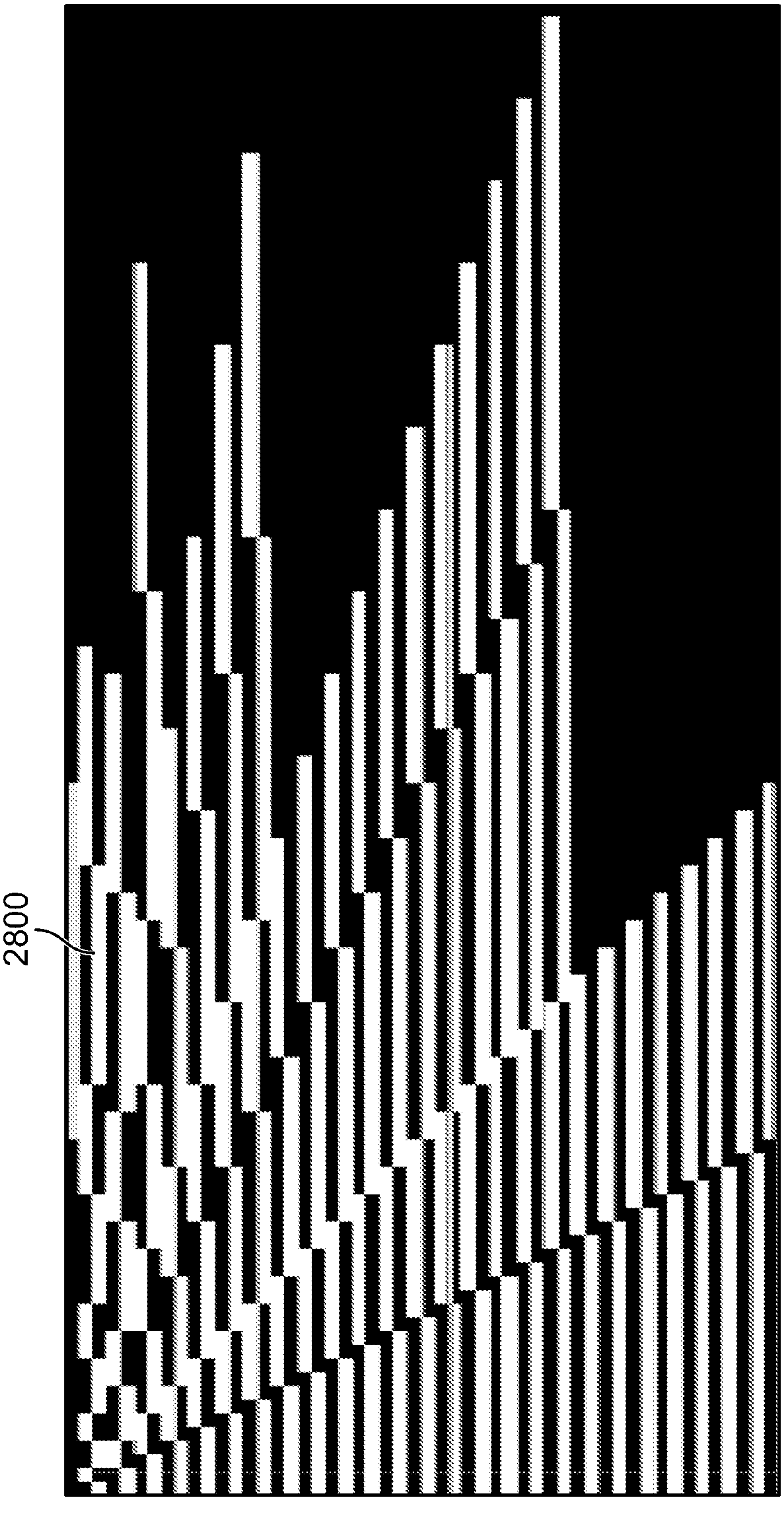
FIG. 28 shows a test pattern for checking synchronization of hyperspectral cameras, in accordance with some embodiments of the present specification.

The result of this pattern 2800 for a badly synchronized hyperspectral imaging system is shown in FIG. 28. Here, several green and magenta regions are seen. In a perfectly synchronized system all test bars appear in white color.

Image Viewing

Figure 29:
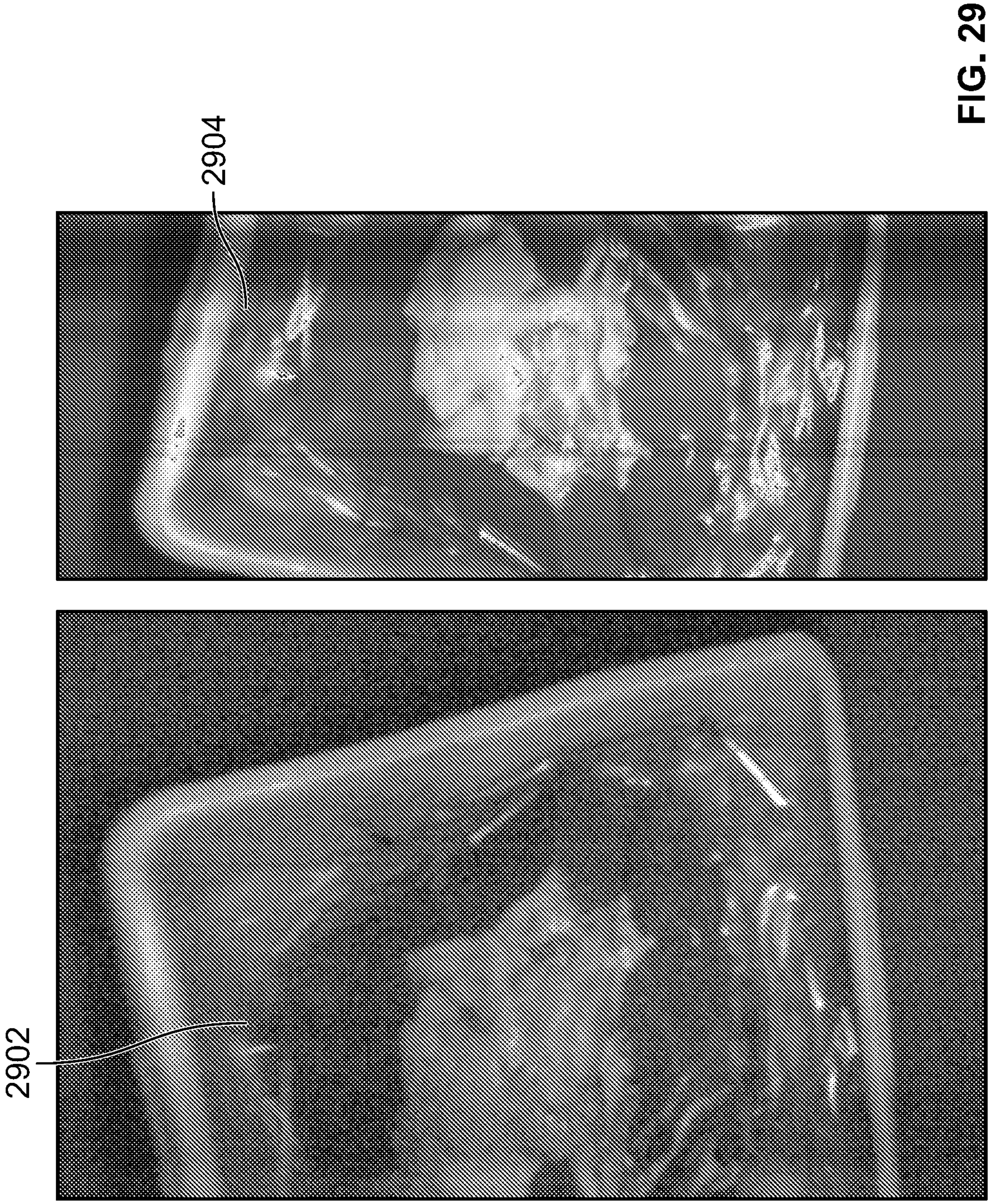
FIG. 29 shows a first image from a visible hyperspectral camera and a second image from a SWIR hyperspectral camera in accordance with some embodiments of the present specification.

Hyperspectral image data for liver from a lamb is shown in FIG. 29. Data 2902 from the visible hyperspectral imaging camera is presented as colored with a pseudo color scale (from blue to red). Data 2904 from the SWIR hyperspectral camera is also shown. There is strong contrast between the fat region at the center of the image and the lung tissue region at the periphery of the image.

Beef Organ Scanning

All organs were collected from collaborating abattoirs or butchers (~30 km from the scanning and pathology laboratories), transported chilled on ice (2° C.) from the site of collection to the laboratory and scanned with the multisensory platform 2200 within 1.86±0.16 days from slaughter. Subsequently, all organs were examined to confirm abnormalities during post-mortem inspection by experienced veterinary pathologists (grossly and histologically) within 0.81±0.12 days from scanning. In total, 126 organs were collected as follows:

- 95 livers, 43 healthy and 52 unhealthy
- 17 kidneys, 13 healthy and 4 unhealthy at abattoir but then deemed healthy at post-mortem inspection
- 14 lungs, 12 healthy and 2 unhealthy but only 1 was confirmed unhealthy during post-mortem inspection Livers were the most commonly affected organs and therefore, provided the strongest dataset for algorithm development.

A total of 52 beef cattle livers considered as not fit or rejected for human consumption by the meat inspectors were collected from a collaborating abattoir. Organs were processed and were stored at 2° C. until scanning.

A total of 43 beef cattle livers considered as fit for human consumption were collected from a commercial sale point and stored at 2° C. until scanning.

Organs were scanned using the multi-sensory platform 2200 (encompassing multi-energy X-ray attenuation at six energy levels, and visible and short-wave infrared hyperspectral imaging) and were then examined grossly and, subsequently, histologically by veterinary pathologists to confirm abnormalities.

Organ Scanning

In order to scan the organs, individually, livers were placed into containment bags, which were opened, and then scanned using the multi-sensory scanning system 2200 of the present specification. Each liver specimen was positioned with the diaphragmatic surface upward and the caudate lobe at the lower left-hand side, and then scanned following a standard protocol. A total of six radiographs for each of the six X-ray energy bands were produced simultaneously. The handling of the specimens were performed following a standard PC2 workflow. Normal RGB (Red Green Blue) images were also obtained in the position scanned and the area of interest recorded for later image markup.

Figure 30A:
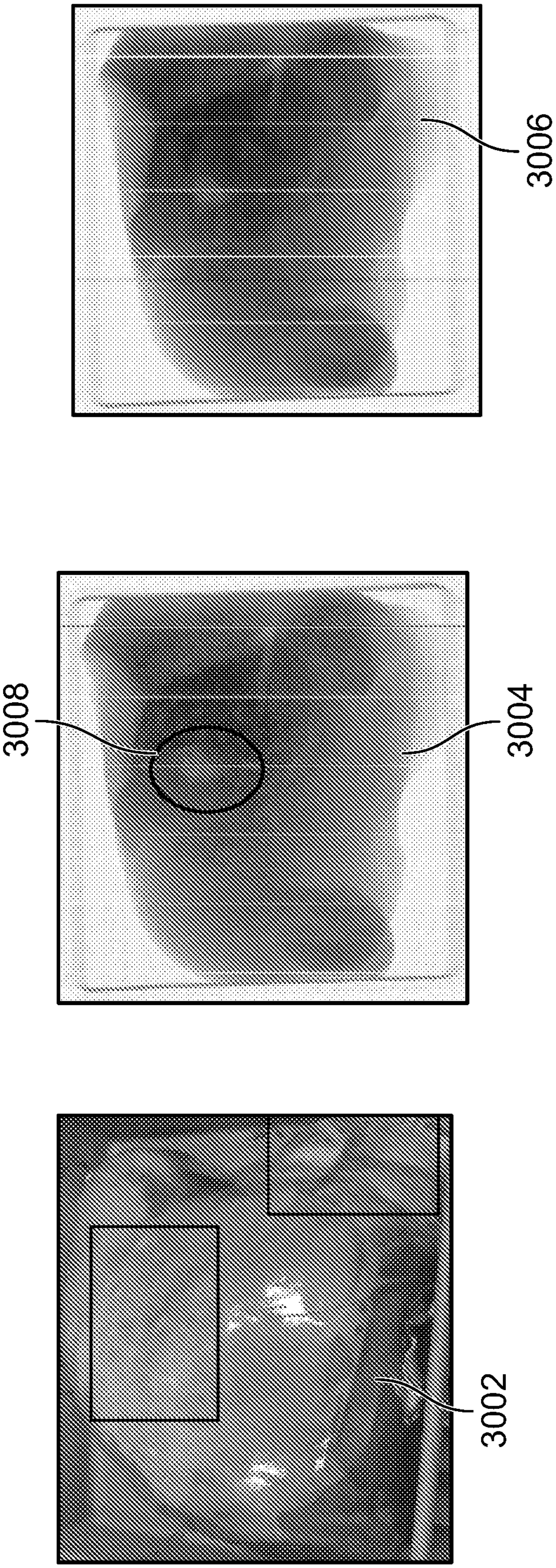
FIG. 30A shows an RGB image of a beef liver and corresponding high and low-energy X-ray scan images, in accordance with some embodiments of the present specification.

Representative image outcomes and spectral signal are displayed in FIGS. 30A through 30D. FIG. 30A shows a first RGB image 3002 of a beef liver showing the macroscopic aspect of the organ before scanning, a second X-ray image 3004 for low energy and a third X-ray image 3006 for high energy irradiation of the beef liver. Red circle 3008 encloses the liver fluke found upon histopathological analysis. Veterinary inspection demonstrated the organ had multiple nodules and fluke.

Figure 30B:
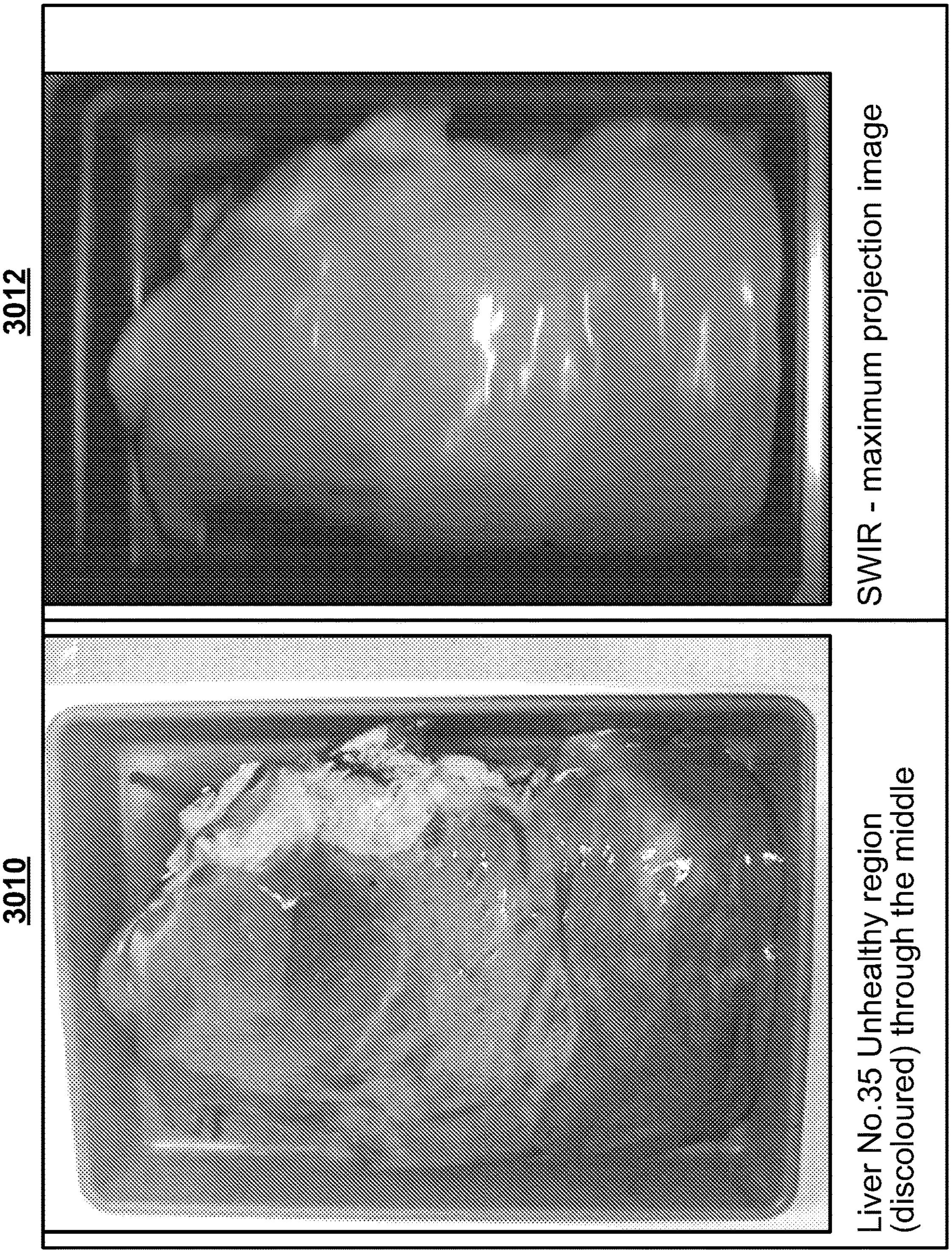
FIG. 30B shows an RGB image and corresponding SWIR hyperspectral image, in accordance with some embodiments of the present specification.
Figure 30C:
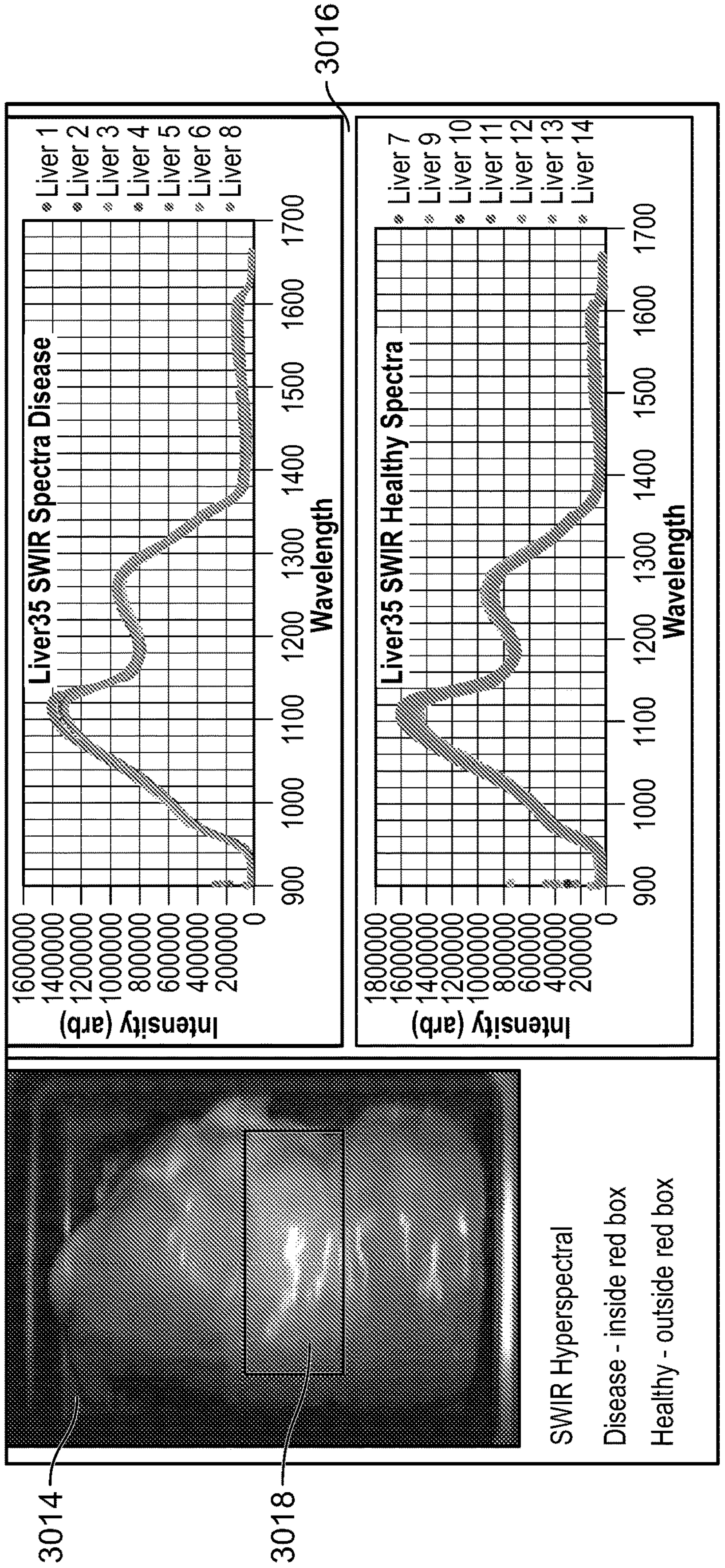
FIG. 30C shows a SWIR hyperspectral image and corresponding spectral signals, in accordance with some embodiments of the present specification.
Figure 30D:
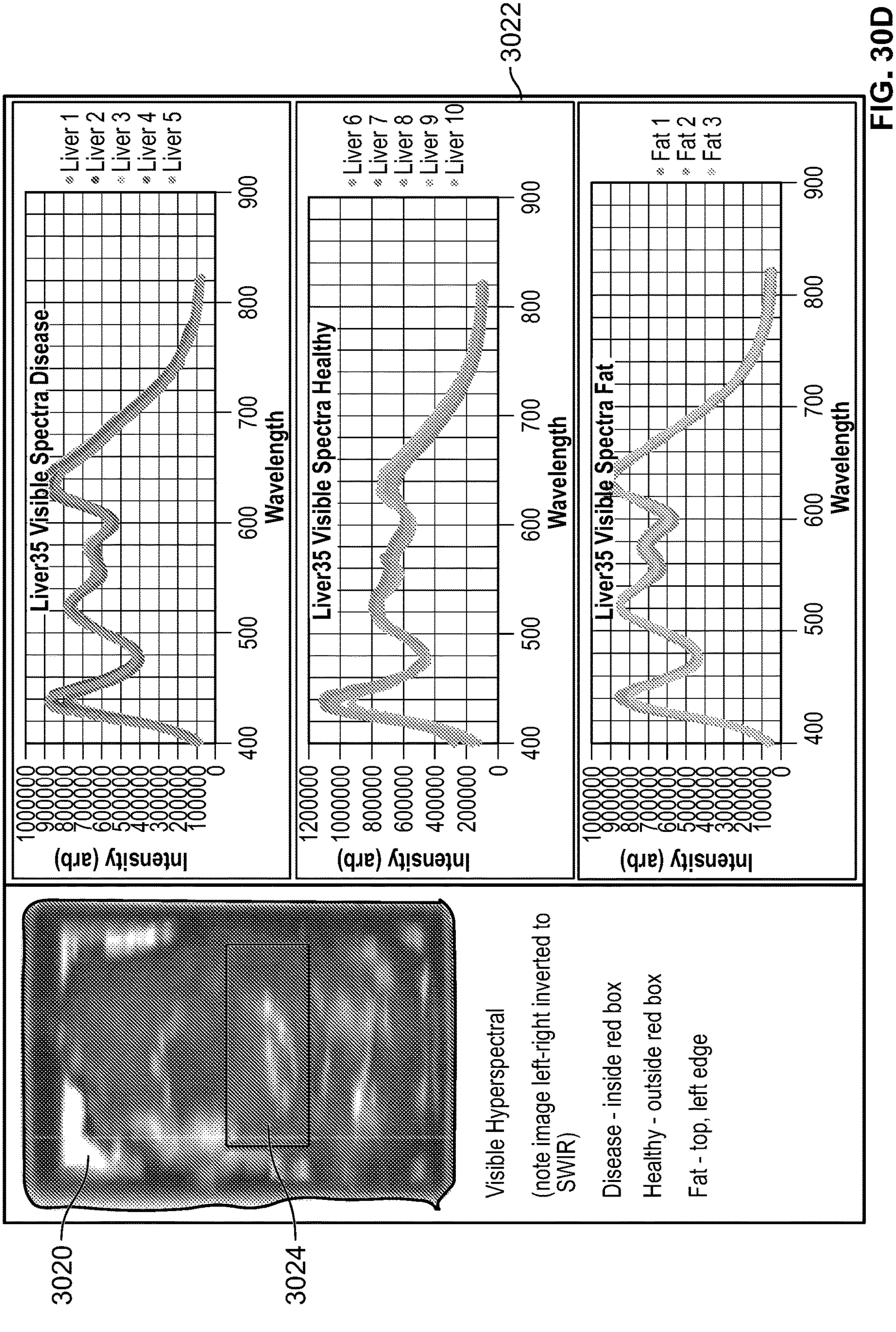
FIG. 30D shows a visible hyperspectral image and corresponding spectral signals, in accordance with some embodiments of the present specification.

FIG. 30B shows a fourth RGB image 3010 and a corresponding fifth SWIR hyperspectral image 3012. FIG. 30C shows a sixth SWIR hyperspectral image 3014 and corresponding spectral signals 3016. The box annotation 3018 marks a disease area. FIG. 30D shows a seventh visible hyperspectral image 3020 and corresponding spectral signals 3022. The box annotation 3024 marks a disease area.

Post-Mortem Inspection

All organs were systematically examined for gross lesions by qualified veterinarians specializing in pathology. Should a lesion be present the following data were recorded: location, distribution, demarcation, color, shape, appearance of the cut surface, and consistency. The most likely cause of the lesion was also recorded. Organs were also examined for off-colors and inconsistency in texture by palpation, with sectioning and sampling for histopathology in some instances, to confirm the identity of the lesions. During this process, photos were taken of abnormal findings. After completion of each post-mortem examination, findings were recorded.

Image Processing

Figure 31:
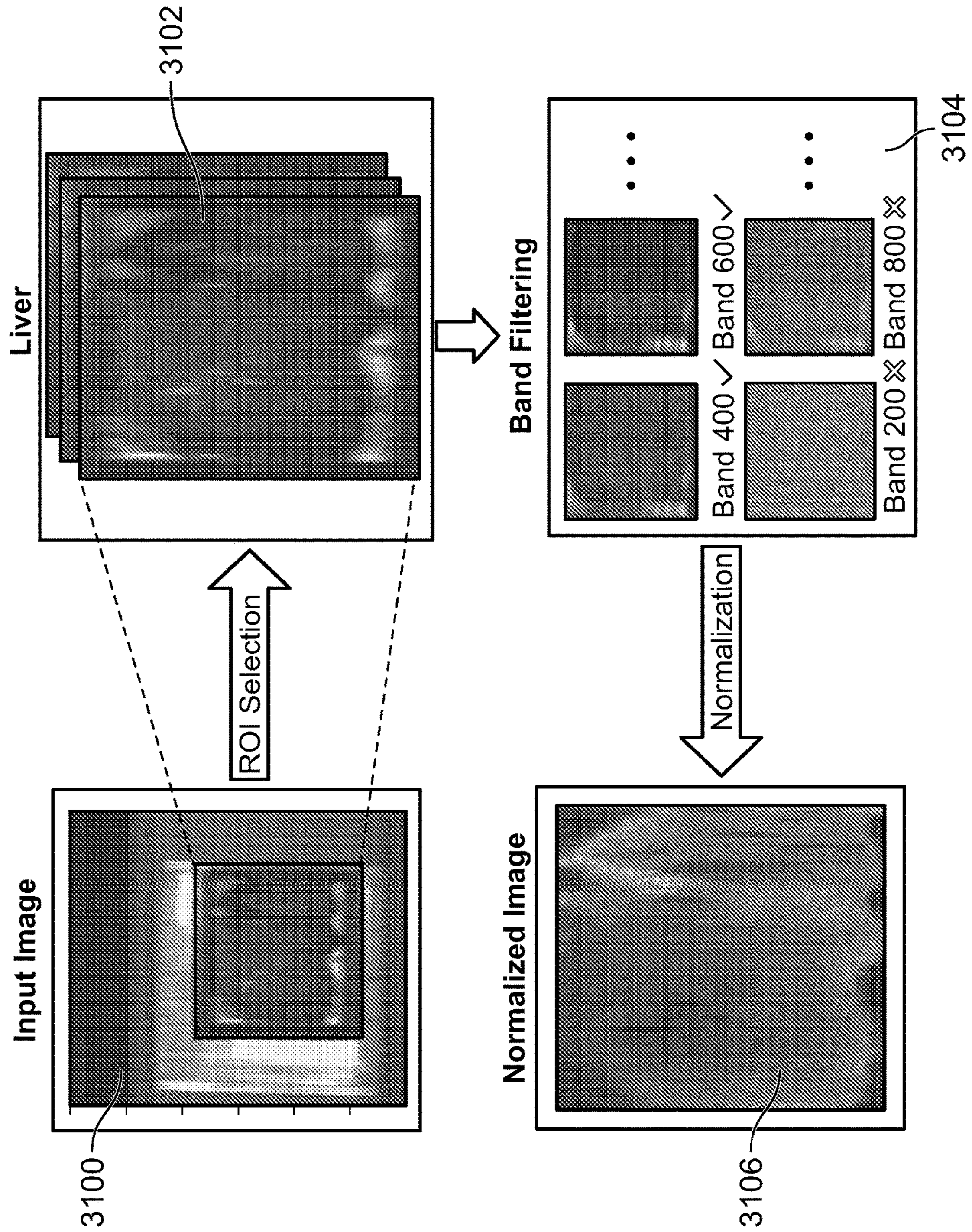
FIG. 31 illustrates steps for pre-processing a visible hyperspectral image, in accordance with some embodiments of the present specification.

Machine and deep learning models are often sensitive to the dataset distribution, and data variations or redundancy may lead to performance decline of a deep learning model. To alleviate the negative impacts of distractive or redundant information from visible HS (hyperspectral) images such as image 3100, pre-processing operations, as illustrated in FIG. 31, were performed, including manual removal of irrelevant regions and selection of regions of interest (ROI) at step 3102, band filtering at step 3104, and value normalization at step 3106.

At step 3102, firstly, the regions outside of the tray area are excluded to avoid 'misleading' the deep learning model's attention to these irrelevant regions and hence resulting in erroneous prediction and classification. The ROI is manually selected because the data is complex and insufficient. Moreover, the non-beef tissue component (conveyor belt) is a much higher component of the original image than the beef component (organ and iron plate). Therefore, the ROI is manually selected to speed up training (time constraints) and get good results on small data. In subsequent commercial scenarios, there is no need to develop a particular automated pre-process program, but only to fix the position of the iron plate containing the beef at the time of scanning to complete the ROI segmentation.

At step 3104, secondly, distinctive spectra with high signal to noise ratio (SNR) are selected. In the case of images, SNR is the ratio of the pixel mean to the variance of the image. Because the information generally presents a specific mode or diagram, it has a minor variance, i.e., a higher signal-to-noise ratio. Since different image bands do not carry equally important information and some bands are highly noisy and of low SNR, which impose significant challenges to distinguish the overall outline of the organ. These randomly distributed noisy data can be very disruptive to the model's performance for classification and prediction.

The final step 3106 is normalizing the image values to normalize the intensities of each image band within a fixed range and to maintain the intensity ratio among channels. The image pixel values are normalized to [0,1] L2-norm, where the most significant pixel values are mapped to 1.

Subsequently, the entire data set is divided into a training set and a test set in a ratio of 2:1 to develop and evaluate the prediction or detection models, respectively.

Statistical Analysis and Algorithm Development

Deep Learning Network Classification

Figure 32:
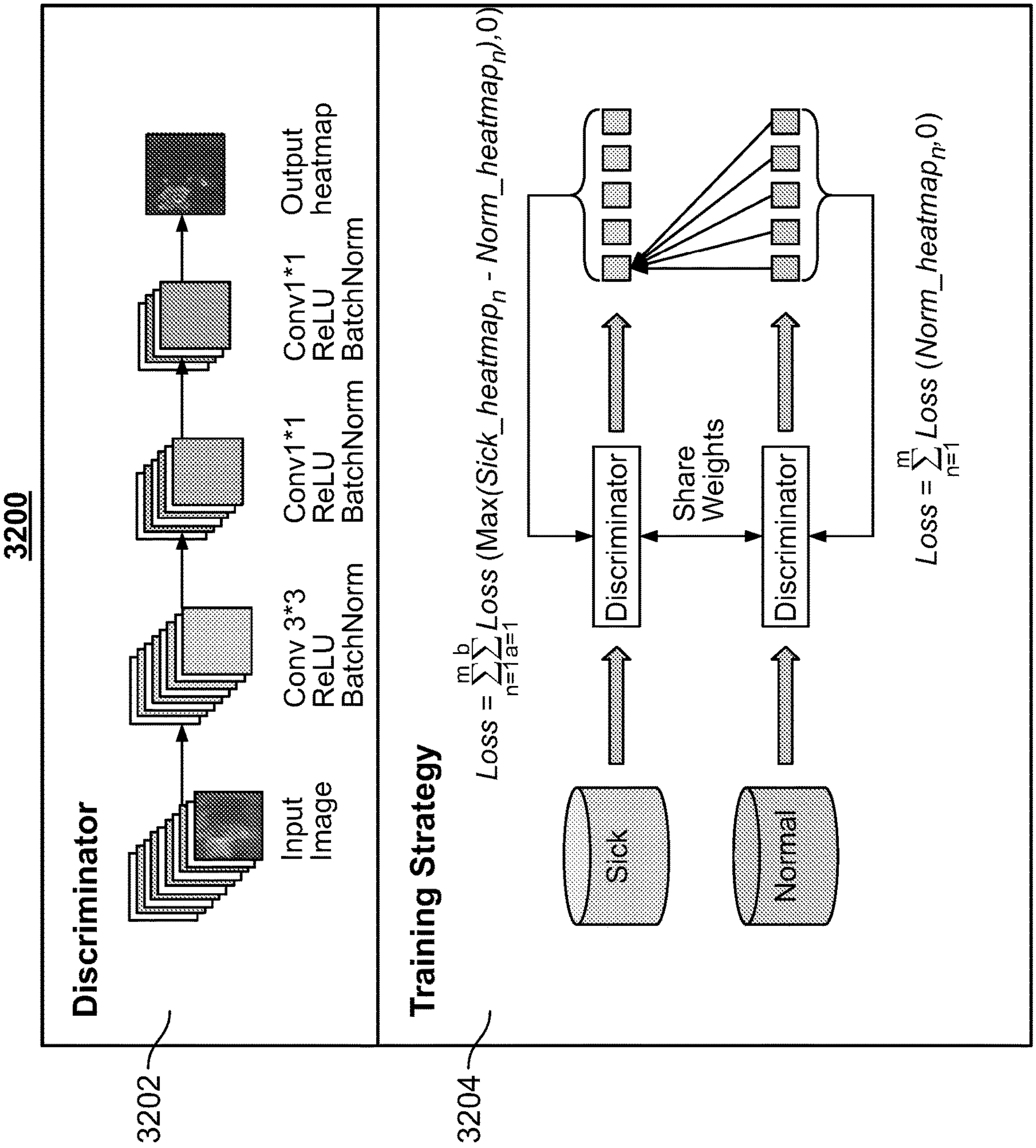
FIG. 32 is a block diagram of a deep learning network for disease screening and anomaly heatmap generation, in accordance with some embodiments of the present specification.

Automated inspection, using deep learning classifications, is a viable solution to the challenges of improving economic efficiency and reducing the risk of human infection. Also, in general, deep learning exhibits better performance for screening tasks. In order to develop deep learning-based classifications, the analysis is based on an assumption that an abnormal image is caused by abnormal elements, i.e., anomaly, which would not appear in a normal image. Since deep learning networks are trained by the use of a loss function in order to produce the result as expected, the loss function is determined according to the assumption that abnormal images, of unhealthy meat, contain tissues not found in normal images of healthy meat. As illustrated in FIG. 32, the deep learning network 3200 mainly consists of a discriminator 3202 and a training strategy 3204. The discriminator 3202 is composed of convolutional layers and fully-connected layers. The convolutional layer captures the spatial information in the image, while the fully-connected layer transforms the captured information into a prediction result. Discriminators 3202 are trained to produce the result expected using the training strategy 3204.

In some embodiments, the deep learning network 3200 includes a down-sampling and up-sampling phase. The down-sampling stage compresses the spatial information to obtain a larger field of perception, which gives a complete picture of defects in the image. However, as the information is compressed, the network gradually loses the corresponding location information. Although the up-sampling stage might recover the compressed spatial information to find the exact location of the defects, the convolution itself is very sensitive to deformation.

The discriminator 3202 is trained according to an assumption that only anomalous pixels are present in anomalous images. The anomalous pixels are conceptually anomalous, i.e., they cause, for example, the liver in the image to be anomalous, and there is no need to define exactly what pixels are anomalous in advance (unsupervised). The network 3200 automatically defines and finds the anomaly during the training process. The discriminator 3202 is required to predict each pixel for a given image and display the results as a heat map. The higher the heat map value, the higher the probability that a feature in the image is anomalous (0 for the normal, 1 for anomaly). Thus, the network 3200 must predict each pixel for a given image and display the results as a heat map. The higher the heat map value, the higher the probability that a feature in the image is a defect (0 for the normal, 1 for a defect). Although the location of the defects in the image containing the defects may be unknown, the defects in the image should be the maximum in the image.

During training, the discriminator 3202 outputs for a normal organ image. After pre-processing, the image already contains only the liver and the iron plate. The heatmap of a normal organ can therefore be all zeros and the same color. In contrast, the output for an abnormal image is set to at least one pixel of one, i.e., the abnormal image should have an abnormal feature. Furthermore, the training strategy 3204 also calculates the difference between the heat map of the anomalous image and the other normal images to ensure that the features found in the anomalous image are not found anomalous relative to all normal images. In some embodiments, the training strategy 3204 is to compare all tissues of a meat type (of, for example, beef liver) with all corresponding meat types (beef livers) in the normal dataset. If the predicted tissues do not appear in the normal data, they are identified as defects.

In some embodiments, the training strategy 3204 is configured such that it automatically adjusts the learning rate to adapt to a calculated gradient by calculating a first-order moment estimation and a second-order moment estimation of the gradient. In some embodiments, for the defect screening task, where an image is provided as input to the network 3200 to determine whether it contains defects, accuracy, precision, sensitivity, and specificity are calculated to evaluate the performance.

K-Means Clustering for Automated Anomaly Localization

Figure 33A:
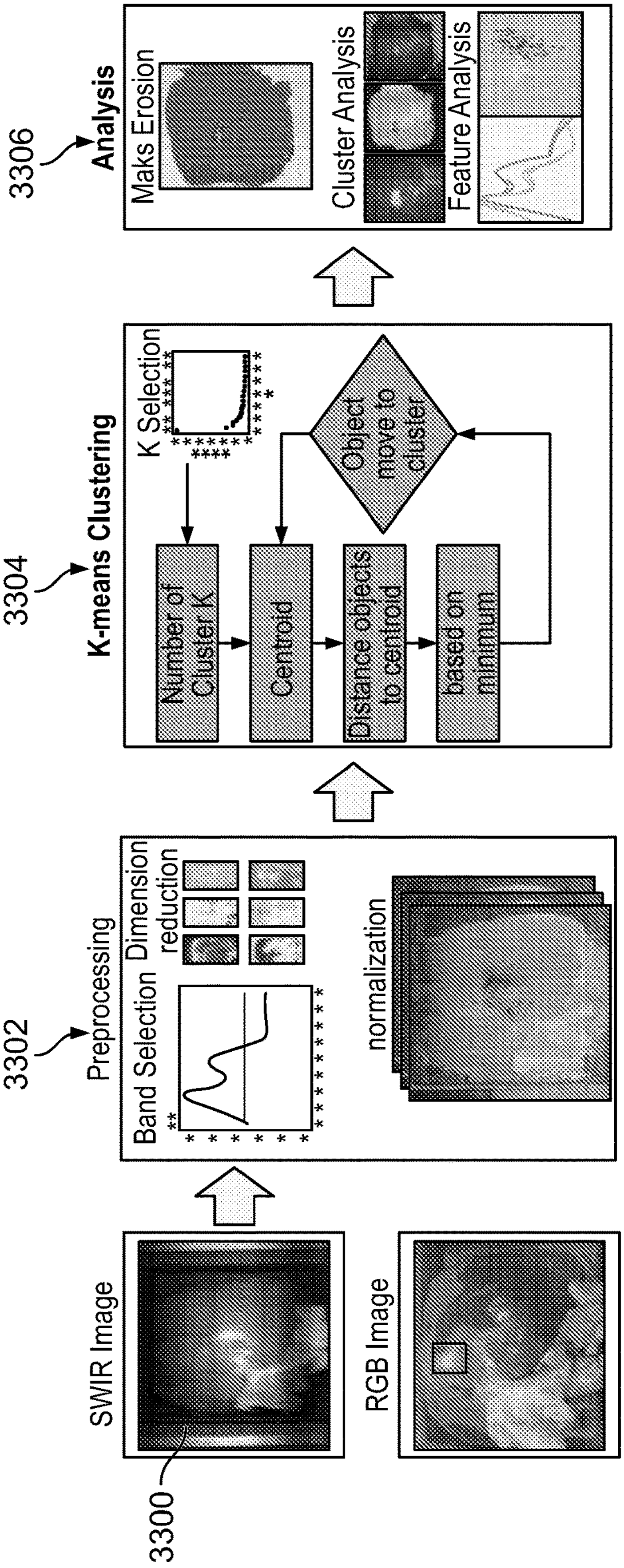
FIG. 33A is a workflow of automated anomaly detection from SWIR images using k-clustering algorithm for anomaly detection, in accordance with some embodiments of the present specification.

Referring now to FIG. 33A, automated anomaly detection from SWIR images 3300 is conducted on the basis of k-means clustering algorithm (unsupervised classification). As illustrated in FIG. 33A, the computing and analysis workflow for anomaly detection is composed of three major stages including stage 3302 of pre-processing for band selection and normalization to select region of interest (ROI) and to reduce the noise and intensity shift; stage 3304 of k-means clustering for normal and abnormal tissue in the liver; and stage 3306 of analysis on clustering results.

Stage 3302: Image Pre-Processing Stage

Figure 33B:
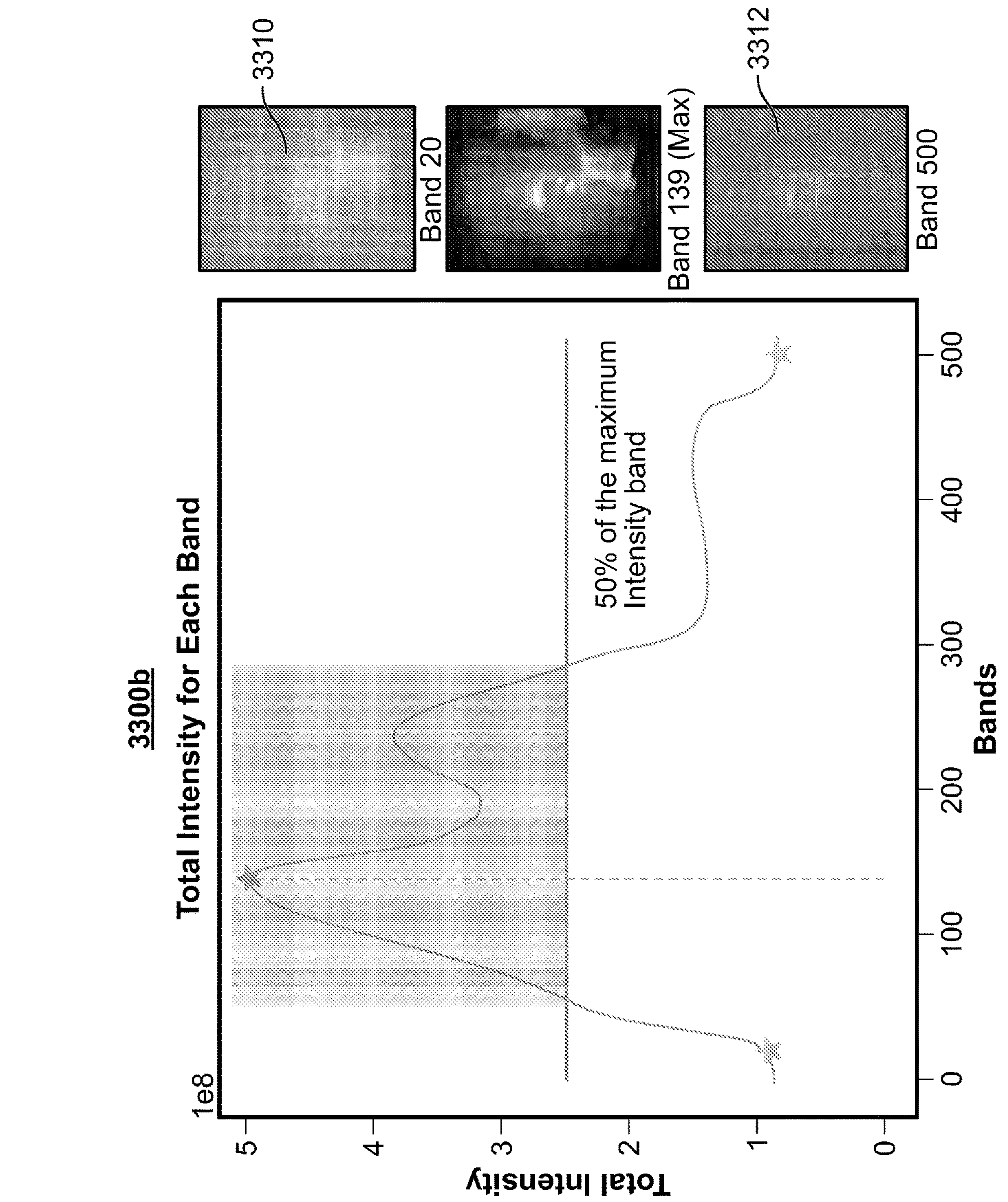
FIG. 33B shows a plot indicative of a sum of intensity for each SWIR band from beef organs, in accordance with some embodiments of the present specification.

Each SWIR image consists of sub-images of different bands, which can provide much more information than the corresponding RGB image. FIG. 33B shows a plot 3300*b* indicative of a sum of Intensity for each SWIR band from beef organs, in accordance with some embodiments of the present specification. As shown, the signal to noise ratio (SNR) of sub-images with lower total intensity such as band 20 3310 and band 500 3312 is very low, which lead to the poor quality of sub-images while the SNR of sub-images with higher total intensity is high. Therefore, to enhance the SNR of the whole SWIR image, sub-images with total intensity over 50% of the maximum total intensity sub-images are selected as shown in FIG. 33B.

The pixel values of the same pixel position in every sub-image will form a pixel vector. However, the range of each pixel vector varies dramatically, which make distances between different pair of pixel vectors also not comparable. Therefore, band wise normalization is conducted by the following formula:

$$P_{Normalized=\frac{p}{\|p\|}}$$

Figure 33C:
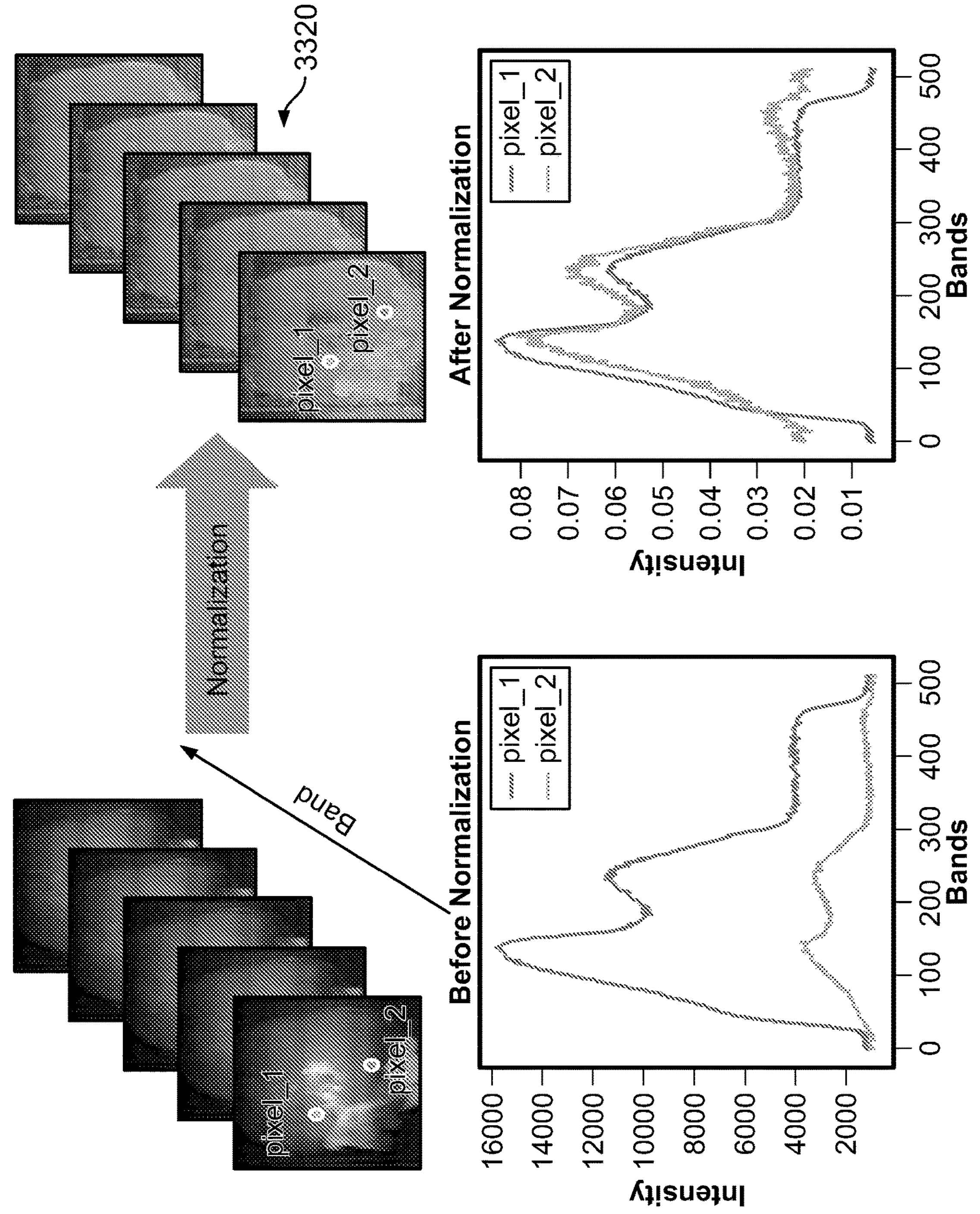
FIG. 33C shows a normalization process of SWIR hyperspectral data of beef livers, in accordance with some embodiments of the present specification.

The normalized pixel vectors 3320 have the same range and become comparable as shown in FIG. 33C.

Figure 33D:
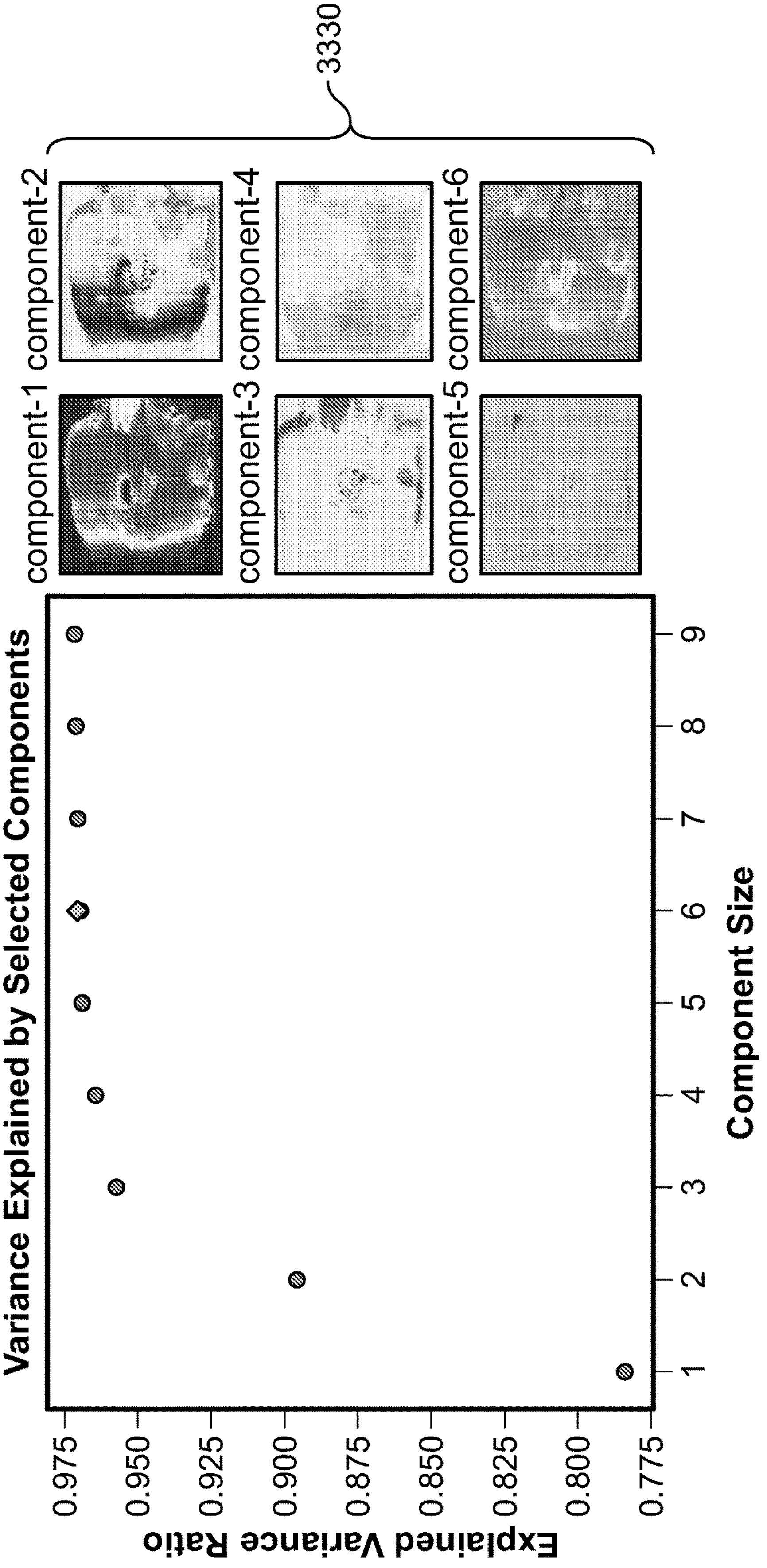
FIG. 33D shows PCA processing of SWIR hyperspectral images from beef cattle livers, in accordance with some embodiments of the present specification.

The use of distance as a metric to identify similarity using the k-means algorithm does not perform well with high dimension data because the distances between vectors tend to be closer as the dimensions increase (the curse of dimensionality). To reduce the dimensions, the principal component analysis (PCA) algorithm is applied. The component size of 6 is chosen to ensure the amount of variance explained by selected components was over 97%. The reduced SWIR sub-images 3330 are shown in FIG. 33D.

Stage 3304: K-Means Clustering for Anomaly Detection

The k-means clustering algorithm is used to partition pixel PCA vectors into K clusters in which each pixel vector belongs to the cluster with the nearest mean distance to the cluster centroid.

It contains two steps when finding the optimal clustering:

Step 1 assign the cluster label i at t iteration:

$$s^{(t)} = \{x_p : \|x_p - m_i^{(t)}\| \le \|x_p - m_j^{(t)}\| \ \forall\, j,\ 1 \le j \le k\}$$

where each pixel vector $x_p$ is assigned to label i and $$m_i^{(t)}$$

is the centroid of the label. ||•|| is the distance between vectors.

Step 2 update Centroids:

$$m_i^{(t+1)} = \frac{1}{|s_i^{(t)}|} \sum\nolimits_{x_j \in S_i^{(t)}} x_j$$

The algorithm will converge when the assignments are not changed.

Figure 33E:
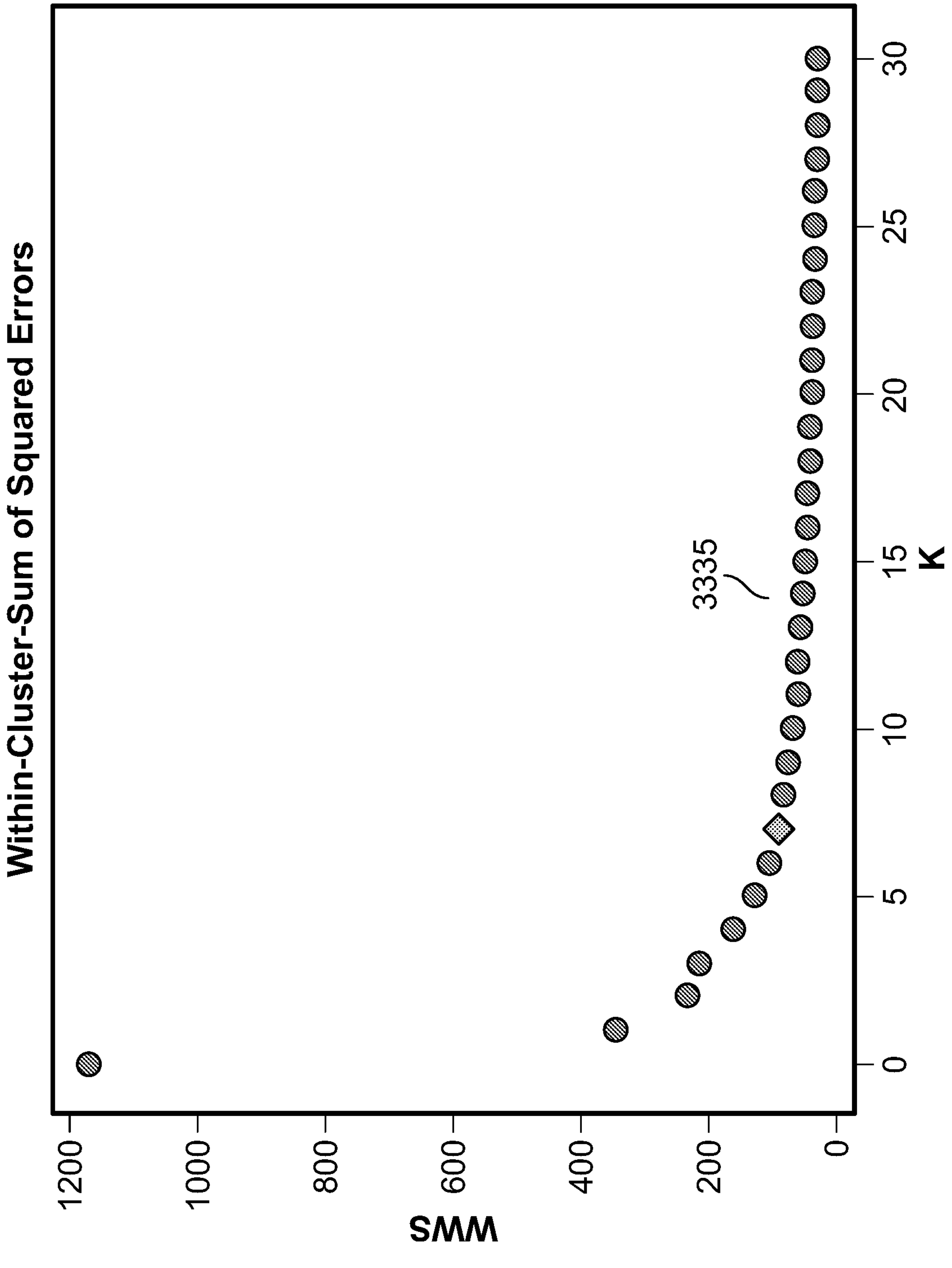
FIG. 33E is a plot indicative of Within-Cluster-Sum of Squared Errors (WSS) used in k-means classification method for anomaly detection in beef livers, in accordance with some embodiments of the present specification.

Since K value is a critical hyperparameter for k-means algorithm, K value is selected automatically according to Within-Cluster-Sum of Squared Errors (WSS) and the K of the elbow on the curve 3335 is used in the model as shown in FIG. 33E.

After the k-means model converged, similar pixel vectors will have the same label, and the image can be segmented based on these labels. However, since the k-means is an unsupervised algorithm, it cannot identify whether each cluster is normal or not.

Stage 3306: Clustering Analysis for Anomaly Localization

Figure 33F:
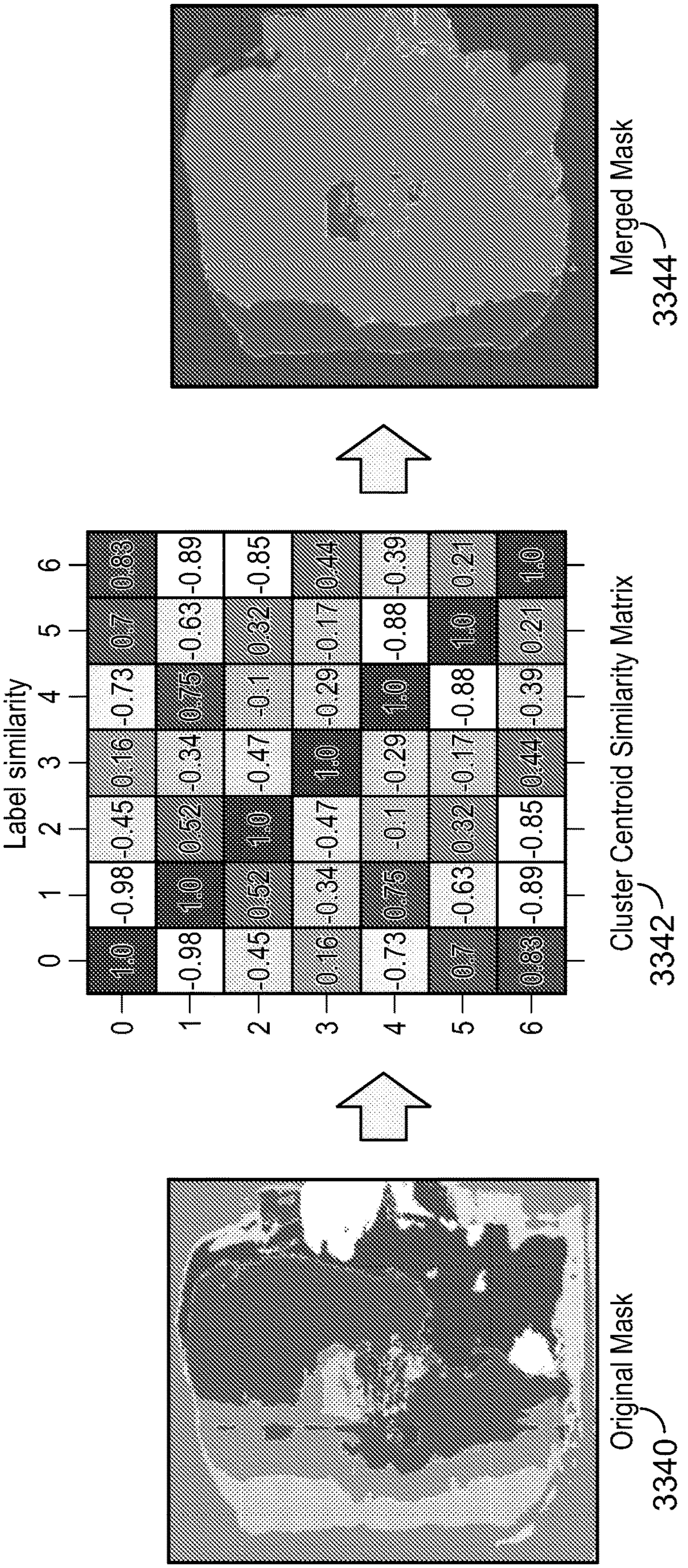
FIG. 33F shows cluster merging to detect anomalies in believers from SWIR hyperspectral data, in accordance with some embodiments of the present specification.

FIG. 33F shows cluster merging to detect anomalies in believers from SWIR hyperspectral data, in accordance with some embodiments of the present specification. To identify anomalies, feature analysis on different clustering regions has been further preformed. Pixel vectors within each label are sampled randomly for spectral analysis. FIG. 33F shows an original mask 3340, a cluster centroid similarity matrix 3342 and a merged mask 3344. The similarity for each pair of cluster centroids is used to merge similar cluster to reduce the over segmentation as demonstrated in FIG. 33F.

Since it is challenging to precisely differentiate the boundary between healthy tissue and sick regions, an erosion process is performed for each label to avoid inclusion of the labels with lower confidence. Thus, the k-means clustering algorithm generates a localization of defects. It should be appreciated that images with manually outlined defect locations are not used in the training stage of the deep learning network 3200, and instead the defect locations are outlined or generated entirely automatically by the network 3200.

The deep learning network 3200 and associated methods of image analysis provide at least the following advantages. Firstly, it provides a higher level of automation, mainly in data processing. The deep learning network 3200 does not require a fixed size for the ROI. In prior art systems selecting ROIs requires a manual component. The manual selection of ROIs has uncertainty which may lead to errors in the final prediction results. In some embodiments, the deep learning network 3200 uses a U-net structure, which allows for pixel-level prediction at any input size. Therefore, the network 3200 and associated image analysis methods can reduce the complexity when processing data and thus has a higher degree of automation. Secondly, as another advantage, the training strategy 3204 can be configured to perform semi-supervised localization training of defects. Also, the training strategy 3204 can be configured to allow for the training of the localization task to be completed in the absence of the mask.

Figure 64:
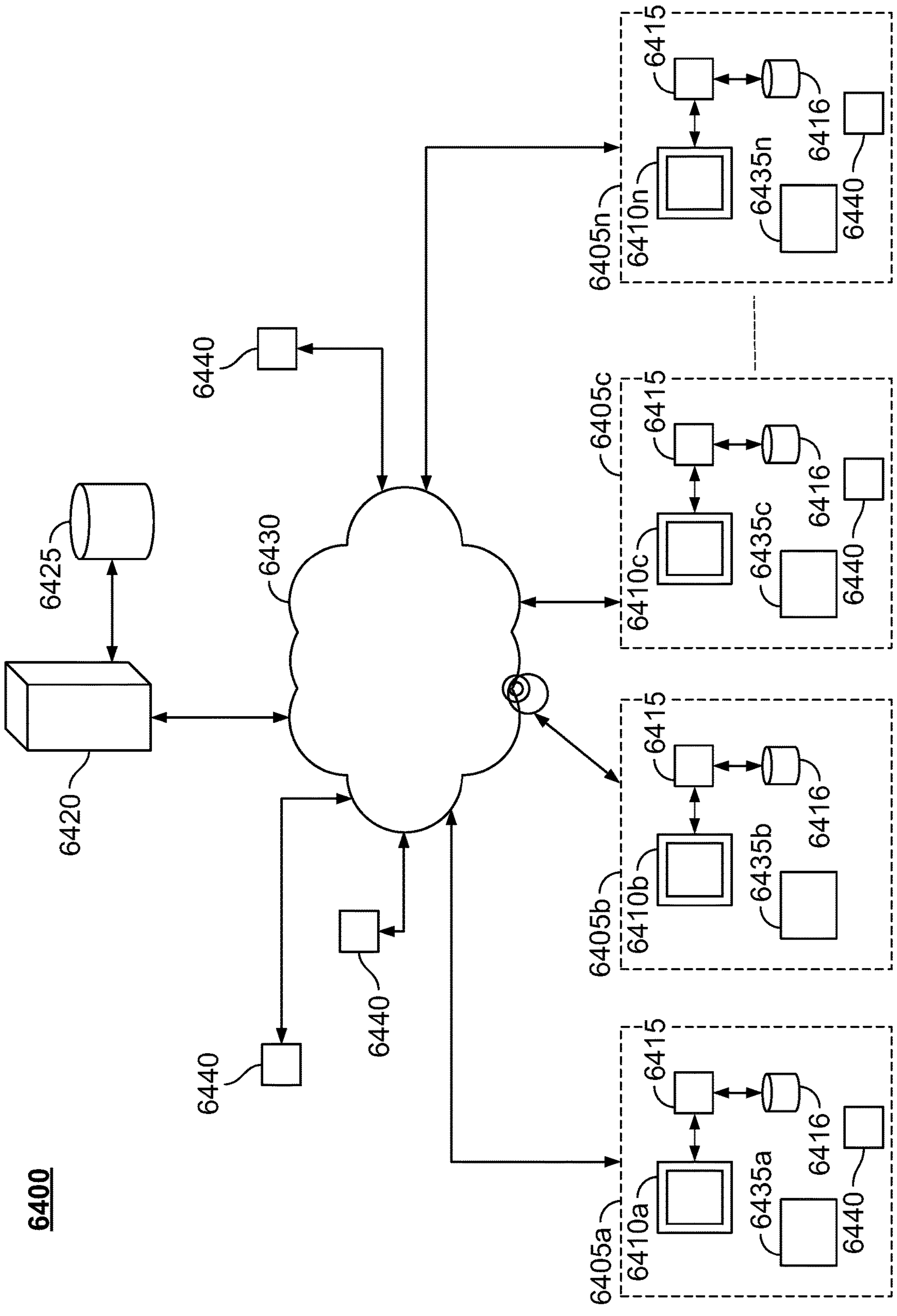
FIG. 64 shows an intelligent meat production system, in accordance with some embodiments of the present specification.

FIG. 64 shows an intelligent meat production system 6400, in accordance with some embodiments of the present specification. The system 6400 comprises a plurality of geographically distributed meat production sites or abattoirs 6405*a*, 6405*b*, 6405*c* to 6405*n* (collectively referred to by the numeral 6405) having associated multi-sensor imaging systems 6410*a*, 6410*b*, 6410*c* to 6410*n* (collectively referred to by the numeral 6410 and similar to the multi-sensor imaging system 2200). In some embodiments, the plurality of meat production sites or abattoirs 6405*a*, 6405*b*, 6405*c* to 6405*n* also have associated livestock farms or breeders 6435*a*, 6435*b*, 6435*c* to 6435*n* (collectively referred to by the numeral 6435).

In some embodiments, each of the plurality of meat production sites or abattoirs 6405*a*, 6405*b*, 6405*c* to 6405*n* is in data communication with at least one server 6420 over a network 6430. The at least one server 6420 has an associated database system 6425. In some embodiments, a plurality of end-user computing devices 6440 are also in data communication with the at least one server 6420 over the network 6430. In a non-limiting scenario, for example, some of the plurality of end-user computing devices 6440 may be co-located with some of the plurality of meat production sites or abattoirs 6405*a*, 6405*b*, 6405*c* to 6405*n* and/or the associated livestock farms or breeders 6435 while some of the plurality of end-user computing devices 6440 may be geographically distributed remote from the plurality of meat production sites or abattoirs 6405*a*, 6405*b*, 6405*c* to 6405*n* and the associated livestock farms or breeders 6435.

In some embodiments, each multi-sensor imaging system 6410 includes a 2D projection X-ray imaging system in single-view or dual-view configurations with dual or multi-energy X-ray attenuation (MEXA) sensors in combination with a hyperspectral imaging system in data communication with a computing device 6415 and a producer's database system 6416. Each producer's database system 6416 stores a plurality of local or site-specific meat production and quality data related to the associated meat production site or abattoir 6405 and livestock farm or breeder 6435. The plurality of local meat production and quality data includes data such as, but not limited to, animal ID (corresponding to, for example, an identification tag associated with the animal), animal type (fish, chicken, pig, cattle, lamb, etc.), breed of animal, X-ray scan data corresponding to each of different ages of the animal, X-ray scan data of the animal's carcass and/or primal, hyperspectral image data of the animal's meat and organs, geographical location (of the livestock farm and/or meat production site or abattoir), climate, weather, season, feed type, time of year of meat production, vaccination history, medications, disease history, age of animal (when received in the meat production site or abattoir), a plurality of after-sale parameters including-lean meat yield (that is, percentage of meat, fat and bone), ratio of intra-muscular fat to tissue, amount of inter-muscular fat, absolute and relative size of individual organs, muscle volume, number of ribs, and presence or absence of diseases such as cysts, tumors, pleurisy and foreign objects.

In accordance with aspects of the present specification, the plurality of local or site-specific meat production and quality data from each producer's database system 6416 (at each of the plurality of meat production sites or abattoirs 6405) are aggregated and stored in the database system 6425 (associated with the at least one server 6420) in order to generate a plurality of global meat production and quality data. In some embodiments, the plurality of local or site-specific meat production and quality data from each producer's database system 6416 is aggregated based on one or more parameters such as, but not limited to, animal type, geographical location, feed type and/or climatic conditions.

In accordance with aspects of the present specification, the at least one server 6420 implements a plurality of instructions or programmatic code representative of at least one machine learning model. In some embodiments, the at least one machine learning model implements modelling techniques such as, but not limited to, partial least squares discriminant analysis, random forest and artificial neural networks. In some embodiments, the at least one machine learning model implements at least one deep learning or artificial neural network (ANN) such as, for example, a convolutional neural network (CNN).

In some embodiments, the at least one machine learning model is configured to detect (and therefore differentiate) unhealthy/diseased scan data from healthy scan data and consequently infer and output global best livestock farming and meat production practices, patterns and insights for maximizing a plurality of positive parameters and minimizing a plurality of negative parameters based on the plurality of global meat production and quality data. The plurality of positive parameters corresponds to, for example, reduced need for medication, lower carbon footprint, variable cost efficiency, reputation protection, lower health risks to consumers and improvements in the plurality of after-sale parameters including-lean meat yield, ratio of intra-muscular fat to tissue, amount of inter-muscular fat, absolute and relative size of individual organs, muscle volume, number of ribs, and absence of diseases such as cysts, tumors, pleurisy and foreign objects. The plurality of negative parameters corresponds to, for example, presence of abnormalities/diseases such as cysts, tumors, pleurisy and foreign objects.

In some embodiments, the at least one machine learning model is configured to analyze scan data (such as, any one, all or any combination of X-ray scan data corresponding to each of different ages of the animal, X-ray scan data of the animal's carcass and/or primal and hyperspectral image data) with additional information (such as, animal type, geographical location (of the livestock farm and/or meat production site or abattoir), climate, weather, season, feed type, time of year of meat production, vaccination history, medications, disease history, age of animal (when received in the meat production site or abattoir), and the plurality of after-sale parameters) to identify and output global best livestock farming and meat production practices, patterns and insights of what maximizes the plurality of positive parameters and what minimizes the plurality of negative parameters.

In some embodiments, the analyses of scan data with the additional information is performed based on local meat production and quality data corresponding to each of the plurality of meat production sites or abattoirs 6405 and associated livestock farms or breeders 6435 in order to identify global best livestock farming and meat production practices, patterns and insights. The identified global best livestock farming and meat production practices, patterns and insights are then communicated back to the plurality of meat production sites or abattoirs 6405 and associated livestock farms or breeders 6435.

In some embodiments, the at least one machine learning model is trained using input data. In some embodiments, the input data includes healthy or unhealthy/diseased hyper-spectral image data of an animal's meat and organs along with at least a portion of associated additional information in the meat production and quality data such as animal ID, animal type (fish, chicken, pig, cattle, lamb, etc.), breed of animal, X-ray scan data corresponding to each of different ages of the animal, X-ray scan data of the animal's carcass and/or primal, geographical location (of the livestock farm and/or meat production site or abattoir), climate, weather, season, feed type, time of year of meat production, vaccination history, medications, disease history, age of animal (when received in the meat production site or abattoir), a plurality of after-sale parameters including-lean meat yield (that is, percentage of meat, fat and bone), ratio of intra-muscular fat to tissue, amount of inter-muscular fat, absolute and relative size of individual organs, muscle volume, number of ribs, and presence or absence of diseases such as cysts, tumors, pleurisy and foreign objects.

The hyperspectral image data and the additional information from the meat production and quality data are associated with the animal ID in the database and hence retrievable as training input data. In some embodiments, training input data represents a sample from the global meat production and quality data stored in the database system 6425. In some embodiments, the sample is representative of each geographical location of the meat production sites or abattoirs 6405 and the associated livestock farms or breeders 6435.

In some embodiments, the input data is processed in order to generate processed training input data for training the at least one machine learning model. In some embodiments, the processing is applied directly to the input data (including, healthy or diseased scans), and the input data does not require manual annotation or being manually designated healthy or diseased. Thus, the training is based on a hypothesis that diseased, unhealthy or abnormal image is caused by abnormal elements, i.e., anomaly, which would not appear in a healthy/normal image.

As known to persons of ordinary skill in the art, a hyperspectral image corresponding to the hyperspectral image data includes a plurality of pixels wherein each pixel includes a plurality of hyperspectral bands. In some embodiments, the plurality of hyperspectral bands is broken down in to a plurality of bins, where each of the plurality of bins is associated with characterizing data. In some embodiments, the characterizing data is indicative of hyperspectral reflectance intensity from the surface of the target organ/meat. In some embodiments, the characterizing data is further processed by mathematical functions such as, for example, differentiation, in order to achieve feature highlighting. Thus, the hyperspectral image is segmented into bits that are of no interest and bits that are of interest (for example, those associated with lean (meat), fat, bone, healthy organ, and disease organ). For example, N spectral bands of the hyperspectral image are grouped into predefined number of M bins. In some embodiments, the number of bins M is 6. It should be appreciated that the Principle Component Analysis algorithm sets M=6, in some embodiments, in order to achieve an Explained Variance Ratio (EVR) above 97%. However, in alternate embodiments, M could take lower values, for example 1, at lesser EVR, and up to 300 for Visible and 512 for SWIR hyperspectral scan data (these values being the maximum spectral bins=pixels on the imaging sensor). Thus, the characterizing data is associated with one of the M bins. Preferably, samples are spread equally across the M bins, but could have an orthogonal set of data where populations would vary. The samples are spread equally across the M bins as a result of normalization, so that each of the M bins has the same intensity, and therefore the same statistical precision—that is each of the M bins carries the same weight in the final result.

In embodiments, the bins have the following characteristics: a) the bins need to be sufficiently separated or discriminated within a grid space. Also, data is presented against multiple dimensional structure. Therefore, principal components are chosen for each of 3 axes; and b) the bins should have no more than 5% overlap, even more preferably no overlap in volume.

Each of the M bins corresponds to a separate set of processed training input data. The at least one machine learning model is trained using data from the full set of M bins in order to be able to a) detect unhealthy or diseased hyperspectral image data from healthy hyperspectral image data and b) infer and output global best livestock farming and meat production practices, patterns and insights based on the plurality of global meat production and quality data associated with unhealthy/diseased and healthy hyperspectral image data.

In embodiments, a selection of the hyperspectral bands is designed to improve the quality of the data, enhance accuracy of the at least one machine learning model, suppress overfitting, and increase efficiency, and ultimately improve the performance of the at least one machine learning model. The peak signal-to-noise ratio (PSNR) is the ratio between the maximum possible power of a signal and the power of corrupting noise that affects the fidelity of its representation, and this is used for band selection for K-means and deep learning models.

For each sample in dataset, the hyperspectral image stack with the shape (width, height, band) has the intensity ranging from 0 to $2^n-1$, where n is the intensity resolution. In some embodiments, n=64. Image of band i is denoted as $B_i$ and the intensity of pixel j as $p_j$. The total intensity $I_i$ of $B_i$ is calculated using formula as:

$$I_i = \sum_{pj \in B_i} p_j$$

After the total intensity calculation of each band, the maximum total intensity $I_g$ and its corresponding band g can be found. Image $B_g$ is used as reference image to calculate peak signal-to-noise ratio (PSNR) of band i using formula as:

$$MSE_i = \frac{1}{\text{width} * \text{height}} \sum_{e=0}^{width-1} \sum_{f=0}^{height-1} [B_g(e, f) - B_i(e, f)]^2$$

$$PSNR_i = 20\text{long}_{10}(\text{MAX}_n) - 10\log_{10}(MSE_i)$$

where $\text{MAX}_n$ is $2^n-1$ and $MSE_i$ is the mean squared error between $B_i$ and $B_g$. The PSNR value is used as threshold for bands selection. In accordance with some embodiments, the threshold is chosen as 20 dB (the total intensity is around 50% of the $I_g$) since typical values below 20 dB are normally with unacceptable quality.

In accordance with some aspects of the present specification, the at least one server 6420 also implements a plurality of instructions or programmatic code in order to generate at least one graphical user interface (GUI) for access by the plurality of end-user computing devices 6440 over the network 6430. The at least one GUI is configured to acquire user query. The acquired user query is provided as input to the at least one trained machine learning model that processes the user query and outputs a response for display, to the user, in the at least one GUI. In some embodiments, the response is based on the global best livestock farming and meat production practices, patterns and insights inferred by the at least one machine learning model. In some embodiments, the end-user is a livestock farmer or breeder. In some embodiments, the end-user is a meat producer.

In various embodiments, the at least one GUI enables an end-user to input query data corresponding to various scenarios into the at least one trained machine learning model in order to simulate and understand how the scenarios (associated with the input query data) will affect the plurality of positive and negative parameters. For example, an end-user's input query data may correspond to a scenario of "what happens if I invest in a $3 vaccine?". The output response from the at least one trained machine learning model could be "this leads to $20 in improved health/meat quality outcome". Similarly, the end-user's input query data may correspond to, for example, what happens if no vaccines are used, there is a change in feed type, there is a change in temperature, rain or any other climatic, weather or seasonal changes.

It should be appreciated that the analyses and therefore the response of the at least one machine learning model is highly geographically (and climate) specific. Consequently, in some embodiments, the at least one GUI enables the end-user to specify (via selection of a pre-populated drop down list, for example) the geographic location along with the input query data. In some embodiments, the at least one GUI enables the end-user to filter the responses on the basis of one or more geographic locations and/or climatic, weather and seasonal characteristics.

Results of Beef Organ Scanning

Histopatholigical Findings

The findings recorded during scanning of the sick livers (rejected for human consumption by meat inspectors) and the gross descriptions noted during post-mortem inspection are displayed in Table 2. A total of 32 out of 52 livers rejected for human consumptions showed various degrees of discoloration, 7 livers had abscesses, 5 ducts thickening, 4 fibrosis, 2 flukes and 2 cysts. Results for kidneys and lungs are not presented because they were all healthy.

TABLE 2

Post-mortem gross description of the diseased livers and area of interest set before scanning based on the macroscopical aspect of the organ

| ID | Organ | Status | Area of interest | Gross description |
|---|---|---|---|---|
| 3 | Liver | Diseased | Upper left | Multifocal discoloration |
| 4 | Liver | Diseased | Middle | Focal discoloration and fluke |
| 5 | Liver | Diseased | Upper left | Multifocal discoloration |
| 6 | Liver | Diseased | Entire cranial body | Multifocal discoloration |

TABLE 2-continued

Post-mortem gross description of the diseased livers and area of interest set before scanning based on the macroscopical aspect of the organ

| ID | Organ | Status | Area of interest | Gross description |
|---|---|---|---|---|
| 7 | Liver | Diseased | Bottom-right | Generalized discoloration |
| 8 | Liver | Diseased | Bottom-right | Multiple nodules and fluke |
| 9 | Liver | Diseased | Left side | Abscesses |
| 10 | Liver | Diseased | Right side | Surface fibrosis |
| 11 | Liver | Diseased | Left side | Multifocal fibrosis and duct thickening |
| 12 | Liver | Diseased | Middle | Multifocal discoloration and duct thickening |
| 13 | Liver | Diseased | Single spots middle right side | Focal discoloration |
| 14 | Liver | Diseased | Bottom-right | Multifocal discoloration and duct thickening |
| 15 | Liver | Diseased | Right side | Multifocal discoloration and duct thickening |
| 16 | Liver | Diseased | Cranial edge | 2 Cysts |
| 17 | Liver | Diseased | Right side | Generalized discoloration |
| 22 | Liver | Diseased | Caudate lobe and right side | Multifocal discoloration |
| 23 | Liver | Diseased | Bottom-right | Multifocal discoloration |
| 24 | Liver | Diseased | Left side | Multifocal discoloration |
| 25 | Liver | Diseased | Upper left | Multifocal discoloration |
| 26 | Liver | Diseased | Middle bottom | Edge discolored |
| 27 | Liver | Diseased | None | Normal |
| 28 | Liver | Diseased | None | Normal |
| 29 | Liver | Diseased | Right side | 2 edge lesions |
| 30 | Liver | Diseased | None | Normal |
| 31 | Liver | Diseased | Right side | Focal discoloration and duct thickening |
| 32 | Liver | Diseased | Bottom | None |
| 33 | Liver | Diseased | Right side | Focal discoloration |
| 34 | Liver | Diseased | Cranial edge | Pale liver with fibrosis |
| 35 | Liver | Diseased | Right side | Multiple discoloration |
| 36 | Liver | Diseased | Left side | Focal discoloration |
| 37 | Liver | Diseased | Left side | Multifocal discoloration |
| 38 | Liver | Diseased | Middle left | Multifocal discoloration |
| 39 | Liver | Diseased | Right side | Focal discoloration |
| 40 | Liver | Diseased | Right side | Small discoloration |
| 41 | Liver | Diseased | Left side | Focal discoloration |
| 42 | Liver | Diseased | Left side | Focal discoloration |
| 43 | Liver | Diseased | Entire body | Multifocal discoloration |
| 50 | Liver | Diseased | Right side | Two lesions |
| 51 | Liver | Diseased | Middle | Multifocal discoloration |
| 52 | Liver | Diseased | Middle left | Focal discoloration |
| 53 | Liver | Diseased | Bottom-left | Pale left lobe |
| 54 | Liver | Diseased | Left side | Two lesions |
| 55 | Liver | Diseased | Upper middle | Bile duct thickening |
| 56 | Liver | Diseased | Middle bottom | Multifocal discoloration |
| 57 | Liver | Diseased | Whole | Multiple bile duct thickening |
| 58 | Liver | Diseased | Left side | Left lobe discoloration |
| 59 | Liver | Diseased | Abscess bottom-left | Fibrosis and multiple thickening |
| 60 | Liver | Diseased | Bottom | None |
| 61 | Liver | Diseased | Abscess top left and bottom-right | Two abscesses in the left lobe, one in the right |
| 62 | Liver | Diseased | Right side and bottom | Multiple discoloration |
| 63 | Liver | Diseased | Top left | Discoloration, bile duct thickening and fluke |
| 64 | Liver | Diseased | Middle right | Focal discoloration |

RGB Images During Post-Mortem Inspection and X-Ray Images (Collected for Each of Six X-Ray Intensities Irradiated)

Figure 34A:
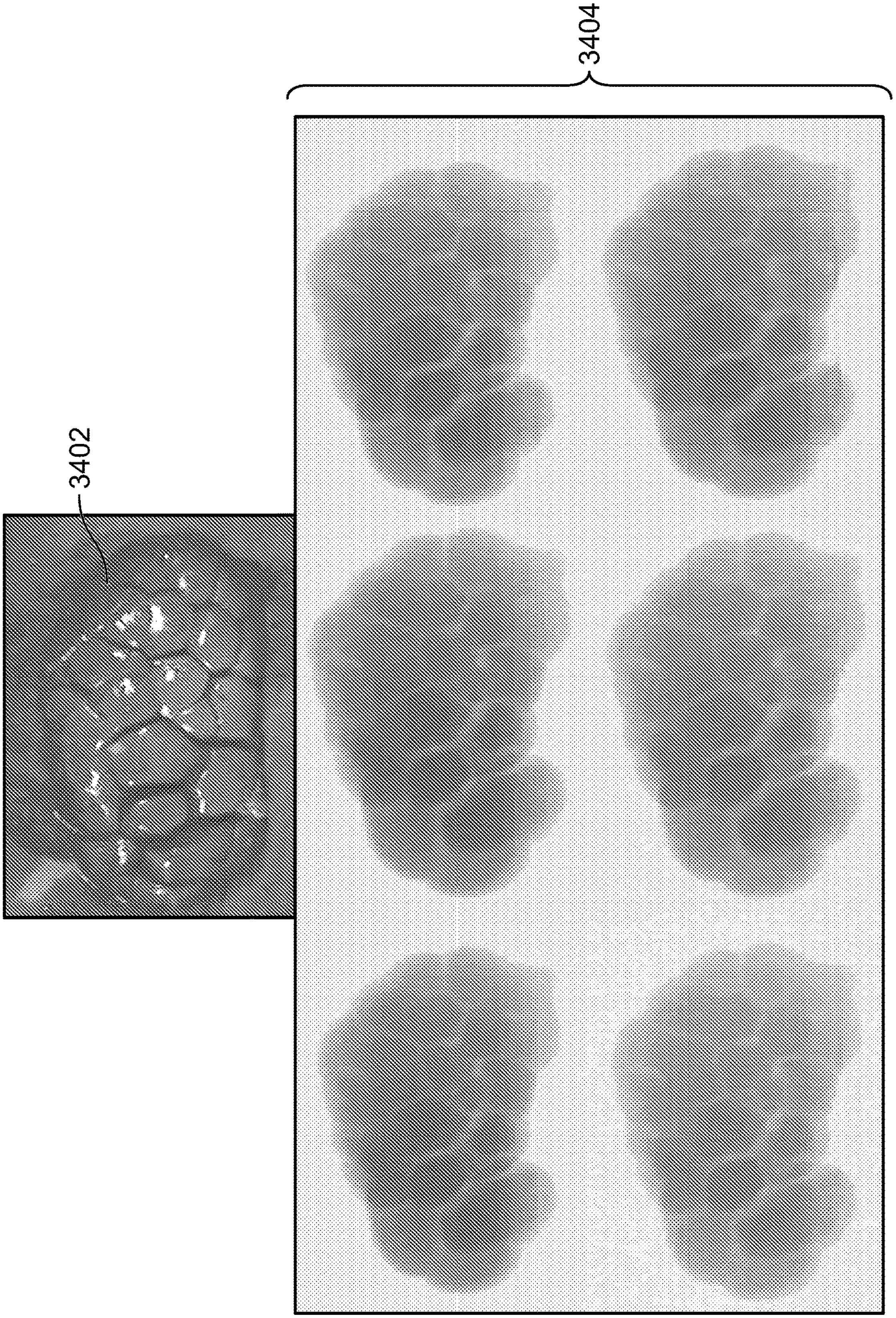
FIG. 34A shows RGB and X-ray images (six images for six X-ray energies) and the macroscopic findings of a kidney with no macroscopic lesions, in accordance with some embodiments of the present specification.
Figure 34B:
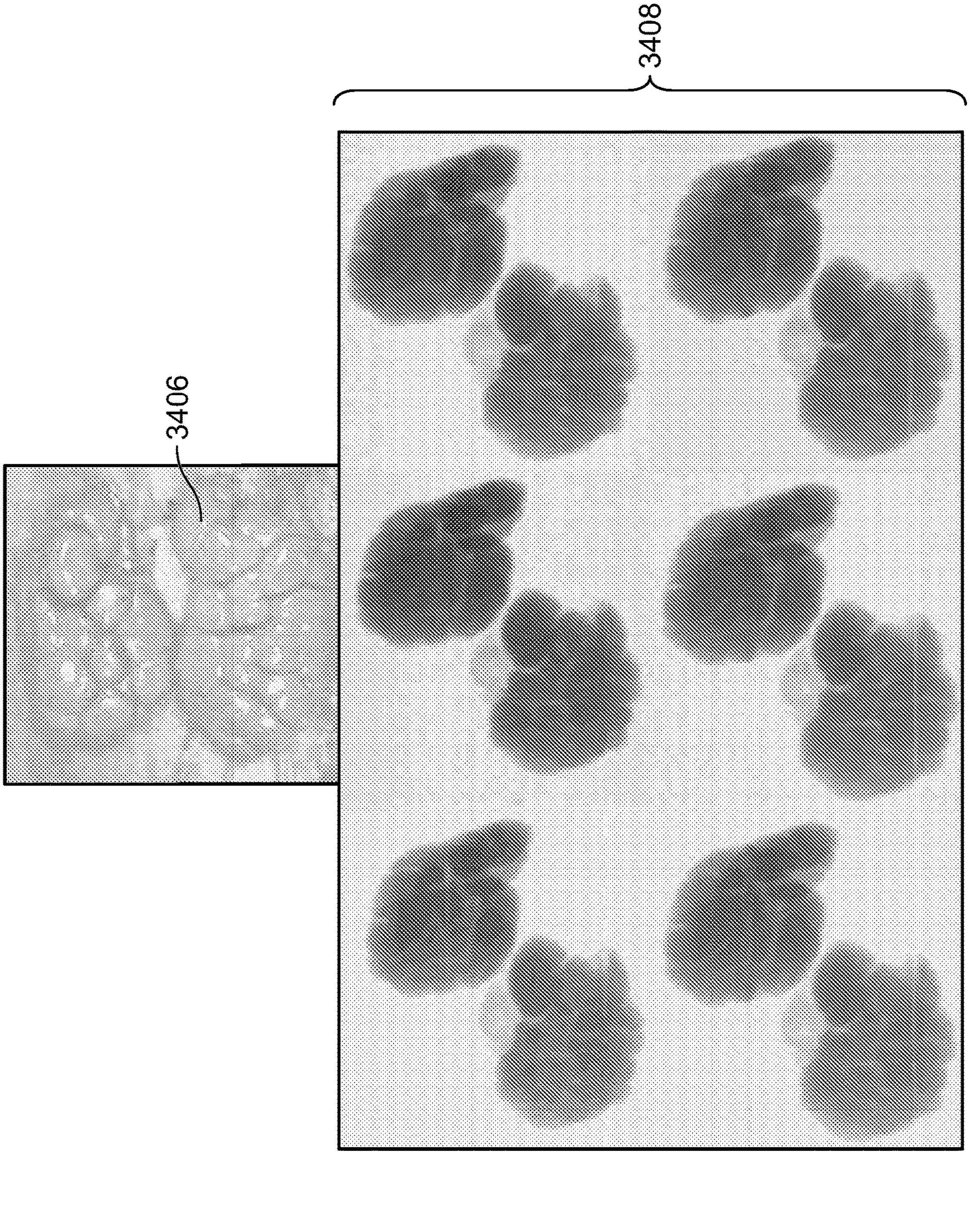
FIG. 34B shows RGB and X-ray images (six images for six X-ray energies) and the macroscopic findings of two kidneys with no macroscopic lesions, in accordance with some embodiments of the present specification.

FIG. 34A shows RGB image 3402 and X-ray image 3404 of a kidney with no macroscopic lesions, in accordance with some embodiments of the present specification. It should be noted that the generated images can be corrected after collected (for example, to remove horizontal stripes) and do not affect the analysis. The clarity of the lobes of the kidney is also a demonstration of the use of X-ray imaging to penetrate tissues. FIG. 34B shows RGB image 3406 and X-ray image 3408 of two kidneys with no macroscopic lesions. Fat tissue from the kidney parenchyma may also be visible however detection of discoloration when comparing images of FIGS. 34A and 34B does not seem evident.

Figure 34C:
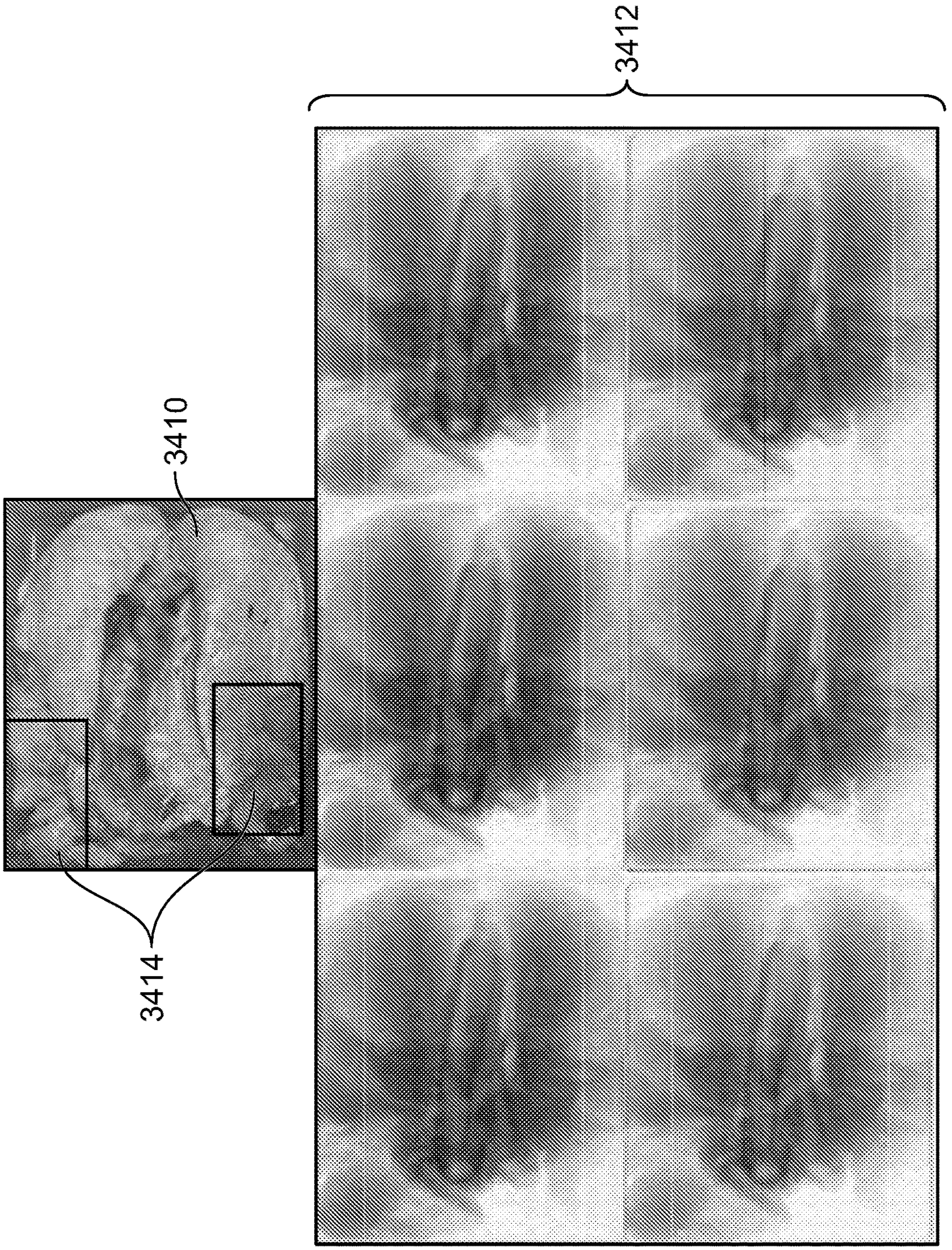
FIG. 34C shows RGB and X-ray images (six images for six X-ray energies) and the macroscopic findings of two lungs, in accordance with some embodiments of the present specification.
Figure 34D:
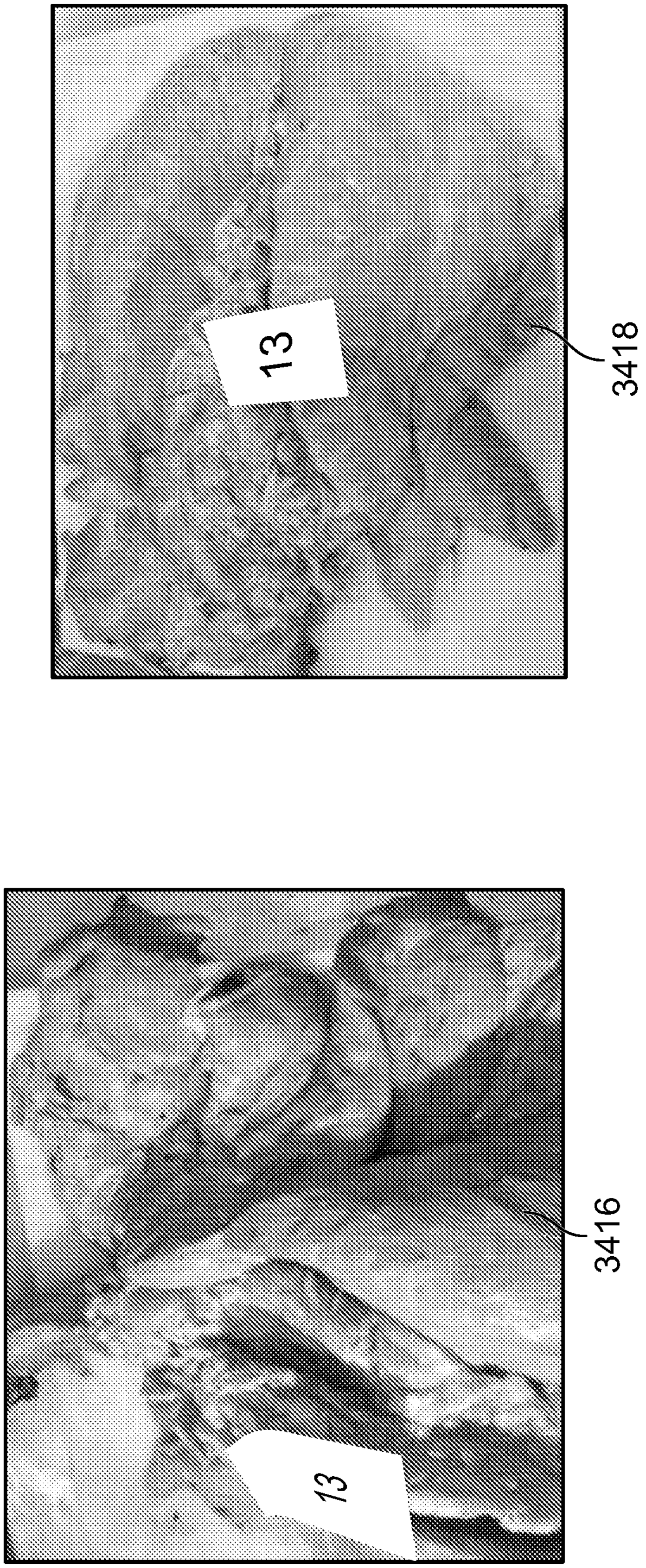
FIG. 34D shows, based on post-mortem inspection of beef lungs, pneumonia evidenced through discoloration and consolidation of tissue.
Figure 34E:
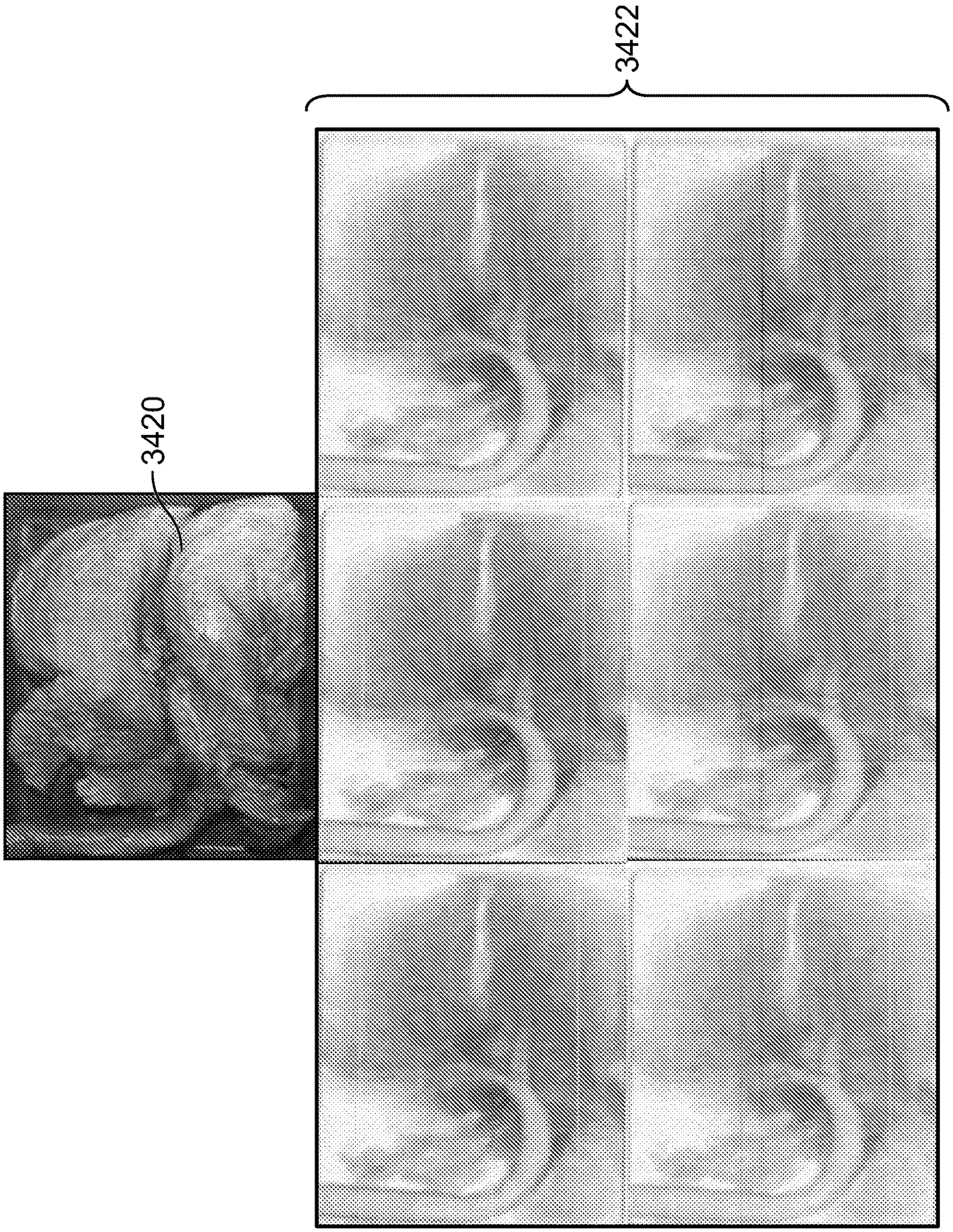
FIG. 34E shows RGB and X-ray images (six images for six X-ray energies) and the macroscopic findings of lungs, in accordance with some embodiments of the present specification.
Figure 34F:
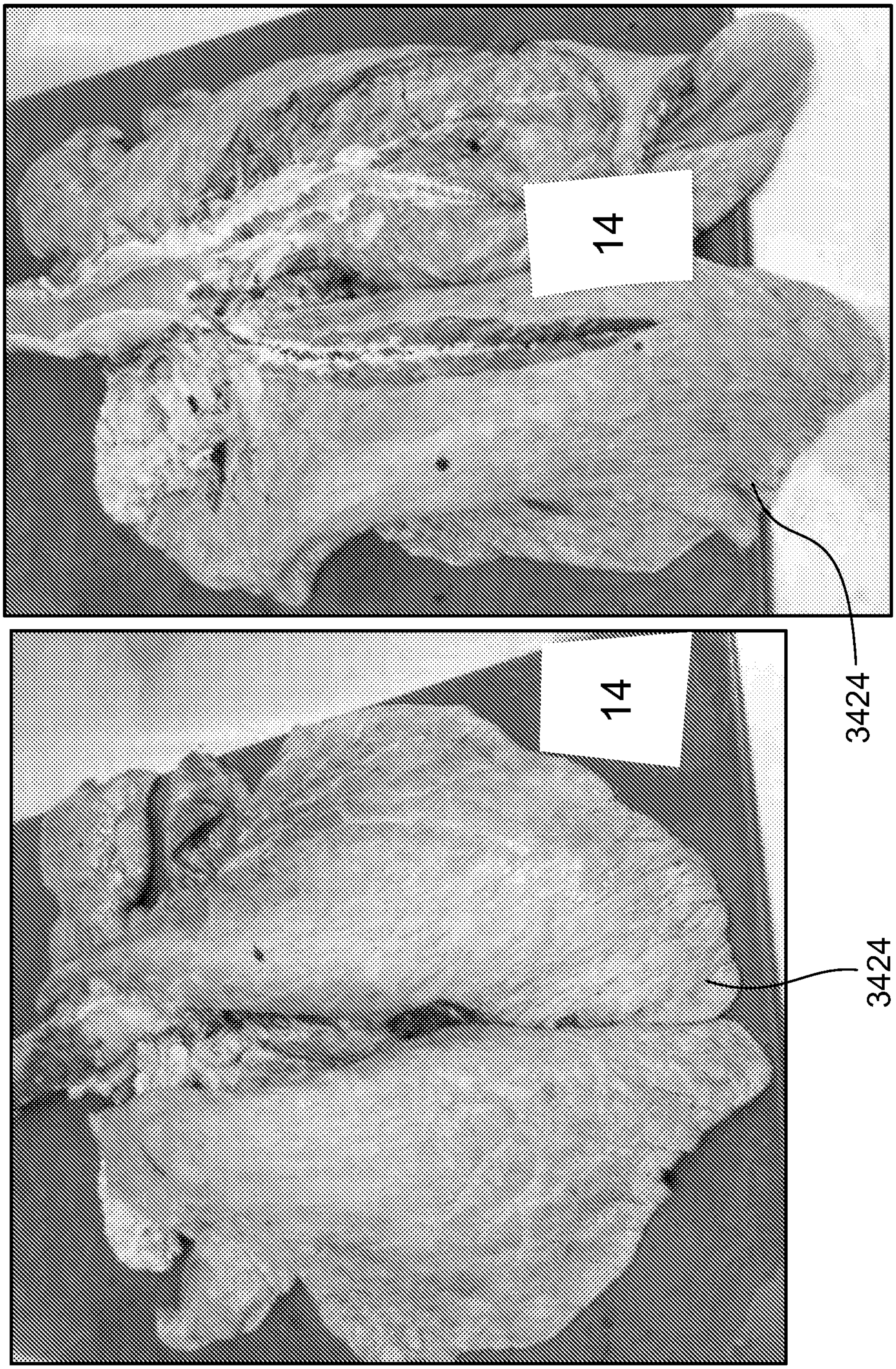
FIG. 34F shows no lesions as a result of post-mortem inspection of beef lungs, in accordance with some embodiments of the present specification.

FIG. 34C shows RGB image 3410 and X-ray image 3412 and the macroscopic findings of two lungs. The cranial lobes were marked 3414 as regions of interest due to discoloration. In FIG. 34D, images 3416, 3418 of the post-mortem inspection of lungs show the cranial lobes of the organs with lesions from past pneumonia episodes. The X-ray images, however, may not be as effective as detecting these health issues because lung tissue is filled with air and the disease did not cause a change in density of the tissues. FIG. 34E shows RGB image 3420 and X-ray image 3422 and the macroscopic findings of lungs, in accordance with some embodiments of the present specification. FIG. 34F shows no lesions as a result of post-mortem inspection of beef lungs 3424, in accordance with some embodiments of the present specification.

Figure 34G:
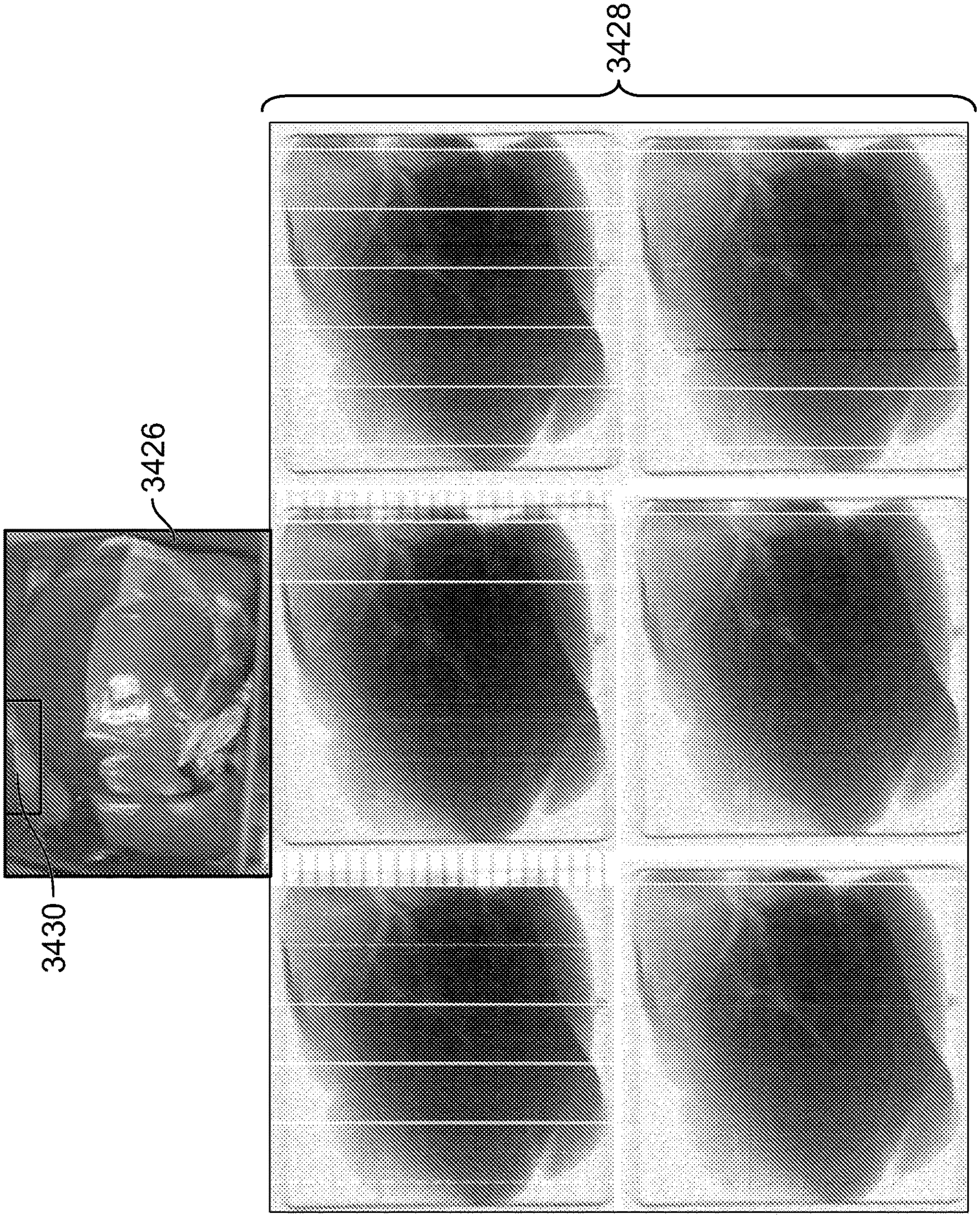
FIG. 34G shows RGB and X-ray images (six images for six X-ray energies) and the macroscopic findings of a liver with multifocal discoloration, in accordance with some embodiments of the present specification.
Figure 34H:
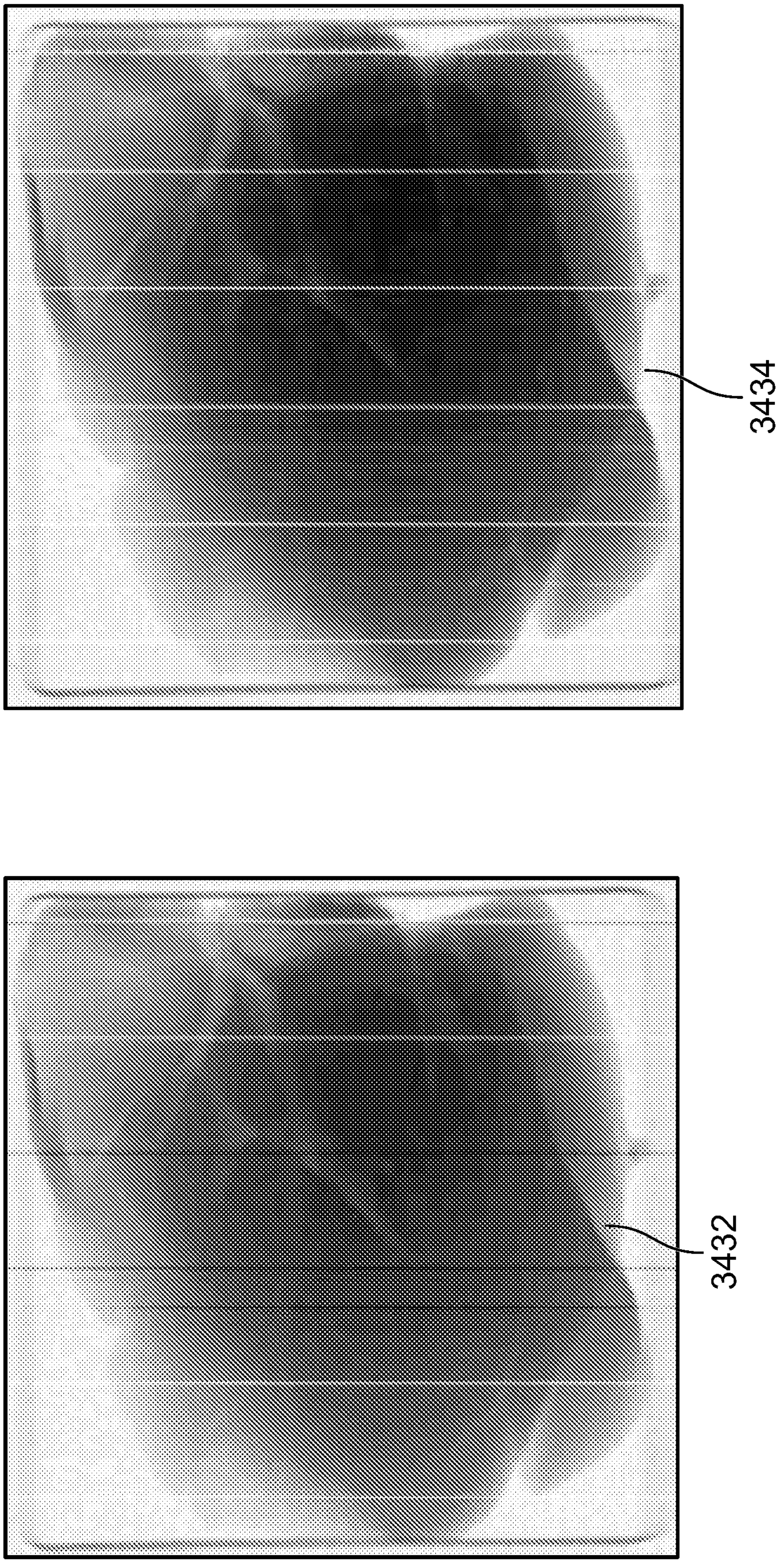
FIG. 34H shows first and second X-ray images of the liver obtained from absorptiometry data in which the data is obtained from subtracting high energy from low energy or using both low energy absorptiometry data, in accordance with some embodiments of the present specification.

FIG. 34G shows RGB image 3426 and X-ray image 3428 and the macroscopic findings of a liver with multifocal discoloration, in accordance with some embodiments of the present specification. The X-ray highlighted a lighter pattern of the liver parenchyma in part 3430 of the organ compared to the healthy hepatic tissue. The organ was determined to have multifocal discoloration upon histopathological analysis. In addition to working with X-ray images collected for each of the six X-ray intensities irradiated, in some embodiments, a second processing method using a subtraction between all different energies to determine if these would augment the features of interest was employed. FIG. 34H shows first X-ray image 3432 and second X-ray image 3434, of the liver, obtained from absorptiometry data in which the data is obtained from subtracting high energy from low energy or using both low energy absorptiometry data, in accordance with some embodiments of the present specification. However, this analysis did not seem to provide unique superior performance. During the post-mortem inspection of the liver above, a focally extensive pale discoloration was described on the diaphragmatic surface of the organ. This did not seem to be reflected in the X-ray data (3432, 3434) likely because the defect may not affect tissue density sufficiently enough to be picked up by the scanner.

Figure 35A:
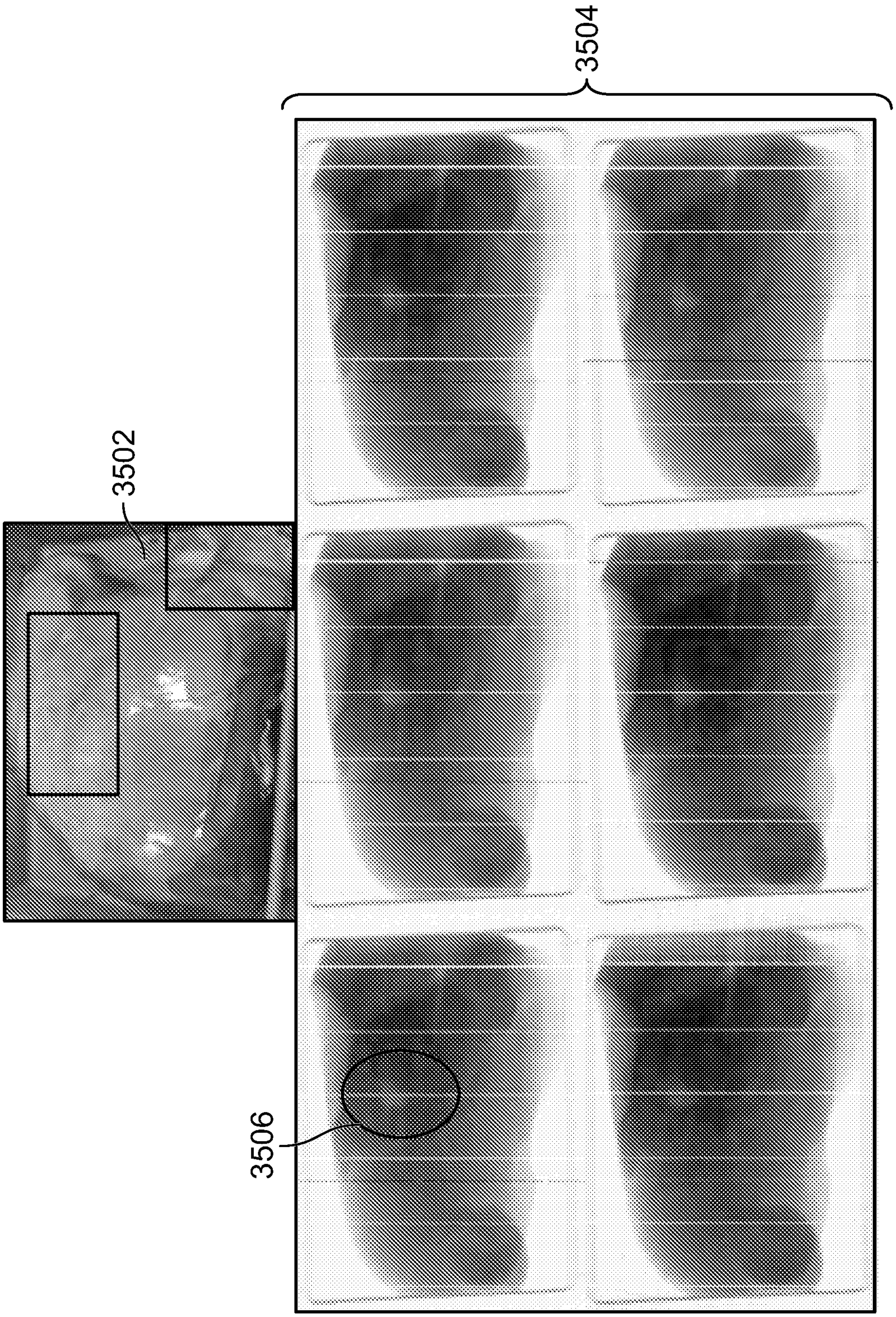
FIG. 35A shows RGB and X-ray images (six images for six X-ray energies) of a liver sample, in accordance with some embodiments of the present specification.
Figure 35B:
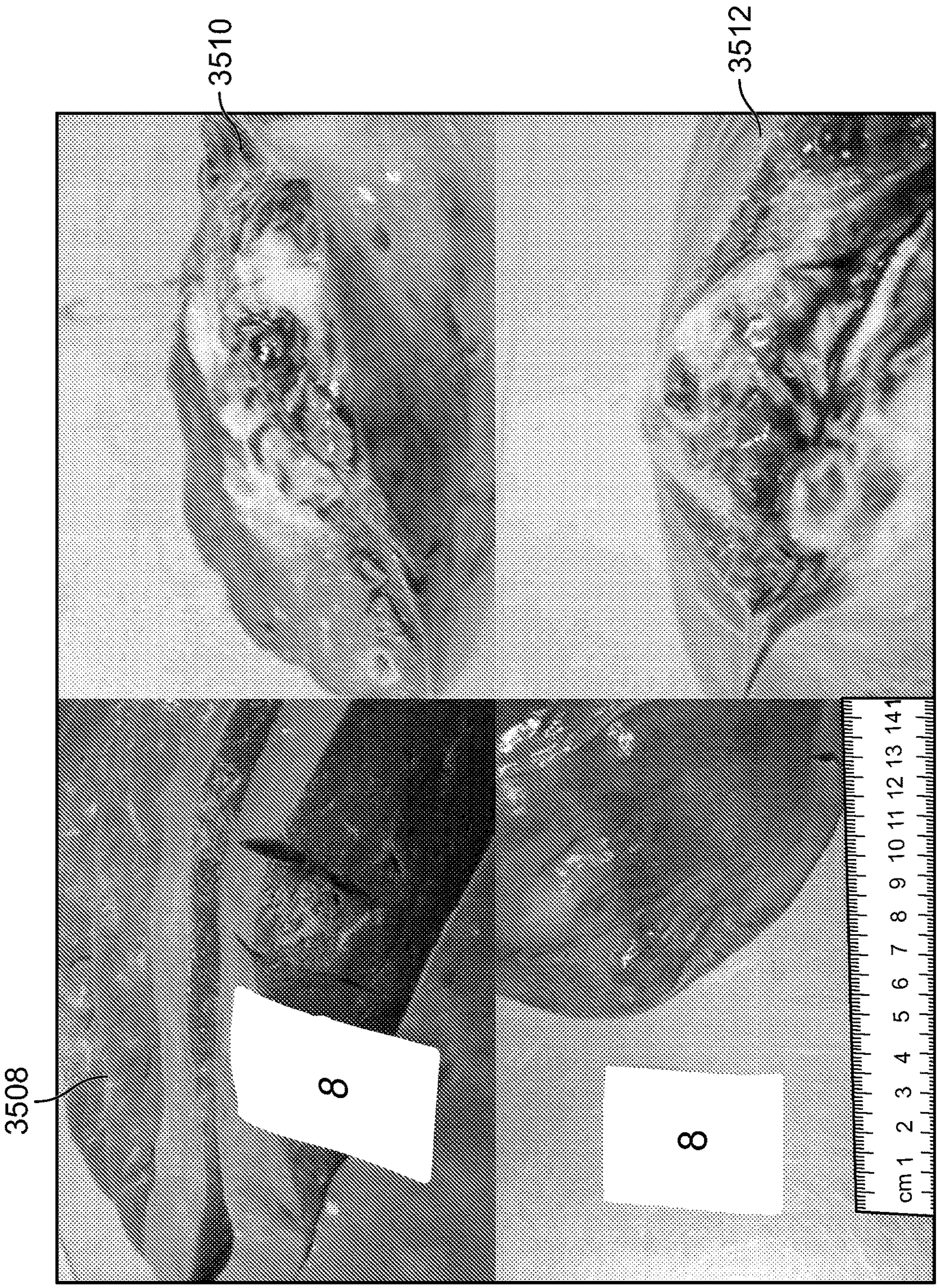
FIG. 35B shows a plurality of images of the liver sample during a post-mortem inspection, in accordance with some embodiments of the present specification.

FIG. 35A shows RGB image 3502 and X-ray image 3504 of another liver sample, in accordance with some embodiments of the present specification. The RGB image 3502 shows the macroscopic aspect of the organ before scanning. The six X-ray images 3504 correspond to six X-ray energies irradiated. A circular mark 3506 encloses a liver fluke found upon histopathological analysis. Veterinary inspection demonstrated the organ had multiple nodules and fluke. The images of the post-mortem inspection of the liver showed the multiple nodules on the diaphragmatic surface and multiple bile duct thickening and an area of focal discoloration. The cross section of the 10 mm nodule on the left lobe showed liver flukes which were also reflected in the X-ray images 3504. FIG. 35B shows, as part of a post-mortem inspection of the liver, a first image 3508 of the organ before dissecting, a second image 3510 showing nodules and a third image 3512 showing fluke worms.

Figure 36A:
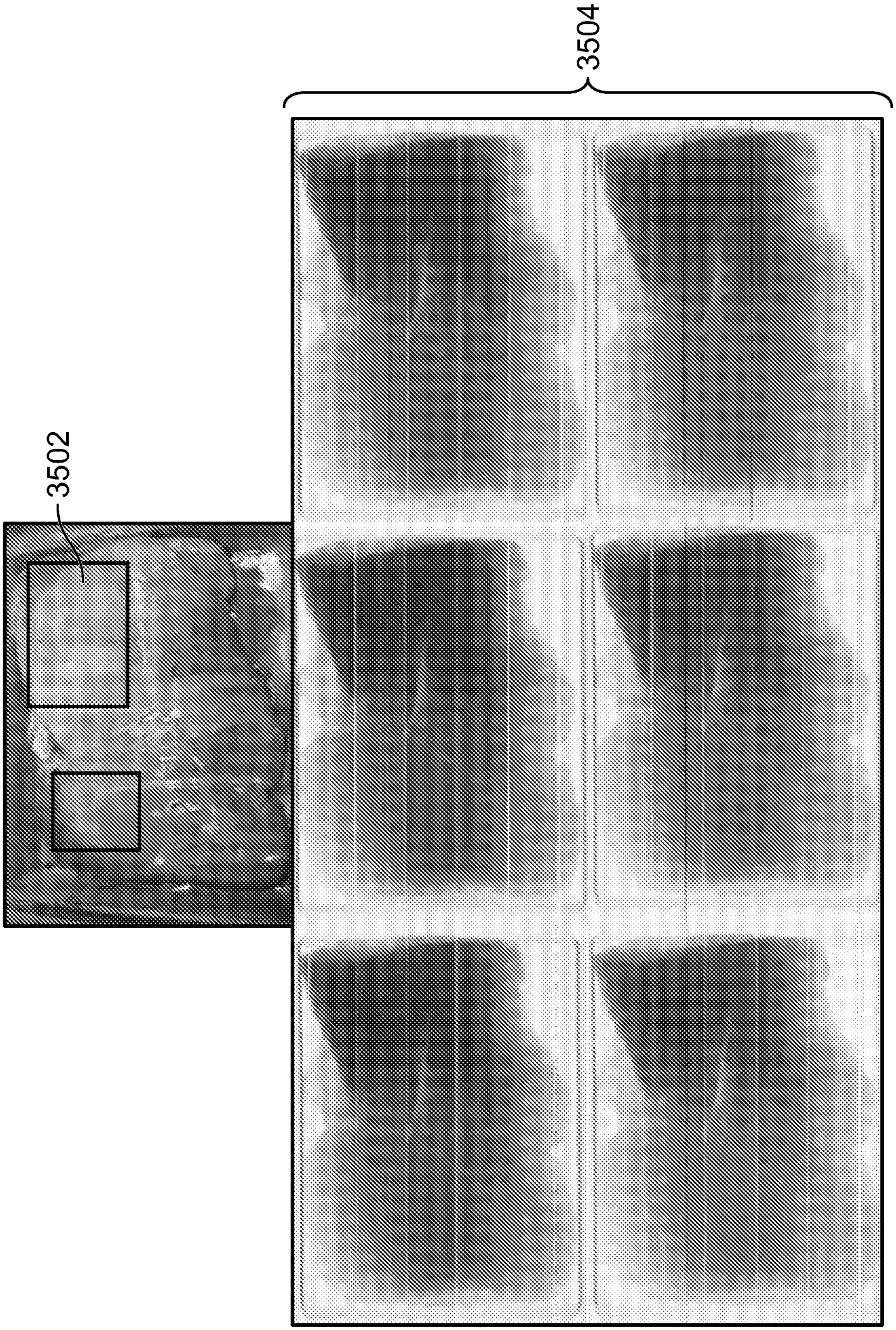
FIG. 36A shows RGB and X-ray images (six images for six X-ray energies) of yet another liver sample, in accordance with some embodiments of the present specification.
Figure 36B:
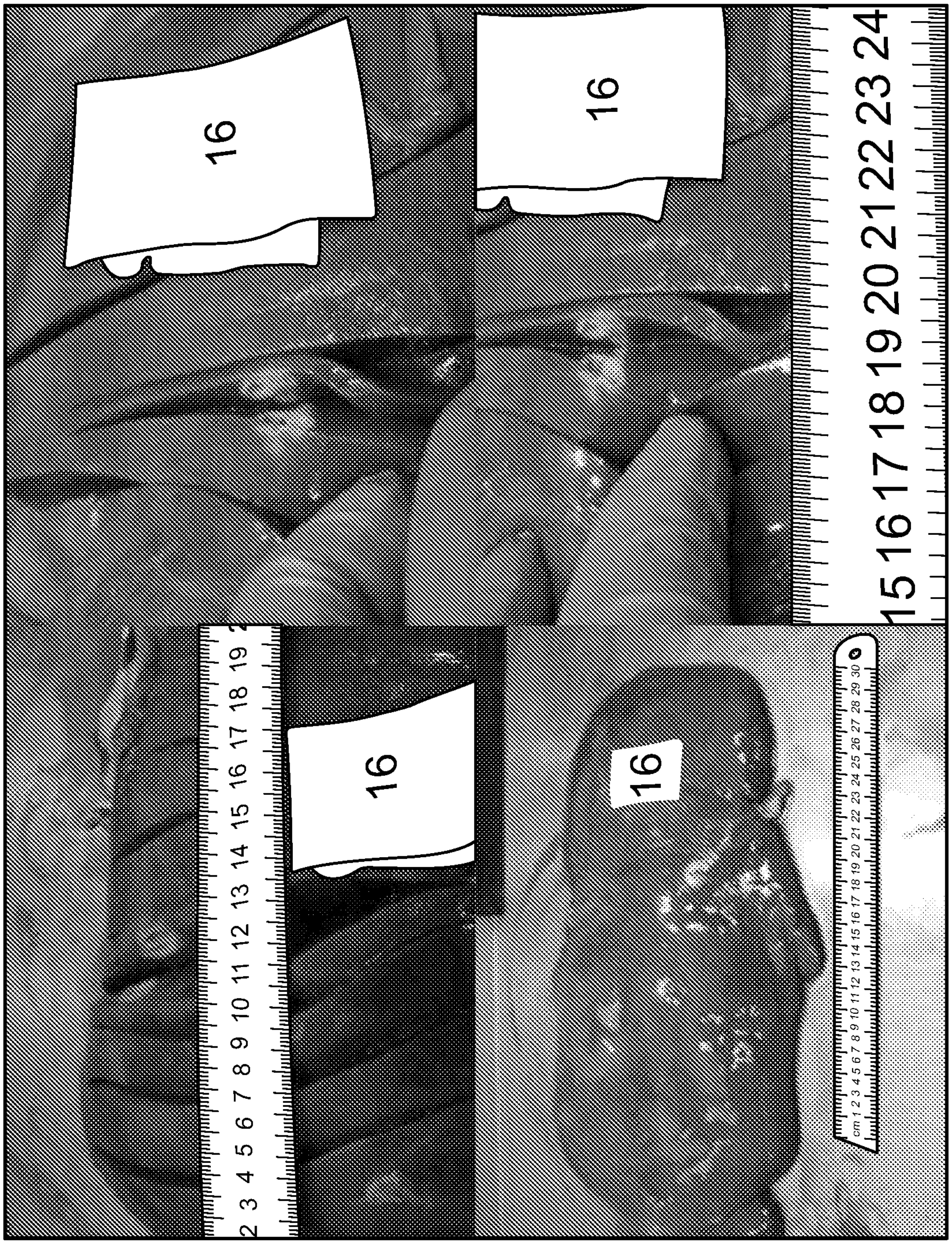
FIG. 36B shows, during the post-mortem inspection and histopathology of the liver, first and second images of first and second cysts, respectively, in accordance with some embodiments of the present specification.

FIG. 36A shows RGB image 3602 and X-ray image 3604 of yet another liver sample, in accordance with some embodiments of the present specification. The RGB image 3602 shows the macroscopic aspect of the organ before scanning. The six X-ray images 3604 correspond to six X-ray energies irradiated. Post-mortem inspection of the liver found two cysts on the diaphragmatic surface of the organ, one on the left lobe and one at the edge of the right lobe. The content was liquid and aqueous. FIG. 36B shows, during the post-mortem inspection and histopathology of the liver, a first image 3606 of a first cyst and a second image 3608 of a second cyst.

Figure 37A:
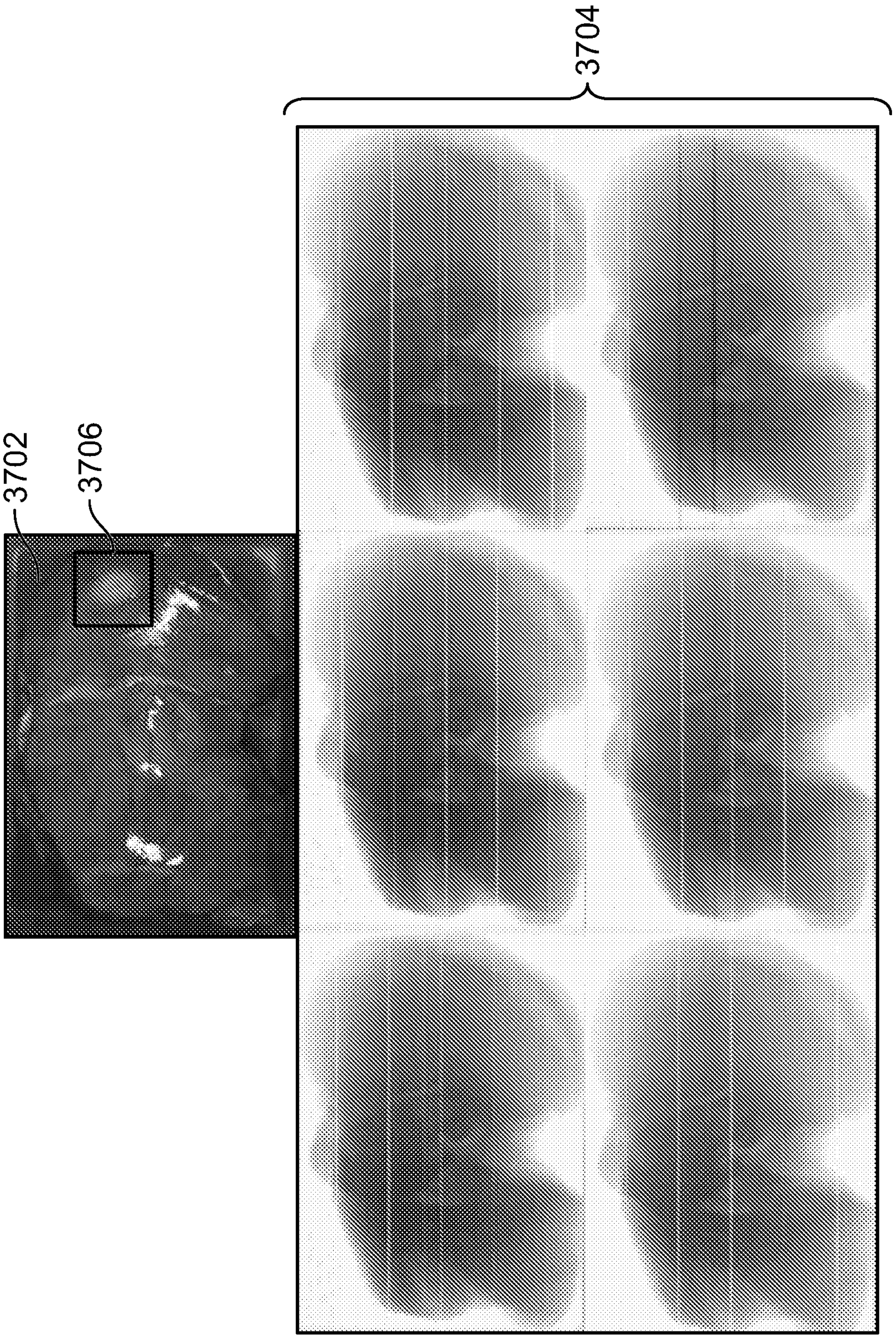
FIG. 37A shows RGB and X-ray images (six images for six X-ray energies) of yet another liver sample, in accordance with some embodiments of the present specification.
Figure 37B:
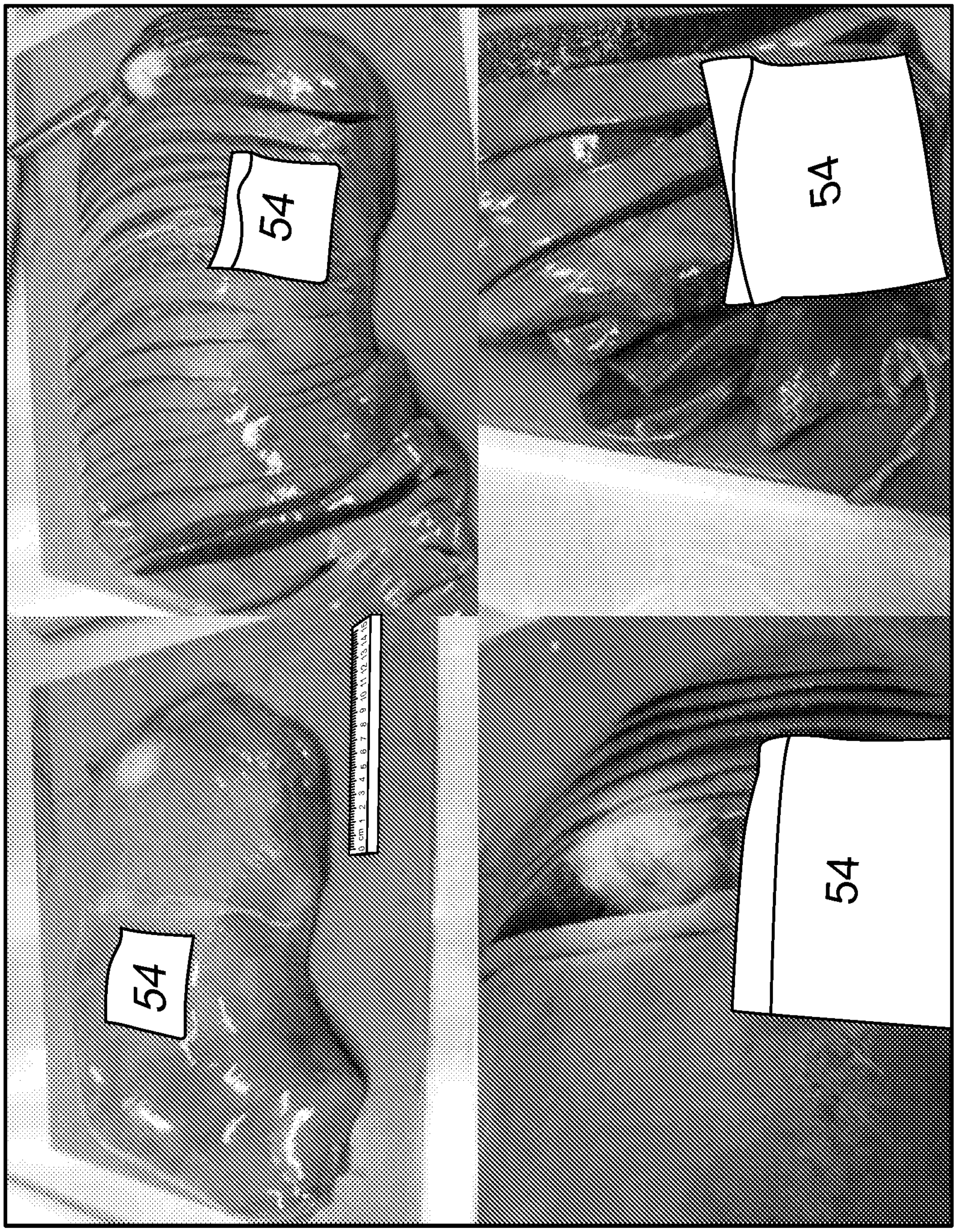
FIG. 37B shows RGB images of the liver showing a large nodule upon post-mortem inspection, in accordance with some embodiments of the present specification.

FIG. 37A shows RGB image 3702 and X-ray image 3704 of yet another liver sample, in accordance with some embodiments of the present specification. The liver sample has a nodular lesion found on the left lobe and the area of interest 3706 is marked accordingly. The X-ray scanning did not seem to reflect the shape and location of the lesion, although the pattern of the left lobe of the liver appeared quite homogeneous and brighter than the right one. FIG. 37B shows RGB images 3708 of the liver showing a large nodule upon post-mortem inspection.

Figure 38A:
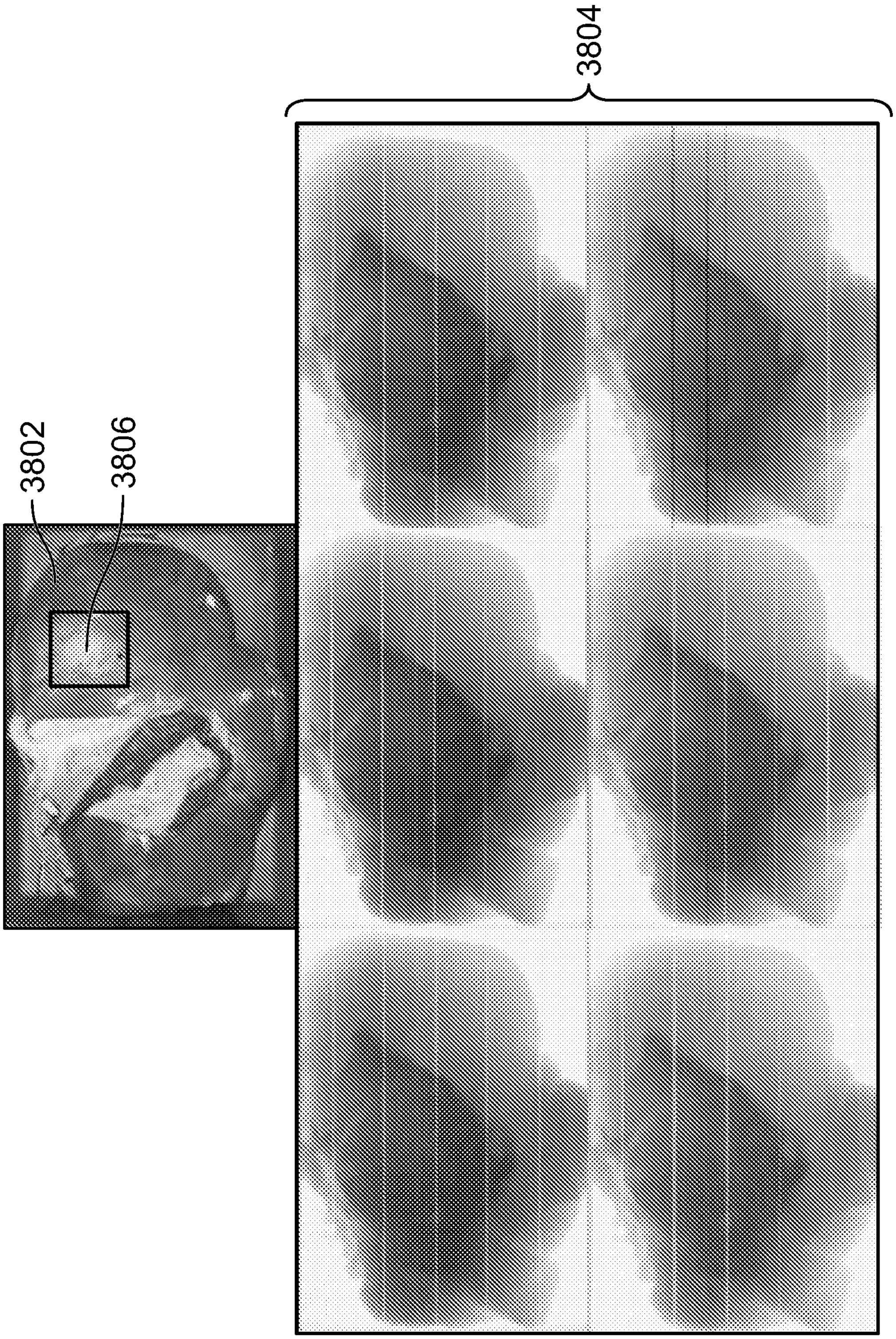
FIG. 38A shows RGB and X-ray images (six images for six X-ray energies) of yet another liver sample, in accordance with some embodiments of the present specification.
Figure 38B:
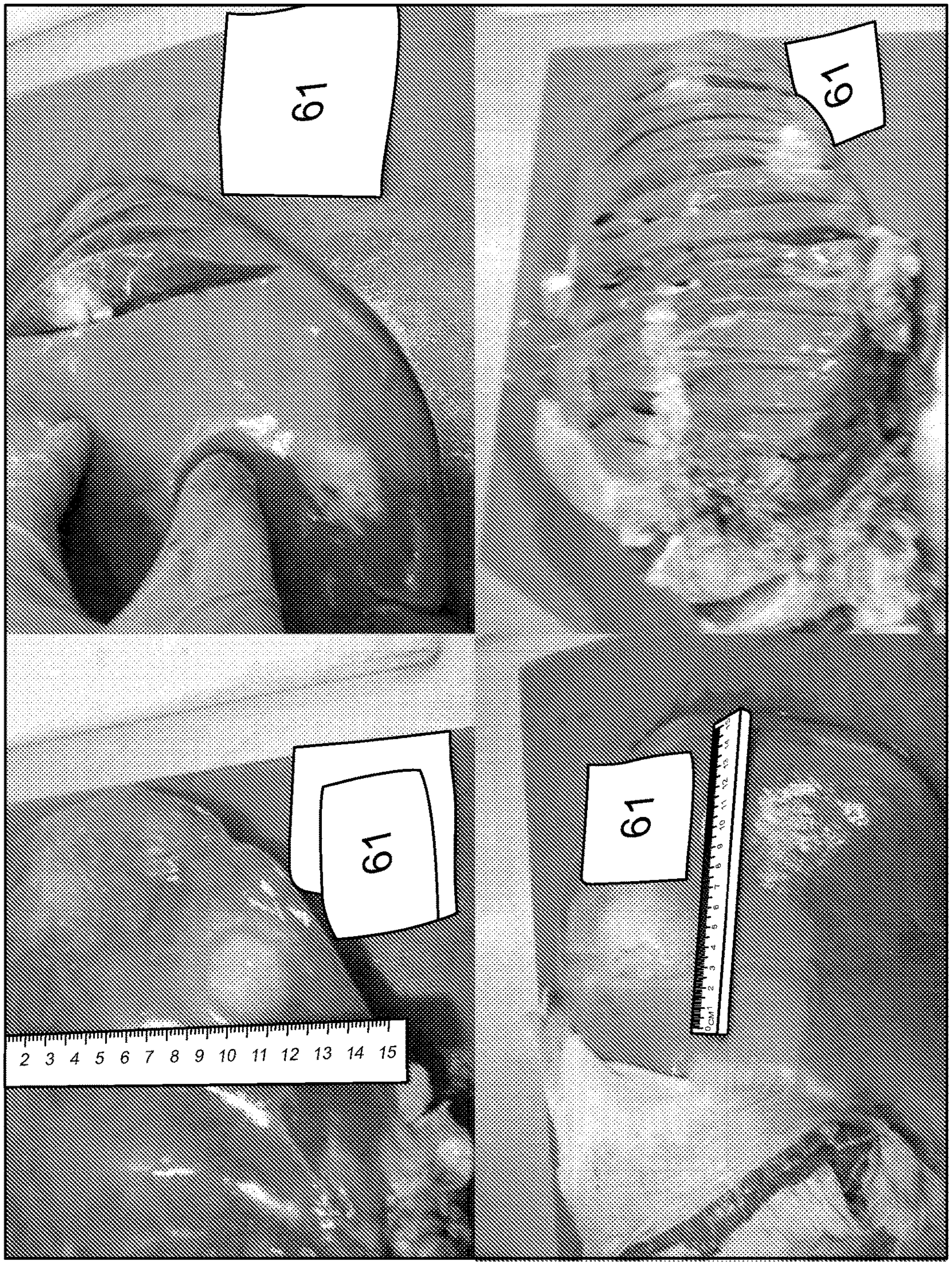
FIG. 38B shows RGB images of the liver showing a first abscess on the edge of the left lobe and a second abscess on the right by the bile duct, upon post-mortem inspection, in accordance with some embodiments of the present specification.

FIG. 38A shows RGB image 3802 and X-ray image 3804 of yet another liver sample, in accordance with some embodiments of the present specification. As can be seen in image 3802, the liver has a large abscess 3806 on the left lobe of the diaphragmatic surface. The X-ray images 3804 showed a lighter shade of grey pattern compared to the right counterpart. However, the nodule does not seem to be reflected clearly in the X-ray images 3804. FIG. 38B shows RGB images 3808 of the liver showing a first abscess on the edge of the left lobe and a second abscess on the right by the bile duct, upon post-mortem inspection. Each abscess measured approximately 45 mm when inspected and incised, revealing caseous content.

Figure 39A:
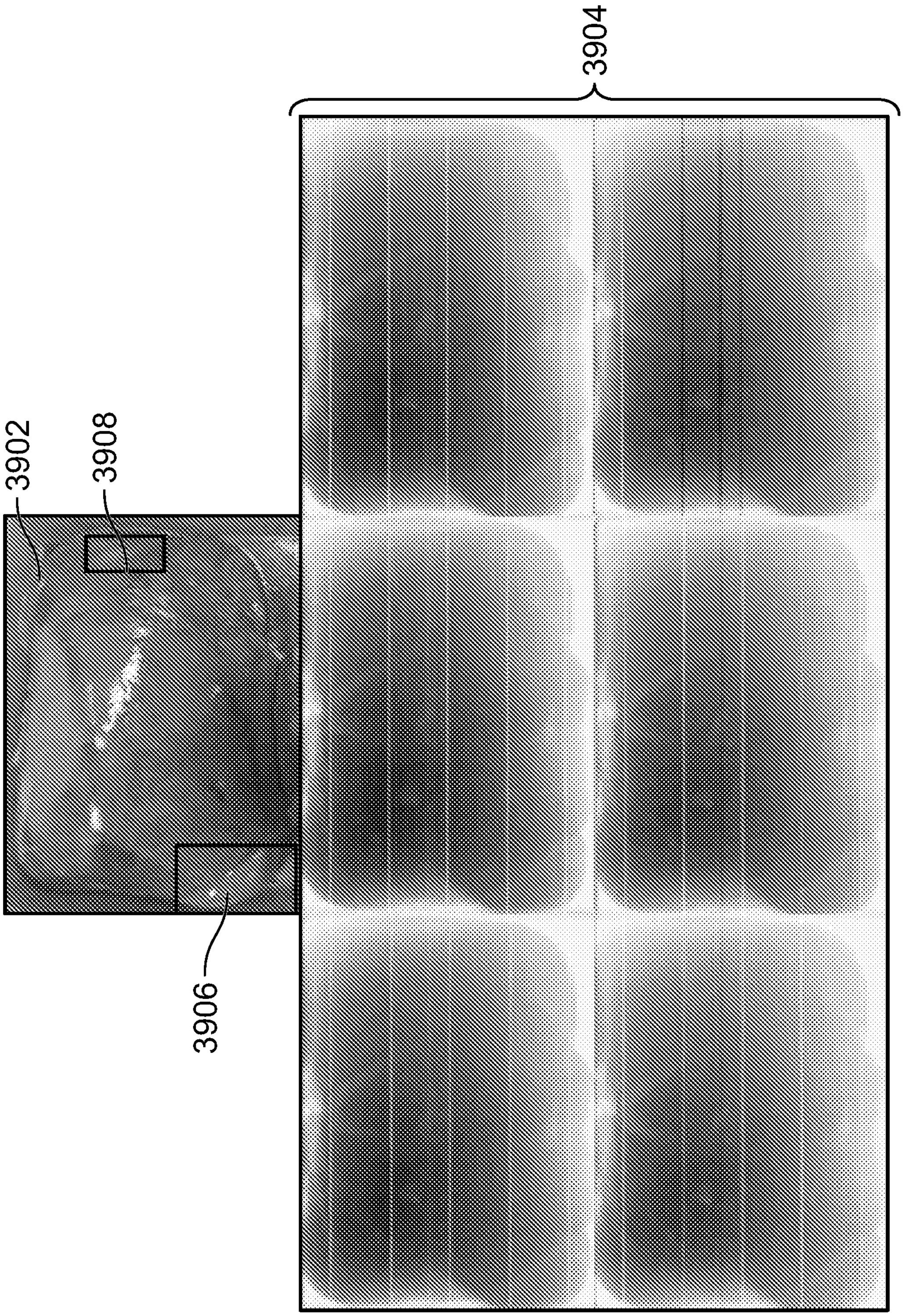
FIG. 39A shows RGB and X-ray images (six images for six X-ray energies) of yet another liver sample, in accordance with some embodiments of the present specification.
Figure 39B:
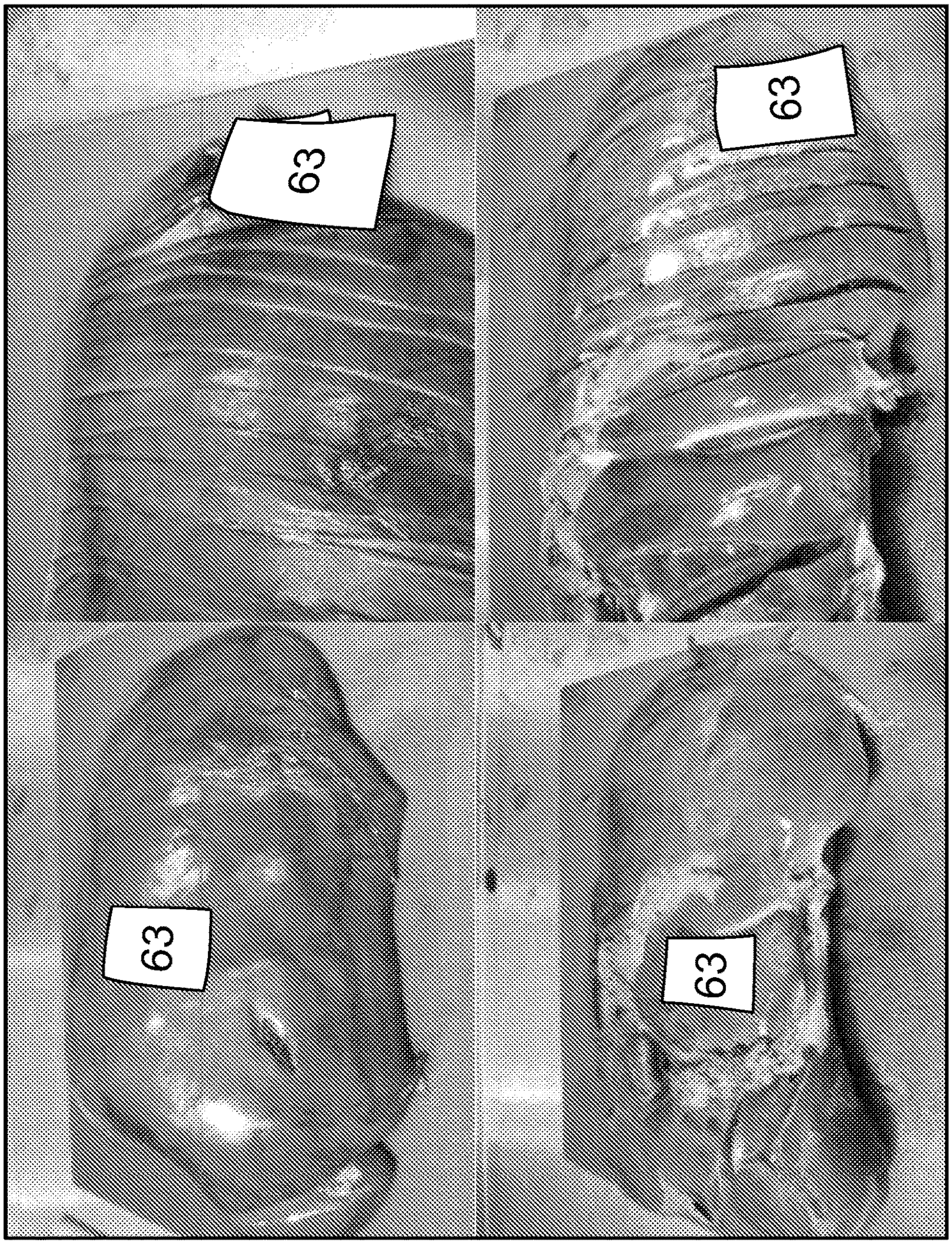
FIG. 39B shows RGB images of the liver showing discoloration, bile duct thickening and fluke, upon post-mortem inspection, in accordance with some embodiments of the present specification.

FIG. 39A shows RGB image 3902 and X-ray image 3904 of yet another liver sample, in accordance with some embodiments of the present specification. Upon examination, the liver sample revealed discoloration, bile duct thickening and fluke. The areas of interest 3906, 3908 were marked on the left and caudate lobes with areas of discolorations. The X-ray images 3904 showed brighter edges of the organ on the whole lower part, extending between the two lobes. FIG. 39B shows RGB images 3910 of the liver showing discoloration, bile duct thickening and fluke, upon post-mortem inspection. Thus, the post mortem inspection of the liver confirmed a 30×25 mm area of irregular discoloration on the diaphragmatic surface of the left lobe. The visceral surface of the bile duct appeared thickened and fluke was found within when cut.

Deep Learning Network Classification

For the anomaly classification task, where an image is provided to determine whether it is an anomaly or a normal image, the systems and methods of the present specification can achieve accuracy and sensitivity measures of over 90% (Table 3) and can also show the location of the abnormal pixels.

TABLE 3

Model metrics on the test (validation) set of diseased and healthy liver samples (⅓ of the total dataset).

| | Metric on Test Set |
|---|---|
| Accuracy | 0.92 |
| Precision | 0.88 |
| Sensitivity | 0.93 |
| Specificity | 0.84 |

Figure 40A:
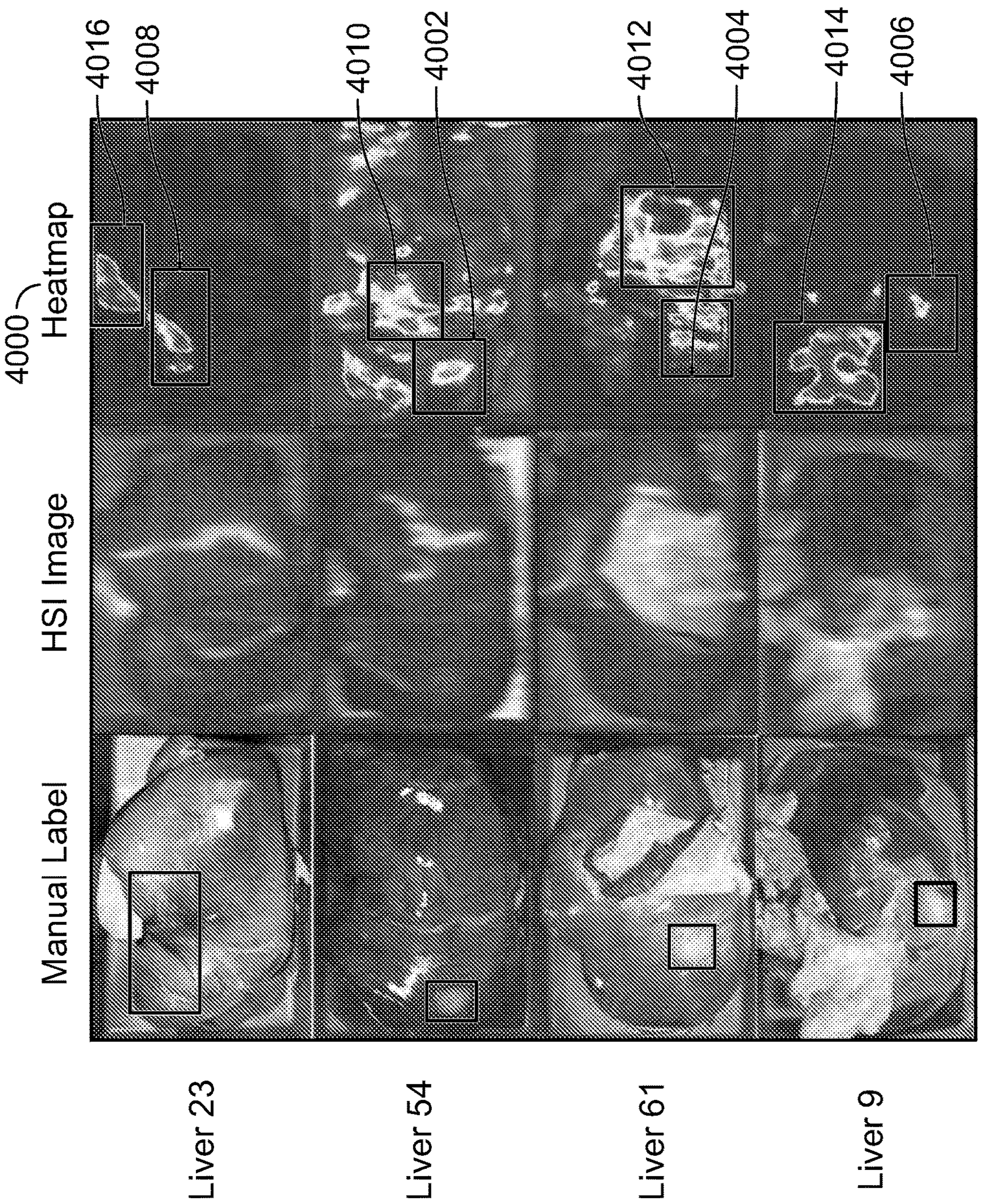
FIG. 40A shows results visualization of a plurality of beef livers with anomalies using deep learning algorithms, in accordance with some embodiments of the present specification.
Figure 40B:
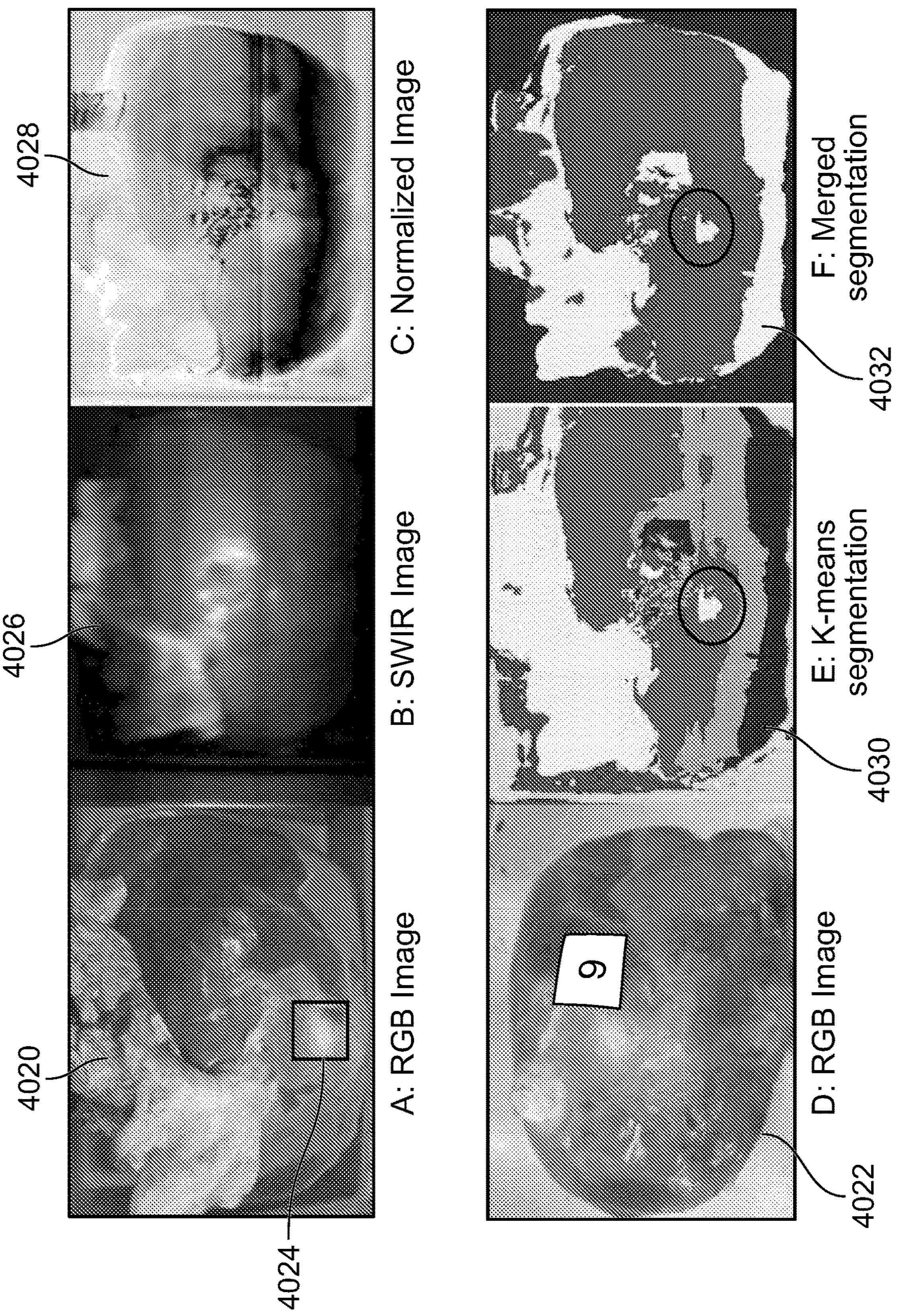
FIG. 40B shows a plurality of images of a beef liver with unsupervised PCA and k-means clustering showing pixels with different characteristics not similar, in accordance with some embodiments of the present specification.

In addition to the binary automated classification of abnormal and normal, as illustrated in FIG. 40A, the method of the present specification is also configured to generate heatmaps 4000 for anomaly detection. It is worth noting that the manually classified anomaly locations were not used in the training stage at all and rather were generated entirely automatically by the discriminator. Moreover, the deep learning network generates reliable results compared to manual segmentation. For example, the network may detect the location of the tumor. In livers 23, 54, 61, and 9, the tumor location is displayed as high contrast in the heatmap and annotated or marked as green boxes 4002, 4004, 4006, 4008 in heatmap. However, the network also finds other anomalies—annotated or marked as red boxes 4010, 4012, 4014, 4016 in the heatmap. These anomalies do not appear in any of the normal images but do appear in the anomalous images. Therefore, the discriminator of the present specification also identifies them as anomalous tissues K-Means Clustering for Anomaly Detection First Case Study As shown in images 4020, 4022 of FIG. 40B, the liver 9 has abscesses within the yellow bounding box 4024. FIG. 40B also shows a SWIR image 4026 and a normalized image 4028 of the liver 9. The k-means clustering result is shown in image 4030 and the merged mask is shown in image 4032.

Figure 40C:
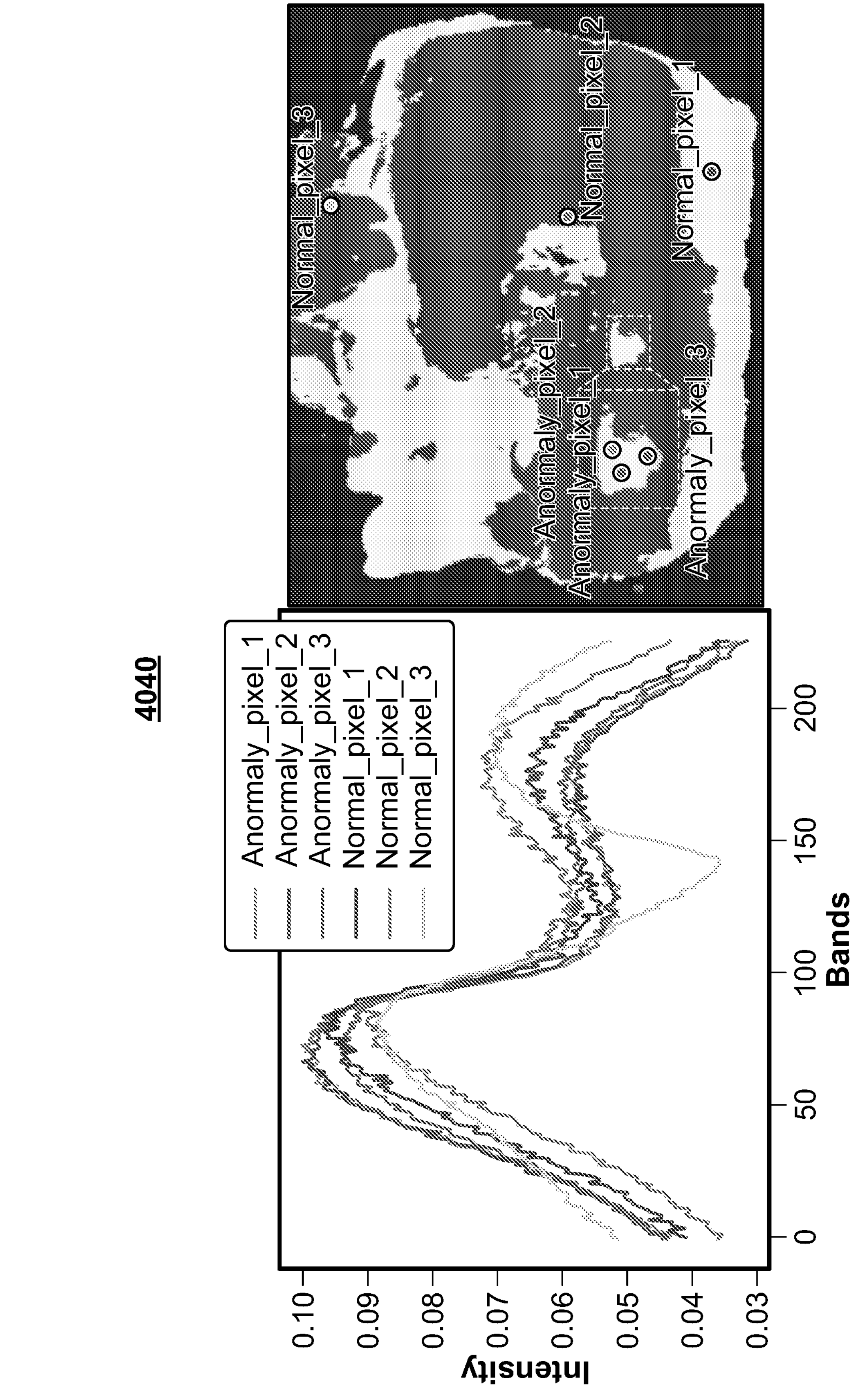
FIG. 40C shows a spectral analysis for sampled pixel vector, in accordance with some embodiments of the present specification.

The pixel vectors within each cluster are sampled for further spectral feature comparison 4040 as shown in FIG. 40C. According to FIG. 40C, the spectral features with same cluster label are very similar while they are different from each other if they do not have the same cluster label. The dimension was further reduced to 3 to visualize the pixel vectors in the 3D space.

Figure 40D:
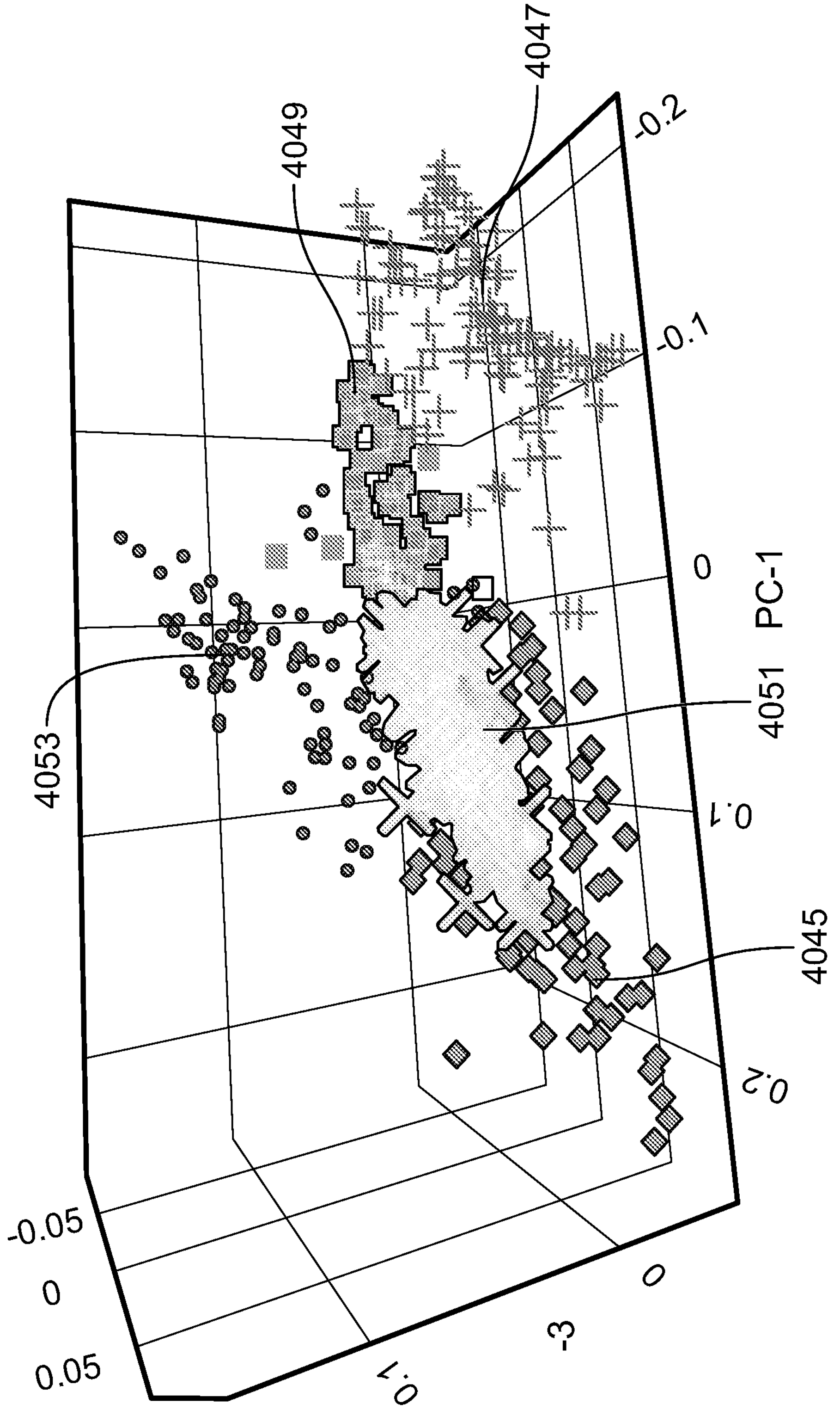
FIG. 40D is a plot of pixel vector in 3D space from SWIR data collected in beef liver, in accordance with some embodiments of the present specification.

From FIG. 40D, it can be seen that the abnormal tissue labeled in diamonds 4045 is are closer to each other. The light yellow cross cluster 4047 is the tray feature and features with pink square 4049 and orange cross 4051 belong to normal tissue. Features of violet round points 4053 may also abnormal in this image since they are scattered far from the normal tissues.

Second Case Study

Figure 41A:
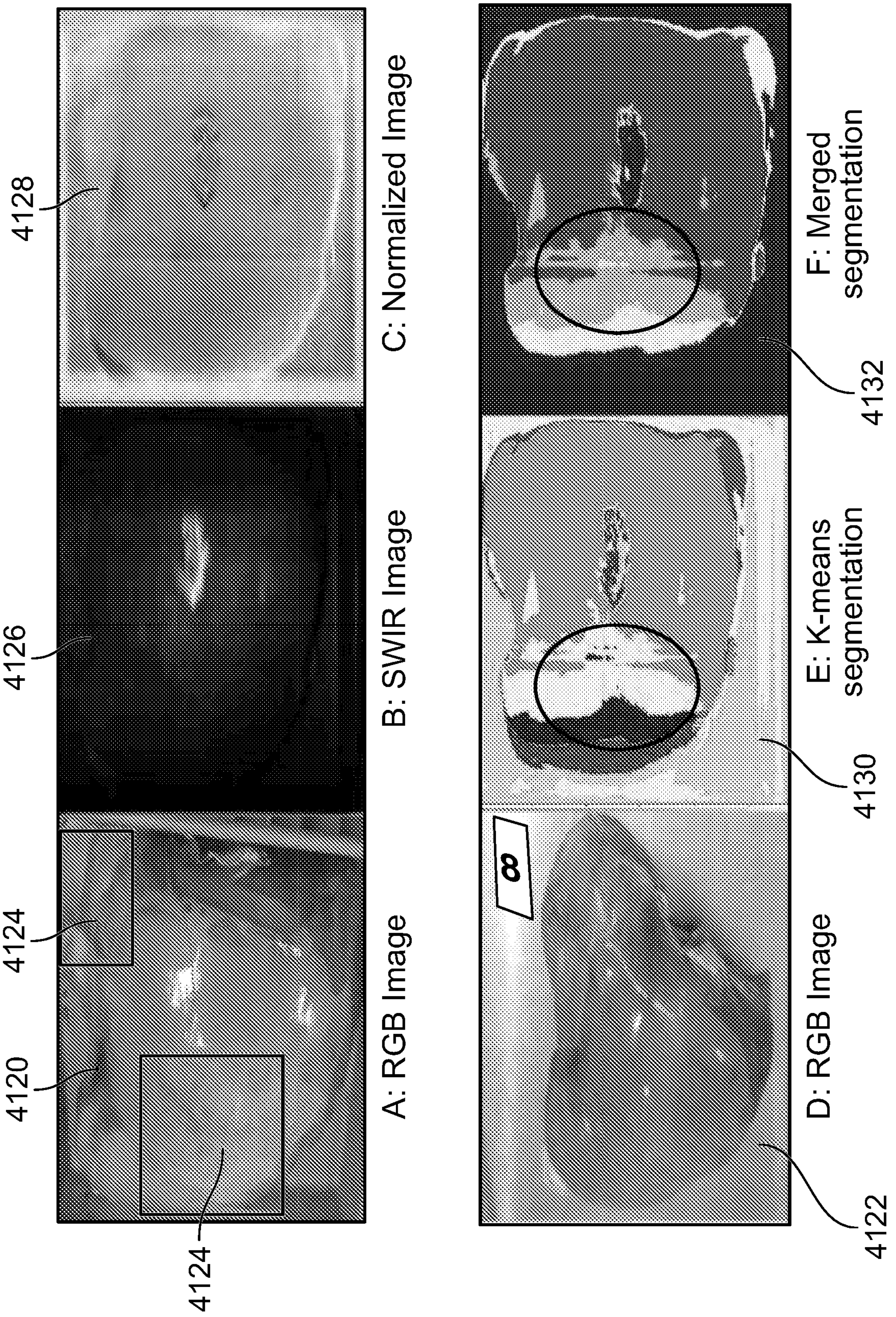
FIG. 41A shows a plurality of images of a beef liver from SWIR hyperspectral using PCA and k-means algorithm to identify regions with anomalies, in accordance with some embodiments of the present specification.

As shown in images 4120, 4122 of FIG. 41A, liver 8 has multiple nodules and fluke within the yellow bounding boxes 4124. FIG. 41A also shows a SWIR image 4126 and a normalized image 4128 of the liver 8. The k-means clustering result is shown in image 4130 and the merged mask is shown in image 4132.

Figure 41B:
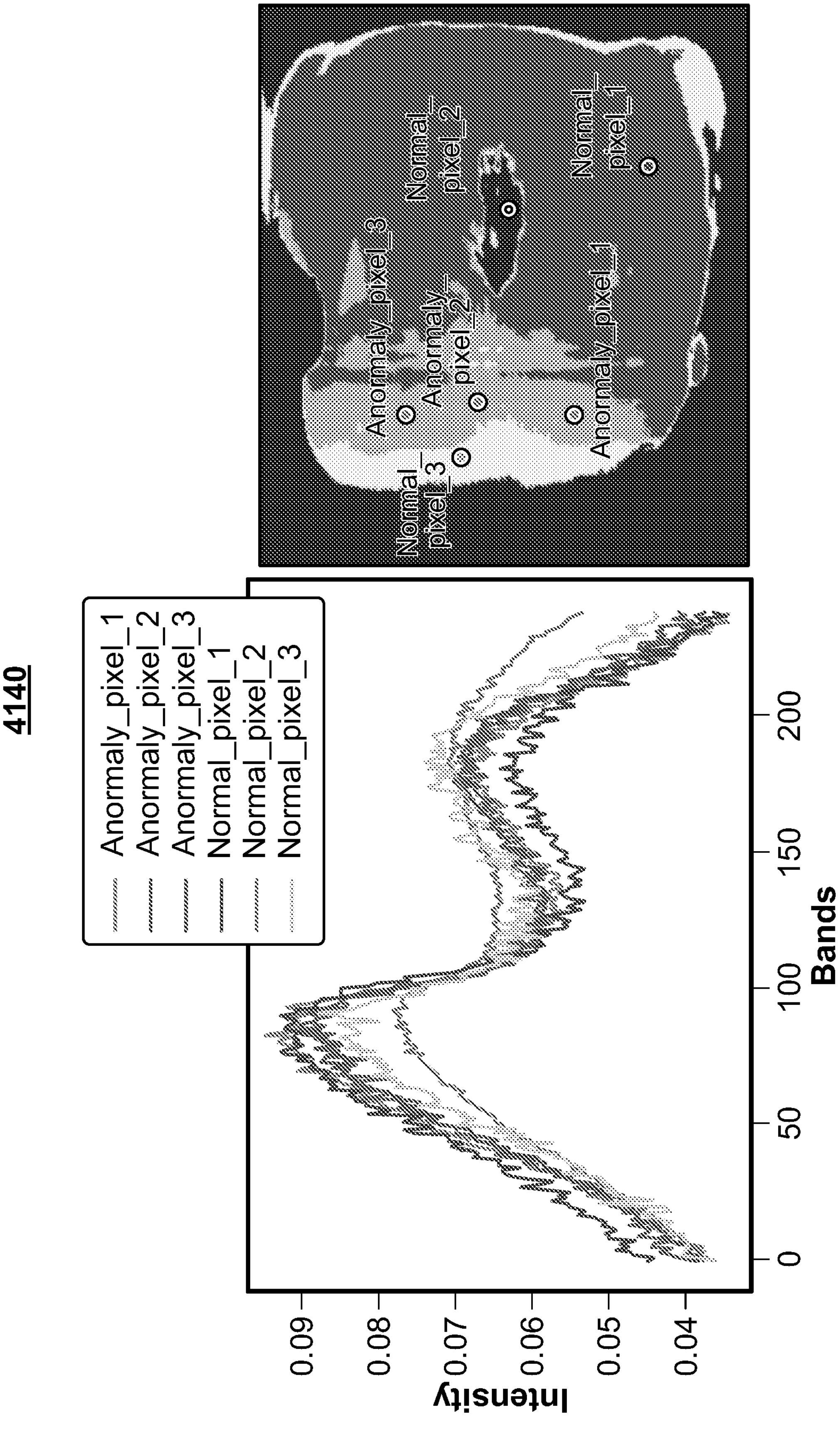
FIG. 41B shows a spectral analysis for sampled pixel vector from SWIR hyperspectral using PCA and k-means algorithm to identify regions with anomalies, in accordance with some embodiments of the present specification.

The pixel vectors within each cluster are sampled for further spectral feature comparison 4140 as shown in FIG. 41B. According to FIG. 41B, the spectral features with same cluster label are very similar while they are different from each other if they do not have the same cluster label. However, when compared with the abscesses feature of liver 9 (FIG. 40A), the feature for multiple nodules are more difficult to be segmented since the features are closer. The dimension is further reduced to 3 to visualize the pixel vectors in the 3D space.

Figure 41C:
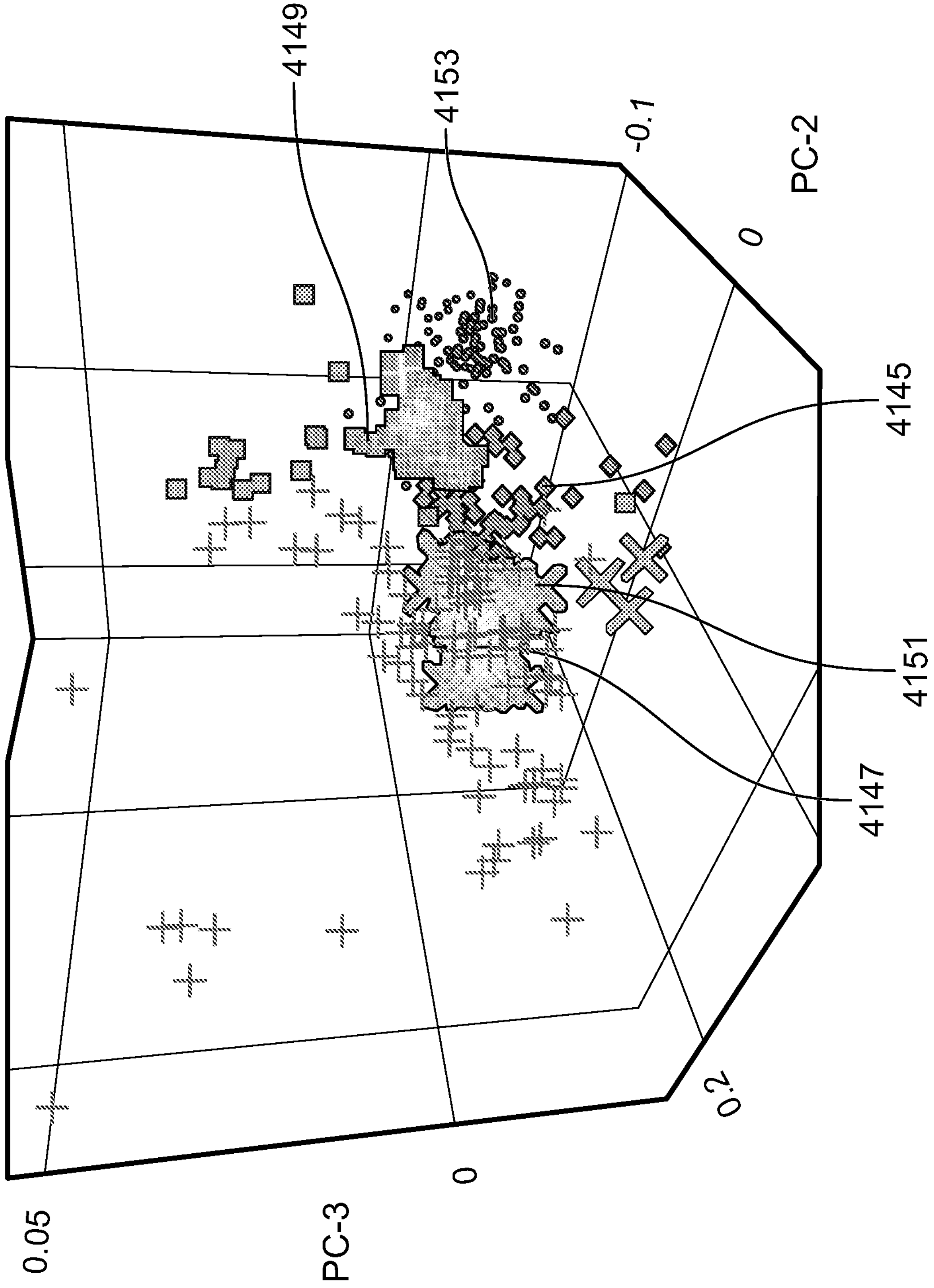
FIG. 41C is a plot of pixel vector in 3D space from SWIR hyperspectral using PCA and k-means algorithm to identify regions with anomalies, in accordance with some embodiments of the present specification.

From FIG. 41C it can be seen that the abnormal tissues labelled in purple diamond 4145 are closer to each other. The light yellow cross cluster 4147 is the tray feature. The features with the pink square 4149, orange cross 4151 and violet round points 4153 belong to normal tissue.

Sheep Organ Scanning

Scanning of sheep organs and post-mortem inspection was performed in a similar way to that of beef organs. However, image data pre-processing, feature extraction, and machine learning models developed were different than those described above for beef cattle. The main difference was that data extraction was done manually in selected regions of interest and no spatial pixel information was analyzed.

Materials and Methods for Sheep Organs

Figure 42A:
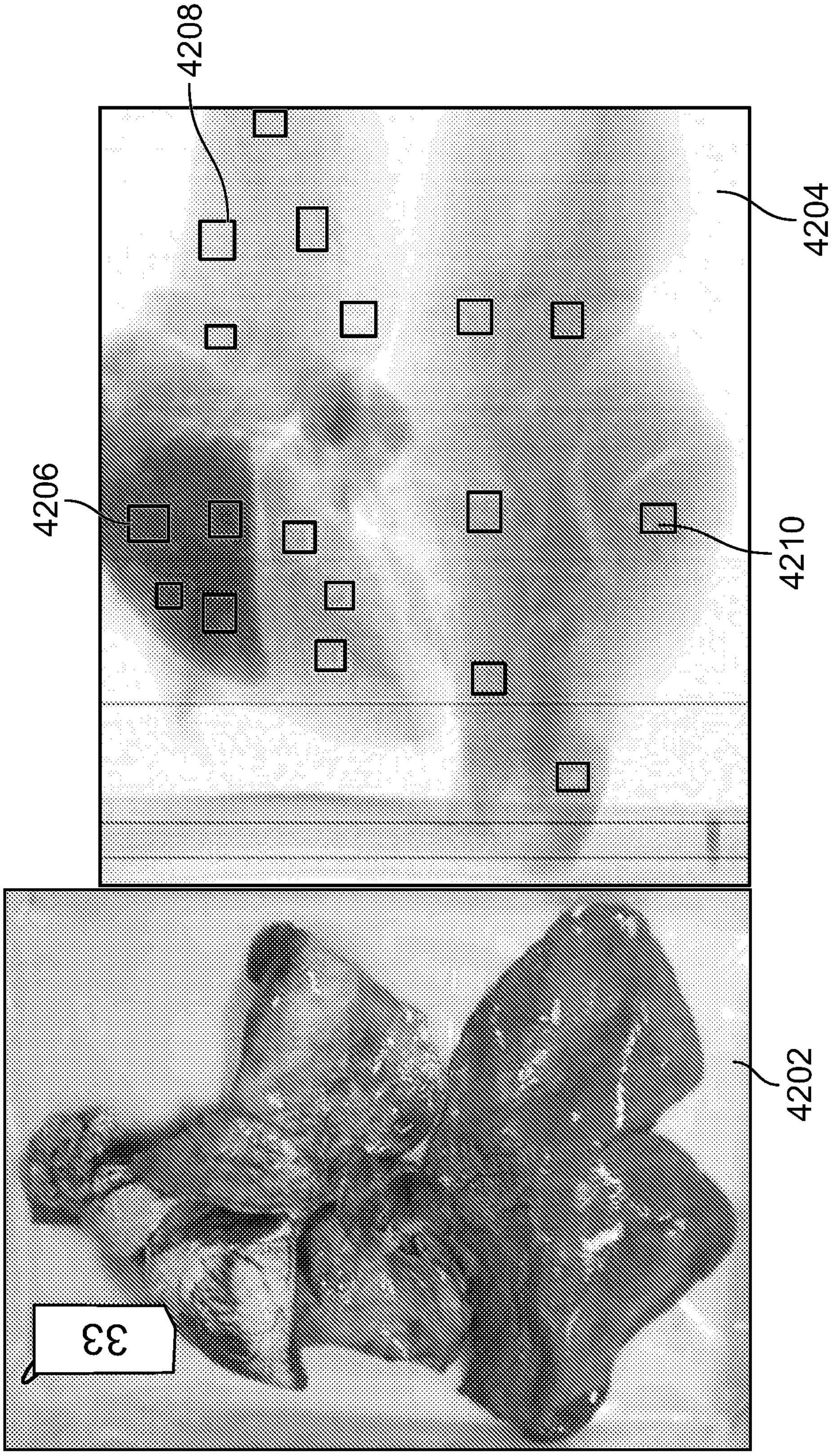
FIG. 42A shows RGB and marked up X-ray image of healthy lamb pluck, in accordance with some embodiments of the present specification.

Sheep organs were examined using the same X-ray procedure as per the cattle trial. Different organs were sampled from a collaborating abattoir and point of sale. Furthermore, one lamb pluck (heart, lungs and liver) were evaluated for differentiation of organ type within the same image. The color differences due to tissue density made this easy to the human eye and as a result, the marked-up X-ray image 4204 in FIG. 42A shows clear differences in color that could be corroborated by the RGB image 4202. The RGB image 4202 is a photograph of healthy lamb pluck and the X-ray image 4204 shows marking or annotations wherein heart is green 4206, lung is yellow 4208, and liver is red 4210.

Results for Sheep Organs

FIG. 42A may be used to develop prediction algorithms for organ type differentiation using multi-energy X-ray attenuation. Note that marking ROI in FIGS. 42A and 42B has been done avoiding visible fat, obviously discolored, or regions of transition between organs.

Figure 42B:
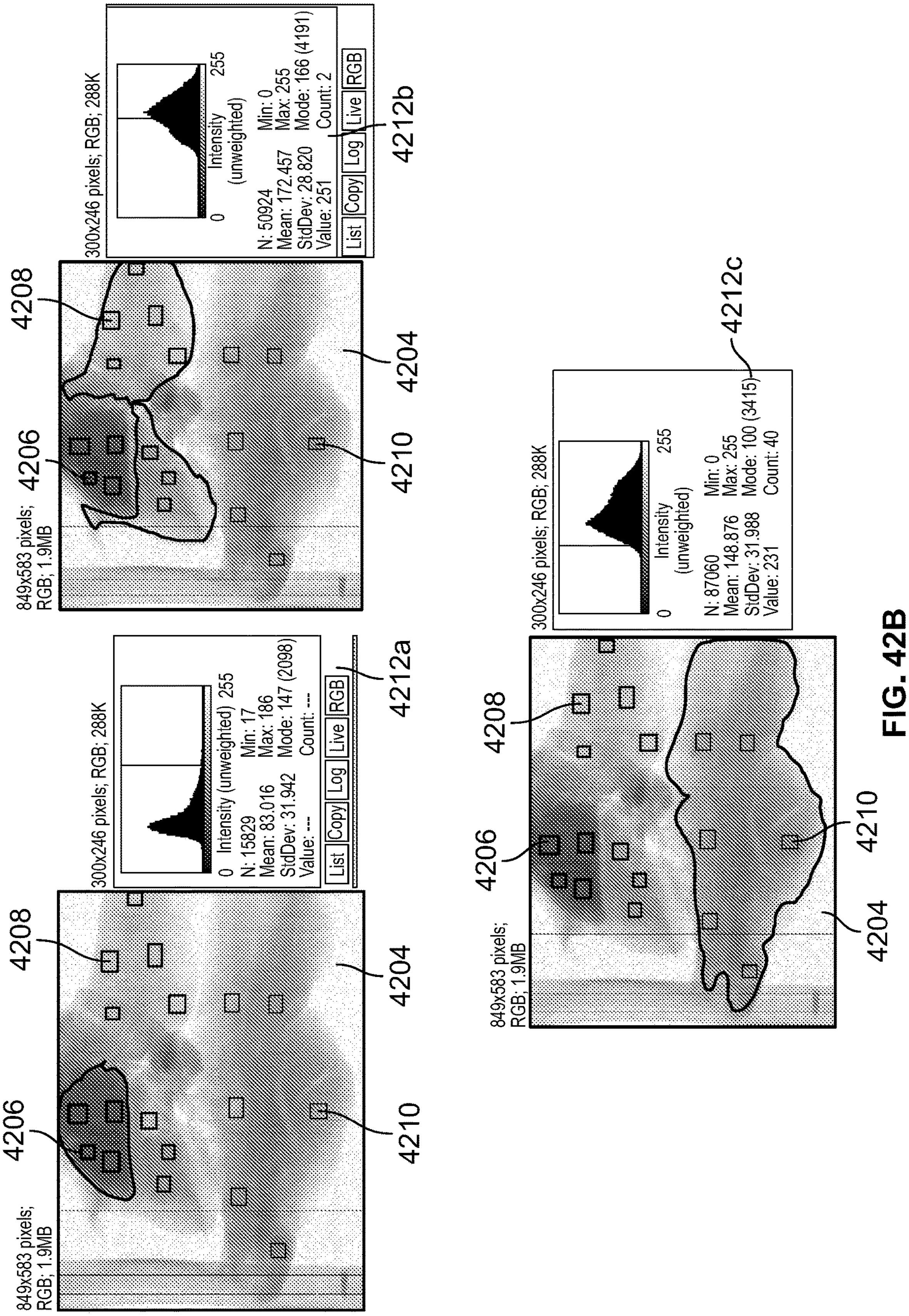
FIG. 42B shows differences in multi-energy X-ray intensity between three organ types of a lamb pluck, each marked-up and with an intensity histogram of a marked organ of interest, in accordance with some embodiments of the present specification.

FIG. 42B shows the X-ray image 4204 indicative of differences in multi-energy X-ray intensity between the three organ types of the lamb pluck: heart, lung, and liver, each marked-up and with a corresponding intensity histogram 4212*a*, 4212*b*, 4212*c* of the yellow marked organ of interest 4208, in accordance with some embodiments of the present specification.

Image processing software was employed to determine the intensity of the X-rays through each type of organ tissue in FIG. 42A, where a lower intensity meant the organ tissue was denser. The images in FIG. 42B show that heart (int=83) was the densest followed by liver (int=149) and then lung (int=172). These intensities are shown clearly in the changes in color (heart is green 4206, lung is yellow 4208, and liver is red 4210) in FIG. 42B.

Sheep lungs were selected from the collaborating abattoir due to the presence of caseous lymphadenitis (CLA), known commonly as cheesy glands, in the lymph nodes surrounding the lungs. FIGS. 43A through 43D show two sheep lungs that were condemned due to CLA within the lymph nodes of lung tissue that could be easily identified using X-ray attenuation. Meanwhile, FIGS. 43E and 43F show the marked-up X-ray images and a small ROI to compare the intensity of healthy and diseased regions of the same lung.

Figure 43A:
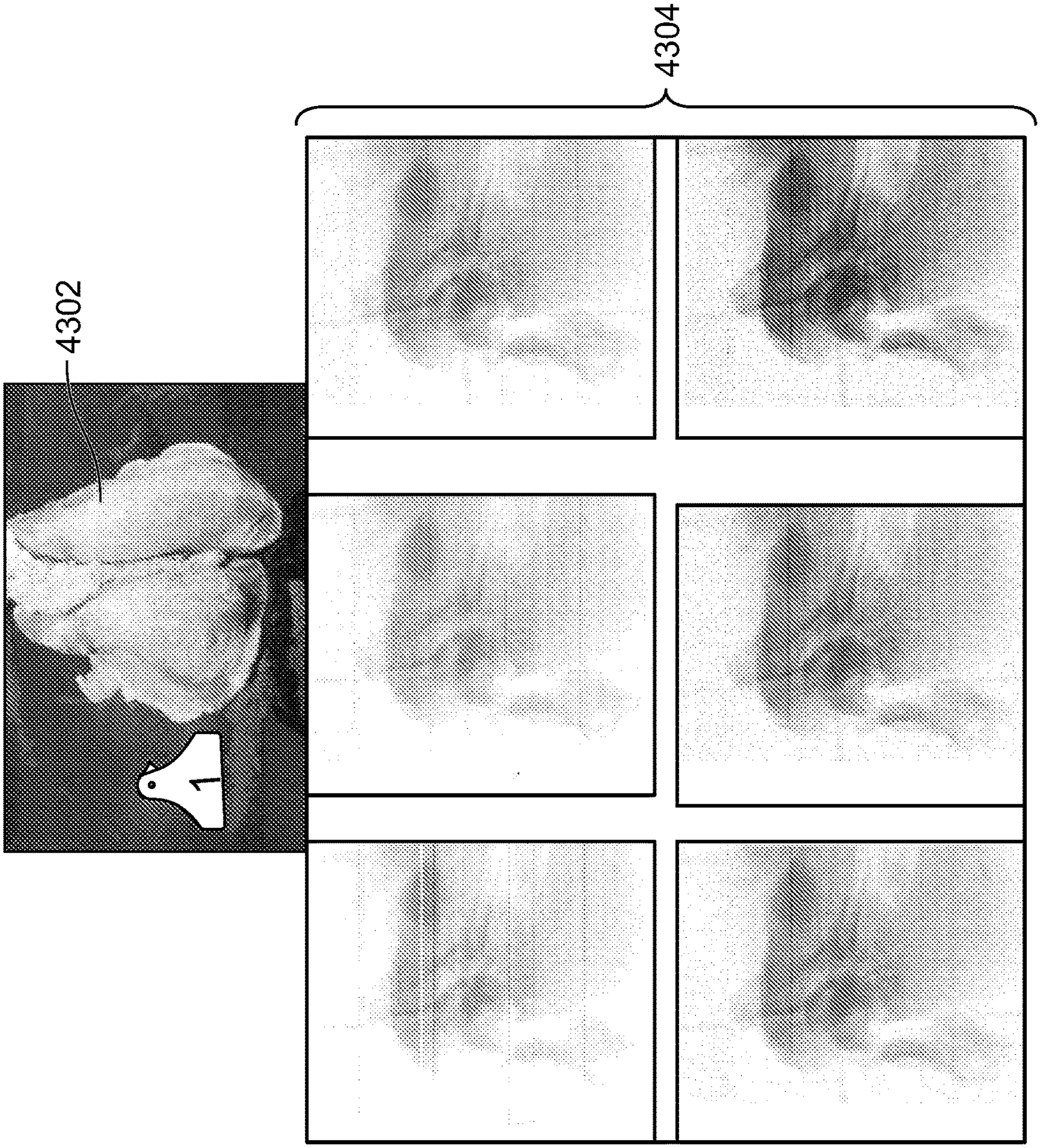
FIG. 43A shows an RGB image of a sheep lung showing evidence of CLA and six X-ray images taken at different energy levels, in accordance with some embodiments of the present specification.

Specifically, FIG. 43A is an RGB image 4302 of a sheep lung showing evidence of CLA and six X-ray images 4304 taken at different energy levels, in accordance with some embodiments of the present specification.

Figure 43B:
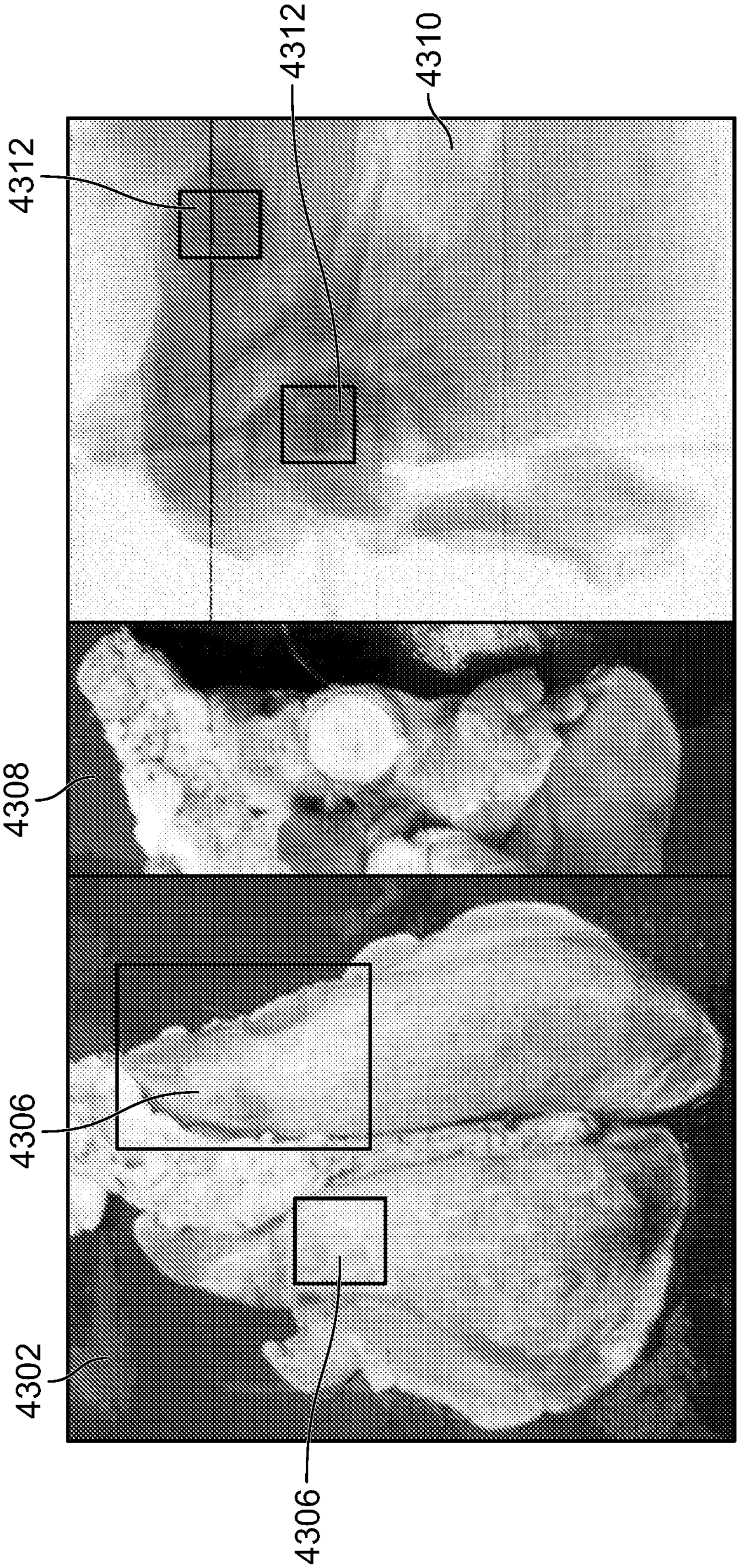
FIG. 43B shows first, second and third images of the sheep lung, in accordance with some embodiments of the present specification.

FIG. 43B is an RGB image 4302 showing markings or annotations 4306 indicative of CLA in mediastinal lymph nodes via palpation, another RGB image 4308 post-excision (cross-section of right-hand side) and an X-ray image 4310 with markings or annotations 4312. The darker areas marked in the X-ray image 4310 correspond to CLA in the mediastinal lymph nodes of the lung tissue, which is marked in both photographs. The middle photograph 4308 shows a large cheesy gland which corresponds to the left lung, which is the right-hand side of the first and last images 4302, 4310. No image was taken of the right lung (left-hand side of the image) which is marked-up as being a potential region of cheesy gland occurrence, as shown in the X-ray image 4310.

Figure 43C:
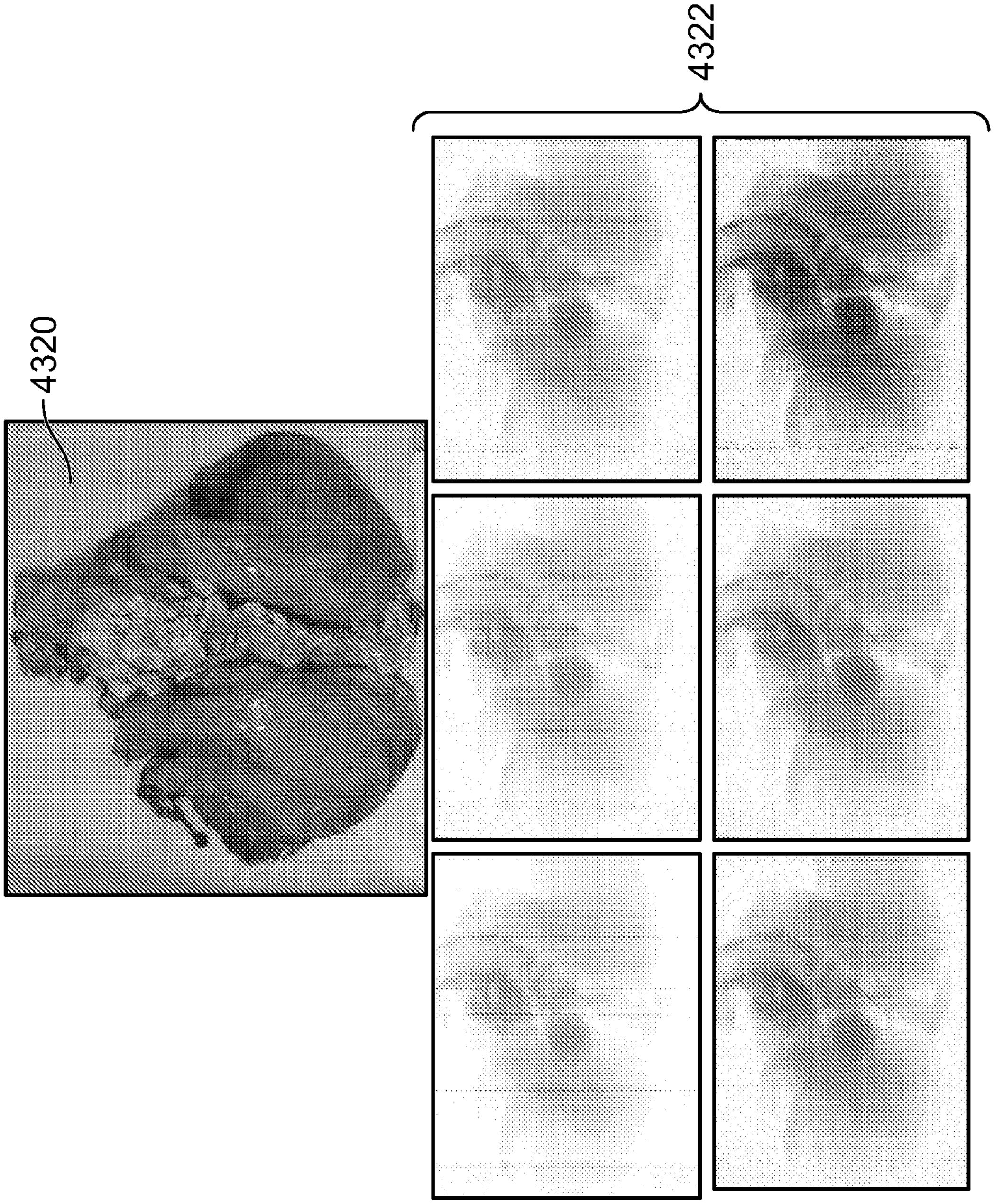
FIG. 43C shows the RGB image of another sheep lung showing evidence of abscessation and six X-ray images taken at different energy level, in accordance with some embodiments of the present specification.
Figure 43D:
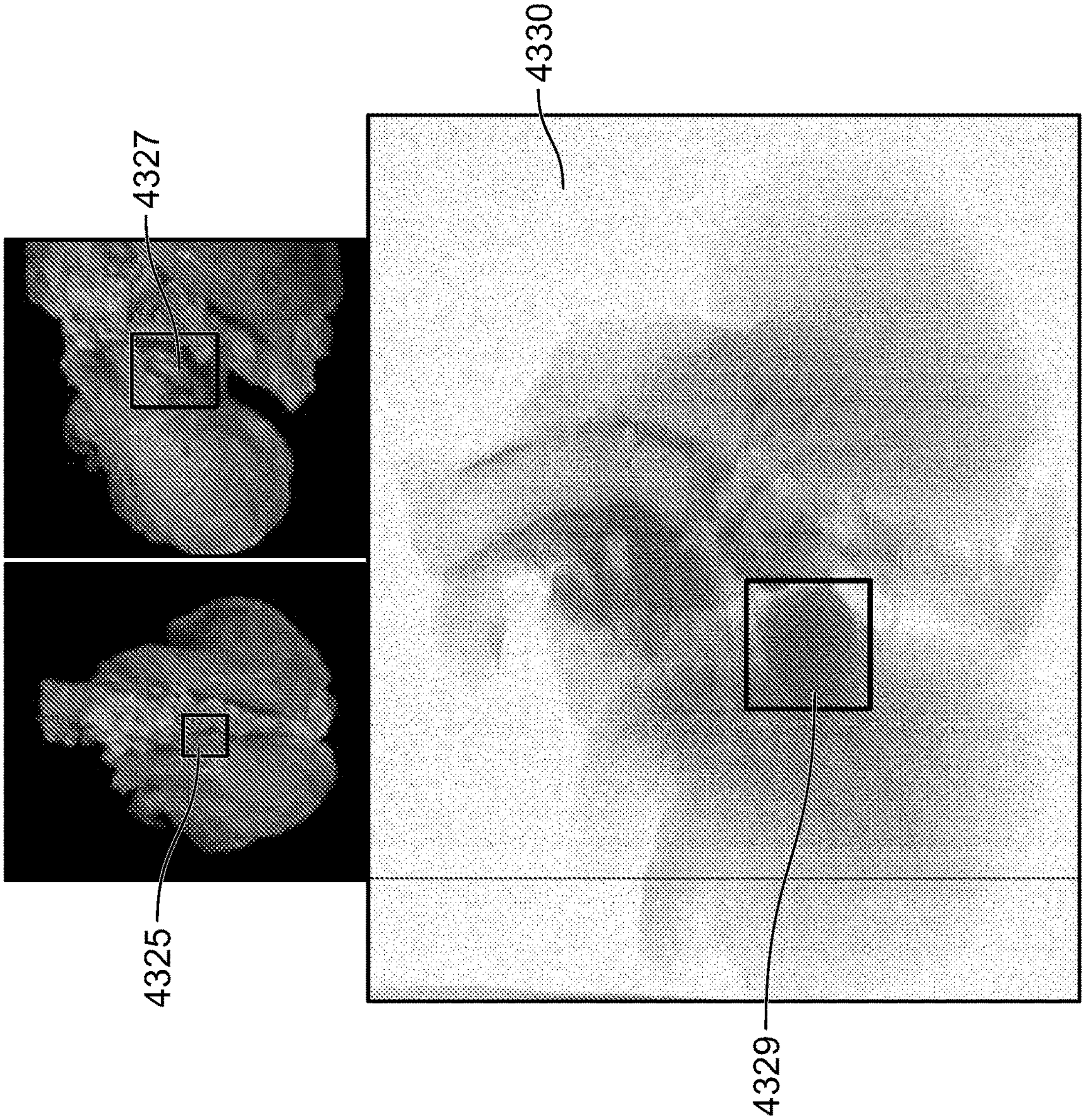
FIG. 43D shows an RGB image and corresponding X-ray image indicative of multifocal abscessation in the right lung of a sheep, in accordance with some embodiments of the present specification.
Figure 43E:
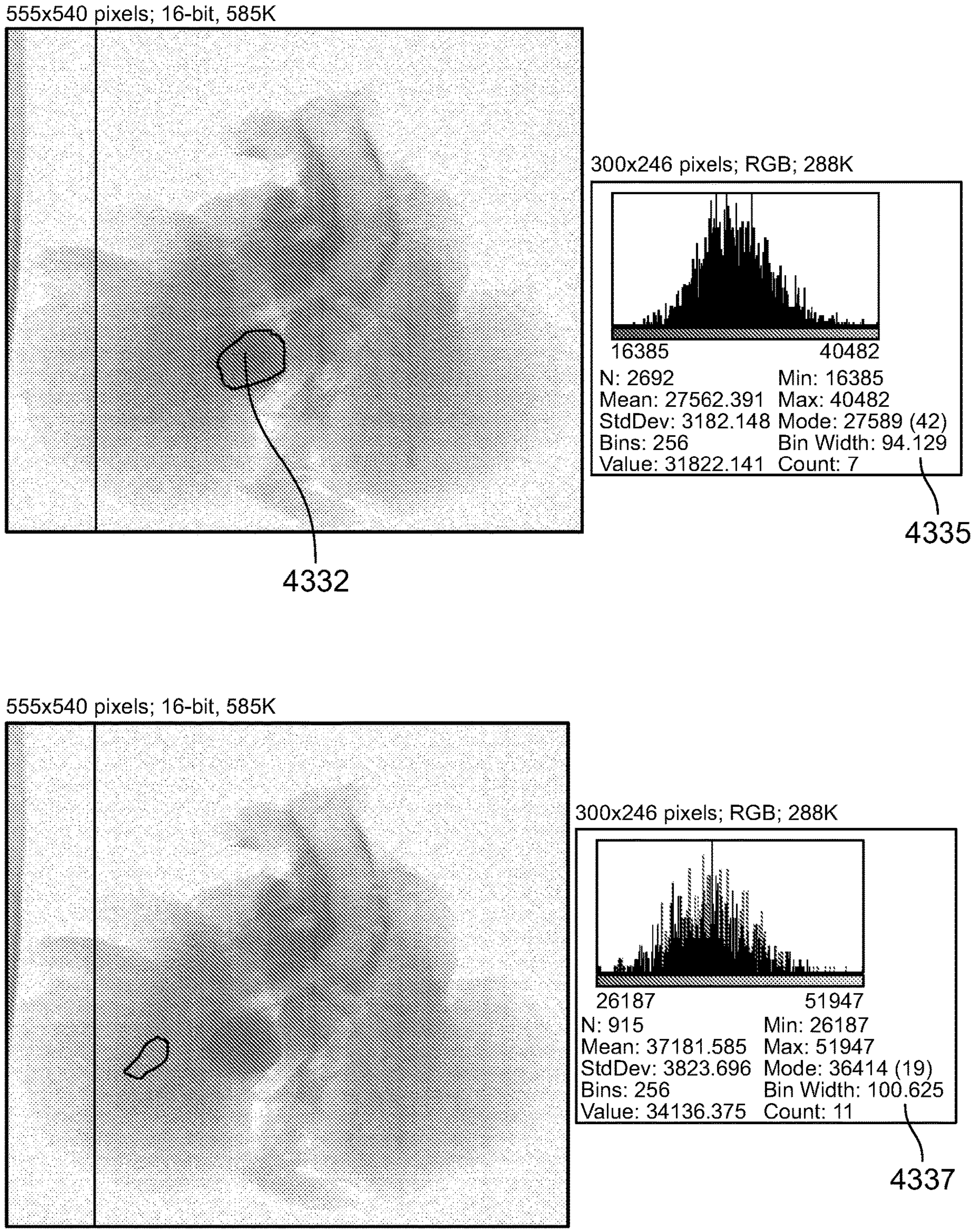
FIG. 43E shows intensity histograms for abscess and healthy regions of the sheep lung of FIGS. 43C and 43D, in accordance with some embodiments of the present specification.
Figure 43F:
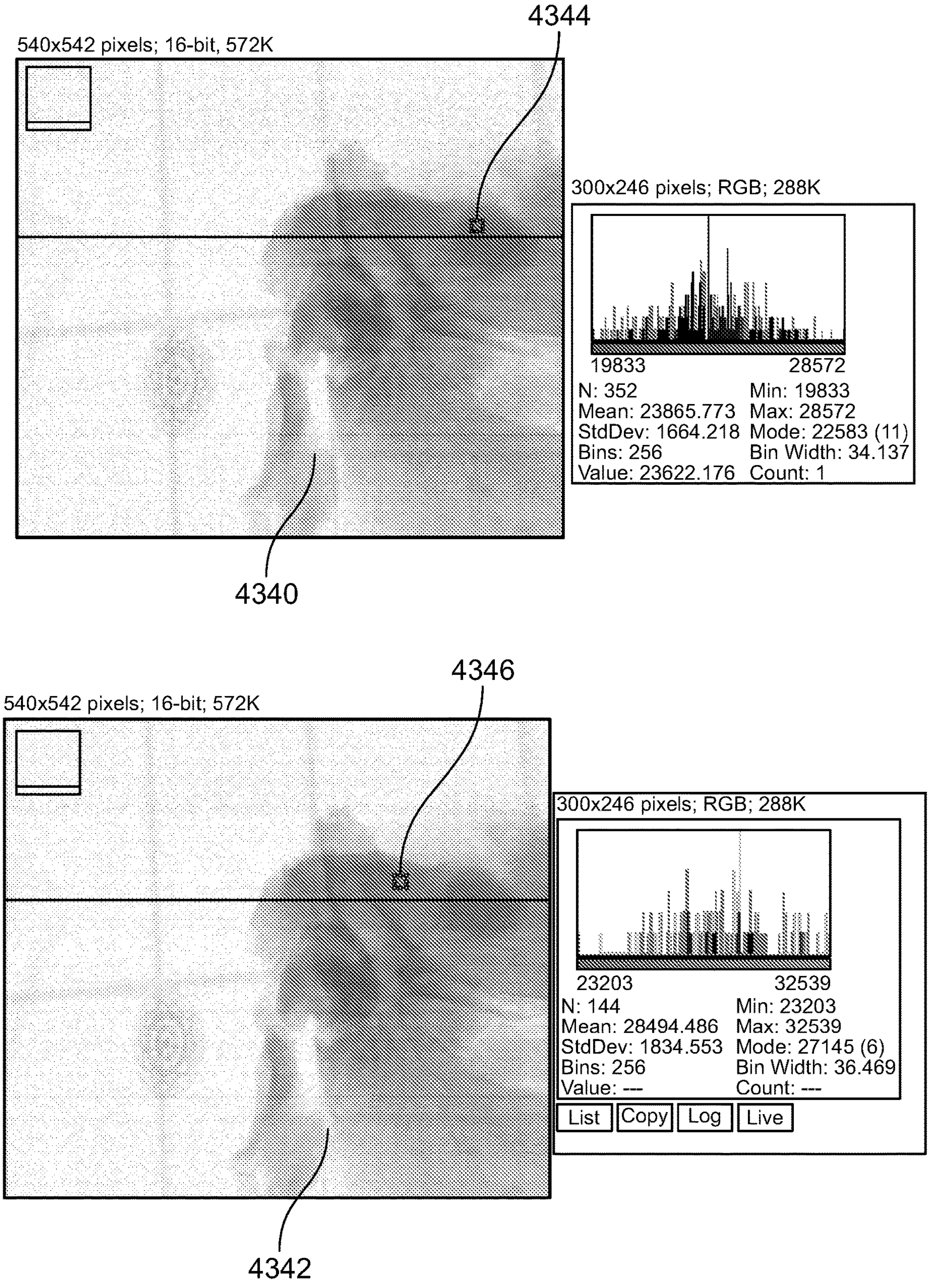
FIG. 43F shows another set of intensity histograms for abscess and healthy regions of the sheep lung of FIGS. 43C and 43D, in accordance with some embodiments of the present specification.

FIG. 43C shows the RGB image 4320 of another sheep lung showing evidence of abscessation and six X-ray images 4322 taken at six different energy levels, in accordance with some embodiments of the present specification. A large lesion is present in within the right lung displayed in the six X-ray images 4322 of FIG. 43C, with the photographed lung rejected for human consumption following palpation. The darker color in the corresponding region of the right lung (left-hand side) is seen in FIG. 43C and is marked-up as annotation 4325 in FIG. 43D. FIG. 43D shows that when sectioned, a large abscess filled with pus (marked-up as annotation 4327) is revealed as the reason for rejection. This lesion is clearly seen and a ROI 4329 is easily marked in the X-ray image 4330 due to the higher density (darker and lower intensity area, int=27562) zone is present in the corresponding location on the image in FIG. 43E (marked-up with purple 4332) compared to a healthy subset of lung tissue which is lighter in color due to its lower density and greater intensity (int=37182). Specifically, FIG. 43E shows first and second intensity histograms 4335, 4337 for abscess and healthy regions of the sheep lung from FIGS. 43C and 43D.

Similarly, the difference in intensity encountered when imaging sheep lungs with abscessation also occurred in the sheep lung showing evidence of CLA. The images 4340, 4342 in FIG. 43F show the marking of "healthy" and "unhealthy" lung tissue using purple squares 4344, 4346 to differentiate by intensity, where the darker colored cheesy gland is denser and less intense (int=23866) and therefore darker than the healthy lung tissue (int=28495).

Figure 44:
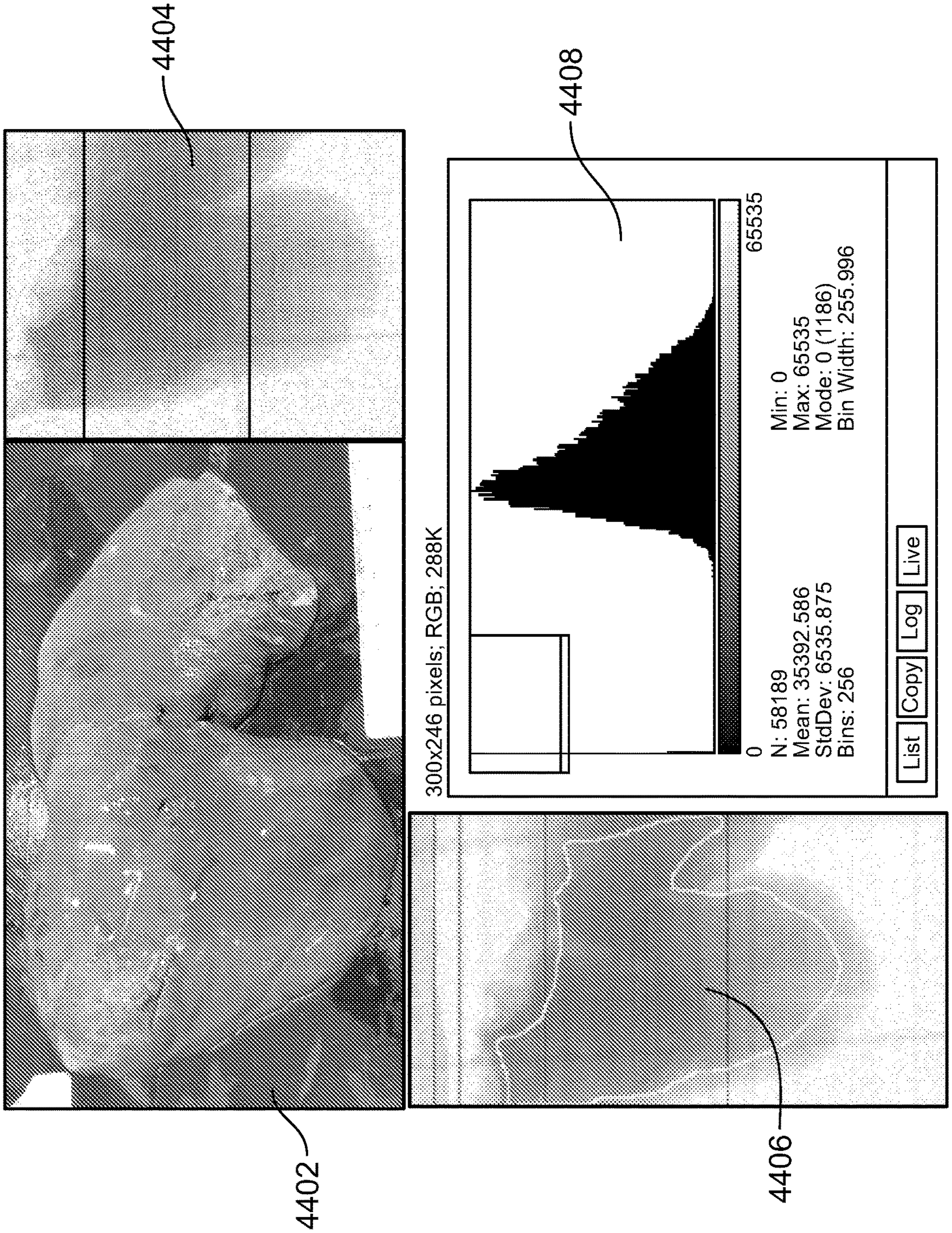
FIG. 44 shows an RGB image and corresponding X-ray image of a diseased sheep liver, in accordance with some embodiments of the present specification.

The RGB image 4402 of a diseased sheep liver in FIG. 44 has evidence of focally extensive capsular fibrosis. As per the beef lungs from the beef organ scanning trial, there is no visible fault within the X-ray image 4404, which is made more difficult by only ~70% of the liver being captured. Also shown is an intensity histogram 4408 within yellow polygon 4406 of the X-ray image 4404.

Figure 45:
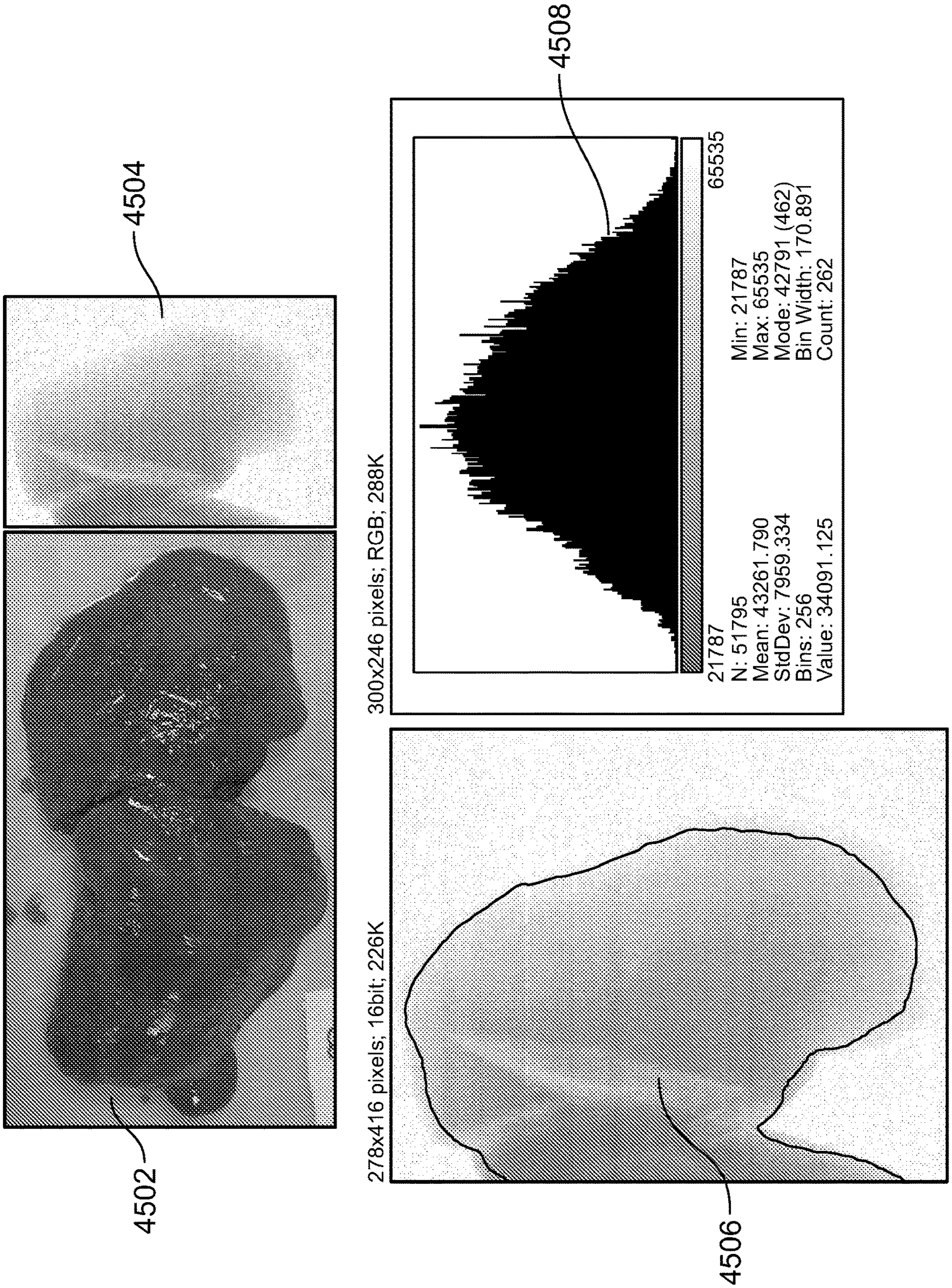
FIG. 45 shows an RGB image and an X-ray image of a healthy sheep liver, in accordance with some embodiments of the present specification.

FIG. 45 shows an RGB image 4502 and an X-ray image 4504 of a healthy sheep liver, in accordance with some embodiments of the present specification. Also shown is an intensity histogram 4508 within yellow polygon 4506 of the X-ray image 4504. The intensity histograms 4408, 4508 in FIGS. 44 and 45 can be used to compare the diseased liver with a healthy one from the butcher. Color differences in the photographs are noticeable, while the cut-off of both X-ray images affects the amount of liver captured for image analysis. When comparing intensities, the diseased liver showed lower intensity (darker cooler and denser tissue due to capsular fibrosis) than the healthy liver passed for human consumption, with mean intensities of 35393 and 43262, respectively.

Figure 46A:
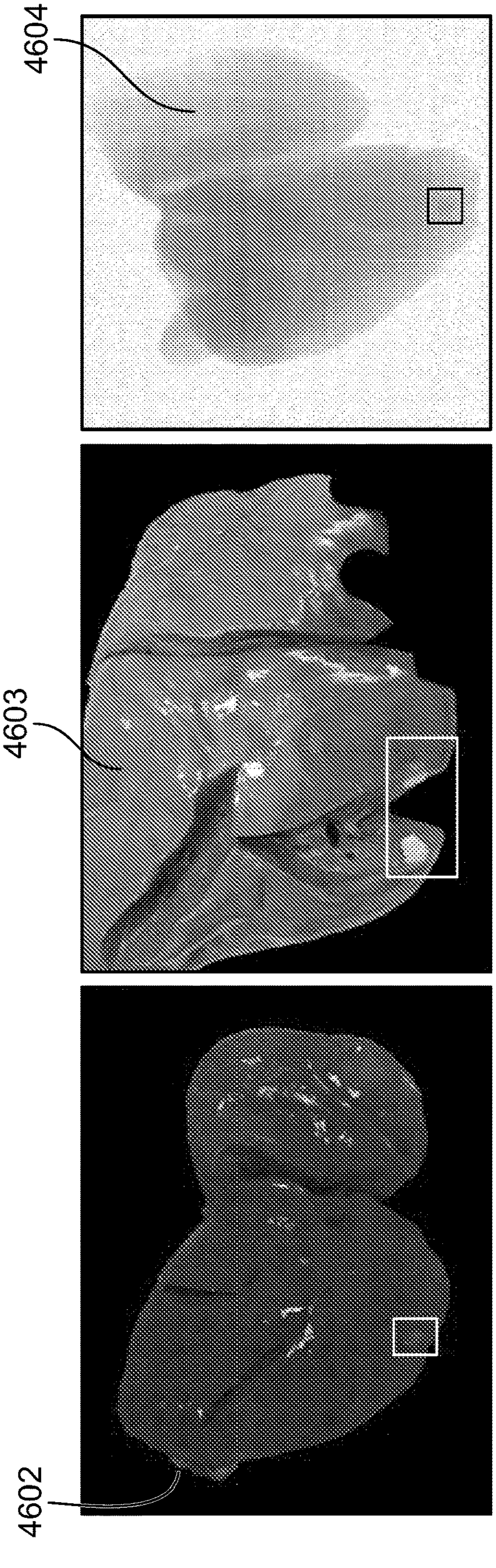
FIG. 46A shows RGB images and an X-ray image of a damaged sheep liver, in accordance with some embodiments of the present specification.
Figure 46B:
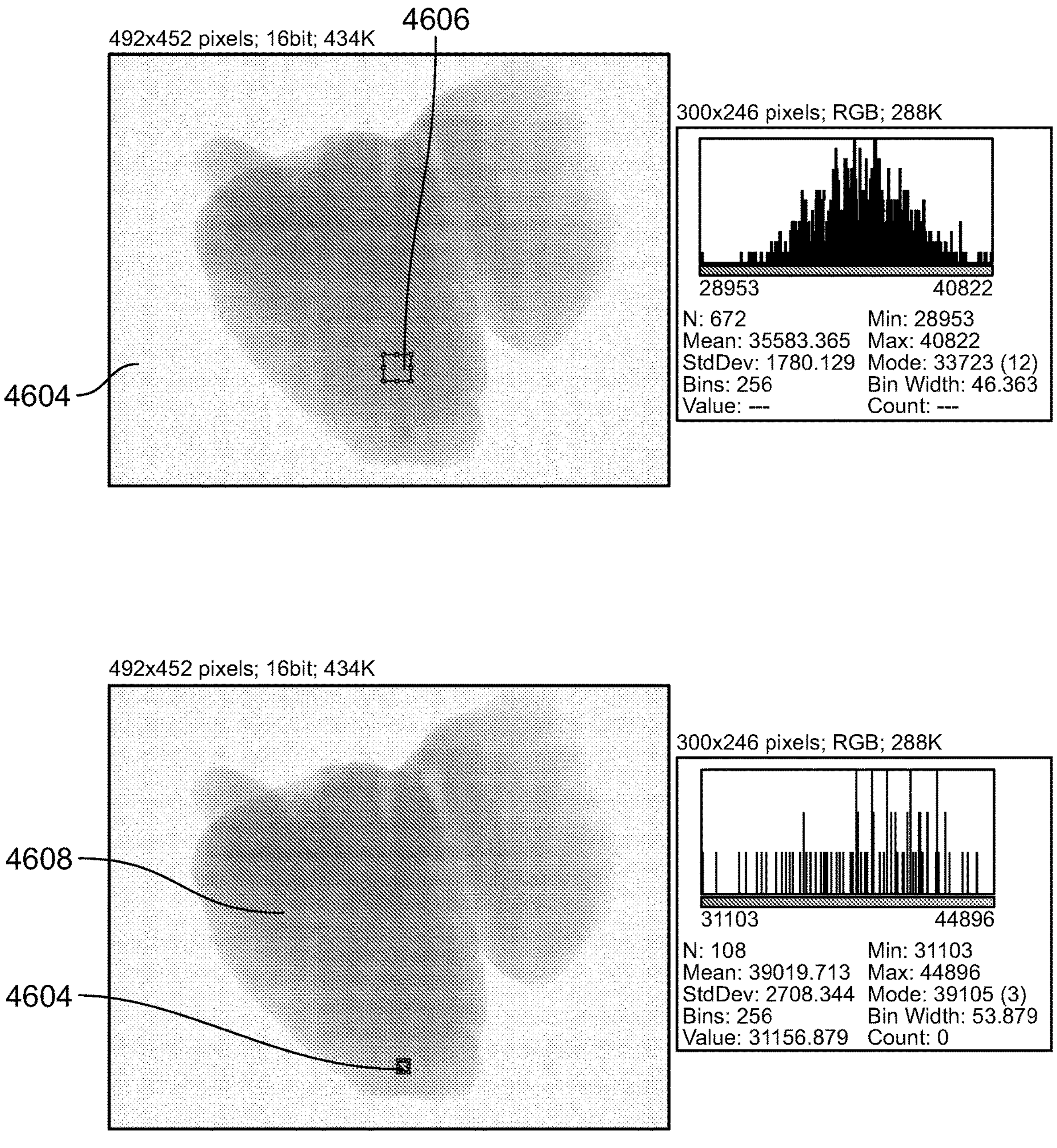
FIG. 46B shows marked-up X-ray images of the damaged sheep liver, in accordance with some embodiments of the present specification.

An RGB image 4602 of a sheep liver containing visible evidence of a lesion is displayed in FIG. 46A, whereupon a hepatic lesion (1 cm diameter) was circumscribed upon one sheep liver, which was diagnosed as having hepatitis. This was visible in the X-ray image 4604 in FIG. 46A. Image 4603 shows the liver cut for cross-section. In the same liver, the "normal" liver tissue was compared with the localized hepatic lesion and found there to be a slight increase in intensity (35583 vs. 39020). FIG. 46B shows the X-ray image 4604 with first and second markings 4606, 4608 corresponding to normal tissue and localized hepatic lesion in sheep liver and their corresponding intensity histograms.

Figure 47:
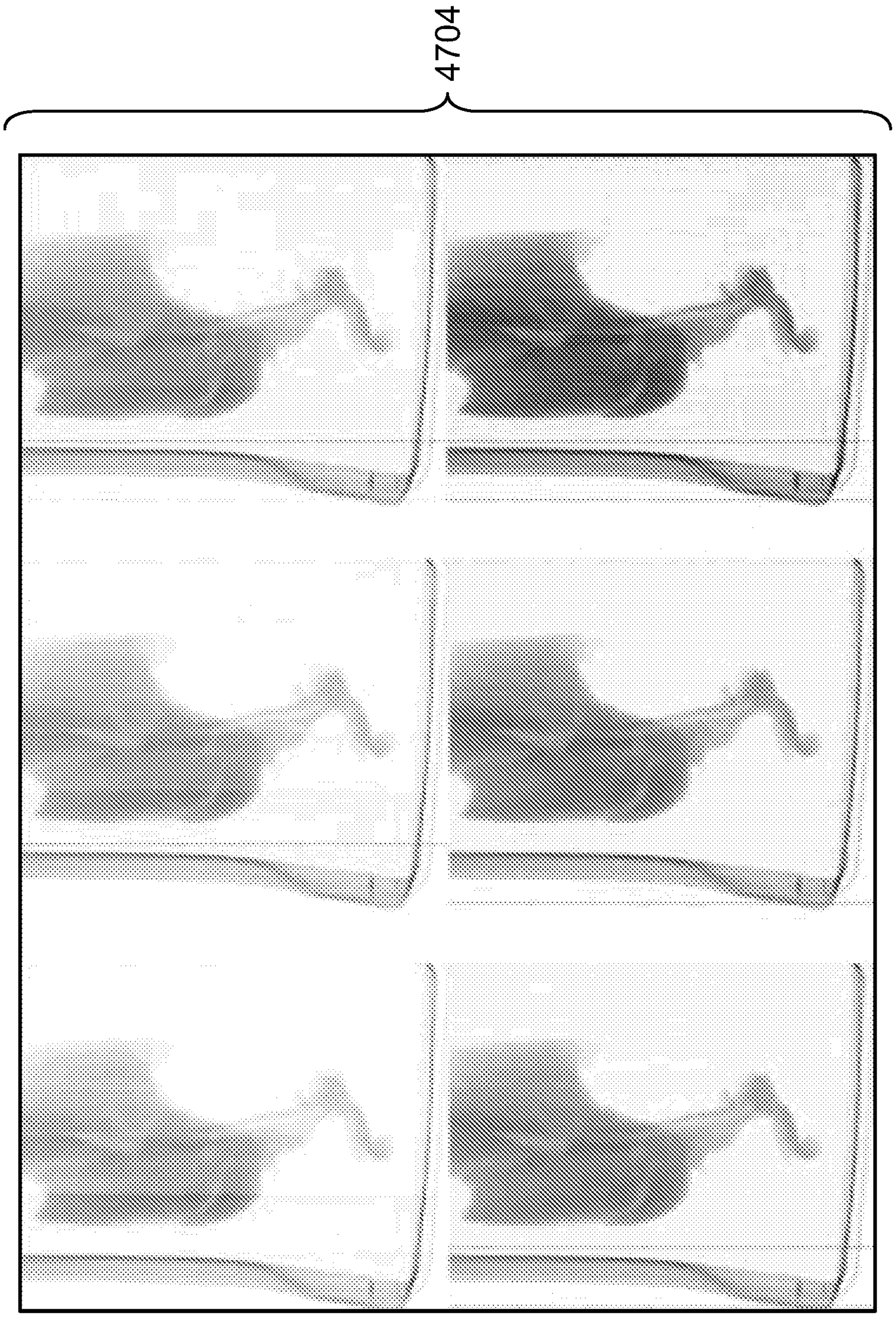
FIG. 47 shows multi-energy X-ray scan of lamb lungs at varying greyscale contrast, in accordance with some embodiments of the present specification.

Lamb Lung. Lamb lungs were also scanned using the multi-sensory system of the present specification. Example of MEXA image data 4704 is presented in FIG. 47. The image data 4704 provides a contrast between airways and lung tissue and may be employed to detect pneumonia.

Figure 48:
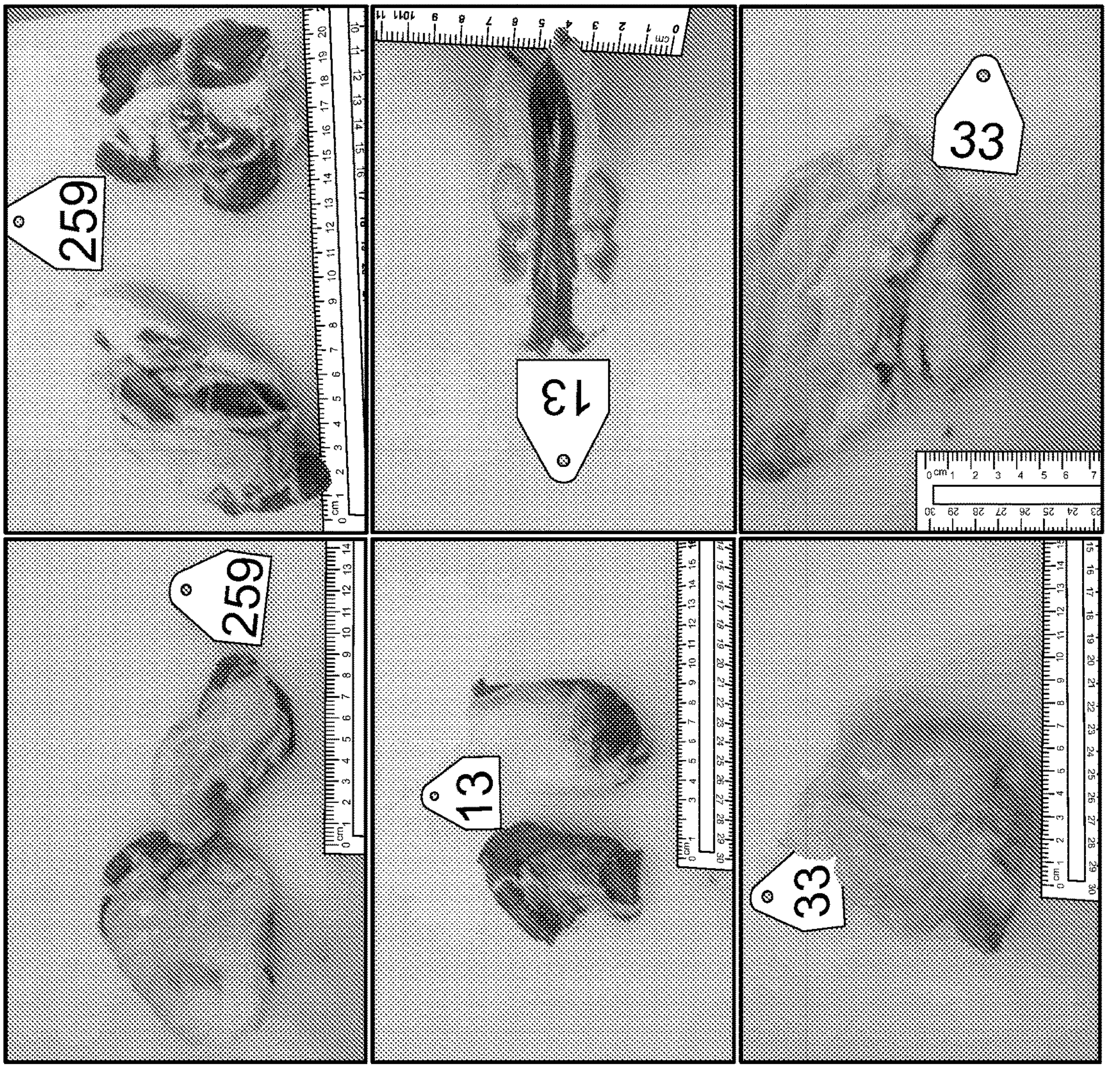
FIG. 48 shows a plurality of images of cheesy glands in mutton, in accordance with some embodiments of the present specification.

Cheesy glands. Another issue of importance in the abattoirs is the detection of cheesy glands. Example photographs 4802 of cheesy glands in mutton (closed and opened) are shown in FIG. 48.

Hyperspectral Data and Detection Algorithms for Sheep Organs

Figure 49:
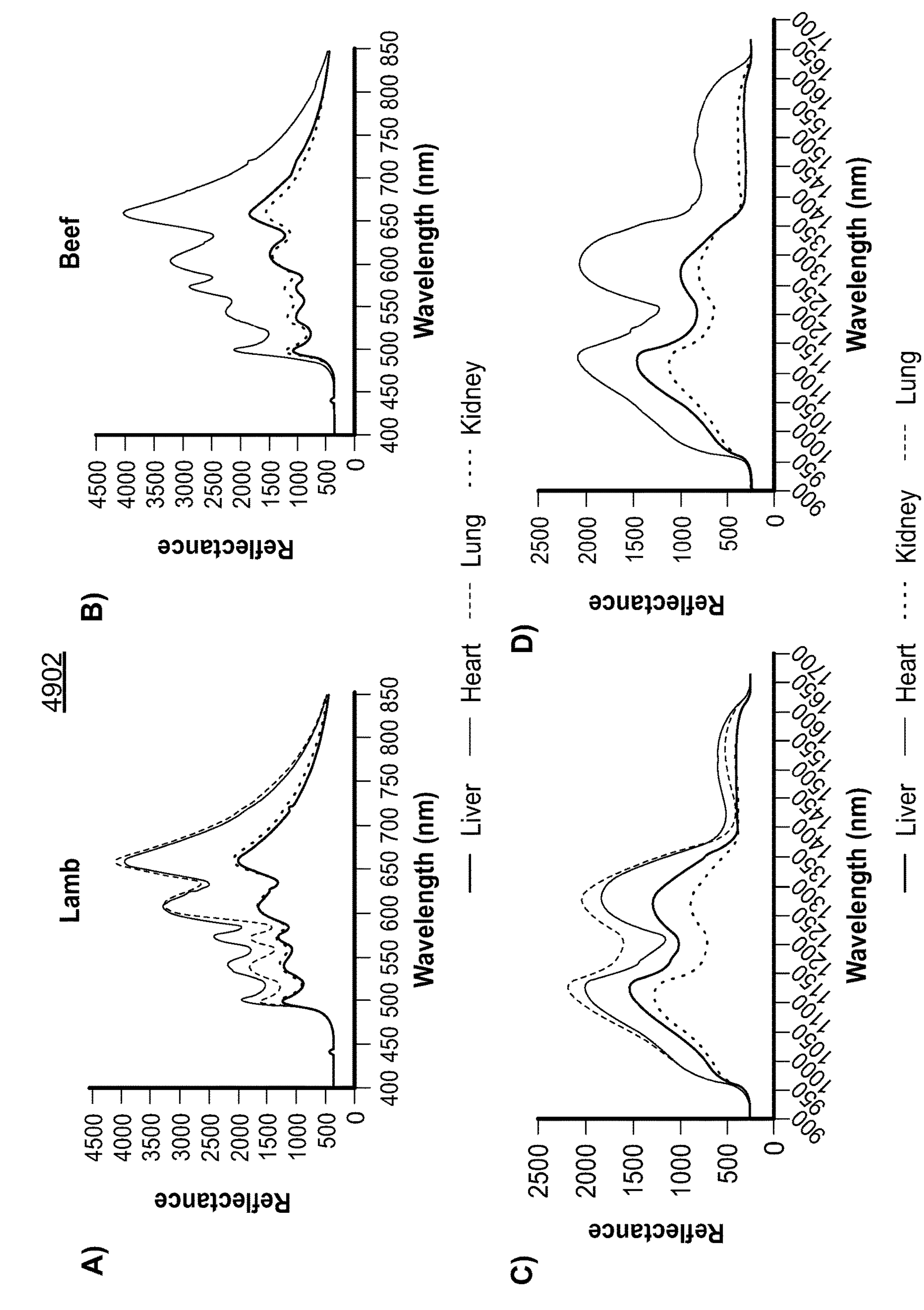
FIG. 49 shows visible and SWIR surface-reflected hyperspectral intensity spectra for mixed sheep and beef organs, in accordance with some embodiments of the present specification.
Figure 50:
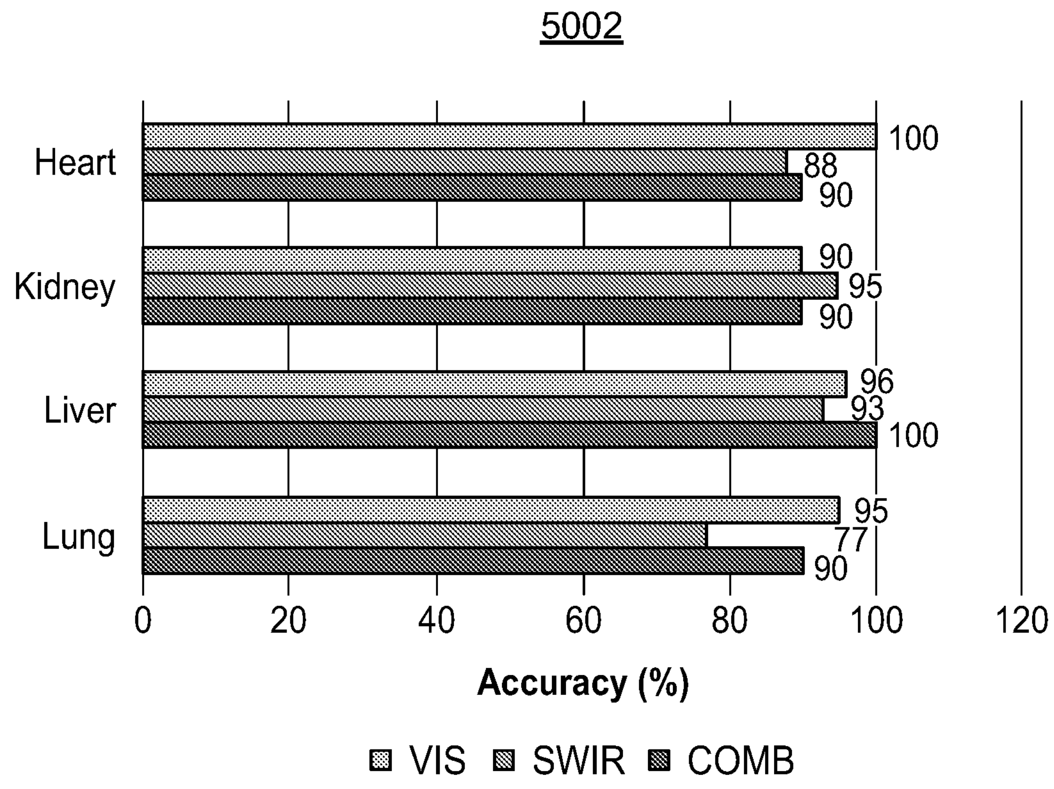
FIG. 50 shows first and second plots indicative of automated organ classification accuracy for visible, SWIR and their combination using two classification models, in accordance with some embodiments of the present specification.
Figure 50:
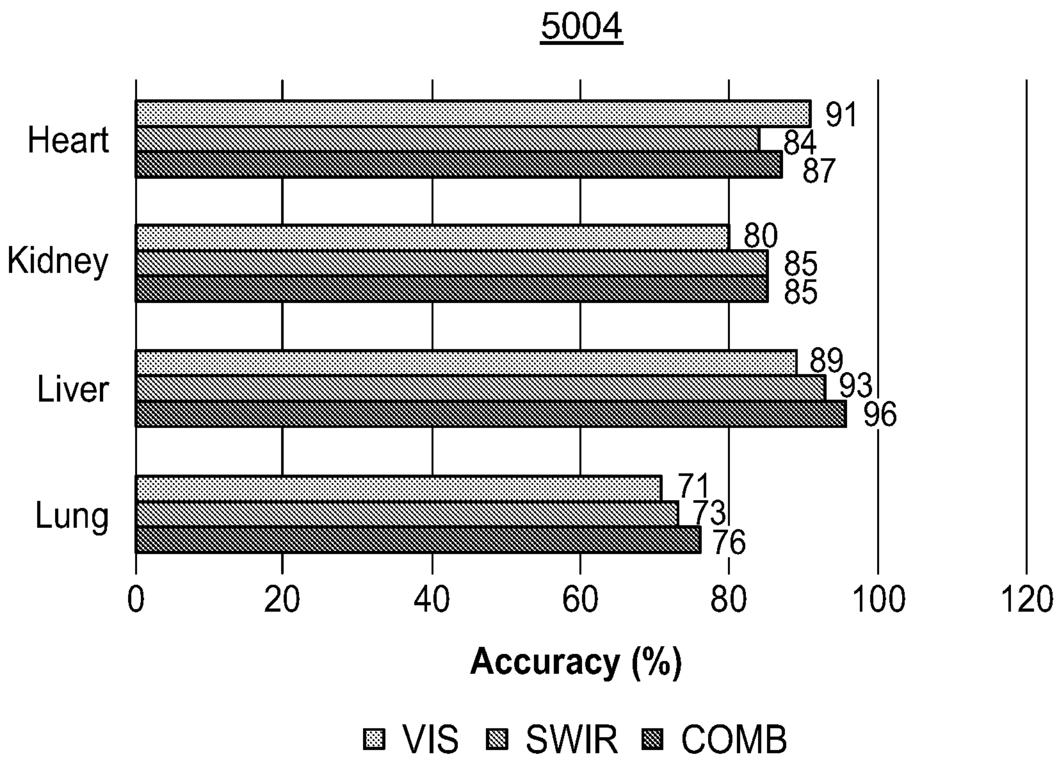

The visible and SWIR surface-reflected hyperspectral intensity spectra 4902 for 102 mixed sheep and beef organs (Table 4) are displayed in FIG. 49. Differences across these spectra make it possible to differentiate organ type. Plots 5002, 5004 of automated organ classification accuracy for visible, SWIR and their combination using two classification models (Partial Least Squares-Discriminant Analysis and Random Forest) are displayed in FIG. 50.

TABLE 4

Distribution of sheep and beef organs collected by organ type.

| Organ Type | n Type |
|---|---|
| Heart | 33 |
| Kidney | 20 |
| Liver | 29 |
| Lung | 20 |

Disease Status—Sheep Organs

Figure 51:
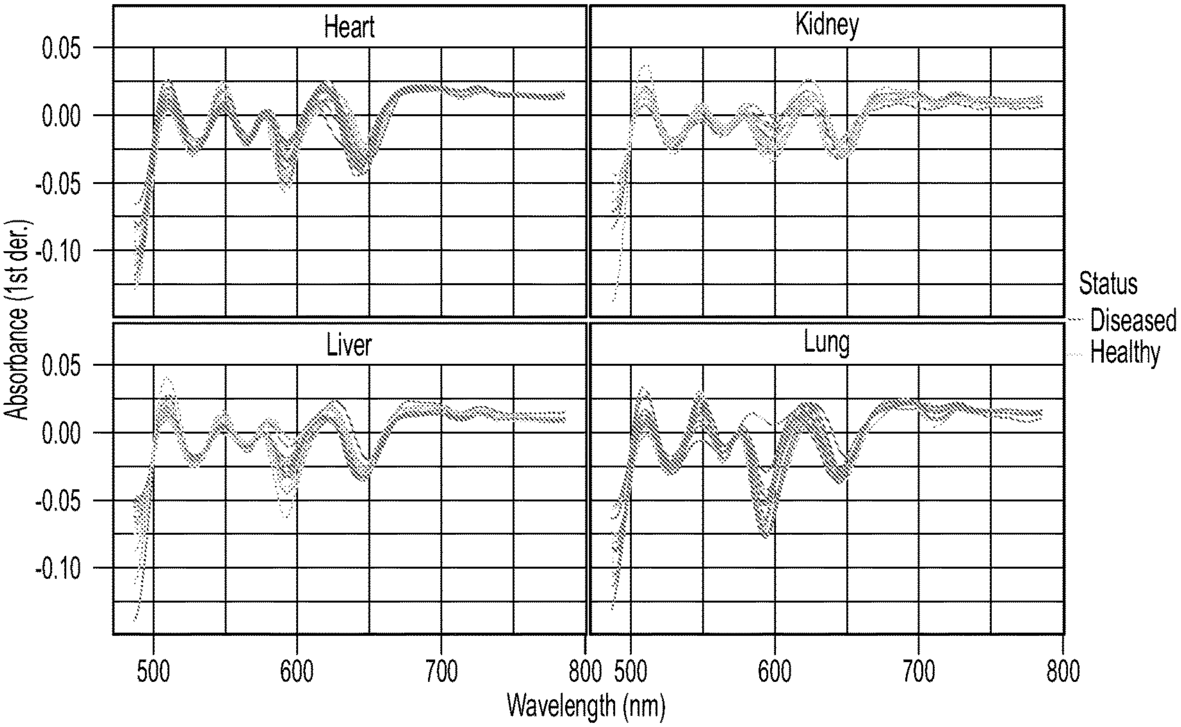
FIG. 51 shows visible and short-wave infrared spectra by organ type for diseased (red) and healthy (blue) organs, in accordance with some embodiments of the present specification.
Figure 51:
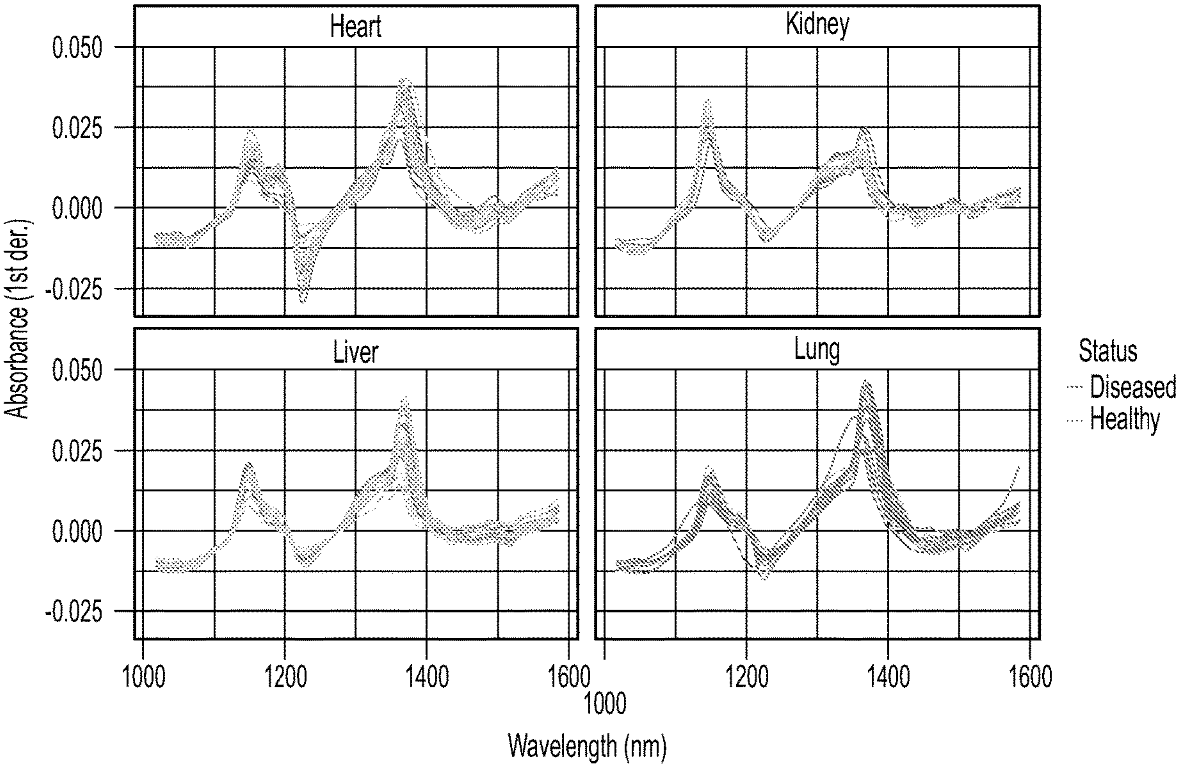
Figure 52:
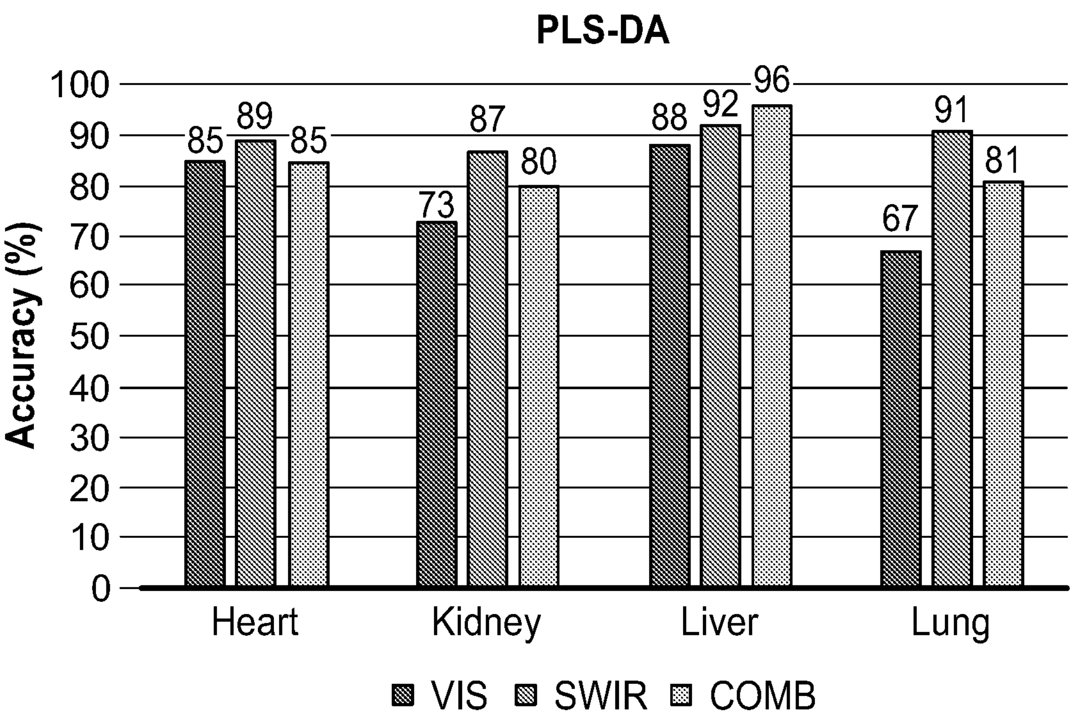
FIG. 52 shows first and second plots indicative of accuracy of machine learning models (PLS-DA—partial least squares discriminant analysis; and RF-random forest) for hyperspectral sensors to differentiate a plurality of sheep organs by disease status, in accordance with some embodiments of the present specification.
Figure 52:
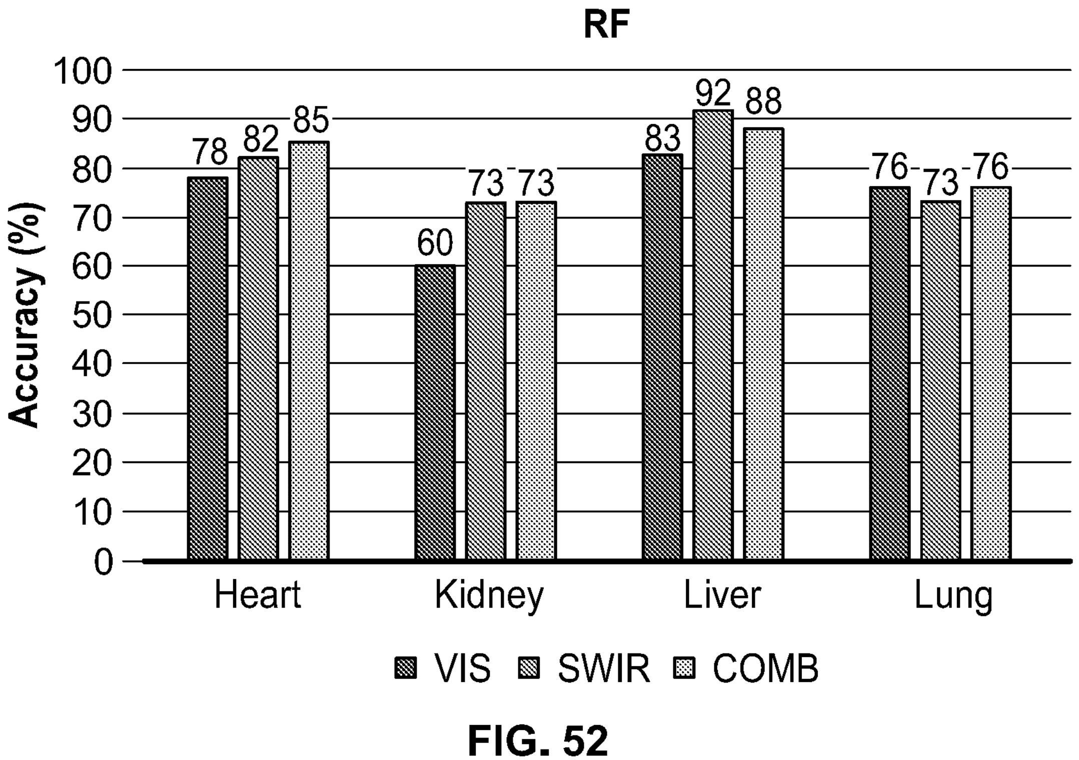

The first derivative of the absorbance of visible and SWIR hyperspectral spectra 5102, 5104 for 89 healthy and diseased sheep organs (Table 5) are displayed in FIG. 51. Differences across these spectra make it possible to differentiate organ health. Plots 5202, 5204 of automated organ classification accuracy for visible, SWIR and their combination using two classification models (Partial Least Squares-Discriminant Analysis and Random Forest) are displayed in FIG. 52.

TABLE 5

Distribution of 89 sheep organs by organ type and disease status

| Organ Type | n Disease | n Healthy |
|---|---|---|
| Heart | 13 | 15 |
| Kidney | 6 | 9 |
| Liver | 11 | 13 |
| Lung | 17 | 5 |

Grain Vs. Grass-Fed Beef

Figure 53:
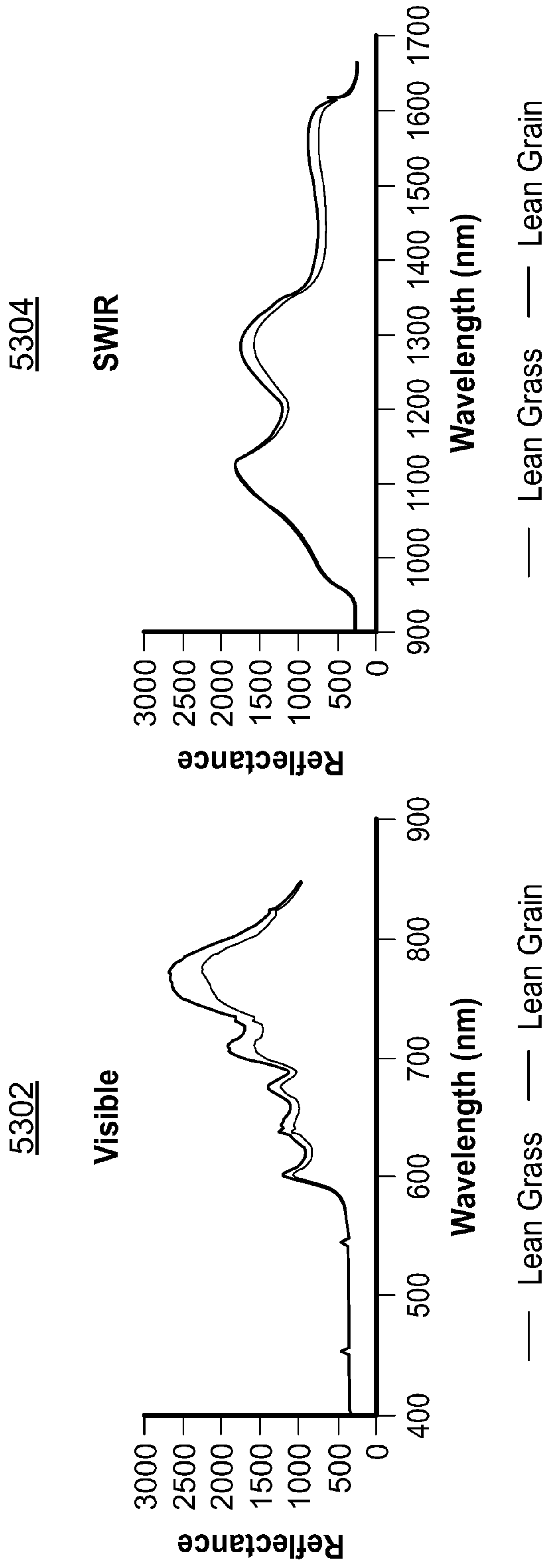
FIG. 53 shows visible and short-wave infrared spectra for differentiation of lean beef by grass- or grain-feeding, in accordance with some embodiments of the present specification.

The mean visible and SWIR hyperspectral reflectance spectra 5302, 5304 for 108 (54 grain and 54 grass, frozen) beef steaks are displayed in FIG. 53. Differences across these spectra make it possible to differentiate steak provenance. Tables of automated steak classification for visible and SWIR HS using three classification models (Partial Least Squares-Discriminant Analysis, Linear Discriminant Analysis and Random Forest) are displayed in Table 6 and Table 7, respectively, wherein all three models achieve significant differentiation.

TABLE 6

Model metrics on the validation dataset (n = 28, 25% of total samples) for differentiation of grass-fed and grain-fed beef using visible hyperspectral imaging. Models were developed on a training dataset (n = 80, 75% of samples) using partial least squares discriminant analysis (PLS-DA), linear discriminant analysis (LDA) and random forest (RF) methods.

| Classification Method | Model Metrics on Validation Dataset | | | | | | | |
|---|---|---|---|---|---|---|---|---|
| | Sensitivity | Specificity | Precision | Accuracy | Kappa | P | Correct Grass | Correct Grain |
| PLS-DA | 0.929 | 0.929 | 0.929 | 0.929 | 0.857 | <0.001 | 13/14 | 13/14 |
| LDA | 1.000 | 0.929 | 0.933 | 0.964 | 0.929 | <0.001 | 13/13 | 14/15 |
| RF | 0.857 | 0.857 | 0.857 | 0.857 | 0.714 | <0.001 | 12/14 | 12/14 |

TABLE 7

Model metrics on the validation dataset (n = 28, 25% of total samples) for differentiation of grass-fed and grain-fed beef using short-wave infrared (SWIR) hyperspectral imaging. Models were developed on a training dataset (n = 80, 75% of samples) using partial least squares discriminant analysis (PLS-DA), linear discriminant analysis (LDA) and random forest (RF) methods.

| Classification Method | Model Metrics on Validation Dataset | | | | | | | |
|---|---|---|---|---|---|---|---|---|
| | Sensitivity | Specificity | Precision | Accuracy | Kappa | P | Correct Grass | Correct Grain |
| PLS-DA | 0.786 | 0.929 | 0.917 | 0.857 | 0.714 | <0.001 | 13/16 | 11/12 |
| LDA | 0.786 | 0.929 | 0.917 | 0.857 | 0.714 | <0.001 | 13/16 | 11/12 |
| RF | 0.786 | 0.857 | 0.846 | 0.821 | 0.643 | <0.001 | 12/15 | 11/13 |

Additional Uses of the Multi-Sensory (MEXA) Imaging System

Scanning of Beef Primals

Figure 54:
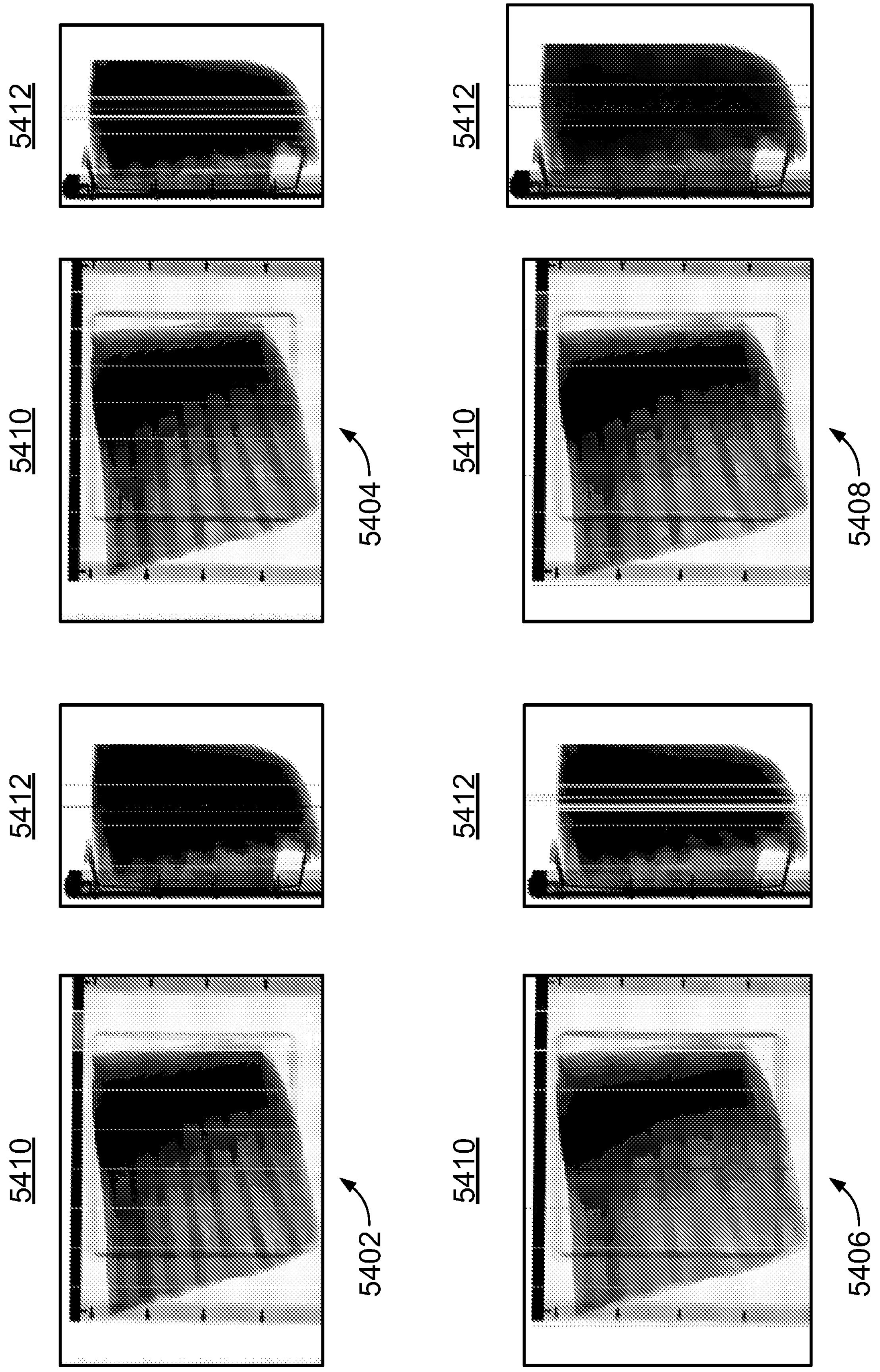
FIG. 54 shows X-ray images of a primal at three different energy levels (low, medium, and high) using two views (up-shooter view and side-shooter view) as well as a summed signal of all six energy levels, in accordance with some embodiments of the present specification.

Beef primals (the wholesale rib sets) were scanned as a component of a larger trial involving the development of optimum carcass endpoints in feedlot cattle depending on breed. At 0, 50, 100, 150 and 200 days on feed at a commercial feedlot, cattle were slaughtered and selected wholesale rib sets were selected for X-ray scanning to develop prediction algorithms for proportions of fat, muscle, and bone. FIG. 54 shows X-ray images of the same primal at three different energy levels (low, medium, and high) 5402, 5404, 5406 using two views (up-shooter view 5410 and side-shooter view 5412), as well as a summed signal 5408 of all six energy levels. The X-ray data shown in images is raw without pre-processing or normalization.

Scanning of Beef Steaks

Figure 55:
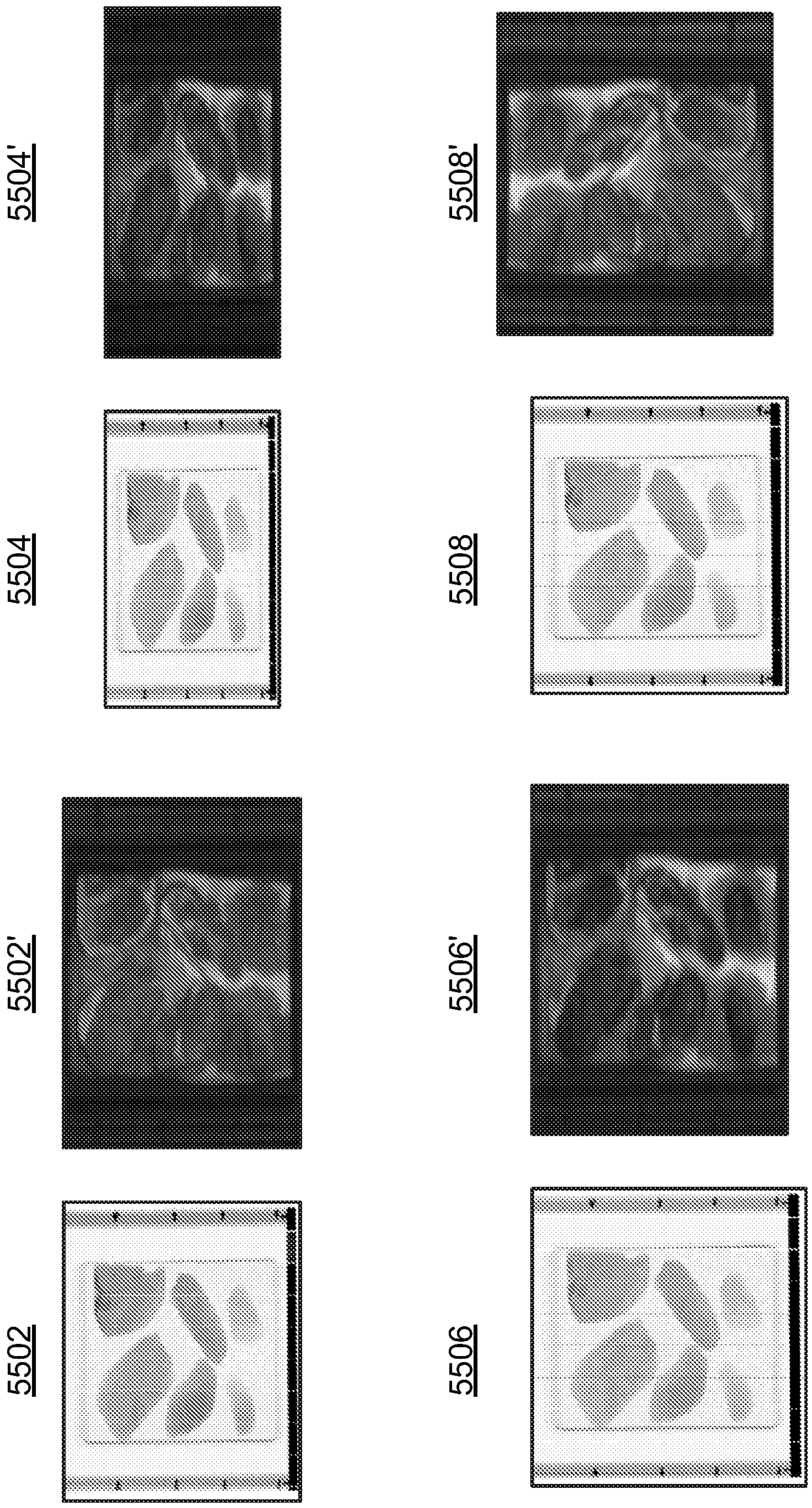
FIG. 55 shows X-ray and short wave infrared hyperspectral images at low, mid, and high energies and wavelengths, respectively, of beef steaks, in accordance with some embodiments of the present specification.

A data collection run was performed of steak samples. In the images of FIG. 55, the low, mid, high energy and summed X-ray images 5502, 5504, 5506, 5508 are shown for six meat sections. Alongside these are three wavelength SWIR images 5502', 5504', 5506' and a compilation image 5508' of the maximum intensity pixel value for qualitative visualization.

Scanning of Dead Lambs

Figure 56:
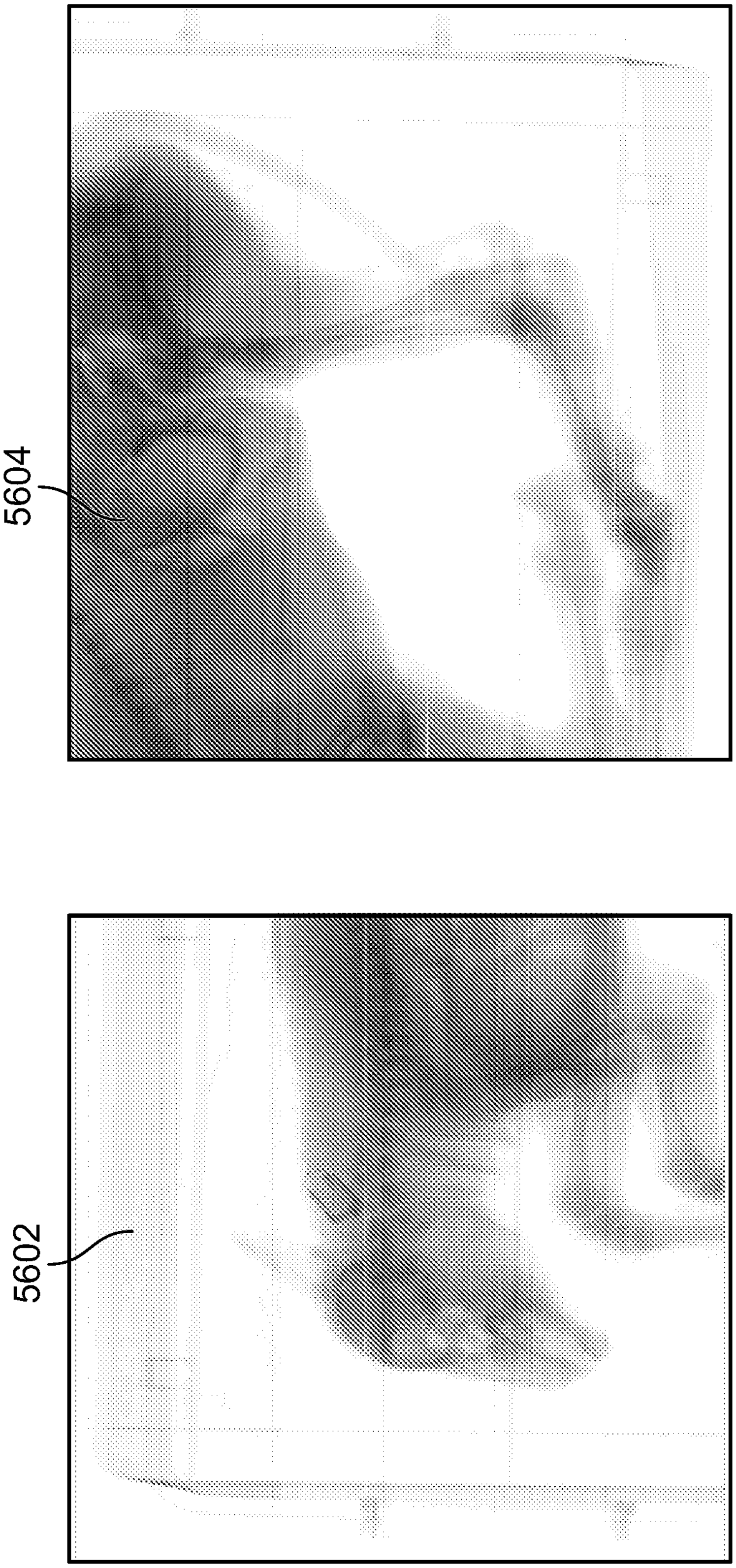
FIG. 56 shows MEXA lamb images acquired in two separate scans and each shown at a different greyscale contrast, in accordance with some embodiments of the present specification.

Sample first X-ray image data 5602 and second X-ray image data 5604 of two lambs is provided in FIG. 56. As shown, the intrinsic image quality looks reasonable for analysis of health issues such as pneumonia, brain inflammation, foreign body inclusions (e.g. syringe needles) and other gross anatomy issues. The X-ray data 5602, 5604 was able to detect differences between lambs that died from head injuries during birth, lambs that had not consumed milk between birth and death. These results showed other potential applications to avoid post-mortem inspections and potentially help understanding the reasons for and reducing mortality in lambs.

The present specification is directed towards evaluating the use of X-ray technology on the detection of the pathologies of foodborne concern. Among the fifty-two livers rejected for human consumptions scanned, 32 were found with various degrees of discoloration (focal and multifocal, located in the different lobes, extended and local), 7 abscesses, 5 ducts thickening, 4 fibrosis, 2 flukes and 2 cysts. Therefore, discoloration not accompanied by a change in tissue density is not expected to be captured by X-ray absorptiometry.

Lesions such as abscesses and fluke lead to modifications of the hepatic tissue involving calcification and thickening processes that alter the physiological radiological density of the organ and could be detected through the X-ray images. In lungs, a less dense tissue than livers, abscesses and CLA lesions were much more easily noticeable. Visual and X-ray intensity comparisons showed differences between livers, kidneys and lungs other than their size and shape.

Soft tissue abscesses are focal or localized collections of pus caused by bacteria or other pathogens surrounded by a peripheral rim or abscess membrane found within the soft tissues in any part of the body. Even if X-rays are generally of limited value for the evaluation of a soft tissue abscess, they might show soft tissue gas or foreign bodies, increasing suspicion for an infectious disease process or reveal other causes for underlying soft tissue swelling.

Fascioliasis or liver fluke is a food-borne hepatic trematode zoonosis, caused by *Fasciola hepatica* and *Fasciola gigantica. F. hepatica* is a flat, leaf-shaped hermaphroditic parasite. Radiological findings can often demonstrate characteristic changes, and thereby, assist in the diagnosis of fascioliasis. The early parenchymal phase of the disease may demonstrate subcapsular low attenuation regions in the liver.

While the X-ray technology did not seem to recognize the shape of the lesions, though the images described various degrees of modifications of the hepatic pattern depending on the lesions found. For each liver scanned, an area of interest was marked based on the macroscopical aspect of the organ and the mark-up was then confirmed during the post-mortem inspection. By the lesion marked, the six radiographs displayed lighter shades of grey when compared to the healthy tissue. The hepatic lesions caused by the pathologies observed (i.e., duct thickening, calcification, etc.) weren't accurately recognized by the radiographs, the technology was only capable of showing unusual shades of grey by the marked-up areas.

The present specification exhibits the use of multi-energy X-ray technology to differentiate organs in a simulated abattoir setting and to present X-ray images compared with whole and dissected photographic images of the same organs, with markings and notes to train a neural network for differentiating the lesions upon the X-ray images compared with the corresponding region of interest upon healthy organs.

The livers from cattle are significantly larger than sheep, and with several presenting noticeable lesions indicative of disease processes. The images within Trial 2 were of mixed species (mostly sheep) and organ type, with lamb pluck X-rays showing differences in density for different types of organs, while the bovine livers were shown to be significantly denser than ovine livers, and a Wagyu liver was shown to be denser than a non-Wagyu liver. Therefore, the size of the tissue or organ being scanned may influence the ability of the X-ray sensor to detect differences of abnormal tissues. In embodiments, the region and distance between the X-ray images may be adjusted for different animal species.

When a lesion is visible to the naked eye, or tissue abnormalities are felt via palpation, prior to sectioning, an X-ray image can discern its shape and further information without requiring sectioning. However, when an organ is simply discolored or there is some subliminal evidence of disease process due to an overly thick surface such as liver fluke deep within a large bovine liver or capsular fibrosis, the X-ray images cannot be marked and therefore intensity histograms from a given ROI would be the optimal method to determine whether an organ can be passed as fit for human consumption or not.

Hyperspectral Data

Hyperspectral (HS) imaging, in the form of two sensors within the multi-sensory platform 2200, is a non-contact technology encompassing the visible spectrum (400-900 nm) and short-wave infrared spectrum (900-1700 nm). The HS images generated from frame-by-frame slices of a hypercube within a region of interest (ROI) are surface-based and can detect differences in spectral signatures within different products such as organs, meat, and agro-food products.

These spectral signatures are extracted from given a ROI across each sample, and can be compared and contrasted with one another using machine learning modelling techniques such as partial least squares discriminant analysis, random forest and artificial neural networks. As a non-contact, non-destructive classification tool, HS may be used to classify organs by organ type, and determining whether an organ of a particular type is diseased. Various algorithms of the present specification may be integrated with the multi-sensory platform.

Figure 57:
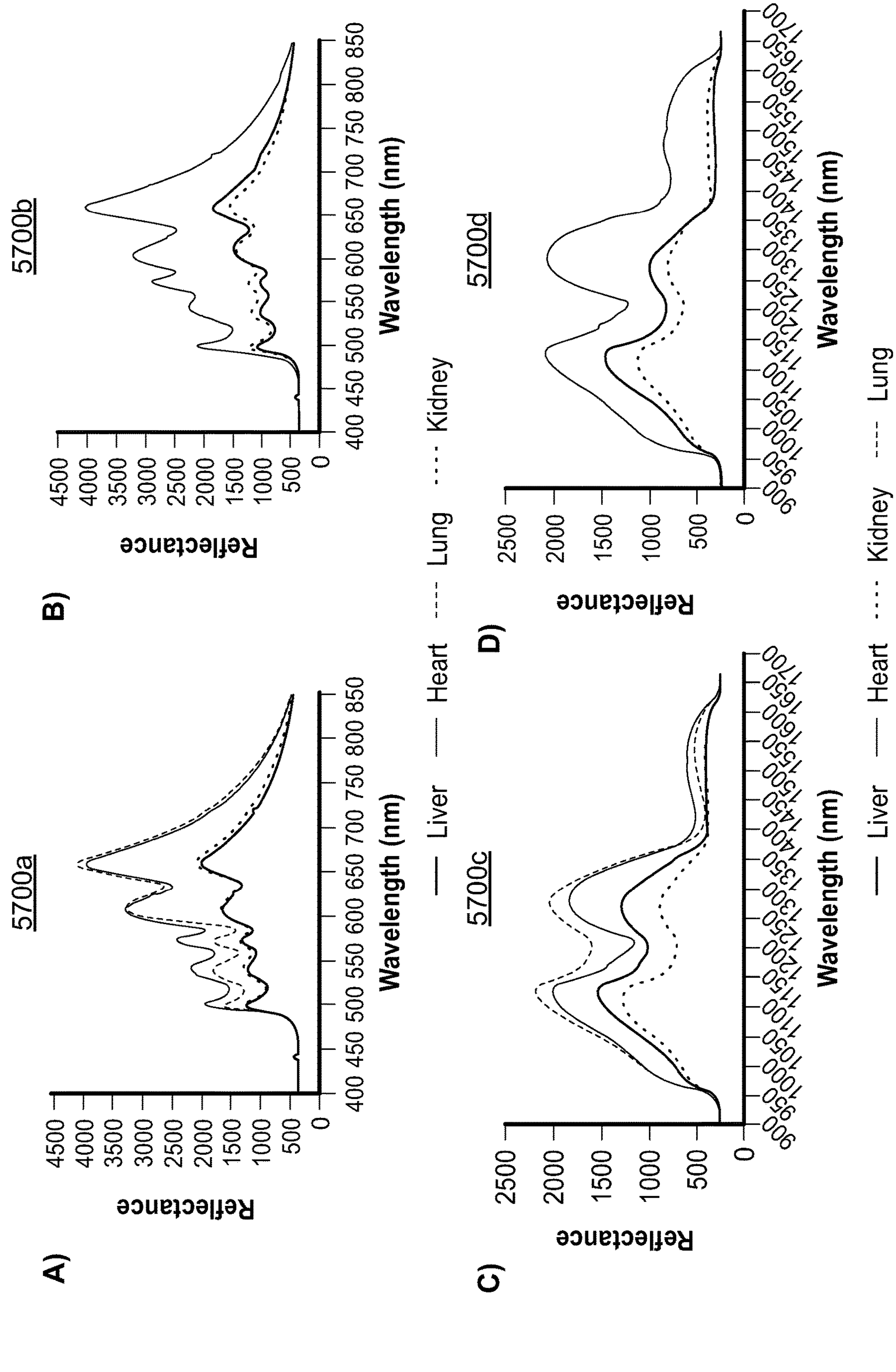
FIG. 57 shows mean visible and short-wave infrared reflectance spectra for each of liver, heart, lung, kidney from sheep and beef, in accordance with some embodiments of the present specification.

In accordance with aspects of the present specification, the multi-sensory imaging system/platform 2200 can be used in organ processing scenarios under commercial conditions such as abattoirs or processing plants. One non-limiting example is where organs are mixed and need to be identified by both species and type. The spectra of each organ and results of classification algorithms to differentiate organs by species and type are described hereunder. Visible (VIS) reflectance spectra 5700*a*, 5700*b* and short-wave infrared (SWIR) reflectance spectra 5700*c*, 5700*d* for each of the four organs (liver, heart, lung, kidney) and each species (beef 5700*b*, 5700*d* and sheep 5700*a*, 5700*c*) are shown in FIG. 57, with hearts and lungs showing higher intensity compared to livers and kidneys in both VIS and SWIR regions. For VIS spectra 5700*a*, 5700*b* difference in intensity occurs between 500 and 850 nm. Hearts and lungs had similar spectral signatures throughout the VIS spectrum except between 500 and 600 nm where hearts had greater intensity. Similarly, kidneys showed slightly greater intensity than livers between 500 and 600 nm. Much stronger differentiation occurred in the SWIR region 5700*c*, 5700*d*, particularly between 1050 to 1350 nm where lung was greatest in intensity, followed by heart, then liver, and then kidney with the lowest intensity. Differences between species were negligible for both spectra.

Figure 58A:
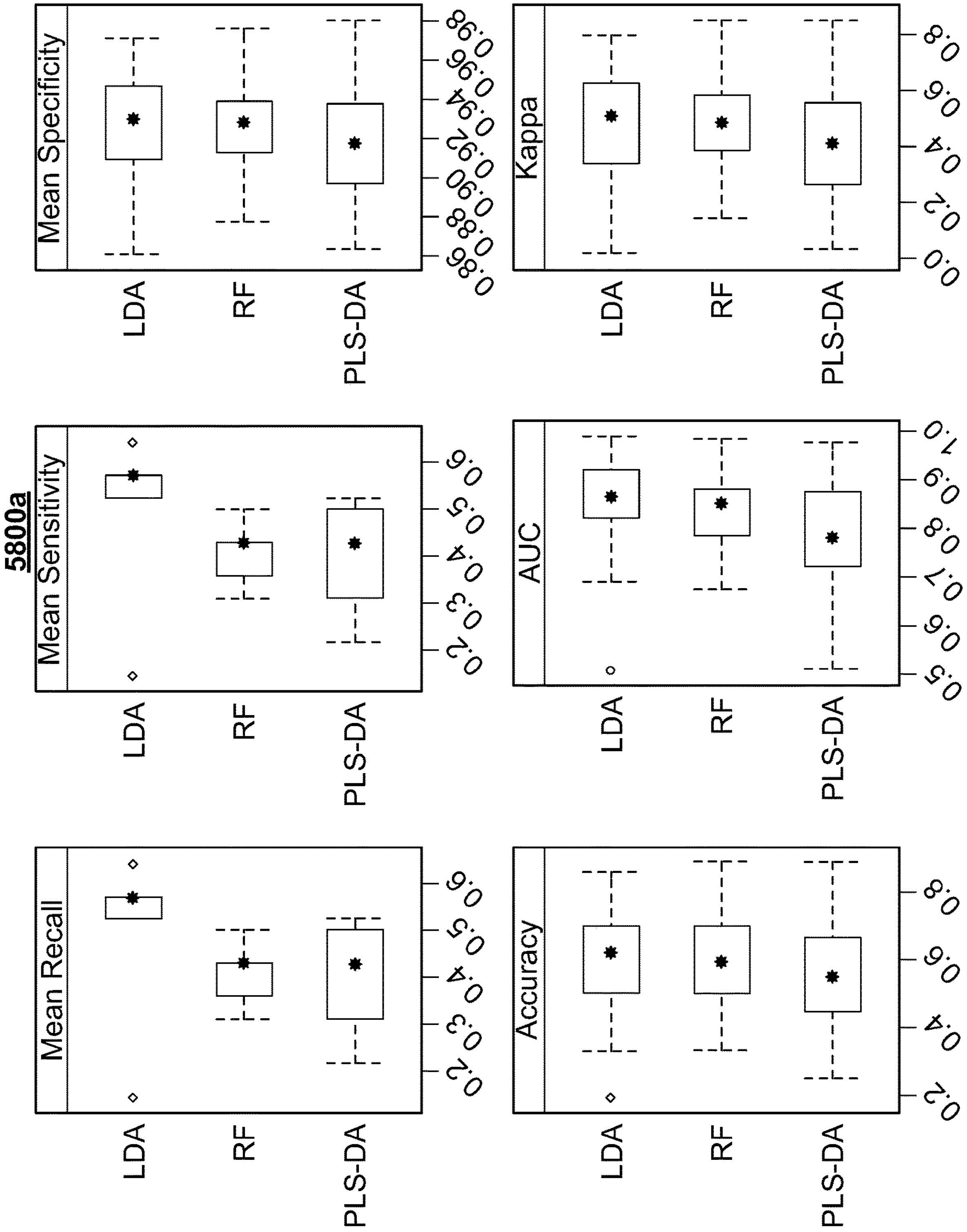
FIG. 58A shows model metrics for the classification of organs from sheep and cattle by both species and type using a visible (VIS) hyperspectral sensor with partial least squares discriminant analysis (PLS-DA), linear discriminant analysis (LDA) and random forest (RF), in accordance with some embodiments of the present specification.
Figure 58B:
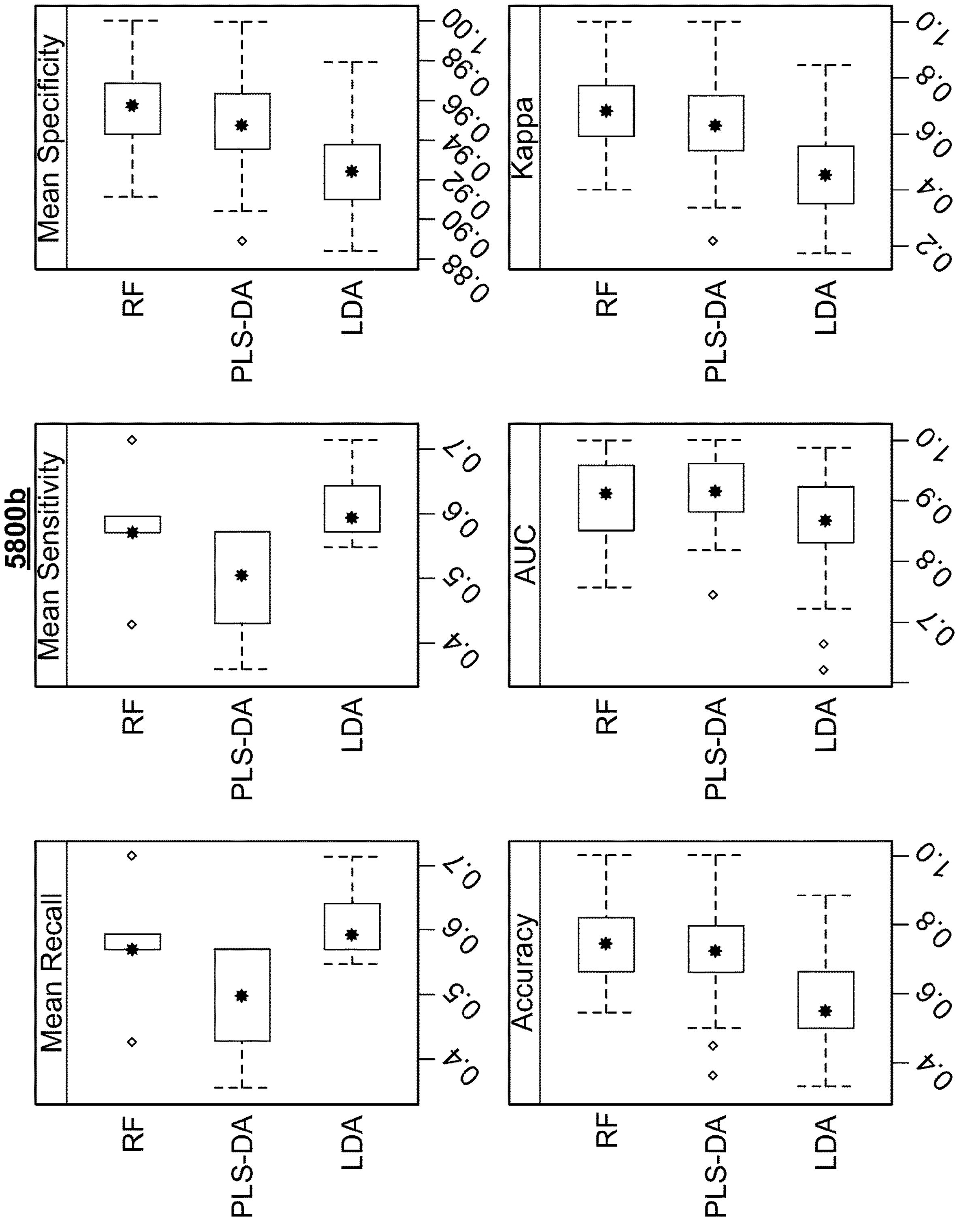
FIG. 58B shows model metrics for the classification of organs from sheep and cattle by both species and type using a short-wave infrared (SWIR) hyperspectral sensor with partial least squares discriminant analysis (PLS-DA), linear discriminant analysis (LDA) and random forest (RF), in accordance with some embodiments of the present specification.
Figure 58C:
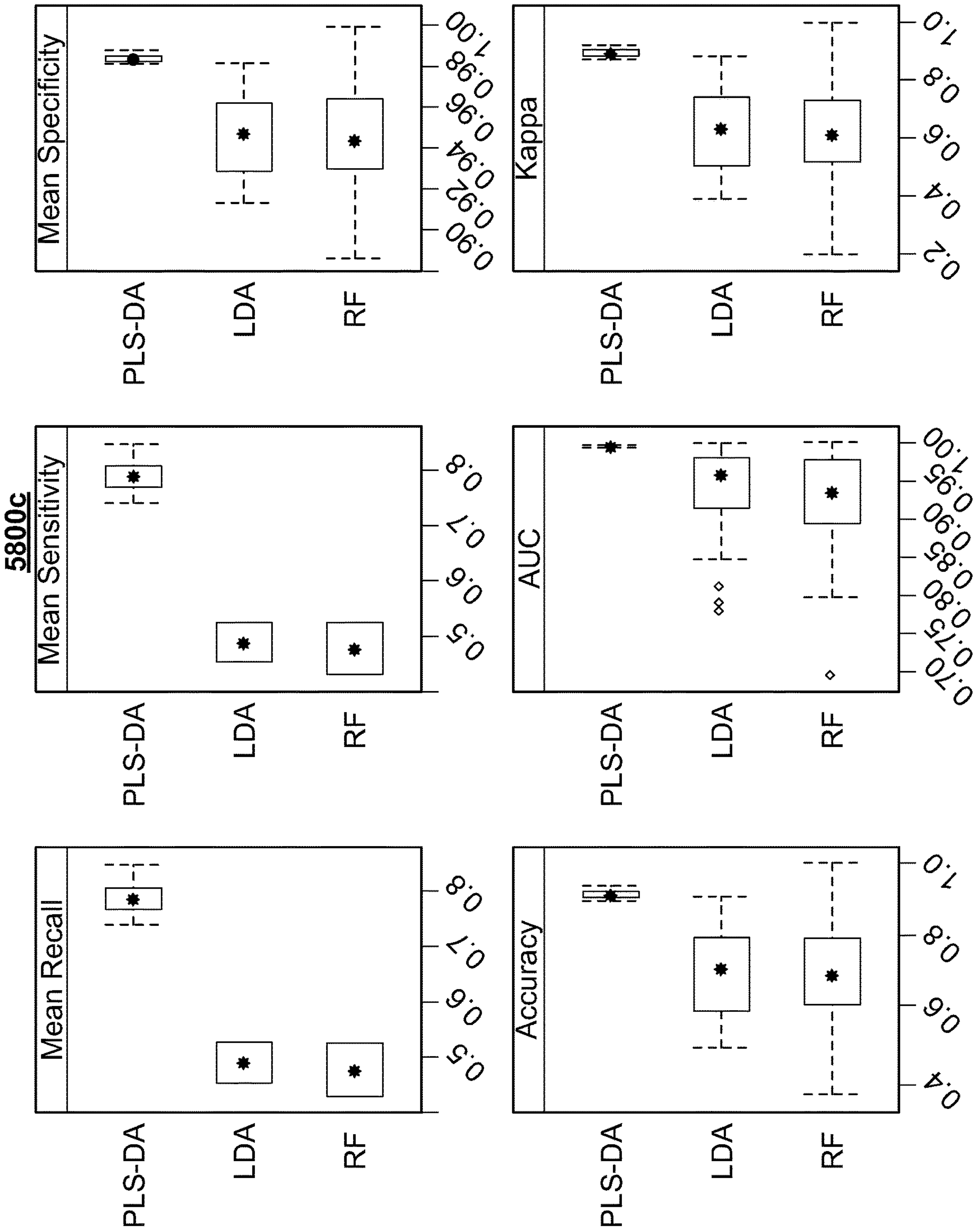
FIG. 58C shows model metrics for the classification of organs from sheep and cattle by both species and type using a combination of visible and short-wave infrared hyperspectral sensors (COMB) with partial least squares discriminant analysis (PLS-DA), linear discriminant analysis (LDA) and random forest (RF), in accordance with some embodiments of the present specification.

In some embodiments, the datasets were pooled across species to develop algorithms for organ and species differentiation as if a mix of organs from both species were scanned through the platform. These algorithms were developed and validated using 5-fold cross-validation. When using both species, the three different spectral regions (VIS, SWIR, and combination VIS and SWIR-COMB) each performed best using a different discriminant analysis model for predictions. As shown in FIG. 58A, model metrics 5800*a* indicative of predictions from VIS spectral data were most accurate with linear discriminant analysis (LDA) modelling. In contrast, model metrics 5800*b* indicative of predictions from SWIR data were most accurate using random forest (RF) modelling (FIG. 58B) and COMB model metrics 5800*c* indicative of predictions with partial least squares discriminant analysis (PLS-DA) modelling (FIG. 58C). However, the three classification methods evaluated with either VIS or SWIR yielded similar accuracies to each other, but COMB was much more accurate with PLS-DA compared to RF and LDA. The PLS-DA model for COMB also had the highest sensitivity, specificity, area under the curve, and Kappa coefficient of agreement (FIG. 58C). Using COMB yielded the highest overall accuracy (71-92%) and Kappa (63-89%) compared to the use of each sensor separately, regardless of the discriminant analysis method used. Therefore, these results show that HS imaging is accurate for industry applications to differentiate between species and organs when these are mixed and passed through the platform.

Figure 59:
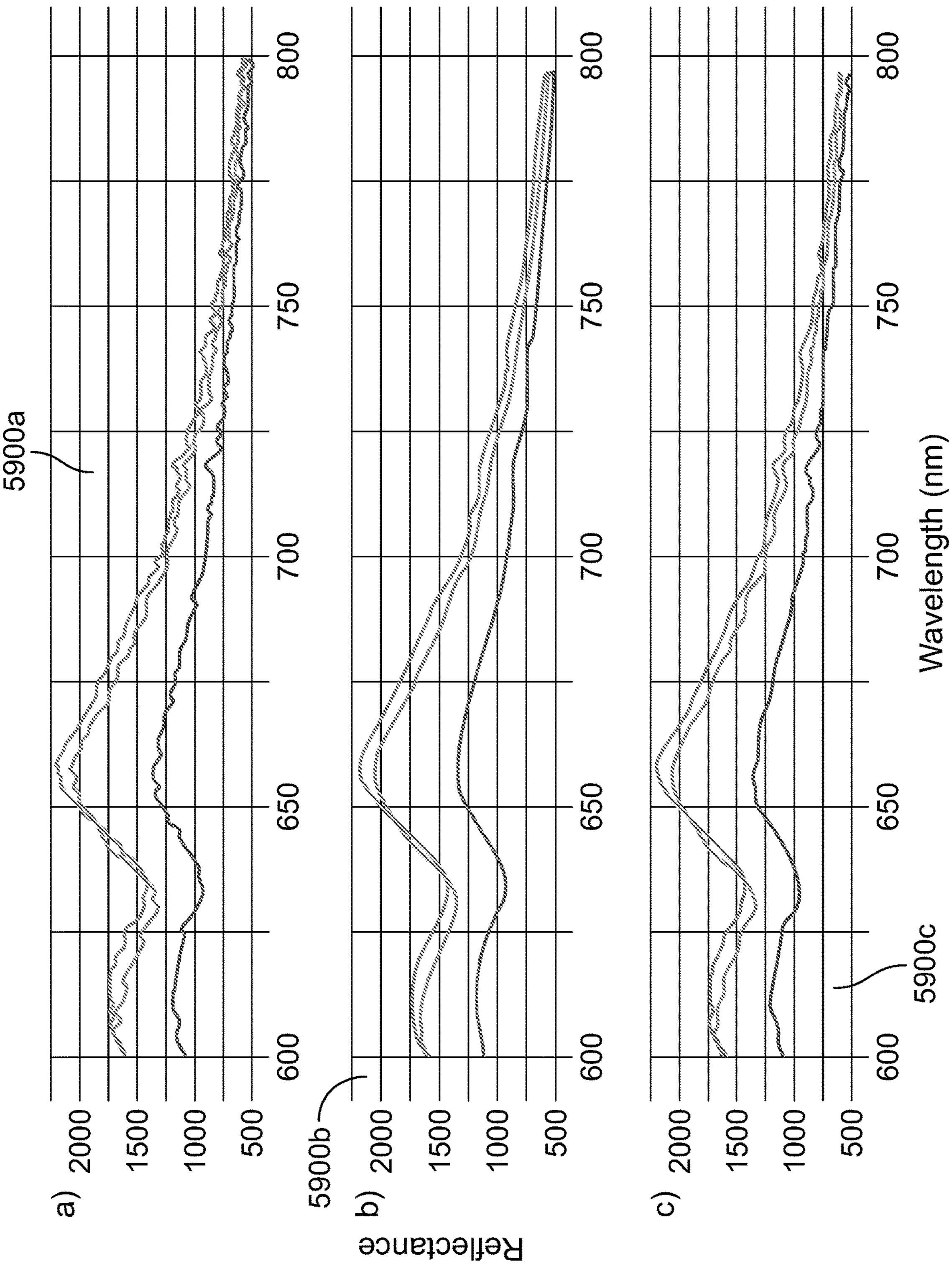
FIG. 59 shows spectra after undergoing different smoothing treatments, in accordance with some embodiments of the present specification.
Figure 59:
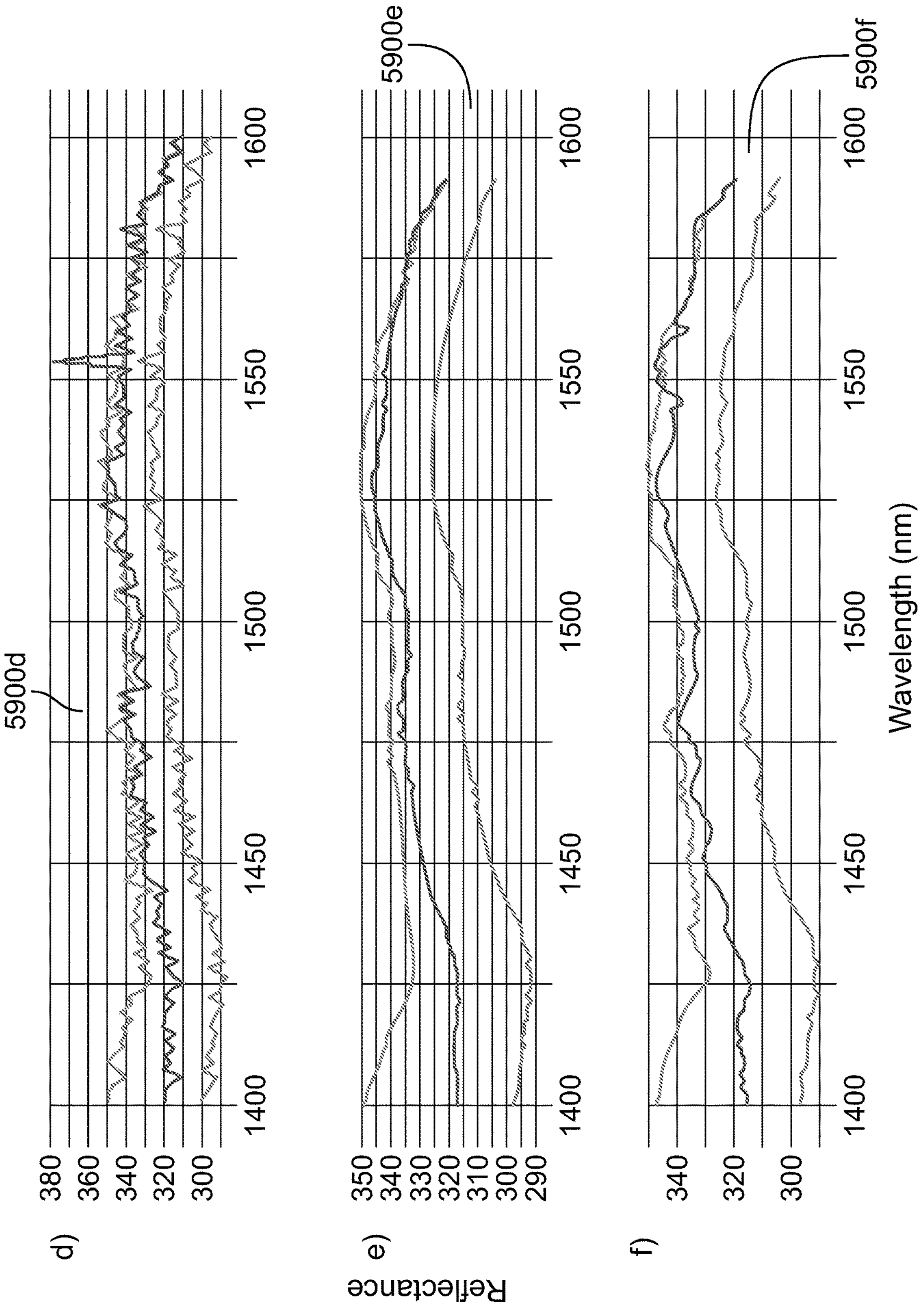

FIG. 59 shows spectra after undergoing different smoothing treatments: a) raw VIS 5900*a*; b) centered moving average of VIS 5900*b*; c) Savitzky-Golay filtered VIS 5900*c*; d) raw SWIR 5900*d*; e) centered moving average SWIR 5900*e*; f) Savitzky-Golay filtered SWIR 5900*f*. The Savitzky-Golay filter did not smooth the spectra to the same extent as centered moving average. In some embodiments, the most accurate model was absorbance with first derivative. However, the differences in the accuracy of the predictions with different data pre-processing methods were not large in most instances and therefore, data pre-processing may not be critical in all cases.

In some embodiments, algorithms could scan entire organs and then search for abnormal regions, which could be assisted by X-ray spectroscopy. Similarly, identifying different components of an organ sampled from the abattoir such as lymph nodes, fat, and bile ducts could assist in identification of the organ, as well as detection of defects, diseases, or abnormalities. However, this would require larger ROI such as marking-up entire organs from an HS image.

Hyperspectral sensors can only measure the electromagnetic radiation from the surface of products and thus, cannot measure the characteristics inside organs to detect defects or abnormalities below the surface. However, the multi-sensory platform of the present specification is used to collect data from a multi-energy X-ray sensor which can penetrate tissues much further. In some embodiments, the platform 2200 contains six X-ray sensors that penetrate at different depths and identifies abnormalities that the HS sensors cannot.

Figure 60:
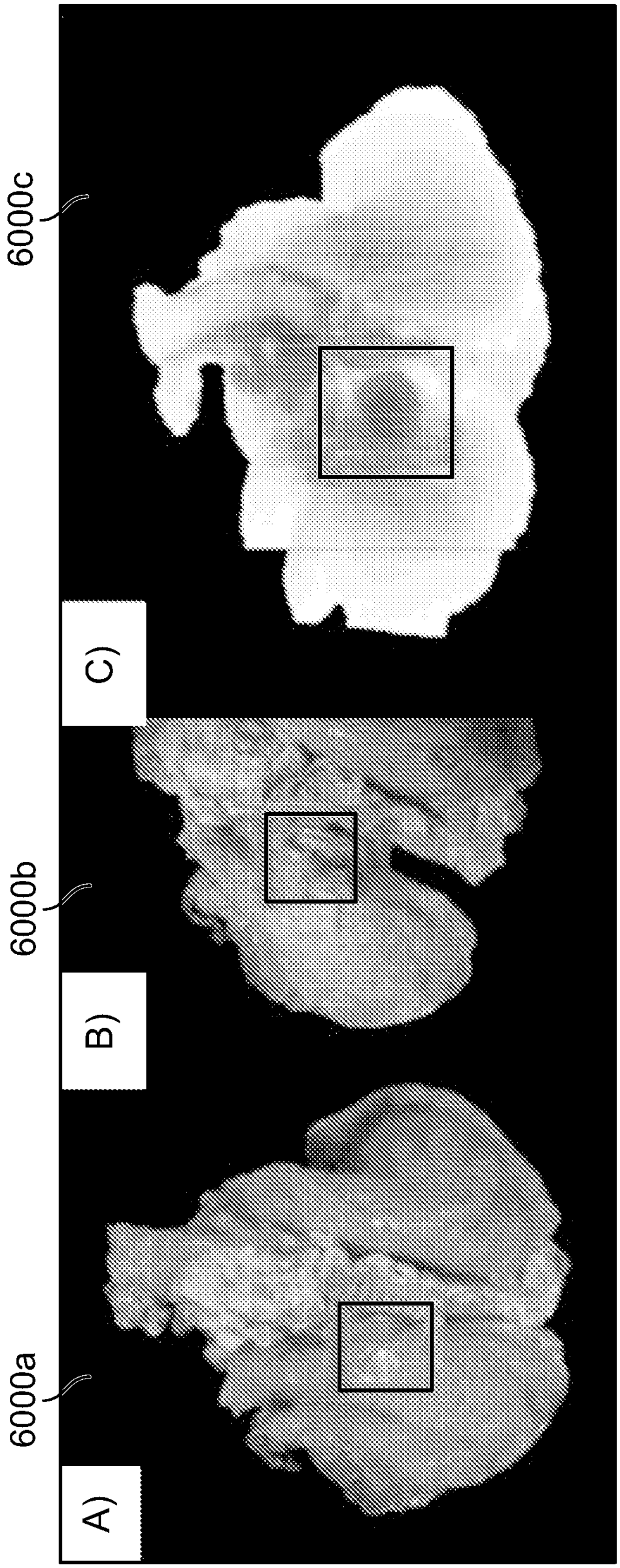
FIG. 60 shows a photograph of unprocessed sheep lung, a photograph of the same sheep lung post-incision and a Multi-Energy X-ray (MEXA) image of the unprocessed sheep lung showing a caseous lymphadenitis (CLA) lesion, in accordance with some embodiments of the present specification.

As shown in FIG. 60, based on visual inspection, several multi-energy X-ray attenuation (MEXA) images of sheep lung generated by the multi-sensory platform 2200 showed the shape and features of organs, and in some cases, allowed for the marking-up of defects such as caseous lymphadenitis (CLA). In FIG. 60, the MEXA image 6002*a* shows an uncut CLA lesion that was felt during palpation by inspectors at the abattoir and was then confirmed by veterinary pathologists after examination/post incision as shown in image 6002*b*. The X-ray image 6002*c* of the sheep lung shows a caseous lymphadenitis (CLA) lesion.

Figure 61:
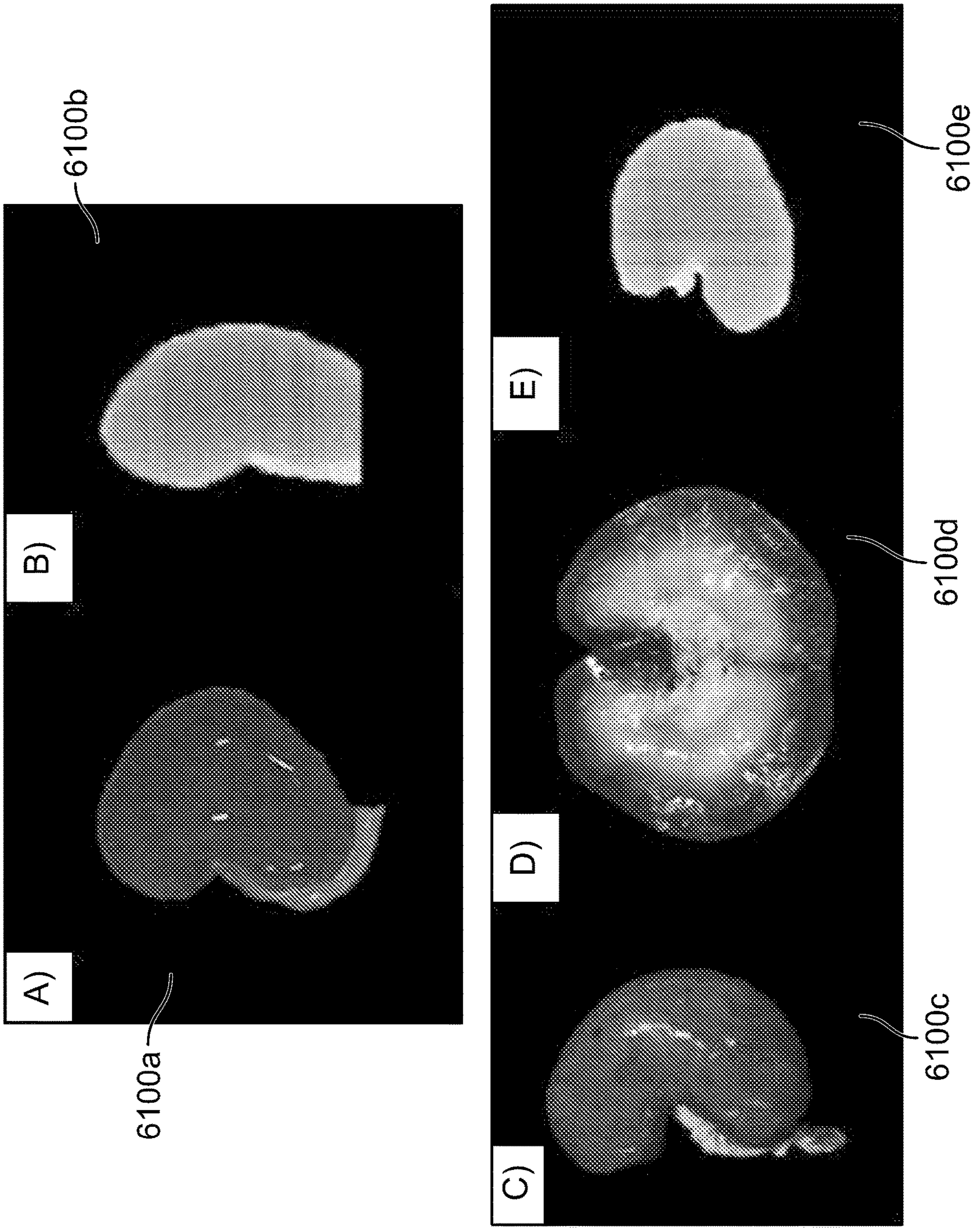
FIG. 61 shows a plurality of RGB and X-ray images of sheep kidneys, in accordance with some embodiments of the present specification.

On the other hand, FIG. 61 shows that in other organs such as kidney with pyelonephritis, the defect is not noticeable to the naked eye, although it may become apparent following image analysis or if dissected organs showing the lesion are scanned. Image 6100*d* is of a bisected kidney showing focal lesion suggestive of pyelonephritis. However, the MEXA image 6100*e* of the defective kidney appears lighter in color than an image 6100*b* of healthy kidney passed for human consumption. Image 6100*a* is of the sheep kidney passed as fit for human consumption while image 6100*c* if of a sheep kidney rejected at an abattoir due to defects. This suggests that diseases that may cause a change in tissue density may be reflected in X-ray absorption, allowing for the creation of threshold values for heart, liver, lung, kidney, and different defects that could replace palpation in the abattoir. The system 2200 could also be used to detect foreign bodies such as needles from vaccinations or other metal bodies. The multi-sensory imaging system 2200 is able to detect organs with defects with an average accuracy of greater than 70%, preferably 90%, in animal tissue, particularly beef offals.

The presently disclosed embodiments can be used to aid inspectors in the abattoir and infer the presence of potential lesions and their location within organs. In addition, X-ray can determine whether an organ of interest (i.e., by abnormal thickness upon palpation or discoloration) is too dense compared to healthy organs within the image library if this is expanded to have more organs, with appropriate thresholds for acceptance or rejection confirmed. In addition, disease processes may also be identified by X-ray imaging once there is a significant amount of marked-up data with information from several lesions.

Hyperspectral imaging technologies are non-invasive and non-contact, and may enable automatic sorting of livestock organs and disease detection in the abattoir, allowing animal health reports to be provided for producers.

The above examples are merely illustrative of the many applications of the system of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. An imaging system configured to evaluate meat, comprising:
- an X-ray scanning system configured to generate X-ray scan data of meat;
- a hyperspectral imaging system configured to generate hyperspectral imaging data;
- a computing device in data communication with the X-ray scanning system and the hyperspectral imaging system, wherein the computing device includes a processor and memory storing a plurality of programmatic instructions which when executed by the processor, configures the processor to:

acquire the X-ray scan data and hyperspectral imaging data;

automatically determine a quality of the meat by analyzing the acquired X-ray scan data in combination with the hyperspectral imaging data;

categorize the meat, based on the determined quality, into one of acceptable quality and unacceptable quality categories;

generate data indicative of the quality of the meat;

generate at least one graphical user interface to display at least one image corresponding to the hyperspectral imaging data;

identify regions indicative of anomalies in the at least one image; and apply an annotation to the identified regions, wherein the annotation is at least one of a shape or a color.

2. The system of claim 1, wherein the X-ray scanning system comprises a two-dimensional projection X-ray imaging system having at least one of a single-view or a dual-view configuration, in combination with multi-energy X-ray (MEXA) sensors.

3. The system of claim 2, wherein the X-ray scanning system comprises an inclined conveyor such that an entrance end of the conveyor is at a lower height position than an exit end of the conveyor.

4. The system of claim 2, wherein the X-ray scanning system uses a declining conveyor such that an entrance end of the conveyor is at a higher height position than an exit end of the conveyor.

5. The system of claim 1, wherein the hyperspectral scan data comprises data in a visible light wavelength range and a shortwave infrared wavelength range.

6. The system of claim 1, wherein the meat comprises offal and organs.

7. The system of claim 1, further comprising at least one of an ink-jet, a laser beam, a LED strip or an augmented reality headset adapted to generate a visual indication of quality in relation to the meat.

8. The system of claim 1, wherein the processor is further configured to:

generate at least one graphical user interface to display at least one image corresponding to the X-ray scan data, and determine the quality of the meat based on data indicative of a thickness and/or a density of the meat.

9. The system of claim 1, further comprising a conveyor that translates the meat through the system at a speed ranging from 0.1 m/s to 1.0 m/s.

10. The system of claim 1, wherein the multi-sensor imaging system has an inspection tunnel having a length ranging from 1100 mm to 5000 mm, a width ranging from 500 mm to 1000 mm, and a height ranging from 300 mm to 1000 mm.

11. The system of claim 1, wherein the X-ray scanning system comprises a first X-ray source of 120 to 160 keV with 0.2 to 1.25 mA beam current and a second X-ray source of 120 to 160 keV with 0.2 to 1.25 mA beam current, wherein the first X-ray source is configured in up-shooter configuration and the second X-ray source is configured in a side-shooter configuration.

12. The system of claim 11, wherein the X-ray scanning system comprises multi-energy photon counting X-ray sensor arrays.

13. The system of claim 11, wherein the X-ray scanning system comprises 6 to 22 data acquisition boards corresponding to the first X-ray source and 4 to 20 data acquisition boards corresponding to the second X-ray source.

14. The system of claim 1, wherein the X-ray scanning system is configured to acquire data in a plurality of energy bands, wherein the plurality of energy bands ranges from 3 to 20 and wherein each of the energy bands are in the range of 20-160 keV.

15. The system of claim 1, wherein the hyperspectral imaging system comprises a first camera sensor configured for visible imaging in 200 to 1200 wavelength bands and a second camera sensor configured for shortwave infrared imaging in 400 to 700 wavelength bands.

16. The system of claim 15, wherein the first camera sensor is configured to operate in a range of 400 nm to 900 nm and have a spectral resolution of at least 20 nm with a pixel size not exceeding 2.0 mm across a width of a conveyor.

17. The system of claim 16, wherein the second camera sensor operates is configured to operate in a range of 900 nm to 1800 nm and have a spectral resolution of at least 20 nm with a pixel size not exceeding 2.0 mm across the width of the conveyor.

18. The system of claim 1, wherein the hyperspectral imaging system is configured to have an acquisition rate of 30 to 150 Hz.

19. The system of claim 1, wherein the X-ray scanning system and the hyperspectral imaging system are synchronized to an X-ray base frequency ranging from 150 to 500 Hz.

20. The system of claim 1, wherein the processor is further configured to determine a type of meat based on the acquired X-ray scan data and hyperspectral imaging data.

21. The system of claim 1, wherein the processor is configured to implement at least one machine learning model, and wherein the machine learning model is configured to analyze the hyperspectral imaging data in order to determine the quality of the meat and the regions indicative of anomalies.

22. The system of claim 1, wherein the machine learning model is adapted to be trained using K-means clustering in order to identify the regions indicative of anomalies.

23. The system of claim 1, wherein the data indicative of a quality of the meat includes at least one of a lean meat yield, a ratio of intra-muscular fat to tissue, an amount of inter-muscular fat, an absolute size of individual organs, a relative size of individual organs, a muscle volume, a number of ribs, a presence or an absence of diseases, a presence or an absence of cysts, a presence or an absence of tumors, a presence or an absence of pleurisy, or a presence or an absence of foreign objects.

24. The system of claim 1, wherein the computing device is further configured to segment at least one region of interest of the meat by applying a hyperspectral band-specific filtering operation, wherein the hyperspectral band-specific filtering operation is configured to isolate tissue signatures associated with one or more organs.

25. The system of claim 1, wherein the computing device is further configured to normalize the hyperspectral imaging data using a reflectance-normalization process prior to determining the quality of the meat.

26. The system of claim 1, wherein the quality determination comprises extracting, from the X-ray scan data, one or more volumetric density features derived from a plurality of imaging planes within the X-ray scanning tunnel.

27. The system of claim 1, further comprising at least one radar or millimeter-wave transceiver positioned proximate the imaging tunnel, wherein the computing device is configured to combine radar-derived surface-contour data with the hyperspectral imaging data to aid in identifying anatomical boundaries of the meat.

28. An imaging system configured to evaluate meat, comprising:

an X-ray scanning system configured to generate X-ray scan data of meat;

a hyperspectral imaging system configured to generate hyperspectral imaging data;

a computing device in data communication with the X-ray scanning system and the hyperspectral imaging system, wherein the computing device includes a processor and memory storing a plurality of programmatic instructions which when executed by the processor, configures the processor to:

acquire the X-ray scan data and hyperspectral imaging data, wherein the X-ray scan data includes a plurality of energy bands ranging from 3 to 20 and wherein each of the energy bands are in the range of 20-160 keV;

automatically determine a quality of the meat by analyzing the acquired X-ray scan data in combination with the hyperspectral imaging data;

categorize the meat, based on the determined quality, into one of acceptable quality and unacceptable quality categories; and generate data indicative of the quality of the meat.

29. An imaging system configured to evaluate meat, comprising:

an X-ray scanning system configured to generate X-ray scan data of meat, wherein the X-ray scanning system comprises a first X-ray source with an energy ranging from 120 to 160 keV with beam current ranging from 0.2 to 1.25 mA and a second X-ray source with an energy ranging from 120 to 160 keV with a beam current ranging from 0.2 to 1.25 mA, wherein the first X-ray source is configured in up-shooter configuration and the second X-ray source is configured in a side-shooter configuration and wherein the X-ray scanning system comprises multi-energy photon counting X-ray sensor arrays;

a hyperspectral imaging system configured to generate hyperspectral imaging data;

a computing device in data communication with the X-ray scanning system and the hyperspectral imaging system, wherein the computing device includes a processor and memory storing a plurality of programmatic instructions which when executed by the processor, configures the processor to:

acquire the X-ray scan data and hyperspectral imaging data;

automatically determine a quality of the meat by analyzing the acquired X-ray scan data in combination with the hyperspectral imaging data;

categorize the meat, based on the determined quality, into one of acceptable quality and unacceptable quality categories; and generate data indicative of the quality of the meat.

* * * * *